(12) United States Patent  
Murakami et al.

(10) Patent No.: US 8,724,729 B2  
(45) Date of Patent: May 13, 2014

(54) INTERLEAVER, INTERLEAVING METHOD, TRANSMISSION APPARATUS, AND TRANSMITTING METHOD

(75) Inventors: Yutaka Murakami, Osaka (JP); Kiyotaka Kobayashi, Osaka (JP); Masayuki Orihashi, Osaka (JP); Akihiko Matsuoka, Osaka (JP); Daichi Imamura, Kanagawa (JP); Rahul Malik, Singapore (SG)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/399,848

(22) Filed: Feb. 17, 2012

(65) Prior Publication Data

US 2012/0147989 A1 Jun. 14, 2012

Related U.S. Application Data

(63) Continuation of application No. 12/917,248, filed on Nov. 1, 2010, now Pat. No. 8,144,799, which is a continuation of application No. 10/579,745, filed as application No. PCT/JP2004/017096 on Nov. 17, 2004, now Pat. No. 7,864,903.

(30) Foreign Application Priority Data

| Nov. 21, 2003 | (JP) | 2003-391860 |
| Jan. 9, 2004 | (JP) | 2004-003885 |
| Mar. 12, 2004 | (JP) | 2004-071780 |
| May 7, 2004 | (JP) | 2004-139241 |
| May 17, 2004 | (JP) | 2004-146887 |
| Jun. 17, 2004 | (JP) | 2004-180277 |
| Nov. 1, 2004 | (JP) | 2004-318521 |

(51) Int. Cl.  
*H04B 7/02* (2006.01)

(52) U.S. Cl.  
USPC ........... 375/267; 375/261; 375/260; 375/259; 375/295; 375/347; 714/704; 714/701; 714/705; 714/700

(58) Field of Classification Search  
USPC ................. 375/267, 261, 260, 259, 295, 347; 714/704, 701, 705, 700  
See application file for complete search history.

(56) References Cited

U.S. PATENT DOCUMENTS

| 4,394,642 | A | * | 7/1983 | Currie et al. .................... 341/81 |
| 6,266,360 | B1 | | 7/2001 | Okamoto |

(Continued)

FOREIGN PATENT DOCUMENTS

| EP | 1530312 | 5/2005 |
| EP | 1691519 | 8/2006 |

(Continued)

OTHER PUBLICATIONS

PCT International Search Report dated Feb. 8, 2005.

(Continued)

*Primary Examiner* — Zewdu Kassa  
(74) *Attorney, Agent, or Firm* — Allen, Dyer, Doppelt, Milbrath & Gilchrist, P.A. Attorneys at Law

(57) ABSTRACT

Soft decision sections provisionally decide each modulated signal separated using an inverse matrix calculation of a channel fluctuation matrix at separation section. Signal point reduction sections reduce candidate signal points of a multiplexed modulated signal using the provisional decision results. Soft decision sections make a correct decision using the reduced candidate signal points and obtain received data of each modulated signal. This allows received data RA, RB with a good error rate characteristic to be obtained with a relatively small number of calculations without reducing data transmission efficiency.

12 Claims, 104 Drawing Sheets

(56) References Cited

U.S. PATENT DOCUMENTS

| | | | |
|---|---|---|---|
| 6,631,491 B1* | 10/2003 | Shibutani et al. | 714/762 |
| 6,829,151 B2 | 12/2004 | Elferich | |
| 2002/0036980 A1 | 3/2002 | Lundby et al. | |
| 2003/0012171 A1 | 1/2003 | Schmidl et al. | |
| 2003/0037298 A1 | 2/2003 | Eleftheriou | |
| 2003/0060173 A1* | 3/2003 | Lee et al. | 455/103 |
| 2003/0072353 A1 | 4/2003 | Wengerter | |
| 2003/0076783 A1 | 4/2003 | Das | |
| 2003/0076873 A1* | 4/2003 | Wengerter et al. | 375/141 |
| 2003/0103584 A1 | 6/2003 | Bjerke | |
| 2003/0105996 A1 | 6/2003 | Dagan | |
| 2003/0112901 A1* | 6/2003 | Gupta | 375/340 |
| 2003/0220324 A1 | 11/2003 | Fotsch | |
| 2003/0236076 A1 | 12/2003 | Brunel | |
| 2004/0042565 A1 | 3/2004 | Garrett | |
| 2004/0148552 A1* | 7/2004 | Matsumoto et al. | 714/712 |
| 2004/0174939 A1 | 9/2004 | Wang | |
| 2004/0181419 A1 | 9/2004 | Davis | |
| 2004/0199846 A1 | 10/2004 | Matsumoto | |
| 2004/0233838 A1 | 11/2004 | Sudo | |
| 2005/0152266 A1 | 7/2005 | Hwang | |
| 2005/0190766 A1 | 9/2005 | Ochiai | |

FOREIGN PATENT DOCUMENTS

| | | |
|---|---|---|
| JP | 10-229383 | 8/1998 |
| JP | 10-233758 | 9/1998 |
| JP | 2003-32226 | 1/2003 |
| JP | 2003-078480 | 3/2003 |
| JP | 2003-111408 | 4/2003 |
| JP | 2003-115768 | 4/2003 |
| JP | 2003-143645 | 5/2003 |
| JP | 2003-179528 | 6/2003 |
| JP | 2003-283441 | 10/2003 |
| JP | 2003-304216 | 10/2003 |
| JP | 2004-023392 | 1/2004 |
| JP | 2004-032781 | 1/2004 |
| JP | 2004-096745 | 3/2004 |
| JP | 2004-266838 | 9/2004 |
| JP | 2004-282757 | 10/2004 |
| JP | 2004-320434 | 11/2004 |
| JP | 2005-503369 | 2/2005 |
| JP | 2005-143116 | 6/2005 |
| WO | 03/047118 | 6/2003 |
| WO | 03047118 | 6/2003 |
| WO | 03049397 | 6/2003 |
| WO | 03/096150 | 11/2003 |
| WO | 03096599 | 11/2003 |

OTHER PUBLICATIONS

T. Aoki, et al., "MIMO Channel ni okeru ZF to MLD o Heiyo shita Group Detection ni Kansuru Kento," 2003 nen The IEICE Tsushin Society Taikai Koen Ronbunshu 1, Sep. 10, 2003, p. 393.

Y. Ashina, et al., "MIMO Channel Denso ni Mochiiru MLD no Enzanryo Sakugenho no Kento," 2003 nen The IEICE Sogo Taikai, Communication 1, Mar. 3, 2003, p. 625.

E. Viterbo, et al., "A Universal Lattice Code Decoder for Fading Channels," IEEE Transactions on Information Theory, vol. 45, No. 5, Jul. 1999, pp. 1639-1642.

K. Miyauchi, et al., "New Technique for Generating and Detecting Multilevel Signal Formats," IEEE Transactions on Communications, vol. 24, No. 2, Feb. 1976, pp. 263-267.

H. Kawai, et al., "QRM-MLD o Mochiiru OFCDM Mimo Taju ni okeru Shinraido Joho o Mochiiru Tekio Ikinokori Symbol Replica Koho Sentakuho no Tokusei Hyoka," The IEICE Gijutsu Kenkyu Hokoku, vol. 104, No. 186, Jul. 9, 2004, pp. 19-24.

W. Jiang, et al., "A Novel MIMO Signal Detection Scheme Combining ZF and MLD," IEICE Technical Report, vol. 103, No. 680, Feb. 25, 2004, pp. 1-6.

T. Onizawa, et al., "OFDM/SDM ni okeru Jigen Shukusho o Mochiita ML Kenshutsuki ni Kansuru Ichikento," 2004 nen The IEICE Sogo Taikai, Communication 1, Mar. 8, 2004, p. 537.

B. Bjerke, et al., "Multiple-Antenna Diversity Techniques for Transmission over Fading Channels," IEEE WCNC 1999, Sep. 1999, pp. 1038-1042, p. 5, line 1.

V. Tarokh, et al., "Space-Time Blok Codes from Orthogonal Designs," IEEE Transactions on Information Theory, vol. 45, No. 5, Jul. 1999, pp. 1456-1467, p. 5, line 3.

J. Hou, et al., "Performance Analysis and Code Optimization of Low Density Parity-Check Codes on Rayleigh Fading Channels," IEEE Journal on selected areas in communications, vol. 19, No. 5, May 2001, pp. 924-934, p. 101, line 18.

Y. Murakami, et al., "Performance Analysis of MIMO Systems under Rician Fading Channels," Technical Report of IEICE, NS2003-67, RCS2003-90, Jul. 2003, pp. 1-6, with English abstract, p. 74, line 5.

K. Miyashita, et al., "Eigenbeam-Space Division Multiplexing (E-SDM) in a MIMO Channel," Technical Report of IEICE, RCS2002-53, May 2005, pp. 13-18, with English abstract, p. 149, line 26.

Japanese Office Action dated Aug. 11, 2009.

Ge Li, et al. "LDPC Coded Systems with D-Blast Structure," Communications, Computers and Signal Processing, 2003, IEEE Pacific Rim Conference, Aug. 2003, vol. 1, pp. 510-513.

Japanese Office Action dated Sep. 8, 2009.

D.C. Popescu et al., "Multiuser MIMO systems and interference avoidance," IEEE International Conference on Acoustics, Speech, and Signal Processing Proceedings, Apr. 2003, vol. 4, pp. IV-828-831.

A. Huebner et al., "A simple space-frequency coding scheme with cyclic delay diversity for OFDM," IEEE 5th European Personal Mobile Communications Conference, Apr. 2003, Conf. Publ. No. 492, pp. 106-110.

Office Action dated Dec. 15, 2009, in a corresponding Japanese Patent Application.

Office Action dated Jan. 5, 2010, in a corresponding Japanese Patent Application.

S. Hori, et al. "A New Branch Metric Generation Method for Soft-Decision Viterbi Decoding in Coded OFDM-SDM Systems Employing MLD over Frequency Selective MIMO Channels," IEICE Transactions of Fundamentals vol. E85-A, No. 7, Jul. 2002, pp. 1675-1684.

H. Kimura, et al. "On performance of FEC in E-SDM," Technical Report of IEICE vol. 102, No. 678, Feb. 2003, pp. 1-6, with English translation of referenced portion.

H. Zheng, et al. "Multiple ARQ Processes for MIMO Systems," The 13th IEEE International Symposium on Personal, Indoor and Mobile Radio Communications, vol. 3, Sep. 2002, pp. 1023-1026.

Japanese Notice of Reasons for Rejection dated Aug. 16, 2011.

T. Nishimura, et al., "Evaluation of weighted BLAST compared with E-SDM in MIMO Channel Systems," Technical Report of The Institute of Electronics, Information, and Communcations Engineers, vol. 102, No. 548, Jan. 2003, pp. 127-132, with partial English translation.

Kobayashi et al., "Varying Interleave Patterns With Iterative Decoding for Improved Performance in MIMO Systems", 15TH IEEE International Symposium on Personal, Indoor and Mobile Radio Communications, vol. 2, Sep. 2004, pp. 1429-1433.

Ariyavisitakul, "Turbo Space-Time Processing to Improve Wireless Channel Capacity", IEEE Transactions on Communications, vol. 48, No. 8, Aug. 2000, pp. 1347-1359.

Mazo et al., "On the Transmitted Power in Generalized Partial Response", IEEE Transactions on Communications, Mar. 1976, pp. 348-352, vol. 24, No. 3.

\* cited by examiner

| | ADDRESS FOR HORIZONTAL DIRECTION | ADDRESS FOR VERTICAL DIRECTION | PRESENCE/ABSENCE OF DATA (1: PRESENT 0: ABSENT) | DATA |
|---|---|---|---|---|
| | m bit | n bit | | |
| DATA#A1 | 1 | 1 | 1 | xx |
| DATA#A2 | 2 | 1 | 0 | xx |
| DATA#A3 | 3 | 1 | 1 | xx |
| DATA#A4 | 4 | 1 | 1 | xx |
| DATA#A5 | 5 | 1 | 0 | xx |
| DATA#A6 | 6 | 1 | 1 | xx |
| DATA#A7 | 7 | 1 | 1 | xx |
| DATA#A8 | 1 | 2 | 1 | xx |
| DATA#A9 | 2 | 2 | 0 | xx |
| DATA#A10 | 3 | 2 | 1 | xx |
| DATA#A11 | 4 | 2 | 1 | xx |
| DATA#A12 | 5 | 2 | 1 | xx |
| DATA#A13 | 6 | 2 | 0 | xx |
| DATA#A14 | 7 | 2 | 1 | xx |
| DATA#A15 | 1 | 3 | | xx |
| DATA#A16 | 2 | 3 | | xx |
| ... | . | . | . | . |

FIG.100

INTERLEAVER, INTERLEAVING METHOD, TRANSMISSION APPARATUS, AND TRANSMITTING METHOD

This is a continuation application of application Ser. No. 12/917,248 filed Nov. 1, 2010, which is a continuation application of application Ser. No. 10/579,745 filed May 18, 2006, which is a national stage of PCT/JP2004/017096 filed Nov. 17, 2004, which is based on Japanese Application No. 2003-391860 filed Nov. 21, 2003, Japanese Application No. 2004-003885 filed Jan. 9, 2004, Japanese Application No. 2004-071780 filed Mar. 12, 2004, Japanese Application No. 2004-139241 filed May 7, 2004, Japanese Application No. 2004-146887 filed May 17, 2004, Japanese Application No. 2004-180277 filed Jun. 17, 2004, and Japanese Application No. 2004-318521 filed Nov. 1, 2004, the entire contents of each of which are incorporated by reference herein.

TECHNICAL FIELD

The present invention relates to a multi-antenna reception apparatus, multi-antenna reception method, multi-antenna transmission apparatus and multi-antenna communication system, and more particularly, to a technology for receiving different modulated signals transmitted simultaneously from a plurality of antennas on the transmitting side using a plurality of antennas and reconstructing transmission data corresponding to the respective modulated signals from the received signal composed of a plurality of modulated signals multiplexed in a propagation path.

BACKGROUND ART

Conventionally, there is a communication method called "MIMO (Multiple-Input Multiple-Output)" whereby a plurality of sequences of transmission data are modulated, modulated data are transmitted simultaneously from a plurality of antennas and the data communication speed is thereby enhanced. The receiving side receives transmission signals from the plurality of antennas using a plurality of antennas.

Here, the received signal obtained at each receive antenna consists of a plurality of modulated signals mixed together in the propagation space, and therefore reconstructing the data corresponding to each modulated signal requires a variation (hereinafter, referred to as a "channel fluctuation") of each modulated signal in the propagation path to be estimated. Therefore, the transmission apparatus inserts known signals such as pilot symbols in the modulated signal beforehand and the reception apparatus estimates a channel fluctuation in the propagation space between each transmit antenna and each receive antenna based on the known signals inserted in the modulated signal. Each modulated signal is demodulated using this channel fluctuation estimated value.

One such method is a method whereby an inverse matrix calculation is carried out on a matrix whose elements consist of channel fluctuation estimated values to separate the signal into respective modulated signals. Another method is one whereby a candidate signal point positions are found using channel fluctuation estimated values and a maximum likelihood detection (MLD) is carried out between these candidate signal point positions and the received signal point position to thereby reconstruct the data transmitted with each modulated signal.

A communication technology using such multi-antennas is disclosed, for example, in Non-Patent Document 1. Hereinafter, the contents disclosed in this Non-Patent Document 1 will be explained briefly using FIG. 102. Multi-antenna transmission apparatus 1 inputs transmission signal A and transmission signal B to modulated signal generation section 3. Modulated signal generation section 3 applies digital modulation processing such as QPSK (Quadrature Phase Shift Keying) and 16QAM (Quadrature Amplitude Modulation) to transmission signals A, B and sends out baseband signals 4, 5 obtained in this way to radio section 6. Radio section 6 applies radio processing such as up-conversion and amplification to baseband signals 4, 5 and sends out modulated signals 7, 8 obtained in this way to antennas 9, 10. In this way, multi-antenna transmission apparatus 1 sends modulated signal 7 of transmission signal A from antenna 9 and modulated signal 8 of transmission signal B from antenna 10 simultaneously.

Multi-antenna reception apparatus 2 inputs received signal 12 received from antenna 11 to radio section 13 and also inputs received signal 16 received form antenna 15 to radio section 17. Radio sections 13, 17 apply radio processing such as down-conversion to received signals 12, 16 and send out baseband signals 14, 18 obtained in this way to demodulation section 19.

Demodulation section 19 obtains received digital signal 20 of transmission signal A and received digital signal 21 of transmission signal B by detecting baseband signals 14, 18. At this time, Non-Patent Document 1 describes a method of carrying out an inverse matrix calculation on a channel estimation matrix to obtain received digital signals 20, 21 and a method of carrying out a maximum likelihood detection (MLD) to obtain received digital signals 20, 21.

Furthermore, as a conventional transmission method using a plurality of antennas, a technology as disclosed in Non-Patent Document 2 for realizing high quality (with a good error rate characteristic) data transmission by transmitting time and space block codes (STBC: Space-Time Block Code) is known. Hereinafter, the contents disclosed in this Non-Patent Document 2 will be explained using the accompanying drawings.

As shown in FIG. 103, the transmission apparatus has a plurality of antennas AN1, AN2 and sends signals simultaneously from antennas AN1, AN2. The reception apparatus receives the plurality of signals sent simultaneously by antenna AN3.

FIG. 104 shows the frame configuration of signals transmitted from antennas AN1, AN2. Transmission signal A is transmitted from antenna AN1 and at the same time, transmission signal B is transmitted from antenna AN2. Transmission signal A and transmission signal B consist of symbol blocks made up of the same symbol arranged a plurality of times so as to obtain a coding gain and a diversity gain.

This will be explained in further detail. In FIG. 104, S1, S2 denote different symbols and "*" indicates a complex conjugate. In space-time block coding, at time i, symbol S1 is transmitted from first antenna AN1 and at the same time symbol S2 is transmitted from second antenna AN2 and at next time i+1, symbol −S2* is transmitted from first antenna AN1 and at the same time symbol S1* is transmitted from second antenna AN2.

Antenna AN3 of the reception apparatus receives a signal which is a combination of transmission signal A affected by transmission path variation $h1(t)$ between antenna AN1 and antenna AN3 and transmission signal B affected by transmission path variation $h2(t)$ between antenna AN2 and antenna AN3.

The reception apparatus estimates transmission path variations $h1(t)$ and $h2(t)$, separates original transmission signal A and transmission signal B from the combined received signal using the estimated values and then demodulates each symbol.

In this case, if signals subjected to space-time block coding as shown in FIG. 104 are used, it is possible to combine symbols S1, S2 at a maximum ratio irrespective of transmission path variations h1(t), h2(t) when the signal is separated, and therefore it is possible to obtain a large coding gain and diversity gain. As a result, the reception quality, that is, the error rate characteristic can be improved.

Non-patent Document "Multiple-antenna diversity techniques for transmission over fading channels" IEEE WCNC 1999, pp. 1038-1042, September 1999.

Non-patent Document 2: "Space-Time Block Codes from Orthogonal Design" IEEE Transactions on Information Theory, pp. 1456-1467, vol. 45, no. 5, July 1999

DISCLOSURE OF INVENTION

Problems to be Solved by the Invention

The system using multi-antennas as described in Non-Patent Document 2 can increase the data communication speed, but there is a problem that the configuration of a reception apparatus becomes complicated. Especially, in the method of carrying out a maximum likelihood detection (MLD) and obtaining data corresponding to each modulated signal, the number of calculations required for a maximum likelihood detection between candidate signal points and the reception point increases, and therefore the circuit scale increases.

More specifically, assuming that the number of transmit antennas is 2 and the number of receive antennas is 2, when a modulated signal subjected to QPSK is transmitted from each antenna, 4×4=16 candidate signal points exist. Moreover, when a modulated signal subjected to 16QAM is transmitted from each antenna, 16×16=256 candidate signal points exist. When a maximum likelihood detection (MLD) is carried out, the distance between the actual reception point and all these candidate signals must be calculated, and therefore an enormous amount of calculation becomes necessary, which contributes to an increase of the circuit scale.

On the other hand, in the method of making a decision after separating each modulated signal from the received signal using an inverse matrix of a channel estimation matrix, the number of the calculations decreases compared to the method of carrying out a maximum likelihood detection (MLD), and therefore the circuit scale decreases, but the error rate characteristic degrades depending on the radio wave propagation environment, and as a result, there is a disadvantage that the error rate characteristic of received data degrades. When the error rate characteristic degrades, this leads to a substantial decrease of the data communication speed.

Furthermore, when a signal subjected to space-time block coding as described in Non-Patent Document 2 is used, the reception quality (error rate characteristic) may improve, but there is a disadvantage that transmission efficiency degrades. That is, S1*  and −S2* transmitted at time i+1 are demodulated as S1, S2 at the reception apparatus, and therefore they have substantially the same information as that of S1, S2 transmitted at time i. For this reason, the same information is transmitted twice and the data transmission efficiency degrades accordingly.

For example, in a general multi-antenna communication system, symbol S3, S4 which are different from symbols S1, S2 are transmitted at time i+1, and therefore four symbols S1 to S4 can be transmitted for a period from time i to time i+1. That is, if this case is handled in a simplified manner, when a space-time block coding technology is used, the data transmission efficiency drops to half that of a general multi-antenna communication.

It is an object of the present invention to provide a multi-antenna reception apparatus, multi-antenna reception method, multi-antenna transmission apparatus and multi-antenna communication system capable of acquiring reception quality similar to a maximum ratio combining without degrading data transmission efficiency compared to a transmission method using STBC, which could not be accomplished by conventional technologies and realizing this with a relatively small number of calculations.

Means for Solving the Problem

In order to solve the above described problems, an aspect of the multi-antenna reception apparatus according to the present invention is a multi-antenna reception apparatus that receives a plurality of modulated signals transmitted from a plurality of antennas simultaneously using a plurality of antennas and reconstructs a data sequence which corresponds to each of the plurality of modulated signals from the received signal, comprising a provisional decision section that provisionally decides all or at least one of the modulated signals from the received signal, a signal point reduction section that reduces candidate signal points about the subject modulated signal using the provisional decision result about the modulated signals other than the subject modulated signal and a main decision section that obtains digital data about the subject modulated signal based on the signal point distance between the reduced candidate signal points and the reception point of the received signal.

According to this configuration, a main decision is made after reducing candidate signal points of the subject modulated signal using the provisional decision result of other modulated signals, and therefore the amount of calculation is reduced when making a detailed decision such as a maximum likelihood detection (MLD) by a main decision. As a result, the digital data which corresponds to the target modulated signal can be accurately obtained with a small circuit scale.

Another aspect of the multi-antenna reception apparatus of the present invention further comprises a channel fluctuation estimation section that estimates a channel fluctuation value between each transmit antenna and each receive antenna based on known signals inserted in each modulated signal, wherein the provisional decision section comprises a separation section that associates the modulated signal transmitted from each transmit antenna with the received signal received from each receive antenna using the channel fluctuation matrix, the elements of which are the channel fluctuation values and carries out an inverse matrix calculation of the channel fluctuation matrix to thereby separate the received signal into the modulated signals transmitted from each transmit antenna and a decision section that obtains a digital signal by making a soft decision or a hard decision on each separated modulated signal and assumes this as a provisional decision value, and the signal point reduction section obtains all candidate signal points of the plurality of multiplexed modulated signals based on the channel fluctuation value and narrows down candidate signal points about the subject modulated signal using the provisional decision value and thereby reduces the candidate signal points about the subject modulated signal.

According to this configuration, the provisional decision section can be realized with a small circuit scale.

A further aspect of the multi-antenna reception apparatus of the present invention further comprises a signal point reduction section that reduces candidate signal points about the subject modulated signal using digital data other than the subject modulated signal out of the digital data obtained by the main decision section.

According to this configuration, the digital data obtained by the main decision section is data having a better error rate characteristic than that of the digital data obtained by the provisional decision section and candidate signal points are reduced using this data, and therefore it is possible to narrow down candidate signal points accurately.

A still further aspect of the multi-antenna reception apparatus of the present invention further comprises a signal point reduction section that reduces candidate signal points about the subject modulated signal using the digital data other than the subject modulated signal out of the digital data obtained by the main decision section, wherein candidate signal points are reduced by recursively using the digital data sequentially obtained by the main decision section.

According to this configuration, candidate signal points are reduced through a so-called "iteration" and therefore it is possible to narrow down candidate signal points more accurately and further improve the error rate characteristic of the digital data obtained by the main decision section.

In a still further aspect of the multi-antenna reception apparatus of the present invention, the plurality of modulated signals are signals modulated in such a way that the reception quality differs from one modulated signal to another.

According to this configuration, if, for example, the modulation multivalue number of the first modulated signal is made smaller than the modulation multivalue number of the second modulated signal, the first modulated signal is subjected to a provisional decision and candidate signal points about the second modulated signal are reduced, it is possible to correctly reduce candidate signal points according to the provisional decision result of the first modulated signal of better reception quality. As a result, the digital data obtained by making a main decision on the second modulated signal has a high transmission speed and a good error rate characteristic. In this way, it is possible to improve both the reception quality and transmission speed.

In a still further aspect of the multi-antenna reception apparatus of the present invention, the main decision section makes a decision using reliability of decisions at the provisional decision section.

In a still further aspect of the multi-antenna reception apparatus of the present invention, the main decision section uses a path metric of each symbol in the provisional decision section as the reliability and a decision is made with the branch metric weighted by the path metric.

According to these configurations, it is possible to further improve the error rate characteristic of the data obtained by the main decision processing.

In a still further aspect of the multi-antenna reception apparatus of the present invention, the provisional decision section classifies candidate signal points into a plurality of sets for each transmission bit and performs soft decision decoding using a minimum square Euclid distance between the points of each set and the received signal points.

According to this configuration, MLD can be performed by suppressing a reduction of the coding gain, and therefore it is possible to improve the error rate characteristic at the time of a provisional decision, and as a result obtain received data having a much better error rate characteristic.

An aspect of the multi-antenna reception method of the present invention is a multi-antenna reception method for reconstructing a data sequence which corresponds to each modulated signal from a received signal consisting of a plurality of simultaneously transmitted modulated signals multiplexed in a propagation path, comprising a provisional decision step of provisionally deciding all or at least one of the modulated signals from the received signal, a signal point reduction step of reducing candidate signal points about the subject modulated signal using the provisional decision result about the modulated signals other than the subject modulated signal and a main decision step of acquiring digital data about the subject modulated signal based on the reduced candidate signal points and the reception point of the received signal.

According to this method, a main decision is made after reducing the candidate signal points of the subject modulated signal using the provisional decision result of the other modulated signals, and therefore it is possible to perform accurate decision processing with the main decision with a small amount of calculation and thereby acquire received data of a good error rate characteristic with a small circuit scale.

In another aspect of the multi-antenna reception method of the present invention, a rough decision is made in the provisional decision step and a detailed decision is made in the main decision step.

In a further aspect of the multi-antenna reception method of the present invention, each modulated signal is separated through an inverse matrix calculation of the channel fluctuation matrix in the provisional decision step and each modulated signal after separation is decided for each modulated signal and a calculation including a maximum likelihood detection is carried out in the main decision step.

A still further aspect of the multi-antenna reception method of the present invention further comprises a signal point reduction step of reducing candidate signal points to be used in the main decision step through iteration processing recursively using the digital data obtained in the main decision step.

An aspect of the multi-antenna transmission apparatus of the present invention comprises a plurality of antennas and an interleaver that interleaves signals to be transmitted from the respective antennas in different interleaving patterns.

According to this configuration, when, for example, the other modulated signals are decided after narrowing down candidate signal points of other modulated signals based on the decision result of a certain modulated signal from the modulated signal which is multiplexed in the propagation path, it is possible to reduce the probability that the data of both modulated signals may make burst errors and thereby improve the error rate characteristic of the data which is the decision result of the other modulated signals. This is effective especially when using an error correcting code.

In another aspect of the multi-antenna transmission apparatus of the present invention, the interleaving pattern of the interleaver is selected so as to have no correlation among the antennas.

According to this configuration, it is possible to further reduce the probability that both the modulated signal data and other modulated signal data may make burst errors and thereby further improve the error rate characteristic of the data which is the decision result of the other modulated signals.

A further aspect of the multi-antenna transmission apparatus of the present invention further comprises an OFDM modulation section which OFDM-modulates each transmission signal after interleaving, wherein the interleaver selects an interleaving pattern in which data is arranged from low frequency subcarriers to high frequency subcarriers as a first interleaving pattern and selects an interleaving pattern in which data is arranged from high frequency subcarriers to low frequency subcarriers as a second interleaving pattern.

A still further aspect of the multi-antenna transmission apparatus of the present invention further comprises an OFDM modulation section that OFDM-modulates each transmission signal after interleaving, wherein the interleaver selects an interleaving pattern in which data is arranged from earlier times to later times in the subcarrier time direction as a first interleaving pattern and selects an interleaving pattern in which data is arranged from later times to earlier times in the subcarrier time direction as a second interleaving pattern.

According to these configurations, the probability that both the data after the decision on the OFDM modulated signal interleaved in the first interleaving pattern and transmitted from the first antenna and the data after the decision on the OFDM modulated signal interleaved in the second interleaving pattern and transmitted from the second antenna may make burst errors decreases, and therefore it is possible to improve a data error rate characteristic which is the decision result of the other modulated signals.

A still further aspect of the multi-antenna transmission apparatus of the present invention further comprises a space-time code insertion section that inserts space-time codes between data symbols.

A still further aspect of the multi-antenna transmission apparatus of the present invention further comprises a special symbol insertion section that inserts special symbols having a relatively small decision error compared to data symbols between data symbols.

According to these configurations, it is possible to make a high reliability symbol decision using space-time codes or special symbols, and therefore when signal points about data symbols are reduced based on this decision result, the reliability of the reduced signal points also improves. As a result, if data symbols are decided using the reduced signal points, the error rate characteristic of the data symbols can be further improved.

A still further aspect of the multi-antenna transmission apparatus of the present invention provides an LDPC (Low Density Parity Check) coder instead of the interleaver, changes a generation matrix of the LDPC coder and thereby interleaves signals to be transmitted from the respective antennas in different interleaving patterns.

According to this configuration, it is possible to perform interleaving processing equivalent to using an interleaver without using any interleaver and thereby reduce the circuit scale.

An aspect of the multi-antenna communication system of the present invention is a multi-antenna communication system comprising a multi-antenna transmission apparatus which is provided with a plurality of antennas and transmits different modulated signals from the respective antennas simultaneously and a multi-antenna reception apparatus which is provided with a plurality of antennas and reconstructs a data sequence which corresponds to respective modulated signals by demodulating the received signals received by the plurality of antennas, wherein the multi-antenna transmission apparatus comprises an interleaver which interleaves signals to be transmitted from the respective antennas in different interleaving patterns, the multi-antenna reception apparatus comprises a provisional decision section that provisionally decides all or one of the modulated signals from the received signal, a signal point reduction section that reduces candidate signal points about the subject modulated signal using the provisional decision result about the modulated signals other than the subject modulated signal and a main decision section that obtains digital data about the subject modulated signal by calculating a signal point distance between the reduced candidate signal points and the reception point of the received signal.

According to this configuration, a main decision is made after reducing the candidate signal points of the subject modulated signal using the provisional decision result of the other modulated signals, and therefore the amount of calculation when a detailed decision such as a maximum likelihood detection (MLD) is made by the main decision is reduced. As a result, the digital data which corresponds to the target modulated signal can be correctly obtained with a small circuit scale. Moreover, because the interleaving pattern differs from one modulated signal to another, the probability that the data of both modulated signals may make burst errors decreases, making it possible to perform a main decision more accurately, and as a result, it is possible to further improve the data error rate characteristic.

Another aspect of the multi-antenna communication system of the present invention is a multi-antenna communication system comprising a multi-antenna transmission apparatus which is provided with a plurality of antennas and transmits different modulated signals from the respective antennas simultaneously and a multi-antenna reception apparatus which is provided with a plurality of antennas and reconstructs a data sequence which corresponds to respective modulated signals by demodulating the received signals received by the plurality of antennas, wherein the multi-antenna reception apparatus comprises a provisional decision section that provisionally decides all or one of the modulated signals from the received signal, a signal point reduction section that reduces candidate signal points about the subject modulated signal using the provisional decision result about the modulated signals other than the subject modulated signal and a main decision section that obtains digital data about the subject modulated signal by calculating a signal point distance between the reduced candidate signal points and the reception point of the received signal, and the multi-antenna transmission apparatus transmits a smaller number of modulates signals at the time of retransmission than modulated signals transmitted at any time other than retransmission.

According to this configuration, since the combined gain of the retransmitted modulated signal increases on the receiving side, the reception quality of the retransmission signal improves. As a result, if signal point reduction processing is carried out on a signal not retransmitted using the retransmission signal, the accuracy of such a signal also improves. Therefore, all modulated signals can be demodulated with a good error rate characteristic.

In a further aspect of the multi-antenna communication system of the present invention, the multi-antenna transmission apparatus forms a modulated signal using a space-time code or cycled delay diversity at the time of retransmission.

According to this configuration, since the diversity gain of the retransmission signal can be increased, each modulated signal can be demodulated with a much better error rate characteristic.

Advantageous Effect of the Invention

In this way, according to the present invention, a provisional decision is carried out on all or at least one of the modulated signals from a received signal consisting of a plurality of simultaneously transmitted modulated signals multiplexed in a propagation path, candidate signal points about the subject modulated signal are reduced using the provisional decision result about the modulated signals other than the subject modulated signal and digital data about the subject modulated signal is obtained based on the reduced candidate signal points and reception point of the received signal, and therefore it is possible to realize a communication capable of obtaining the reception quality close to a maximum ratio combining, without degrading the data transmission efficiency compared to the transmission method using STBC, which could not be accomplished using conventional technologies, and further achieve this with a relatively small number of calculations.

Furthermore, transmission signals to be transmitted from the respective antennas are interleaved in different interleaving patterns, and therefore it is possible to further improve the error rate characteristic at the multi-antenna reception apparatus.

BRIEF DESCRIPTION OF DRAWINGS

FIG. 28 shows an example of interleaving patterns of Embodiment 6; (A) shows interleaving pattern X applied to modulated signal A and (B) shows interleaving pattern Y applied to modulated signal B;

FIG. 57 illustrates bit interleaving processing of Embodiment 12; (A) shows interleaving pattern X and (B) shows interleaving pattern Y;

FIG. 61 illustrates bit interleaving processing of Embodiment 13; (A) shows interleaving pattern X and (B) shows interleaving pattern Y;

FIG. 85-1 shows interleaving processing and the state of signal point selection of Working Example 1; (A) shows a data sequence before interleaving, (B) shows a data sequence after interleaving, (C) shows a data sequence on each channel after interleaving, (D) shows a data state after deinterleaving after first decoding and (E) shows a data state after first decoding after interleaving before signal point reduction;

FIG. 85-2 shows interleaving processing and the state of signal point selection of Working Example 1; (F) shows the state when signal points are reduced using a replica, (G) shows the state after reducing signal points using a replica and deinterleaving and (H) shows the state after Viterbi decoding;

Figure 90:
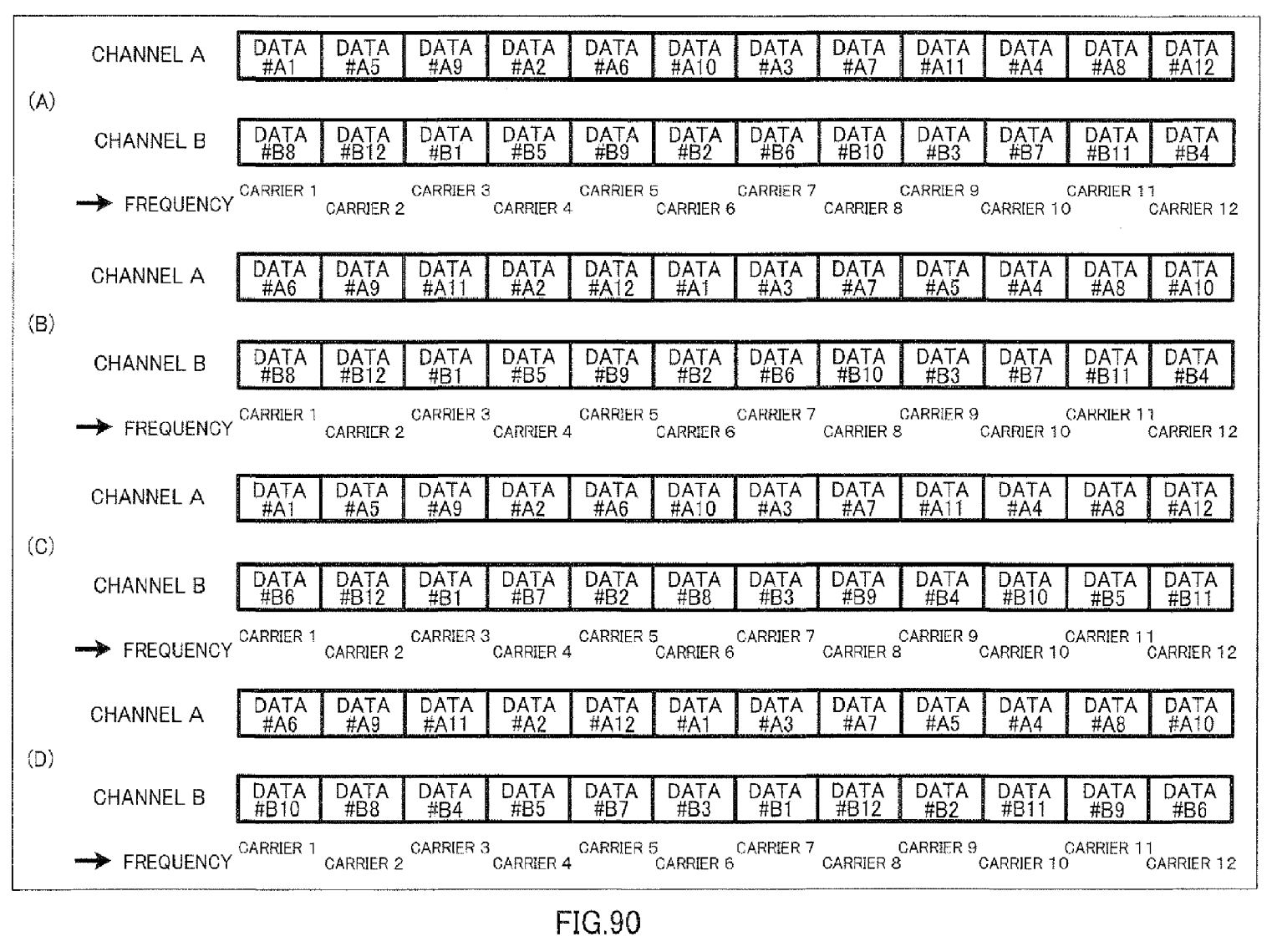

FIG. 90 illustrates interleaving of Working Example 1;

FIG. 100 illustrates interleaving processing of Working Example 4;

BEST MODE FOR CARRYING OUT THE INVENTION

An enormous amount of calculation is necessary for a multi-antenna reception apparatus to obtain data with a good error rate characteristic when the multi-antenna reception apparatus receives and makes a signal point decision on each modulated signal transmitted simultaneously from a multi-antenna transmission apparatus and multiplexed in a propagation path. Especially, the number of calculations increases as the number of channels (the number of antennas) or the modulation multivalue number increases.

A feature of the present invention is to reduce candidate signal points used to decide reception points of modulated signals and acquire received data using decision values of modulated signals other than the subject modulated signal and make a decision (main decision) on the subject modulated signal using the reduced candidate signal points.

Hereinafter, embodiments of the present invention will be explained in detail with reference to the accompanying drawings.

Embodiment 1

Figure 1:
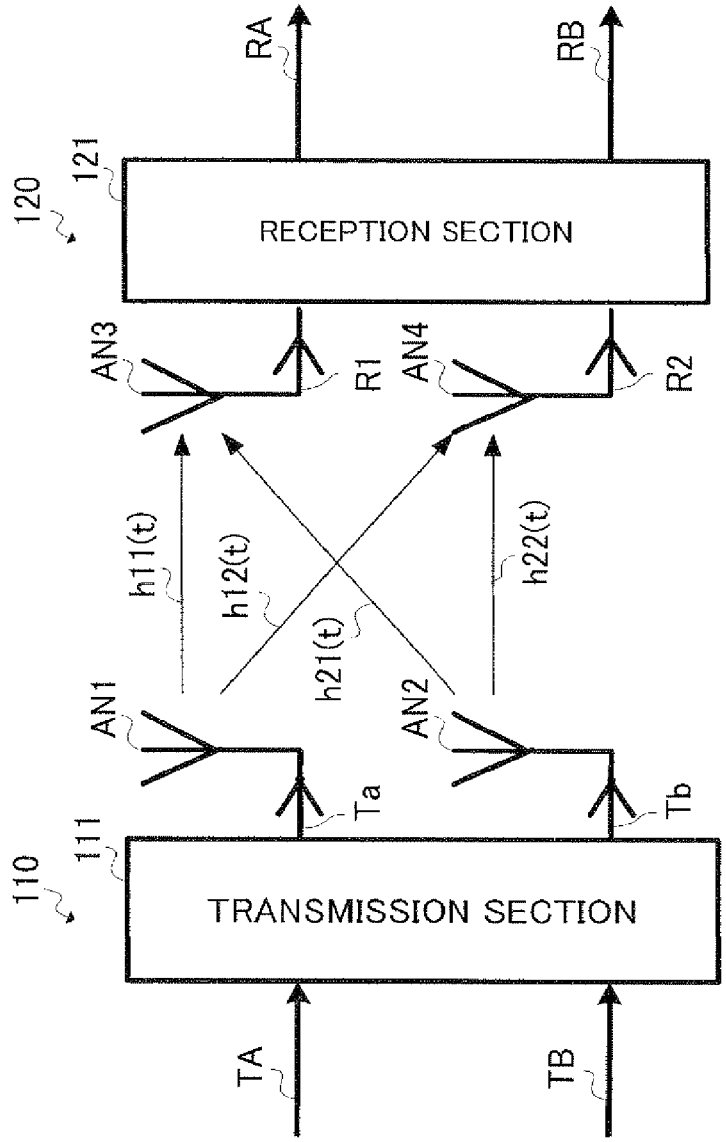
FIG. 1 shows a schematic configuration of a multi-antenna communication system.

FIG. 1 shows an overall configuration of a multi-antenna communication system which will be explained in this embodiment. For simplicity of explanation, this embodiment will explain a case where there are two transmit antennas and two receive antennas, but it is applicable to a multi-antenna system having M (M≥2) transmit antennas and N (N≥2) receive antennas.

Multi-antenna transmission apparatus 110 of multi-antenna communication system 100 obtains modulated signals Ta, Tb by applying predetermined modulation processing and conversion to a radio frequency to transmission digital signals TA, TB at transmission section 111 and transmits these signals from antennas AN1, AN2. Multi-antenna reception apparatus 120 inputs received signal R1, R2 received by antennas AN3, AN4 to reception section 121. Reception section 121 applies demodulating processing to received signals R1, R2 and thereby obtains received data RA, RB corresponding to transmission digital signals TA, TB.

Here, modulated signal Ta transmitted from antenna AN1 is received by antennas AN3, AN4 after undergoing channel fluctuations $h11(t)$, $h12(t)$. On the other hand, modulated signal Tb transmitted from antenna AN2 is received by antennas AN3, AN4 after undergoing channel fluctuations $h21(t)$, $h22(t)$.

Thus, using time parameter t, suppose that signal transmitted from antenna AN1 is $Ta(t)$, the signal transmitted from antenna AN2 is $Tb(t)$, the signal received at receive antenna AN3 is $R1(t)$ and the signal received at receive antenna AN4 is $R2(t)$. Then, the following relational expression is held.

[Expression 1]

$$\begin{pmatrix} R1(t) \\ R2(t) \end{pmatrix} = \begin{pmatrix} h11(t) & h21(t) \\ h12(t) & h22(t) \end{pmatrix} \begin{pmatrix} Ta(t) \\ Tb(t) \end{pmatrix} \quad (1)$$

Figure 2:
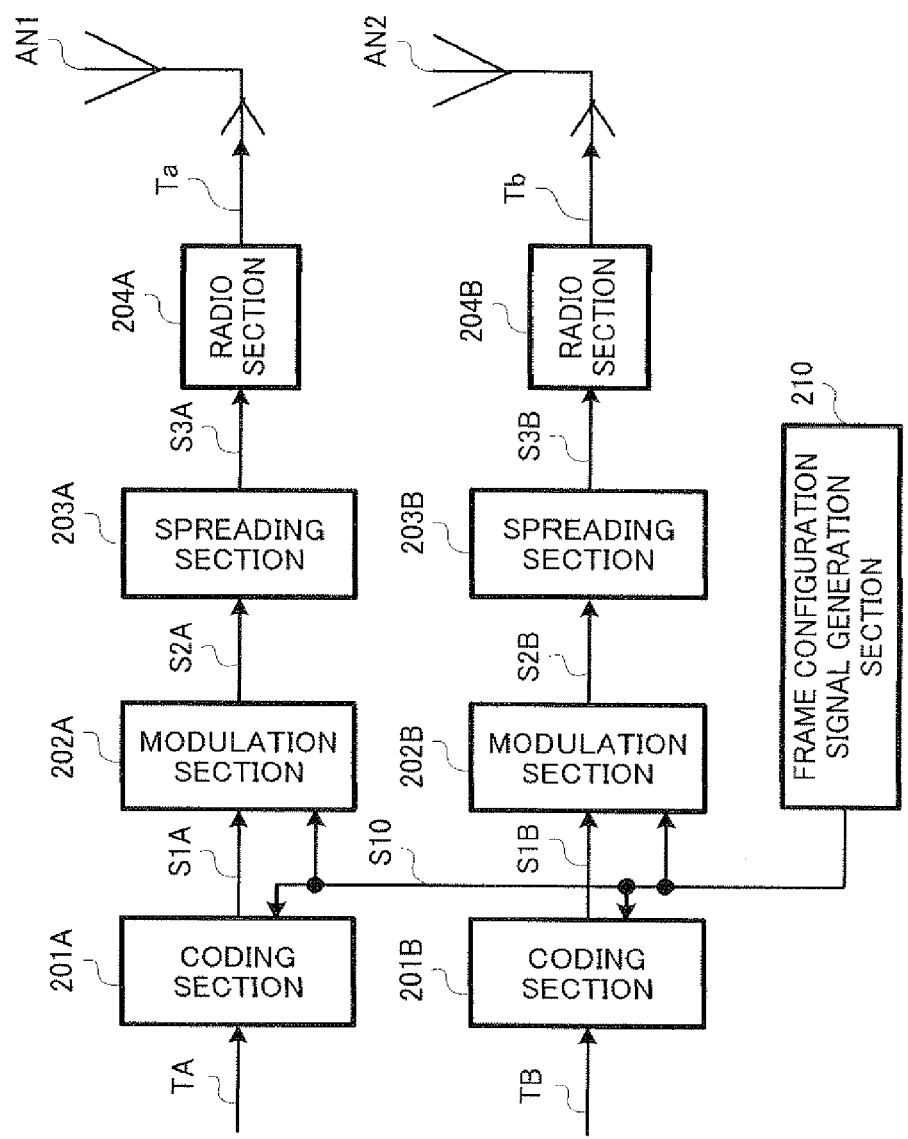
FIG. 2 is a block diagram showing the configuration of a multi-antenna transmission apparatus.

FIG. 2 shows the configuration of multi-antenna transmission apparatus 110. Multi-antenna transmission apparatus 110 inputs transmission digital signals TA, TB to coding sections 201A, 201B. Coding sections 201A, 201B form coded data S1A, S1B by applying convolutional coding processing to transmission digital signals TA, TB according to frame configuration signal S10 from frame configuration signal generation section 210 and send these data to modulation sections 202A, 202B.

Figure 3:
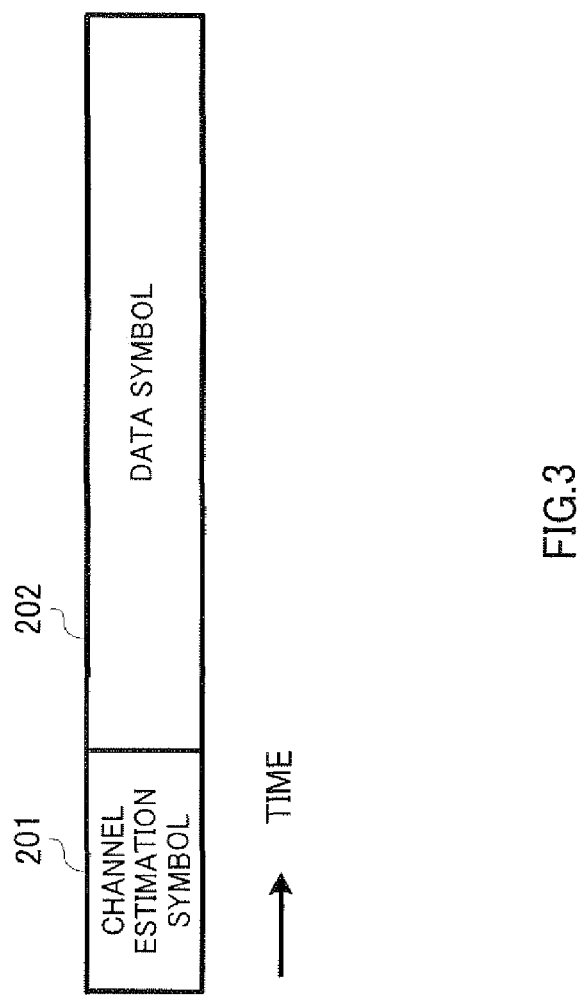
FIG. 3 shows a frame configuration example of a baseband signal.

Modulation sections 202A, 202B apply modulation processing such as QPSK and 16QAM to coded data S1A, S1B and insert symbols for channel estimation at a timing according to frame configuration signal S10, thereby form baseband signals S2A, S2B and send these signals to spreading sections 203A, 203B. FIG. 3 shows a frame configuration example of each baseband signal.

Spreading sections 203A, 203B obtain spread baseband signals S3A, S3B by multiplying the baseband signals by a spreading code and send these signals to radio sections 204A, 204B. Spreading section 203A and spreading section 203B use different spreading codes. Radio sections 204A, 204B form modulated signals Ta, Tb by applying radio processing such as up-conversion and amplification to spread baseband signals S3A, S3B and supply these signals to antennas AN1, AN2.

In this way, antennas AN1, AN2 transmit different modulated signals Ta, Tb subjected to convolutional coding in the time axis direction simultaneously.

Figure 4:
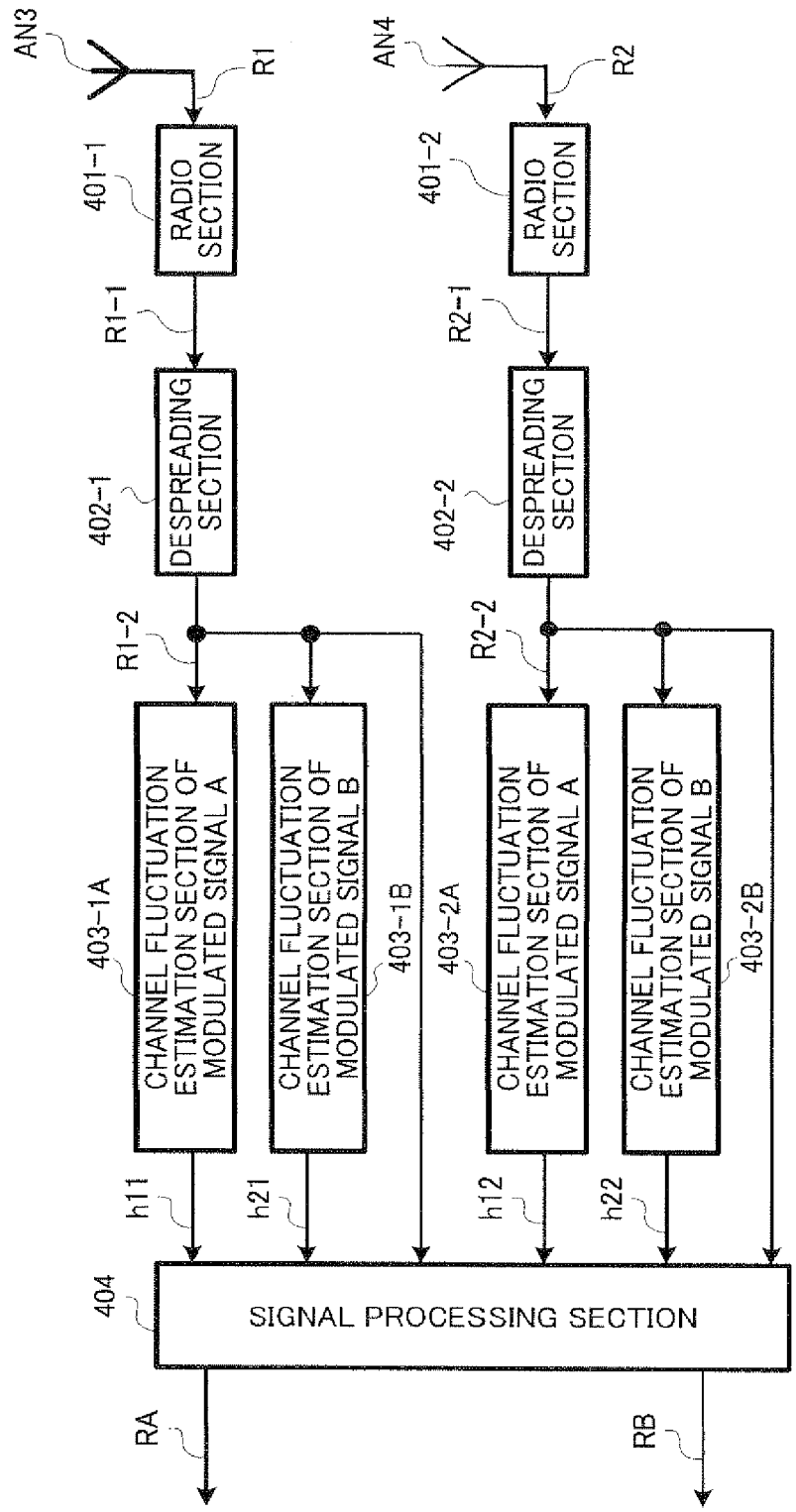
FIG. 4 is a block diagram showing the overall configuration of the multi-antenna reception apparatus.

FIG. 4 shows an overall configuration of multi-antenna reception apparatus 120. Multi-antenna reception apparatus 120 supplies received signals R1, R2 received at antennas AN3, AN4 to radio sections 401-1, 401-2 respectively. Radio sections 401-1, 401-2 obtain baseband signals R1-1, R2-1 by applying radio processing such as down-conversion and orthogonal demodulation to the received signals and send these signals to despreading sections 402-1, 402-2.

Despreading section 402-1 obtains despread baseband signal R1-2 by applying despreading processing using the same spreading code as the spreading code used for spreading section 203A and spreading section 203B in FIG. 2 to baseband signal R1-1 and sends this to channel fluctuation estimation section 403-1A of modulated signal A, channel fluctuation estimation section 403-1B of modulated signal B and signal processing section 404.

In the same way, despreading section 402-2 obtains despread baseband signal R2-2 by applying despreading processing using the same spreading code as the spreading code used for spreading section 203A and spreading section 203B in FIG. 2 to baseband signal R2-1 and sends this to channel fluctuation estimation section 403-2A of modulated signal A, channel fluctuation estimation section 403-2B of modulated signal B and signal processing section 404.

Channel fluctuation estimation section 403-1A of modulated signal A obtains channel fluctuation estimated value h11 by estimating a channel fluctuation of modulated signal A (modulated signal Ta transmitted from antenna AN1) based on a channel estimation symbol. A channel fluctuation between antenna AN1 and antenna AN3 is estimated from this. Channel fluctuation estimation section 403-1B of modulated signal B obtains channel fluctuation estimated value h21 by estimating a channel fluctuation of modulated signal B (modulated signal Tb transmitted from antenna AN2) based on a channel estimation symbol. A channel fluctuation between antenna AN2 and antenna AN3 is estimated from this.

In the same way, channel fluctuation estimation section 403-2A of modulated signal A obtains channel fluctuation estimated value h12 by estimating a channel fluctuation of modulated signal A (modulated signal Ta transmitted from antenna AN1) based on a channel estimation symbol. A channel fluctuation between antenna AN1 and antenna AN4 is estimated from this. Channel fluctuation estimation section 403-2B of modulated signal B obtains channel fluctuation estimated value h22 by estimating a channel fluctuation of modulated signal B (modulated signal Tb transmitted from antenna AN2) based on a channel estimation symbol. A channel fluctuation between antenna AN2 and antenna AN4 is estimated from this.

Signal processing section 404 inputs channel fluctuation estimated values h11, h21, h12, h22 in addition to despread baseband signals R1-2, R2-2 and obtains received data RA, RB which correspond to transmission digital signals TA, TB by performing decoding and detection or the like of baseband signals R1-2, R2-2 using channel fluctuation estimated values h11, h21, h12, h22.

Figure 5:
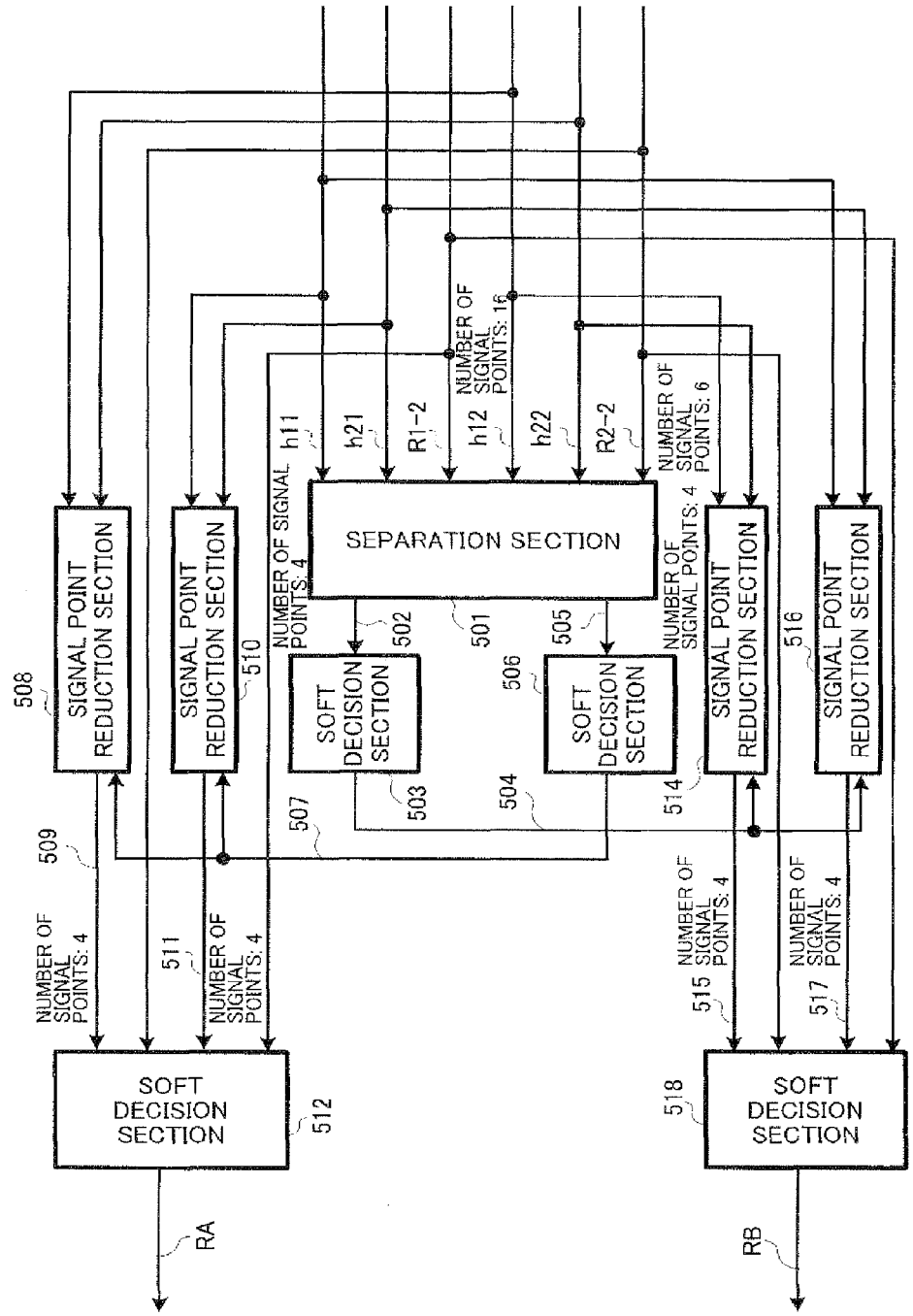
FIG. 5 is a block diagram showing the configuration of the signal processing section of the multi-antenna reception apparatus according to Embodiment 1.

FIG. 5 shows the configuration of signal processing section 404 of this embodiment. Signal processing section 404 inputs baseband signals R1-2, R2-2, channel fluctuation estimated values h11, h21, h12, h22 to separation section 501.

Separation section 501 substitutes baseband signals R1-2, R2-2 and channel fluctuation estimated values h11, h21, h12, h22 into Expression (1) and performs an inverse matrix calculation of Expression (1) and thereby obtains estimated baseband signal 502 of transmission digital signal TA and estimated baseband signal 505 of transmission digital signal TB. In this way, separation section 501 performs signal separation using an inverse matrix calculation instead of carrying out a maximum likelihood detection (MLD), and can thereby perform signal separation with a smaller circuit scale compared with the case where a maximum likelihood detection is carried out. Separation section 501 sends estimated baseband signal 502 of transmission digital signal TA to soft decision section 503 and sends estimated baseband signal 505 of transmission digital signal TB to soft decision section 506.

Soft decision sections 503, 506 calculate soft decision values of estimated baseband signals 502, 505 and then apply error correcting processing to the soft decision values to thereby obtain decision values 504, 507 which are the digital data. Decision value 504 obtained by soft decision section 503 is sent to signal point reduction sections 514, 516. On the other hand, decision value 507 obtained by soft decision section 506 is sent to signal point reduction sections 508, 510.

Figure 6:
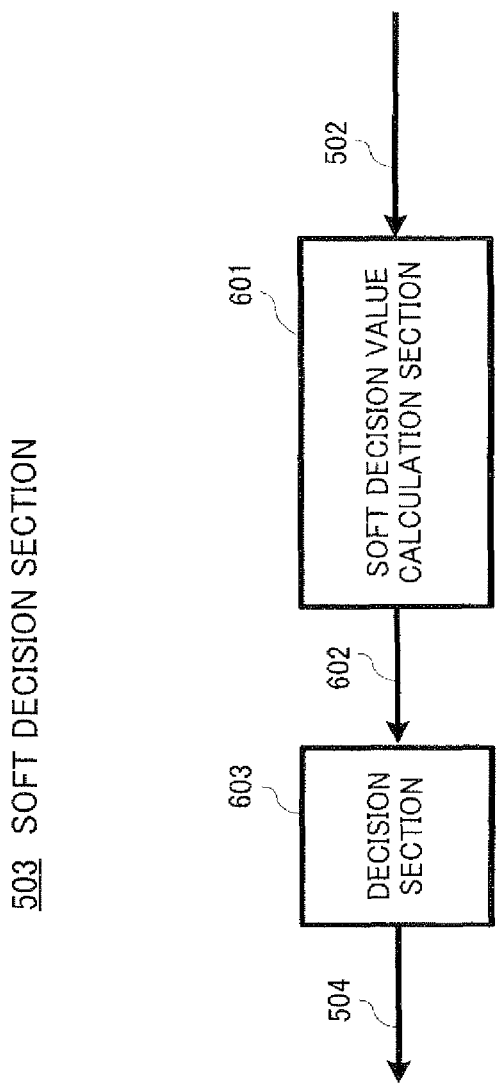
FIG. 6 is a block diagram showing the configuration of soft decision section 503 (506)

FIG. 6 shows the configuration of soft decision sections 503, 506. Because the configuration of soft decision section 503 and that of soft decision section 506 are the same, only the configuration of soft decision section 503 will be explained here. Soft decision section 503 inputs estimated baseband signal 502 to soft decision value calculation section 601. Soft decision value calculation section 601 calculates data sequence 602 of estimated baseband signal 502 by obtaining a branch metric and a path metric of estimated baseband signal 502 and sends this data sequence 602 to decision section 603. Decision section 603 applies error correction processing to data sequence 602 and outputs the data after error correction as decision value 504.

Figure 7:
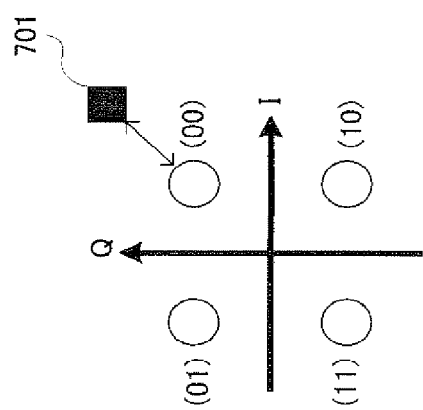
FIG. 7 illustrates processing at soft decision section 503 (506)

Processing at soft decision sections 503, 506 will be explained more specifically using FIG. 7. FIG. 7 shows a signal constellation example when transmission digital signals TA, TB are modulated according to QPSK. In the figure, reference numeral 701 denotes a received signal point, which corresponds to estimated baseband signals 502, 505. Soft decision sections 503, 506 calculate, for example, the square of a Euclid distance between received signal point 701 in FIG. 7 and a signal point of QPSK, regards this value as a branch metric and obtains a path metric using this branch metric. When a convolutional code is used, decoding is performed according to a Viterbi algorithm and decision value 504 about transmission digital signal TA and decision value 507 about transmission digital signal TB are obtained.

In addition to such a configuration, signal processing section 404 has signal point reduction sections 508, 510 about modulated signal A and signal point reduction sections 514, 516 about modulated signal B.

Signal point reduction sections 508, 510 about modulated signal A input a decision value about modulated signal B obtained by soft decision section 506. Furthermore, channel fluctuation value h12 of modulated signal A and the channel fluctuation value h22 of modulated signal B obtained based on the received signal of one receive antenna AN4 are input to signal point reduction section 508, and channel fluctuation value h11 of modulated signal A and channel fluctuation value h21 of modulated signal B obtained based on the received signal of the other receive antenna AN3 are input to signal point reduction section 510.

Figure 8:
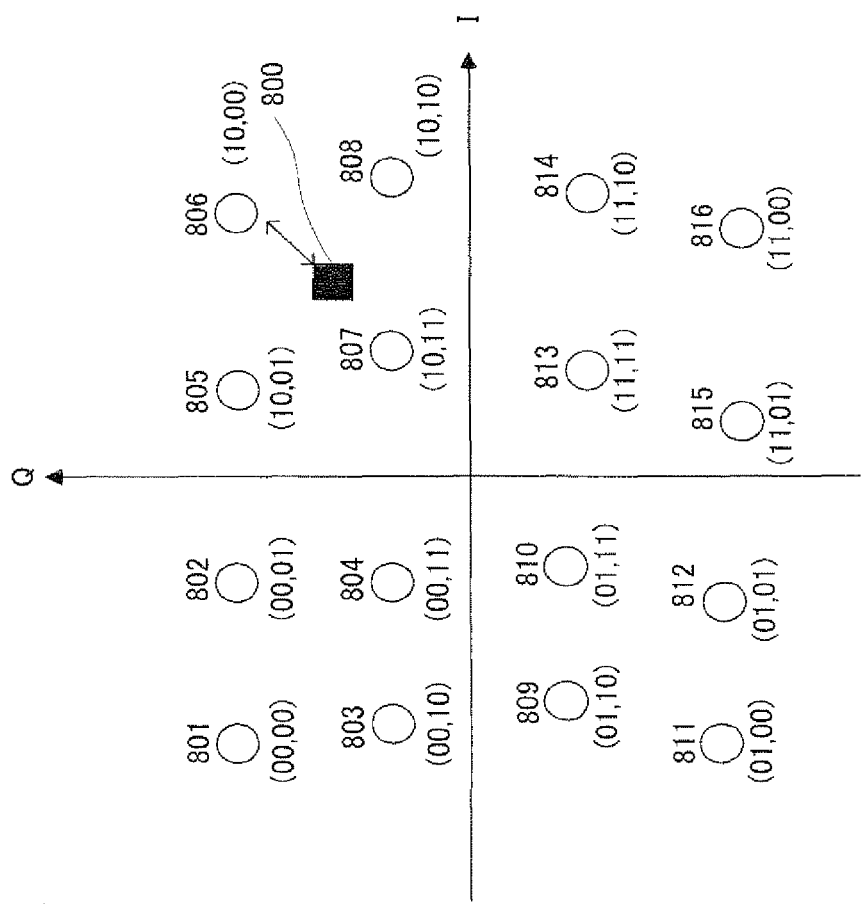
FIG. 8 shows candidate signal points of multiplexed modulated signal A and modulated signal B and a reception point.
Figure 9:
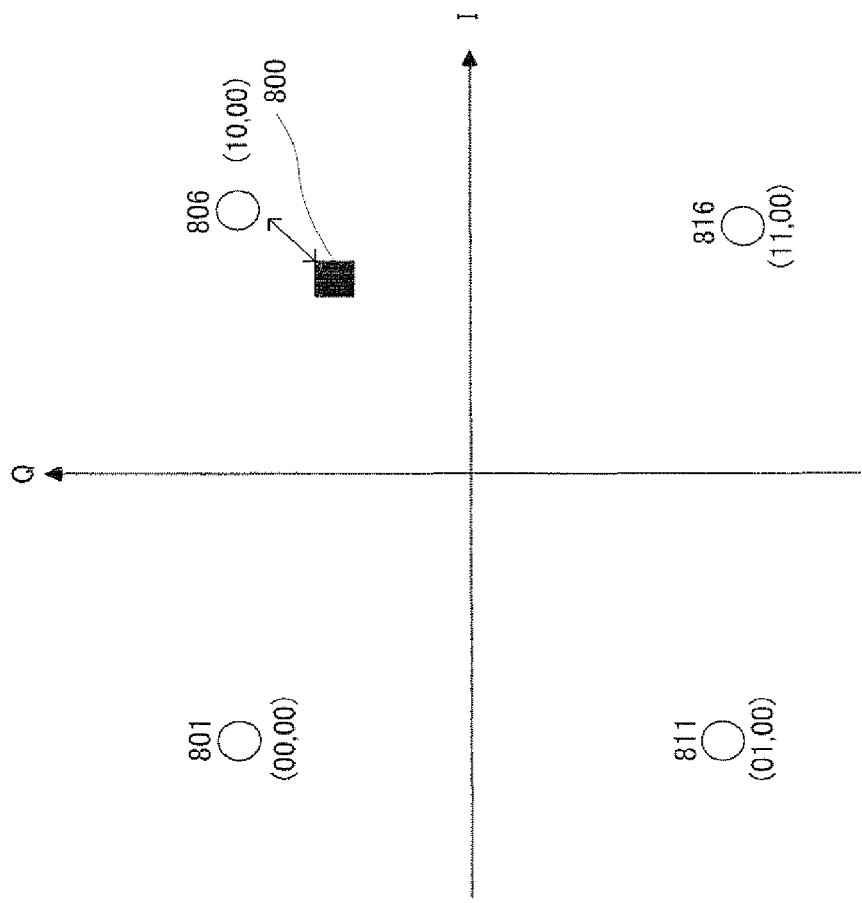
FIG. 9 shows reduced candidate signal points about modulated signal A and a reception point.

Signal point reduction section 508 estimates 16 candidate signal points 801 to 816 as shown in FIG. 8 based on channel fluctuation value h12 of modulated signal A and channel fluctuation value 1122 of modulated signal B. Next, signal point reduction section 508 narrows down the number of candidate signal points to 4 as shown in FIG. 9 using decision value 507 of modulated signal B obtained by soft decision section 506. FIG. 9 shows an example of candidate signal point reduction when decision value 507 of modulated signal B is (0,0), that is, 2 bits transmitted with modulated signal B are decided to be (0,0). Then, signal point reduction section 508 sends information on signal points 801, 806, 811, 816 to soft decision section 512 as signal point information 509.

In the same way, signal point reduction section 510 estimates 16 candidate signal points 801 to 816 based on channel fluctuation value h11 of modulated signal A and channel fluctuation value h21 of modulated signal B, and then reduces the number of candidate signal points to 4 using decision value 507 of modulated signal B obtained by soft decision section 506 and sends information on the 4 signal points to soft decision section 512 as signal point information 511.

Signal point reduction sections 514, 516 about modulated signal B input decision value 504 about modulated signal A obtained by soft decision section 503. Furthermore, channel fluctuation value h12 of modulated signal A and channel fluctuation value h22 of modulated signal B obtained based on the received signal of one receive antenna AN4 are input to signal point reduction section 514, and channel fluctuation value h11 of modulated signal A and channel fluctuation value h21 of modulated signal B obtained based on the received signal of the other receive antenna AN3 are input to signal point reduction section 516.

Figure 10:
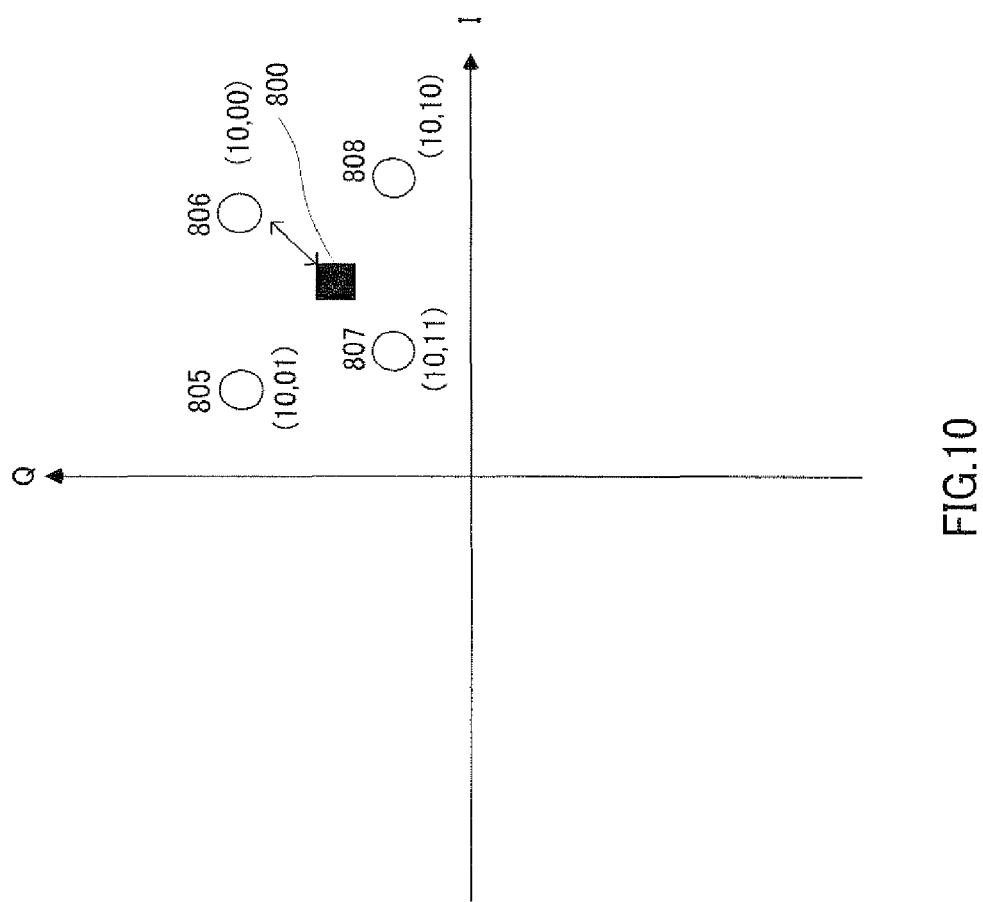
FIG. 10 shows reduced candidate signal points about modulated signal B and a reception point.

Signal point reduction section 514 estimates 16 candidate signal points 801 to 816 as shown in FIG. 8 based on channel fluctuation value h12 of modulated signal A and channel fluctuation value h22 of modulated signal B. Next, signal point reduction section 514 narrows down the number of the candidate signal points to 4 as shown in FIG. 10 using decision value 504 of modulated signal A obtained by soft decision section 503. FIG. 10 shows an example of candidate signal point reduction when decision value 504 of modulated signal A is (1,0), that is, 2 bits transmitted with modulated signal A are decided to be (1,0). Then, signal point reduction section 514 sends information on signal points 805, 806, 807, 808 to soft decision section 518 as signal point information 515.

In the same way, signal point reduction section 516 estimates 16 candidate signal points 801 to 816 based on channel fluctuation value h11 of modulated signal A and channel fluctuation value h21 of modulated signal B, and then reduces the number of candidate signal points to 4 using decision value 504 of modulated signal A obtained by soft decision section 503 and sends information on the 4 signal points to soft decision section 518 as signal point information 517.

In this way, in addition to separation section 501 which separates modulated signals A, B through an inverse matrix calculation of a channel fluctuation matrix and soft decision sections 503, 506 which makes a soft decision on separated modulated signals 502, 505, multi-antenna reception apparatus 120 of this embodiment provides signal point reduction sections 508, 510, 514, 516 which correspond to modulated signals A, B and reduces the number of candidate signals about the subject modulated signal using soft decision values 507, 504 of modulated signals other than the subject modulated signal through signal point reduction sections 508, 510, 514, 516.

That is, separation section 501, soft decision sections 503, 506 provisionally decide modulated signals A, B and signal point reduction sections 508, 510, 514, 516 reduce candidate signal points based on provisional decision results 507, 504.

Soft decision sections 512, 518 make soft decisions on baseband signals R1-2, R2-2 using the candidate signal points about the reduced subject modulated signal, and thereby obtain received data RA, RB which correspond to transmission digital signals TA, TB.

This will be explained more specifically. Soft decision section 512 inputs information on candidate signal points 801, 806, 811, 816 in FIG. 9 as signal point information 509, 511 and inputs received baseband signals R1-2, R2-2. Soft decision section 512 makes a soft decision using candidate signal points 801, 806, 811, 816 about both of received baseband signals R1-2, R2-2. When, for example, the reception point indicated by received baseband signal R1-2 is assumed to be signal point 800 in FIG. 9, soft decision section 512 calculates the square of a Euclid distance between received signal point 800 and candidate signal points 801, 806, 811, 816, and thereby obtains a branch metric (this is called "Bx"). In the same way, when the reception point indicated by received baseband signal R2-2 is assumed to be signal point 800 (however, the reception point of received baseband signal R2-1 and reception point of received baseband signal R2-2 are actually different) in FIG. 9, soft decision section 512 calculates the square of a Euclid distance between received signal point 800 and candidate signal points 801, 806, 811, 816 and thereby obtains a branch metric (this is called "By").

Soft decision section 512 then obtains a path metric from the branch metric which is the sum of branch metric Bx and branch metric By and when, for example, a convolutional code is used, soft decision section 512 obtains received data RA of modulated signal A by performing decoding according to a Viterbi algorithm.

In the same way, soft decision section 518 inputs information on candidate signal points 805, 806, 807, 808 in FIG. 10 as signal point information 515, 517 and inputs received baseband signals R1-2, R2-2. Soft decision section 518 makes a soft decision using candidate signal points 805, 806, 807, 808 about both received baseband signals R1-2, R2-2. When, for example, the reception point indicated by received baseband signal R1-2 is signal point 800 in FIG. 10, soft decision section 518 calculates the square of a Euclid distance between received signal point 800 and candidate signal points 805, 806, 807, 808, and thereby obtains a branch metric (this is called "Bv"). In the same way, when the reception point indicated by received baseband signal R2-2 is assumed to be signal point 800 (however, the reception point of received baseband signal R2-1 is actually different from the reception point of received baseband signal R2-2) in FIG. 10, soft decision section 518 calculates the square of a Euclid distance between received signal point 800 and candidate signal points 805, 806, 807, 808, and thereby obtains a branch metric (this is called "Bw").

Then, when soft decision section 518 obtains a path metric from the branch metric which is the sum of branch metric Bv and branch metric Bw and when, for example, a convolutional code is used, soft decision section 518 obtains received data RB of modulated signal B by performing decoding according to a Viterbi algorithm.

Next, the operation of multi-antenna reception apparatus 120 of this embodiment will be explained. Multi-antenna reception apparatus 120 receives two modulated signals A, B simultaneously transmitted from two antennas AN1, AN2 at two antennas AN3, AN4. Multi-antenna reception apparatus 120 estimates channel fluctuations between transmit antennas AN1, AN2 and receive antenna AN3, AN4 based on known signals inserted in modulated signals A, B by channel fluctuation estimation sections 403-1A, 403-1B, 403-2A, 403-2B.

Here, when modulated signal A, modulated signal B are modulated according to QPSK, there are 4×4=16 signal points in the multiplexed received signal. In other words, the number of candidate signal points formed based on the channel fluctuation estimated value is also 16.

Here, a conventional multi-antenna reception apparatus calculates a signal point distance between 16 candidate signal points and the reception point, detects a candidate signal point which takes a smallest distance value and regards the data indicated by this candidate signal point as the received data.

On the other hand, multi-antenna reception apparatus 120 according to this embodiment provides separation section 501 that separates modulated signals A, B through an inverse matrix calculation of a channel fluctuation matrix and soft decision sections 503, 506 that make a soft decision on the separated modulated signals, obtains digital signals (decision values) of modulated signals A, B and narrows down candidate signal points of modulated signals A, B using these digital signals. Multi-antenna reception apparatus 120 then makes a correct decision through the soft decision section using only the candidate signal points which have been narrowed down. In other words, this means that separation section 501, soft decision sections 503, 504 make a provisional decision on modulated signals A, B, narrow down candidate signal points using the provisional decision value and make accurate digital decision (main decision) on only the candidate signal points which have been narrowed down.

In this way, it is possible to drastically reduce the amount of calculation compared to the case where a reception point is decided by soft decision sections 512, 518 using all candidate signal points. For example, this embodiment uses QPSK as the modulation scheme but the effect will further increase as the multivalue number increases. When, for example, both modulated signals A, B are assumed to be modulated according to 64QAM, if the number of signal points is not reduced, 64×64=4096 candidate signal points exist and trying to determine a branch metric for 4096 candidate signal points requires a circuit on a considerably large scale.

Furthermore, compared to the case where received data is obtained using only an inverse matrix calculation, that is, compared to the case where decision results at soft decision sections 503, 506 are used as received data, the error rate characteristic can be improved. Especially, when the number of signal points is reduced, if a correct reduction is performed, a full diversity gain can be obtained and the error rate characteristic can be further improved. A more preferable configuration for a signal point reduction will be explained in the following embodiment.

In this way, according to this embodiment, modulated signals 502, 505 are provisionally decided based on modulated signals 502, 505 which have been separated using an inverse matrix calculation of a channel fluctuation matrix and the number of candidate signal points of the multiplexed modulated signal is reduced using provisional decision results 504, 507, and then a more accurate decision is made using the reduced candidate signal points and received data RA, RB of the respective modulated signals are obtained, and therefore it is possible to obtain received data RA, RB having a good error rate characteristic with a smaller amount of calculation. As a result, it is possible to realize a multi-antenna reception apparatus and a multi-antenna reception method capable of simplifying an apparatus configuration while maintaining an error rate characteristic.

The above described embodiment has described the case where when each modulated signal to reduce candidate signal points is separated, separation section 501 performs an inverse matrix calculation of a channel fluctuation matrix, but the separation method is not limited to an inverse matrix calculation, and, for example, each modulated signal may also be estimated and separated using, for example, an MMSE (Minimum Mean Square Error) algorithm.

Furthermore, the above described embodiment has described the case where separation section 501 and soft decision sections 503, 506 perform a provisional decision on each modulated signal to reduce the number of candidate signal points, but the method of provisional decision is not limited to this. When a circuit scale does not matter, for example, a provisional decision may also be performed by soft decision section 1101 without performing any inverse matrix calculation for the separation of modulated signals as shown in FIG. 11.

Figure 11:
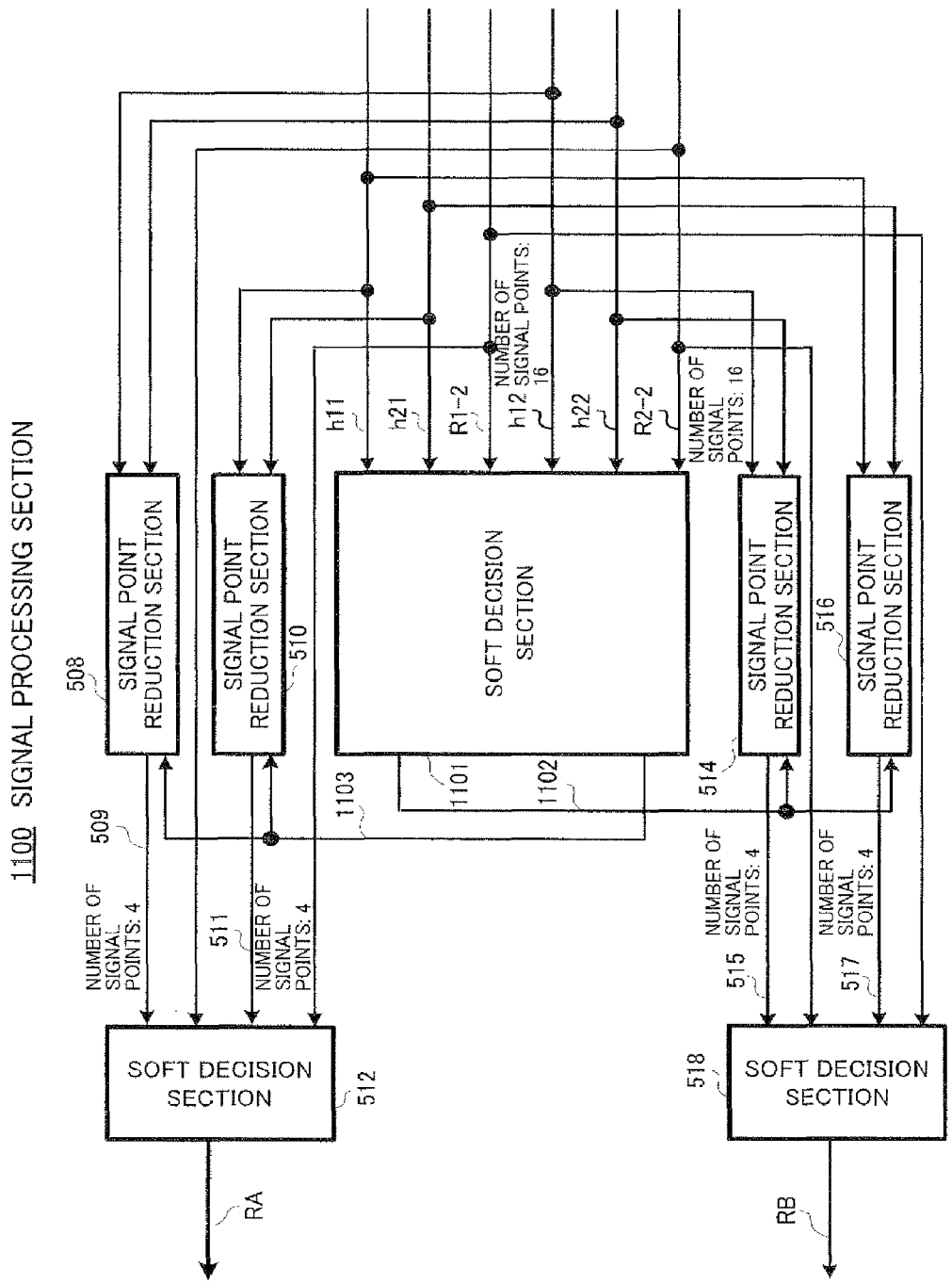
FIG. 11 is a block diagram showing another configuration example of the signal processing section used for the multi-antenna reception apparatus of Embodiment 1.

In FIG. 11 which shows parts corresponding to those in FIG. 5 assigned the same reference numerals, baseband signals R1-2, R2-2 and channel fluctuation estimated values h11, h21, h12, h22 are input to soft decision section 1101 of signal processing section 1100. Soft decision section 1101 estimates 16 candidate signal points 801 to 816 as shown in FIG. 8 based on channel, fluctuation value h11 of modulated signal A and channel fluctuation value h21 of modulated signal B.

Soft decision section 1101 then estimates received signal point 800 in FIG. 8, for example, it calculates the square of each Euclid distance between received signal point 800 and each of 16 candidate signal points 801 to 816 from despread baseband signal R1-2 and determines a branch metric. In the same way, soft decision section 1101 obtains a branch metric from channel fluctuation signals h12, h22 of modulated signal A and despread baseband signal R2-2. When soft decision section 1100 uses a convolutional code, it obtains a path metric from two branch metrics and it outputs decision value 1102 of modulated signal A and decision value 1103 of modulated signal B.

Embodiment 2

Compared to Embodiment 1, this embodiment proposes a multi-antenna reception apparatus that makes simpler the configuration of the part which makes a provisional decision to reduce candidate signal points and can thereby obtain received data with a good error rate characteristic in a simpler configuration.

Figure 12:
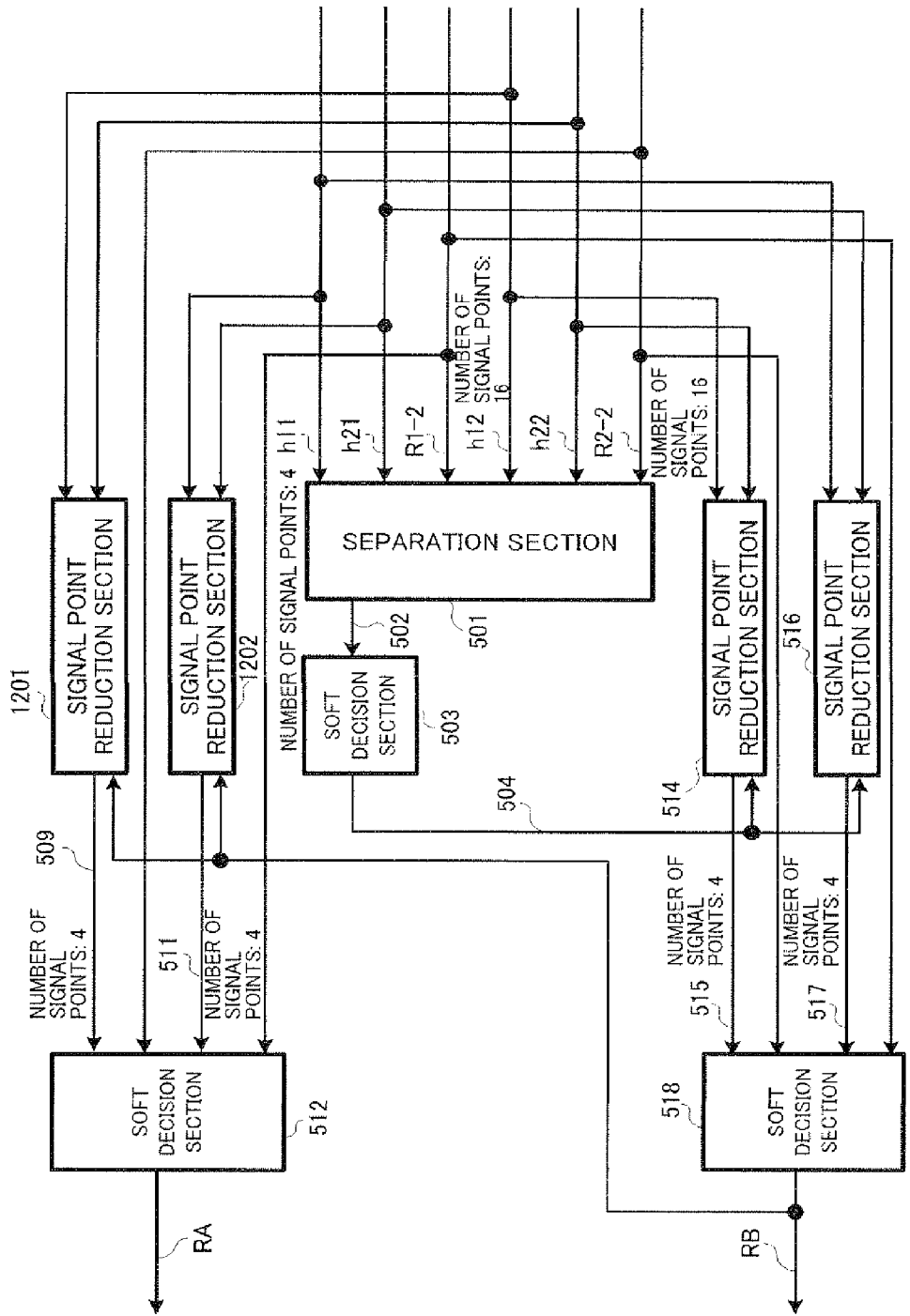
FIG. 12 is a block diagram showing the configuration of a signal processing section of a multi-antenna reception apparatus according to Embodiment 2.

FIG. 12 which shows parts corresponding to those in FIG. 5 assigned the same reference numerals shows the configuration of signal processing section 1200 of the multi-antenna reception apparatus of this embodiment. Compared to signal processing section 404 in FIG. 5, signal processing section 1200 in FIG. 12 has a configuration without soft decision section 506 (FIG. 5) to decide estimated baseband signal 505 of modulated signal B separated by separation section 501. Received data RB of modulated signal B obtained by soft decision section 518 is input to signal point reduction sections 1201, 1202. Signal point reduction sections 1201, 1202 reduce candidate signal points according to a method similar to that explained in Embodiment 1 using received data RB obtained by soft decision section 518 instead of decision value 507 from soft decision section 506 (FIG. 5). This allows the overall circuit configuration to be simplified by the amount of space corresponding to soft decision section 506.

Next, the operation of signal processing section 1200 of this embodiment will be explained. Signal processing section 1200 decodes only modulated signal A through soft decision section 503, signal point reduction sections 514, 516 reduce candidate signal points using the result and soft decision section 518 decodes modulated signal B to obtain received data RB of modulated signal B.

Signal processing section 1200 then reduces candidate signal points about modulated signal A using data RB of modulated signal B through signal point reduction sections 1201, 1202, decodes modulated signal A through soft decision section 512 to thereby obtain received data RA of modulated signal A. In this way, instead of decoding modulated signal A and modulated signal B simultaneously, signal processing section 1200 of this embodiment decodes them alternately such as decoding modulated signal A, decoding modulated signal B, decoding modulated signal A and so on.

In this way, instead of making provisional decisions on all modulated signals and reducing candidate signal points using the provisional decision result through all signal point reduction sections, this embodiment makes provisional decisions on only some modulated signals, reduces candidate signal points using a final decision result (main decision result) for other modulated signals, and can thereby realize a multi-antenna reception apparatus in a much simpler configuration in addition to the effects of Embodiment 1.

Embodiment 3

This embodiment proposes a multi-antenna reception apparatus that not only obtains received data with a good error rate characteristic with a smaller number of calculations by making a main decision after reducing candidate signal points but also applies an iteration (repetition) technology, and can thereby further improve the error rate characteristic.

Figure 13:
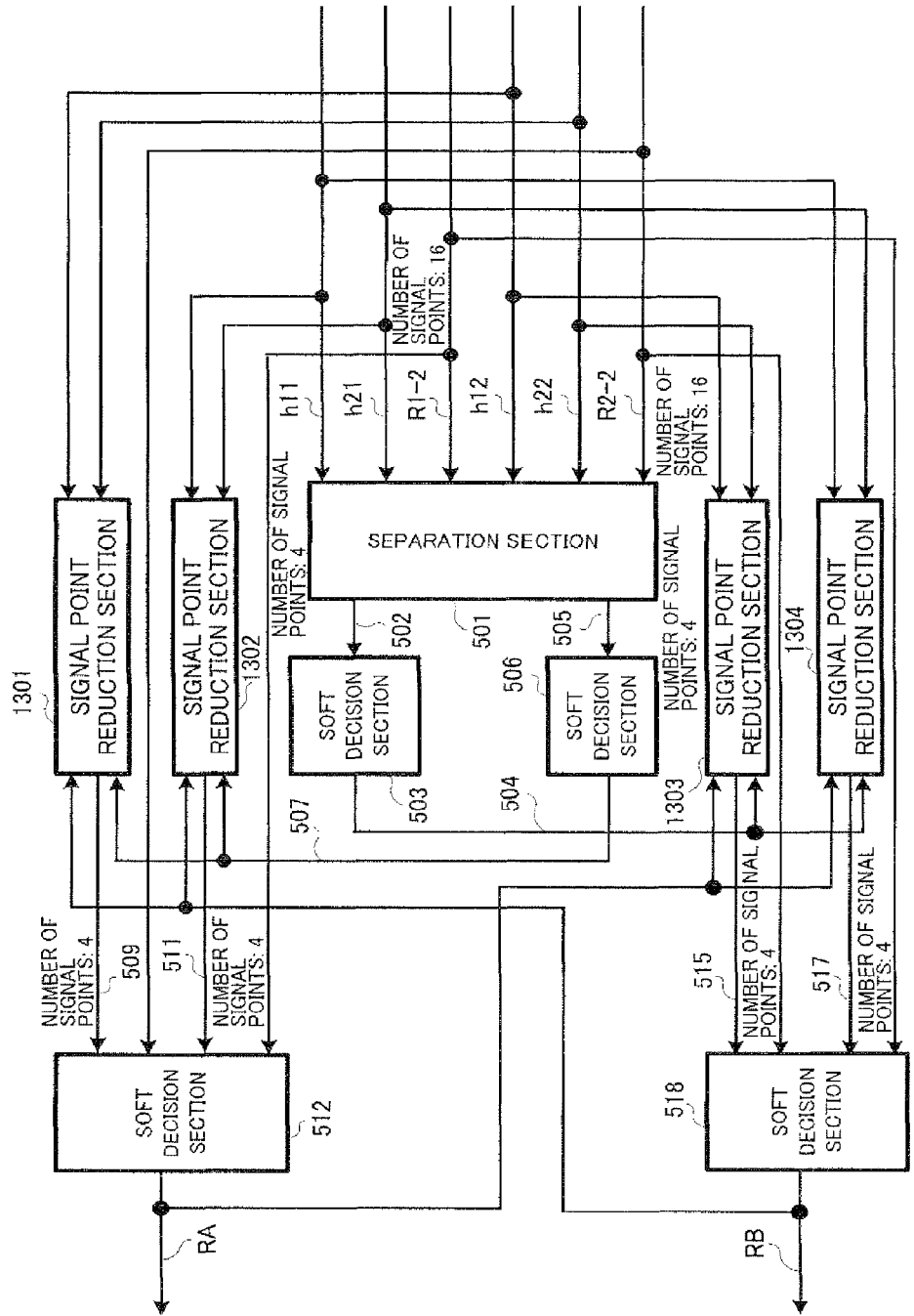
FIG. 13 is a block diagram showing the configuration of a signal processing section of a multi-antenna reception apparatus according to Embodiment 3.

FIG. 13 which shows parts corresponding to those in FIG. 5 assigned the same reference numerals shows the configuration of signal processing section 1300 of the multi-antenna reception apparatus of this embodiment. That is, signal processing section 1300 is replaced by signal processing section 404 in FIG. 4 and is used for multi-antenna reception apparatus 120.

Signal processing section 1300 of this embodiment differs from signal processing section 404 in the FIG. 5 explained in Embodiment 1 in that signal point reduction sections 1301, 1302 receive received data RB from soft decision section 518 in addition to decision value 507 from soft decision section 506 and that signal point reduction sections 1303, 1304 receive received data RA from soft decision section 512 in addition to decision value 504 from soft decision section 503.

This allows signal point reduction sections 1301 to 1304 to improve the probability of reducing signal points correctly compared to signal point reduction sections 508, 510, 514, 516 of Embodiment 1. As a result, the error rate characteristic of finally obtained received data RA, RB can be further improved.

Figure 14:
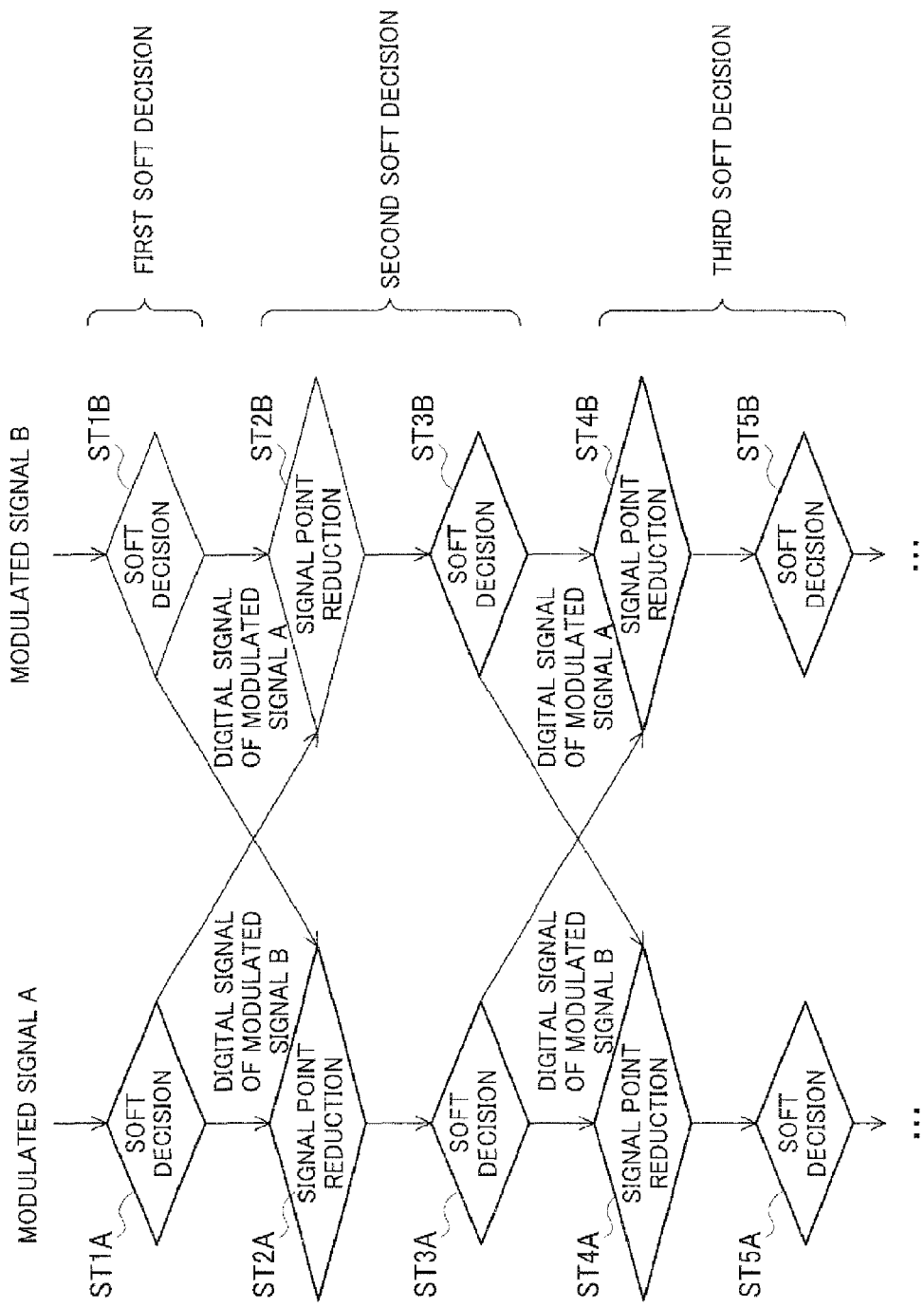
FIG. 14 illustrates an iteration operation according to Embodiment 3.

Next, the operation of signal processing section 1300 of this embodiment will be explained using FIG. 14. As shown in FIG. 14, signal processing section 1300 performs soft decisions and decoding on modulated signals A, B in parallel. Signal points of modulated signal A are reduced using received data RB of modulated signal B obtained through the soft decision on modulated signal B. On the contrary, signal points of modulated signal B are reduced using received data RA of modulated signal A obtained through the soft decision on modulated signal A. Received data RA, RB of modulated signals A, B are obtained by making a soft decision (main decision) on each of modulated signal A, B. Moreover, signal point reductions and soft decisions (main decisions) are repeatedly carried out using received data RA, RB of modulated signals A, B obtained.

This will be explained more specifically. The operation of first soft decision and decoding is the same as the operation of signal processing section 404 in FIG. 5 explained in Embodiment 1. That is, signal points are reduced based on provisional decision values (decision values 504, 507) obtained by soft decision sections 503, 504. On the other hand, soft decision and decoding from the second time onward are performed using received data RA, RB obtained by soft decision sections 512, 518.

In first soft decision processing shown in step ST1A on modulated signal A by signal processing section 1300, signal point reduction sections 1301, 1302 estimate 2 bits transmitted with modulated signal B using soft decision value 507 of modulated signal B respectively, reduces 16 candidate signal points in FIG. 8 to 4 signal points in FIG. 9, sends signal point information (4 signal points) 509, 511 to soft decision section 512 and soft decision section 512 obtains received data RA using signal point information 509, 511.

In the same way, in first soft decision processing shown in step ST1B on modulated signal B by signal processing section 1300, signal point reduction sections 1303, 1304 estimate 2 bits transmitted with modulated signal A using soft decision value 504 of modulated signal A respectively, reduces 16 candidate signal points in FIG. 8 to 4 signal points in FIG. 10, sends signal point information (4 signal points) 515, 517 to soft decision section 518 and soft decision section 518 obtains received data RB using signal point information 515, 517.

In second soft decision processing shown in step ST2A, ST3A on modulated signal A by signal processing section 1300, signal point reduction sections 1301, 1302 estimate 2 bits transmitted with modulated signal B using received data RB obtained in step ST1B respectively, reduces 16 candidate signal points in FIG. 8 to 4 signal points in FIG. 9 (step ST2A), sends signal point information (4 signal points) 509, 511 to soft decision section 512 and soft decision section 512 obtains received data RA using signal point information 509, 511 (step ST3A).

In the same way, in second soft decision processing shown in steps ST2B, ST3B on modulated signal B by signal processing section 1300, signal point reduction sections 1303, 1304 estimate 2 bits transmitted with modulated signal A using received data RA obtained in step ST1A respectively, reduces 16 candidate signal points in FIG. 8 to 4 signal points in FIG. 10 (Step ST2B), sends signal point information (4 signal points) 515, 517 to soft decision section 518 and soft decision section 518 obtains received data RB using signal point information 515, 517 (Step ST3B).

In third soft decision processing shown in steps ST4A, ST5A on modulated signal A by signal processing section 1300, signal point reduction sections 1301, 1302 estimate 2 bits transmitted with modulated signal B using received data RB obtained in step ST3B respectively, reduces 16 candidate signal points in FIG. 8 to 4 signal points in FIG. 9 (step ST4A), sends signal point information (4 signal points) 509, 511 to soft decision section 512 and soft decision section 512 obtains received data RA using signal point information 509, 511 (step ST5A).

In the same way, in third soft decision processing shown in steps ST4B, ST5B on modulated signal B by signal processing section 1300, signal point reduction sections 1303, 1304 estimate 2 bits transmitted with modulated signal A using received data RA obtained in step ST3A respectively, reduces 16 candidate signal points in FIG. 8 to 4 signal points in FIG. 10 (Step ST4B), sends signal point information (4 signal points) 515, 517 to soft decision section 518 and soft decision section 518 obtains received data RB using signal point information 515, 517 (Step ST5B).

In this way, signal processing section 1300 is designed to perform signal point reductions from the second time onward using received data RA, RB of the other modulated signal after the preceding operation is completed.

After performing first soft decision and decoding, soft decision sections 512, 518 outputs first received data RA, RB respectively. Next, after performing second soft decision and decoding, soft decision sections 512, 518 output second received data RA, RB instead of first received data RA, RB. That is, after nth soft decision and decoding, soft decision sections 512, 518 output received data RA, RB which are nth soft decision and decoding results instead of (n−1)th received data RA, RB.

In this way, in reducing candidate signal points, iteration (repetition) processing is performed using data after error correcting decoding of the other modulated signal (suppose that soft decision sections 512, 518 perform the error correcting decoding processing), and therefore it is possible to improve the probability that correct candidate signal points may be left and further improve the error rate characteristic of received data RA, RB.

Figure 15:
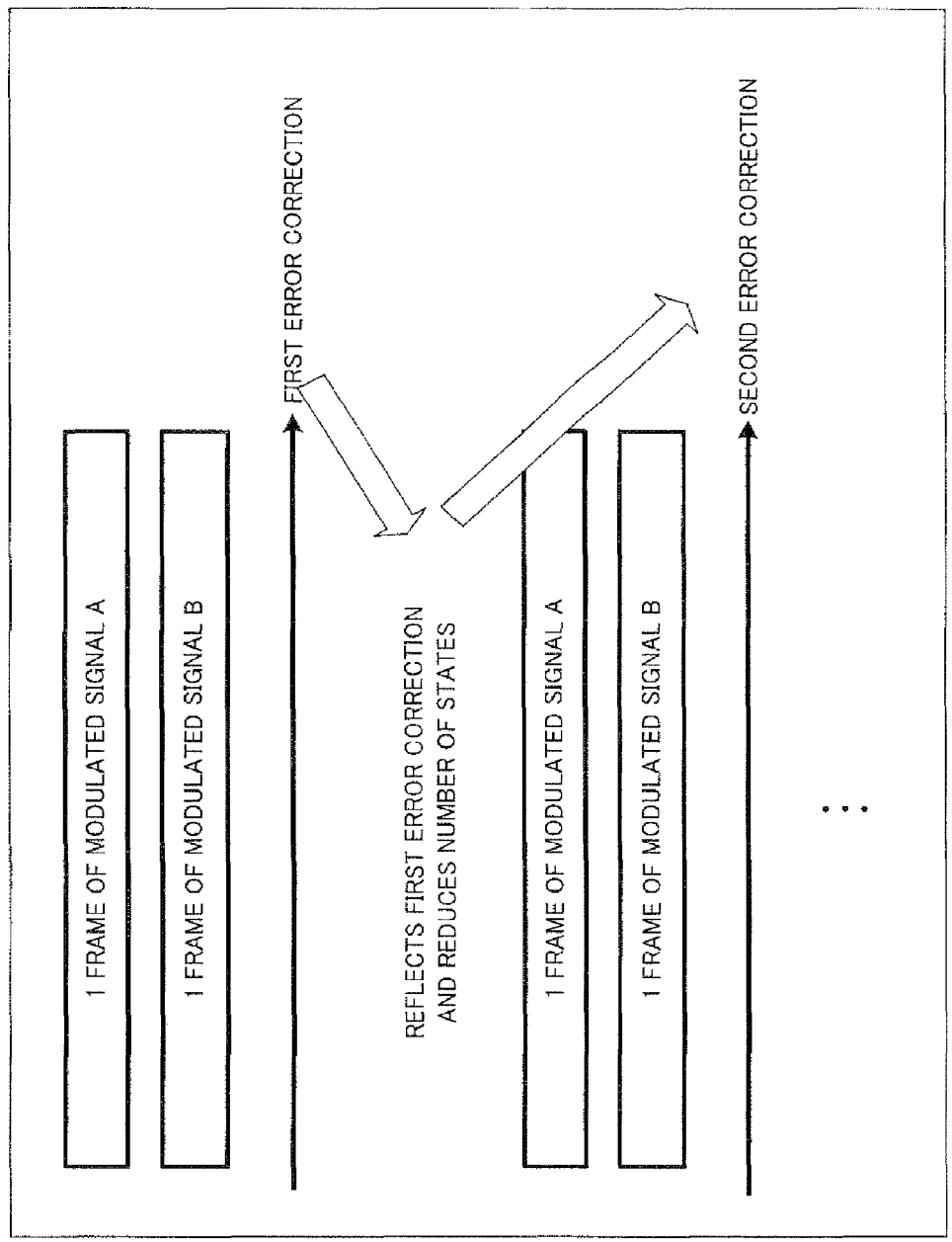
FIG. 15 shows an image of the decoding procedure in Embodiment 3.

FIG. 15 shows an image of the decoding processing procedure in this embodiment. One frame of modulated signal A, modulated signal B is composed of a plurality of symbols.

First, a first error correction corresponding to one frame is performed. Then, the number of states is reduced by reflecting the first error correction result and a second error correction corresponding to one frame is performed. In this way, after reducing the number of states by reflecting an (n−1)th error correction result, an nth error correction corresponding to one frame is performed.

Figure 16:
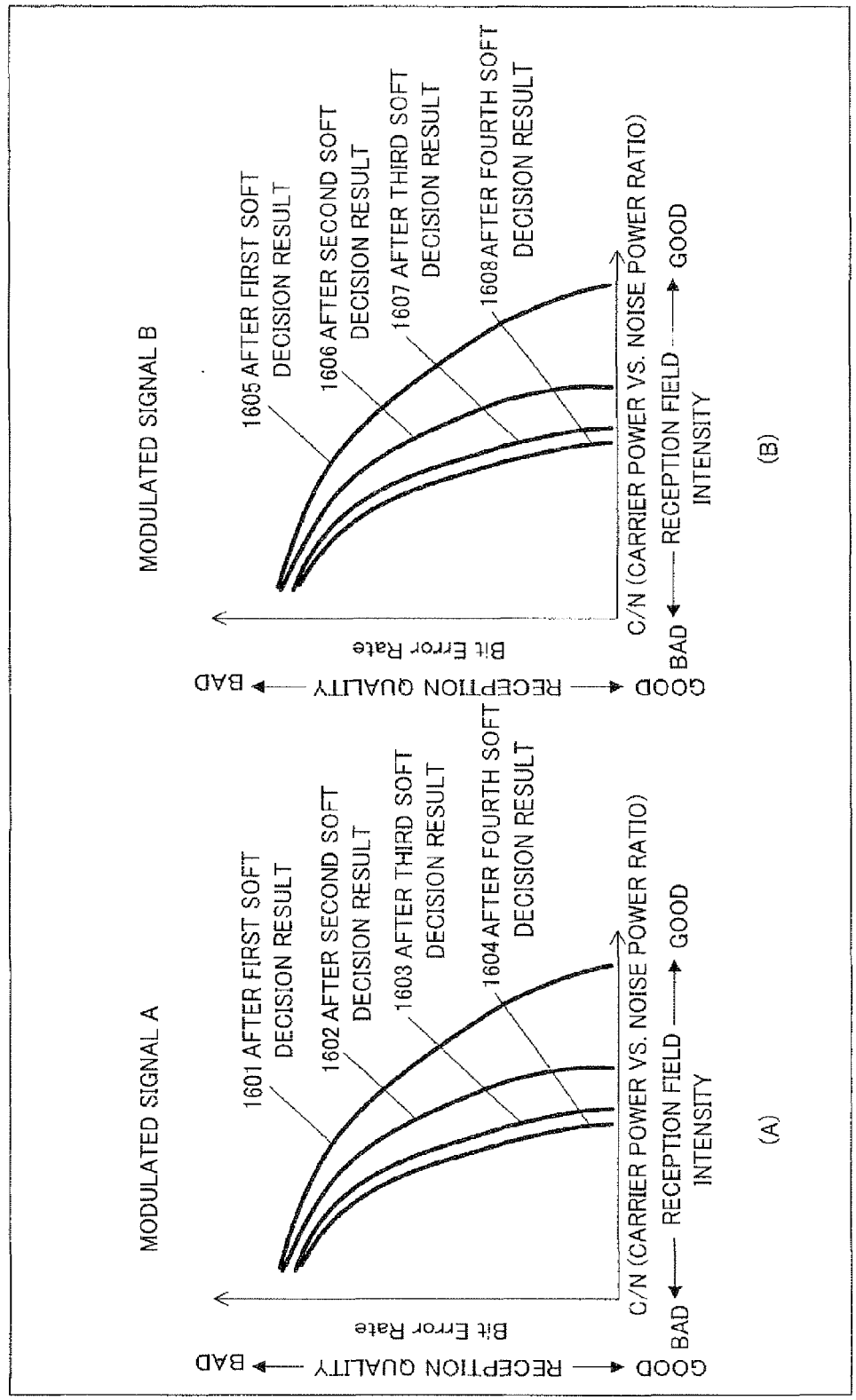
FIG. 16 is a characteristic curve diagram showing a simulation result of the multi-antenna reception apparatus of Embodiment 3; (A) is a characteristic curve diagram of modulated signal A and (B) is a characteristic curve diagram of modulated signal B.

FIG. 16 shows a simulation result of a reception characteristic (relationship between carrier power vs. noise power ratio (C/N) and bit error rate) when using signal processing section 1300 of this embodiment. As is also evident from this figure, as the number of times of iterative decoding increases on both modulated signals A and B, the reception quality improves. However, the point is not to simply increase the number of times, and the improvement effect of the reception quality is saturated when a certain number of times is reached. Furthermore, the reception quality of modulated signals A, B is the same when the modulation scheme is the same.

In this way, when reducing candidate signal points, this embodiment uses data RA, RB of the other modulated signal after error correcting decoding (after a main decision), performs iteration processing and obtains final received data RA, RB, and can thereby obtain received data RA, RB with an improved error rate characteristic compared to Embodiment 1.

Figure 17:
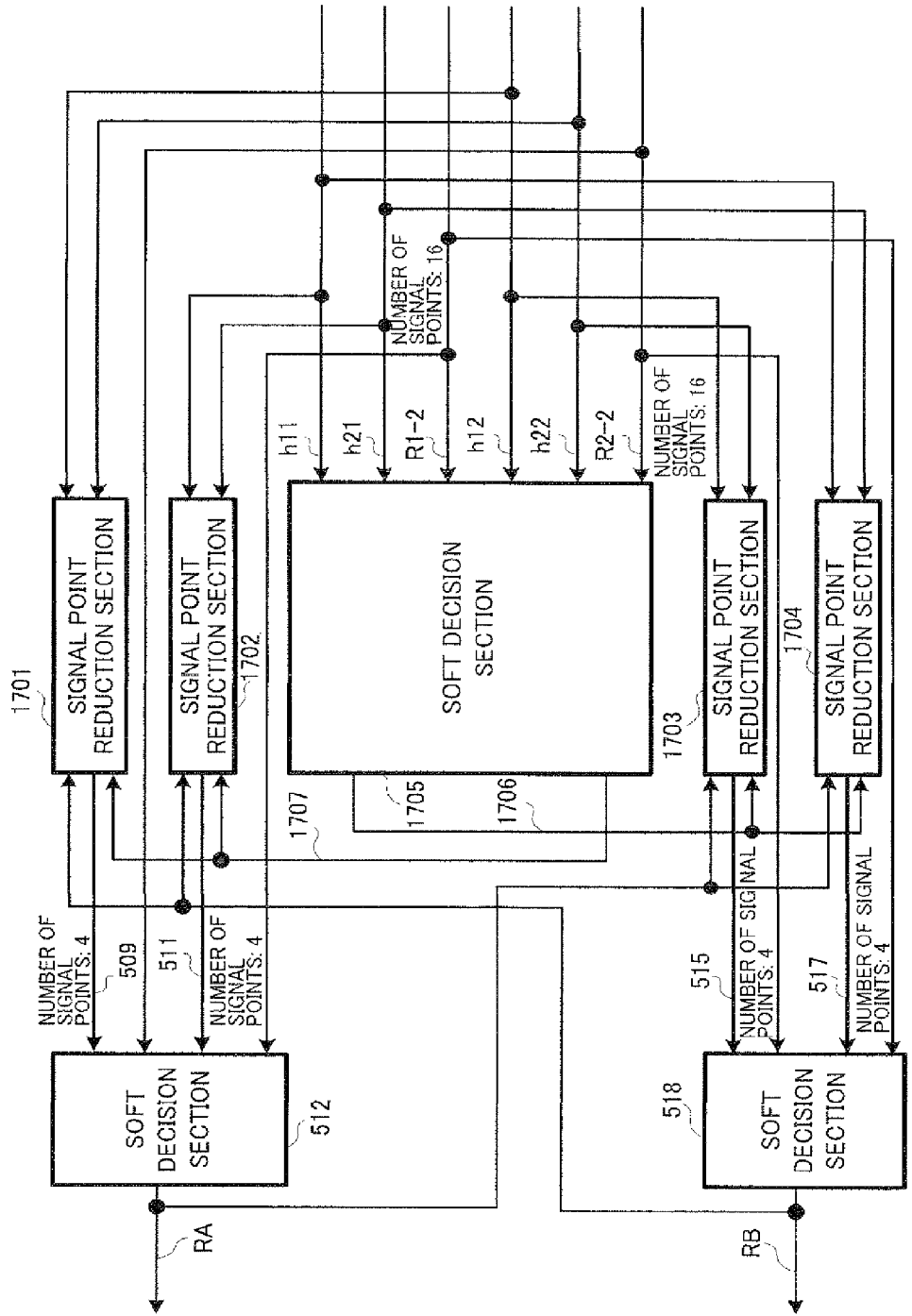
FIG. 17 is a block diagram showing another configuration example of the signal processing section used for the multi-antenna reception apparatus of Embodiment 3.

This embodiment has described the case where separation section 501 and soft decision sections 503, 506 make a provisional decision on each modulated signal to reduce candidate signal points, but the method of making a provisional decision is not limited to this and when the circuit scale does not matter, soft decision section 1705 may make a provisional decision without carrying out any inverse matrix calculation for separation of modulated signals, as shown in FIG. 17, for example.

In FIG. 17 which shows parts corresponding to those in FIG. 13 assigned the same reference numerals, baseband signals R1-2, R2-2 and channel fluctuation estimated values h11, h21, h12, h22 are input to soft decision section 1705 at signal processing section 1700. Soft decision section 1705 estimates 16 candidate signal points 801 to 816 as shown in FIG. 8 based on channel fluctuation value h11 of modulated signal A and channel fluctuation value h21 of modulated signal B. Soft decision section 1705 then estimates received signal point 800 in FIG. 8, for example, it obtains the square of each Euclid distance between received signal point 800 and each of 16 candidate signal points 801 to 816 from despread baseband signal R1-2 and determines a branch metric. In the same way, soft decision section 1705 obtains a branch metric from channel fluctuation signals 1112, h22 of modulated signal A and despread baseband signal R2-2. When a convolutional code is used, soft decision section 1705 obtains a path metric from two branch metrics, sends decision value 1706 of modulated signal A to signal point reduction sections 1703, 1704 and sends decision value 1707 of modulated signal B to signal point reduction sections 1701, 1702.

When the signal processing section 1300 in FIG. 13 is compared with signal processing section 1700 in FIG. 17 here, signal processing section 1700 makes a decision on 16 candidate signal points through soft decision section 1705, and therefore the circuit scale of the branch metric and path metric increases and there is a disadvantage that the overall circuit scale becomes greater than that of signal processing section 1300. Especially, there are 16 signal points in case of QPSK, and 4096 signal points exist in the case of 64QAM, and therefore it becomes less realistic as the modulation multivalue number increases.

However, decision section 1705 can obtain a more accurate decision value than when separation section 501 and soft decision sections 503, 506 are used, and therefore there is an advantage that it is possible to obtain received data RA, RB with a good error rate characteristic when iteration is performed no matter how small the iteration count may be.

Embodiment 4

In contrast to Embodiment 3 where modulated signals are subjected to soft decision decoding in parallel and candidate signal points of the subject modulated signal are reduced using the soft decision decoding results of other modulated signals, this embodiment is characterized in that modulated signals are alternately subjected to soft decision decoding and candidate signal points of the subject modulated signal are reduced using the soft decision decoding results of other modulated signals. Because the number of calculations when adopting an iteration technology for a signal point reduction can be reduced in this way, the circuit configuration can be further simplified.

Figure 18:
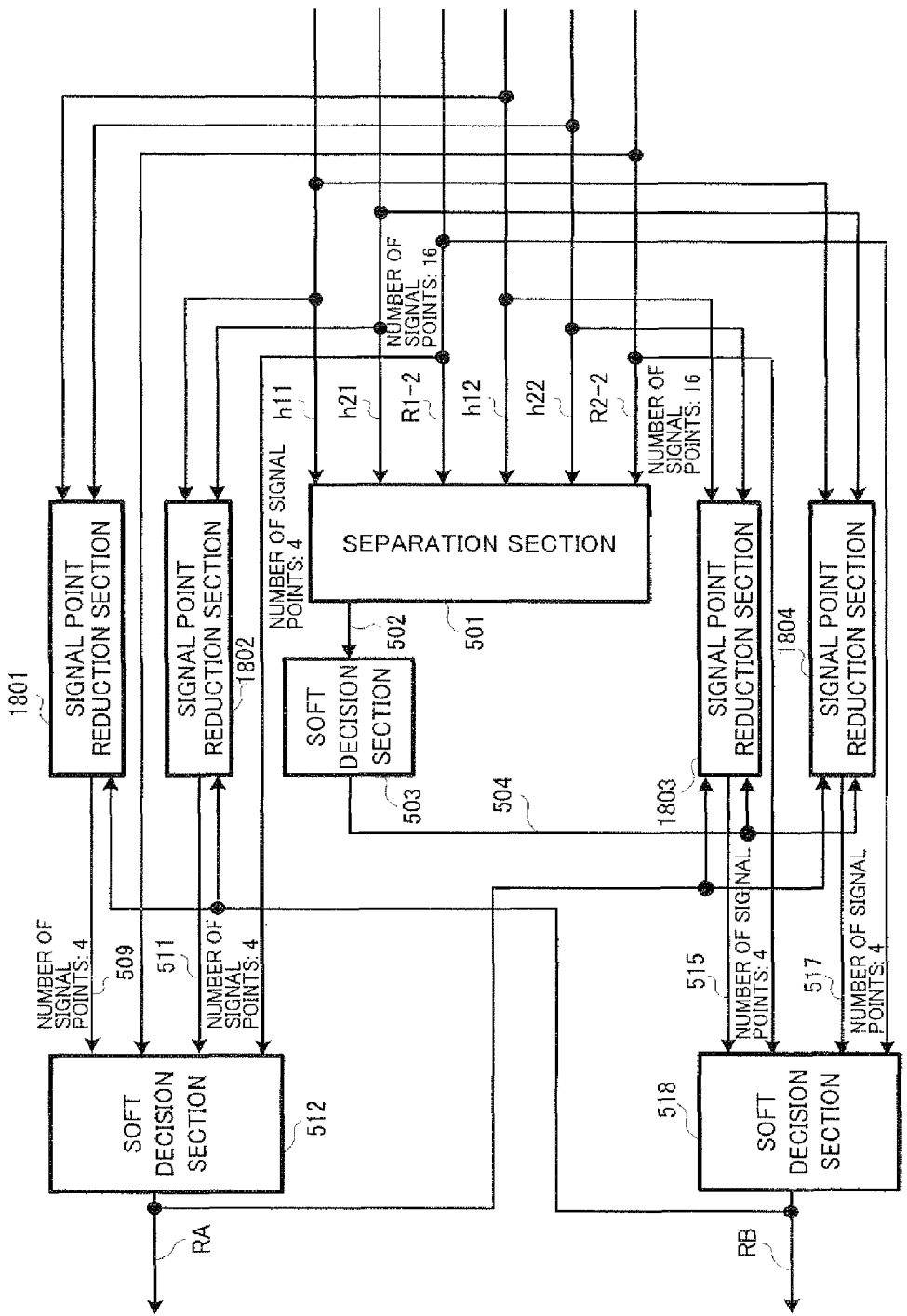
FIG. 18 is a block diagram showing the configuration of a signal processing section of a multi-antenna reception apparatus according to Embodiment 4.
Figure 33:
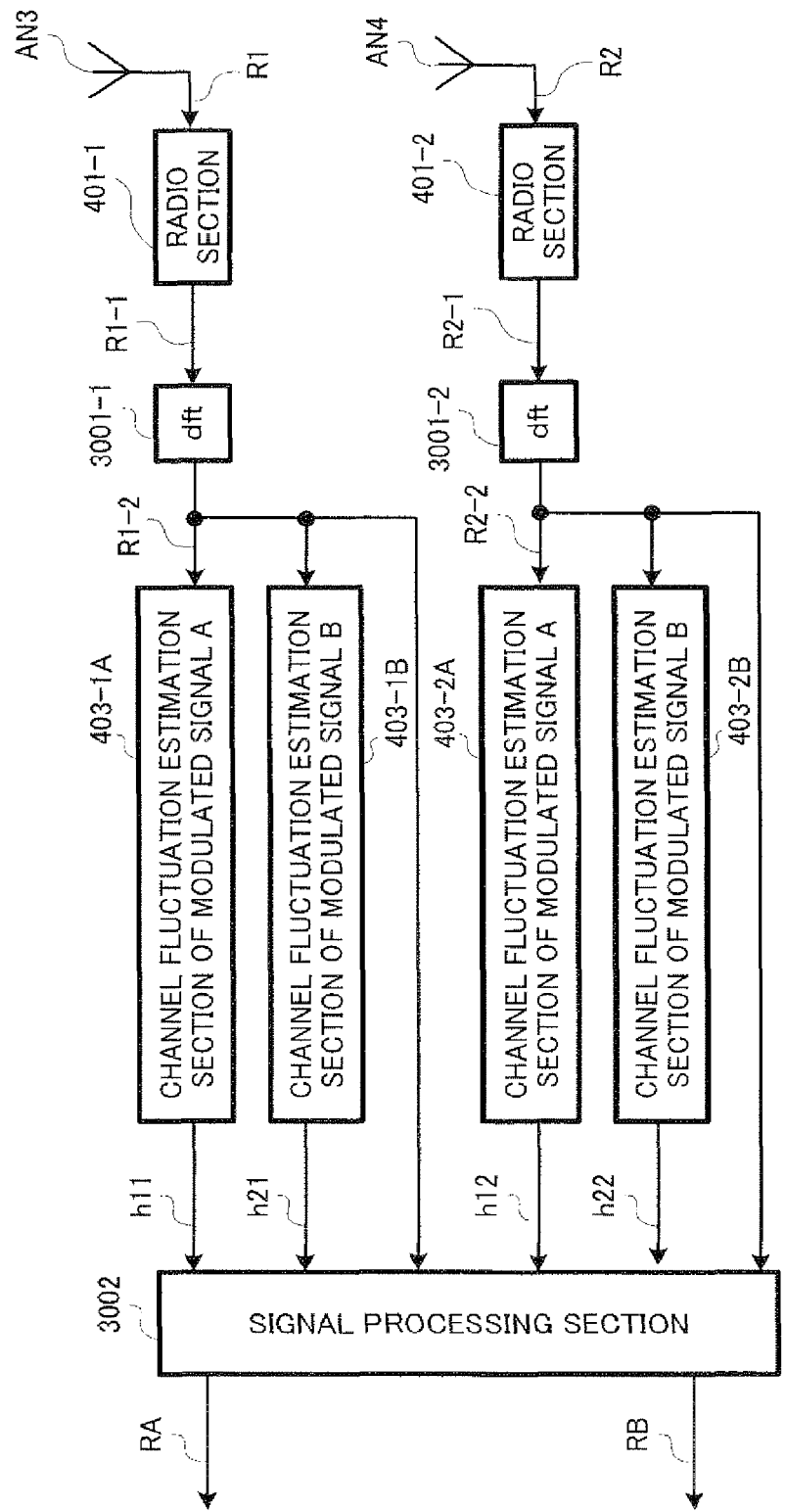
FIG. 33 is a block diagram showing the configuration of a multi-antenna reception apparatus of Embodiment 7.

FIG. 18 which shows parts corresponding to those in FIG. 33 assigned the same reference numerals shows the configuration of the signal processing section of the multi-antenna reception apparatus of this embodiment. Signal processing section 1800 corresponds to the configuration of signal processing section 1300 in FIG. 13 explained in Embodiment 3 without soft decision section 506.

Furthermore, compared to signal processing section 1200 in FIG. 12 explained in Embodiment 2, signal processing section 1800 corresponds to the configuration of signal processing section 1200 with iteration processing added.

In signal processing section 1800, signal point reduction sections 1803, 1804 about modulated signal B reduce candidate signal points using both decision value 504 obtained by soft decision section 503 and received data RA after error correcting decoding obtained by soft decision section 512 as in the case of Embodiment 3, whereas signal point reduction sections 1801, 1802 about modulated signal A reduce candidate signal points using only received data RB after error correcting decoding obtained by soft decision section 518. In this way, signal processing section 1800 of this embodiment can simplify the overall circuit configuration by omitting soft decision section 506 compared to signal processing section 1300 of Embodiment 3.

Figure 19:
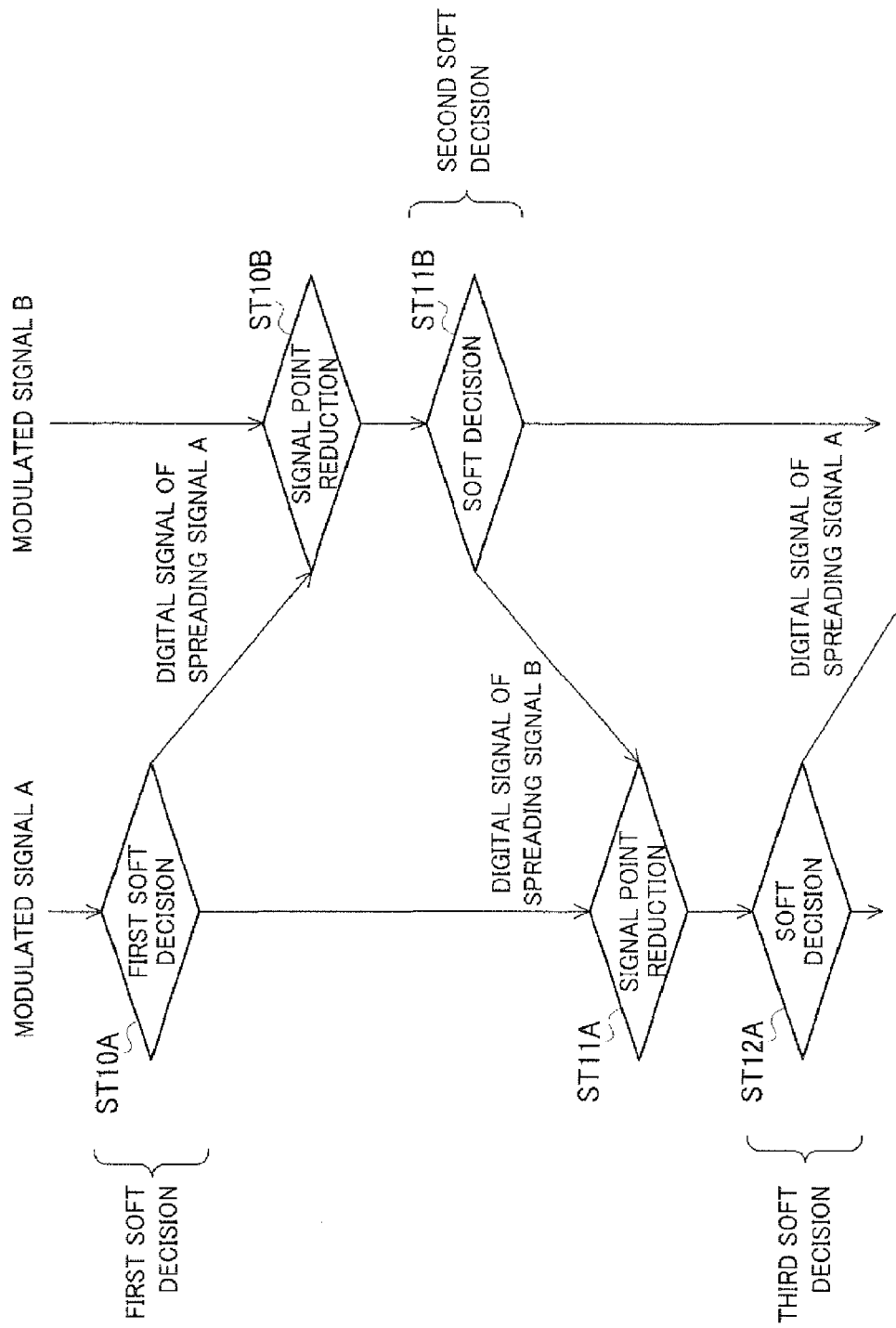
FIG. 19 illustrates an iteration operation according to Embodiment 4.

Next, the operation of signal processing section 1800 of this embodiment will be explained using FIG. 19.

In contrast to signal processing section 1300 of Embodiment 3 that performs soft decisions and decoding on modulated signals A, B in parallel, signal processing section 1800 performs first soft decision decoding on only modulated signal A, performs second soft decision decoding on only modulated signal B and performs third soft decision decoding on only modulated signal A and so on, thus performing soft decision decoding on modulated signal A and modulated signal B alternately.

This will be explained more specifically. First, signal processing section 1800 performs soft decision decoding on only modulated signal A by soft decision section 503 (step ST10A), reduces candidate signal points by signal point reduction sections 1803, 1804 using the result (step ST10B), performs soft decision decoding on modulated signal B by soft decision section 518 (step ST11B) and thereby obtains received data RB of modulated signal B. Next, signal processing section 1800 reduces candidate signal points using received data RB of modulated signal B by signal point reduction sections 1801, 1802 (step ST11A), performs soft decision decoding on modulated signal A by soft decision section 512 (step ST12A) and thereby obtains received data RA of modulated signal A. Hereinafter, signal processing section 1800 likewise reduces candidate signal points using other soft decision decoding results and repeats soft decision decoding on modulated signal A and soft decision decoding on modulated signal B alternately.

Figure 20:
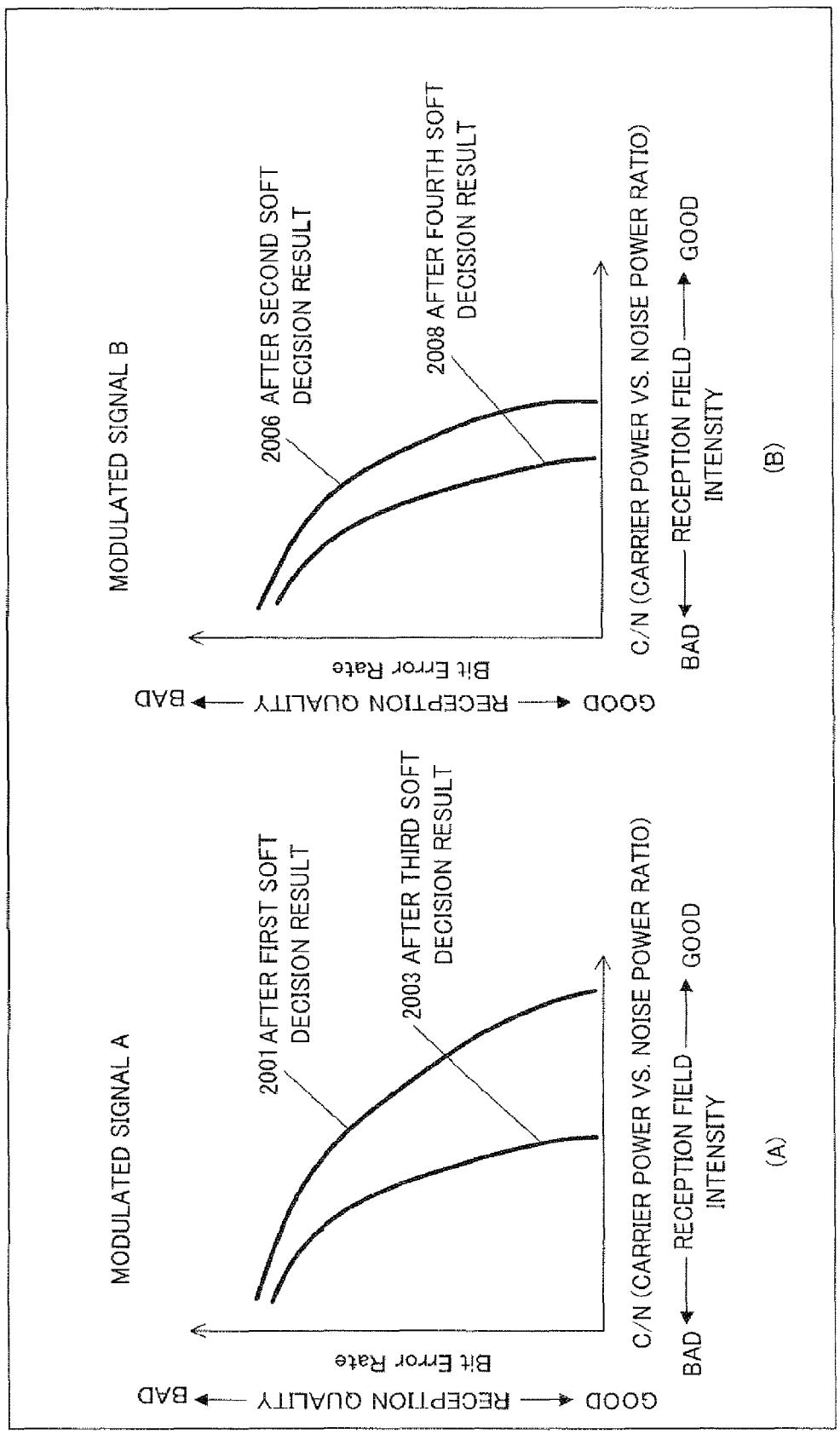
FIG. 20 is a characteristic curve diagram showing a simulation result of the multi-antenna reception apparatus of Embodiment 4; (A) is a characteristic curve diagram of modulated signal A and (B) is a characteristic curve diagram of modulated signal B.

FIG. 20 shows a simulation result of the reception characteristic (relationship between carrier power vs. noise power ratio (C/N) and bit error rate) when using signal processing section 1800 of this embodiment. As is clear from this figure, even when soft decision decoding is performed on the respective modulated signals alternately, it is also possible to obtain received data with a good error rate characteristic similar to that when soft decision decoding is performed on the respective modulated signals in parallel (FIG. 16). Also, the reception quality improves as the count of iterative decoding is increased for both modulated signals A, B, but the point is not to simply increase the number of times and the effect of improvement in the reception quality is saturated when a certain number of times is reached.

In this way, according to this embodiment, processing such as reducing candidate signal points of the subject modulated signal using soft decision decoding results of other modulated signals is performed on the respective modulated signals alternately, and therefore the count of decoding is reduced to half and it is possible to further reduce the circuit scale in addition to the effect of Embodiment 3.

Embodiment 5

This embodiment proposes to transmit modulated signals with different reception quality from respective antennas in addition to above described Embodiments 1 to 4.

Figure 21:
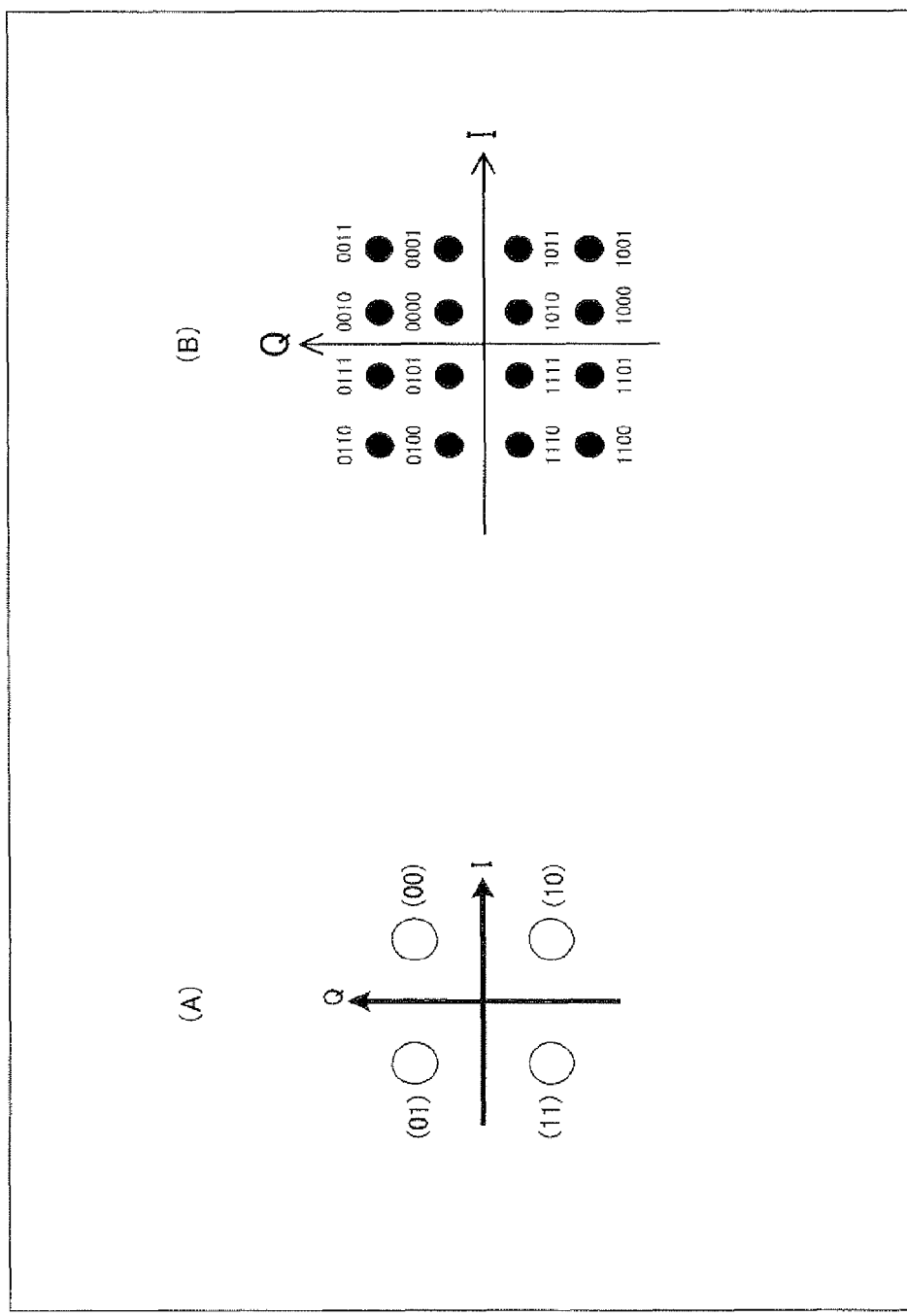
FIG. 21 shows a signal constellation example of each modulated signal in Embodiment 5 ((A) is a signal constellation of modulated signal A, (B) is a signal constellation of modulated signal B)
Figure 22:
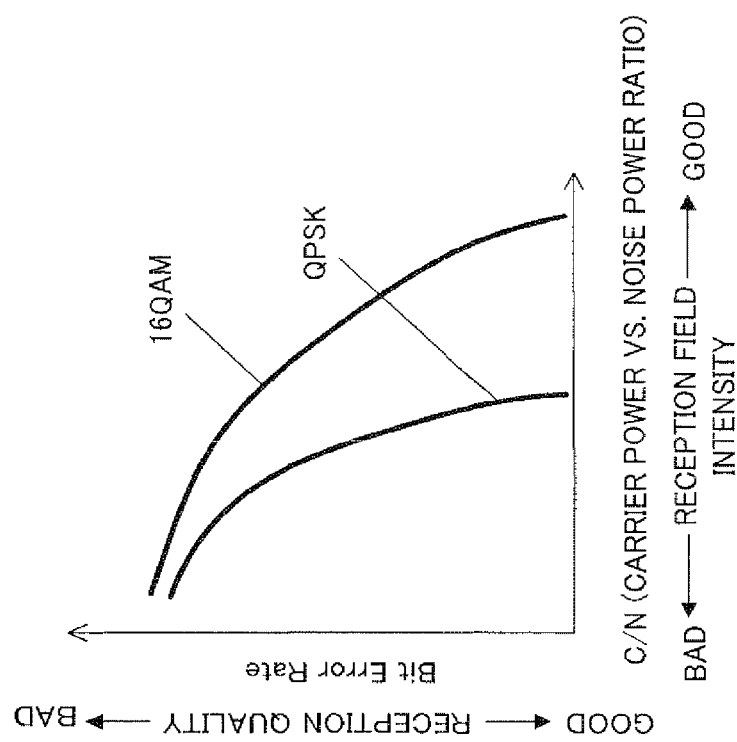
FIG. 22 is a characteristic curve diagram showing reception quality of QPSK and 16QAM.

FIG. 21 shows an example thereof. Considering the configurations of FIG. 12 and FIG. 18, FIG. 21 shows an example of signal constellation on the I-Q plane when the modulation scheme of modulated signal A is assumed to be QPSK and the modulation scheme of modulated signal B is assumed to be 16QAM. FIG. 22 shows a relationship between carrier power vs. noise power ratio and bit error rate of QPSK, 16QAM respectively.

When the configurations of FIG. 12 and FIG. 18 are adopted here, if the modulation scheme of modulated signal A is assumed to be QPSK and the modulation scheme of modulated signal B is assumed to be 16QAM, as shown in FIG. 22, the modulation scheme of modulated signal A is QPSK at the first soft decision, and therefore high reception quality is obtained (compared to 16QAM) and soft decision section 503 obtains decision value 504 (digital signal) of modulated signal A of good reception quality.

Since the decision value of the digital signal of modulated signal A obtained is accurate, the possibility of reducing wrong signal points becomes low when reducing signal points and the error rate characteristic of received data RB of modulated signal B obtained by soft decision section 518 improves when performing soft decision decoding on modulated signal B. Considering the transmission speed here, it is preferable to adopt, for example, 16QAM (or 64QAM) as the modulation scheme of modulated signal B which has a greater modulation multivalue number than QPSK. This can improve both the reception quality and the transmission speed simultaneously.

In this way, by making the modulation multivalue number of modulated signal A smaller than the modulation multivalue number of modulated signal B and securing the reception quality of modulated signal A, it is possible to realize a good signal point reduction, and as a result also secure the reception quality of modulated signal B. This can improve both the reception quality and the transmission speed simultaneously.

In other words, improving the reception quality of modulated signals used for a first provisional decision makes the effect of signal point reduction more accurate, and can thereby bring about good decision results in the subsequent main decision.

In the case the above processing applied to a case where iterative decoding (iteration) is performed, this may result in reduced count of iterations and reduced circuit scale.

Moreover, setting different coding rates for modulated signal A and modulated signal B can also obtain similar effects. For example, suppose the coding rate of modulated signal A is ¼ and the coding rate of modulated signal B is ¾. Then, since the reception quality of modulated signal A is better, the possibility that signal point reduction may be performed correctly increases and the reception quality of modulated signal B also improves.

Moreover, adopting modulated signal A and modulated signal B of different spreading code lengths can also produce a similar effect. For example, the length of spreading code of modulated signal A can be made longer than the length of spreading code of modulated signal B.

In this way, in addition to the configurations of Embodiments 1 to 4, this embodiment causes the modulation scheme, coding rate, spreading factor or the like to differ from one modulated signal to another so that the reception quality varies from one modulated signal to another, and can thereby improve both the error rate characteristic and transmission speed simultaneously in addition to the effect of Embodiments 1 to 4.

Embodiment 6

This embodiment proposes a multi-antenna transmission apparatus that makes an interleaving pattern of a modulated signal to be transmitted from each antenna differ from one modulated signal to another.

Figure 23:
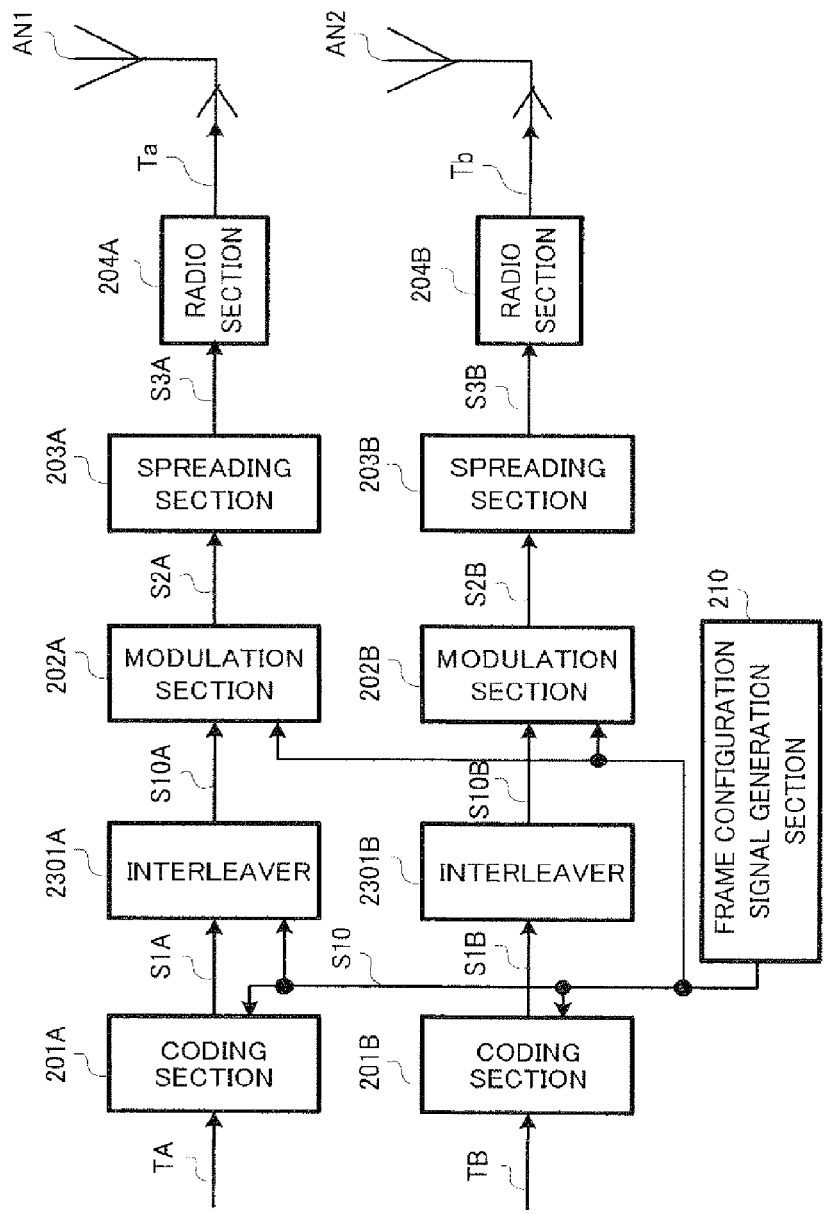
FIG. 23 is a block diagram showing the configuration of a multi-antenna transmission apparatus according to Embodiment 6.

FIG. 23 which shows parts corresponding to those in FIG. 2 assigned the same reference numerals shows the configuration of the multi-antenna transmission apparatus of this embodiment. Multi-antenna transmission apparatus 2300 has a configuration similar to that of multi-antenna transmission apparatus 110 in FIG. 2 explained in Embodiment 1 except in that interleaver 2301A is provided between coding section 201A and modulation section 202A and interleaver 2301E is provided between coding section 201B and modulation section 202B.

Interleaver 2301A receives coded digital signal S1A, changes the sequence and sends interleaved digital signal S10A to modulation section 202A. In the same way, interleaver 2301B receives coded digital signal S1B, changes the sequence and sends interleaved digital signal S10B to modulation section 202B.

Figure 24:
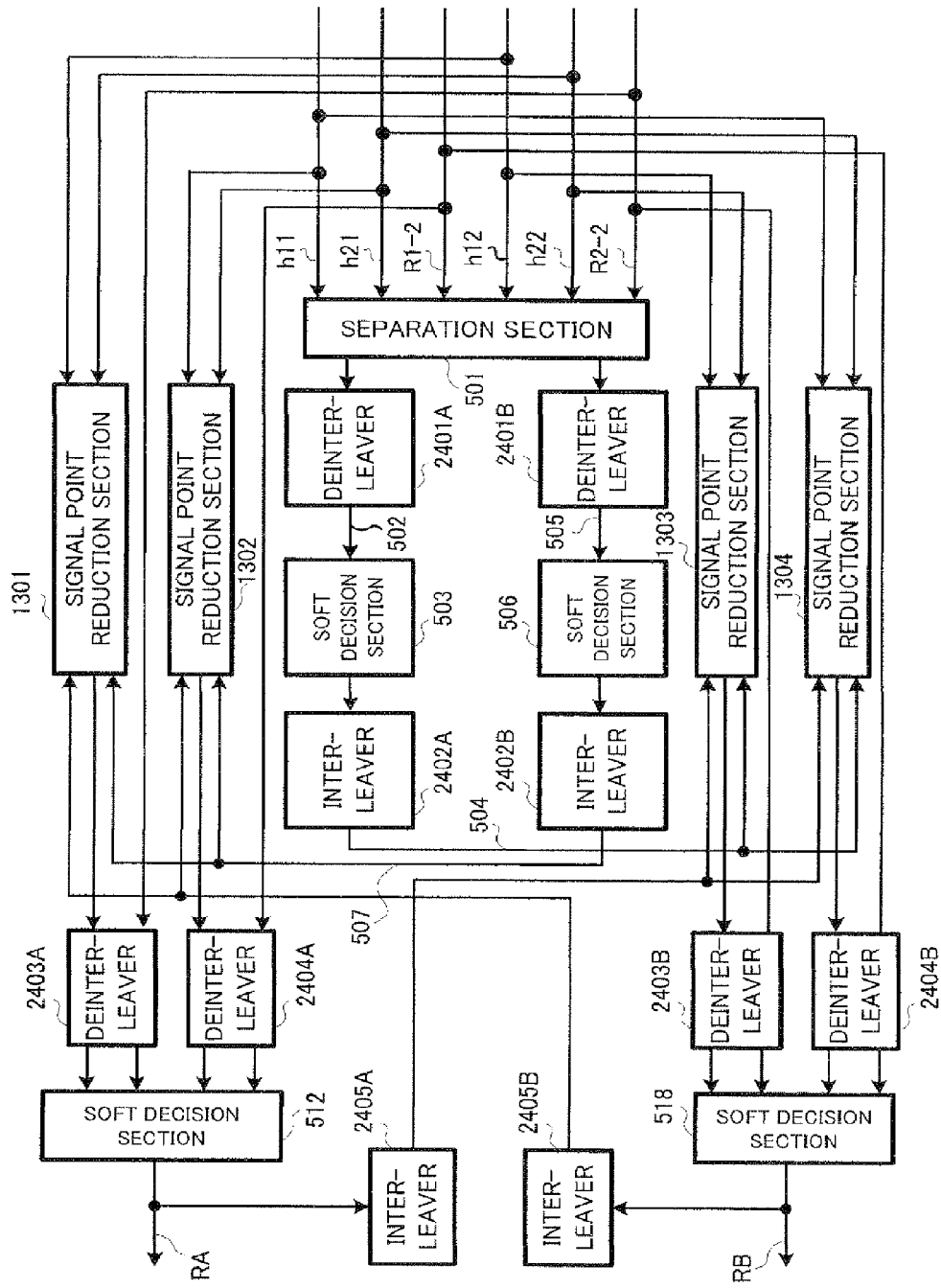
FIG. 24 is a block diagram illustrating processing of a deinterleaver.

When the transmission apparatus side performs interleaving processing in this way, the receiving side needs to perform deinterleaving processing. FIG. 24 shows a configuration example of the reception apparatus in this case. The configuration example in FIG. 24 corresponds to signal processing section 1300 explained in Embodiment 3. In FIG. 24 which shows parts corresponding to those in FIG. 13 assigned the same reference numerals, signal processing section 2400 includes deinterleavers 2401A, 2403A, 2404A that return a signal which has been rearranged by interleaver 2301A on the transmitting side to the original state and also deinterleavers 2401B, 2403B, 2404B that return a signal which has been rearranged by interleaver 2301B on the transmitting side to the original state. Furthermore, signal processing section 2400 includes interleavers 2402A, 2405A that perform a rearrangement similar to that of interleaver 2301A and also interleavers 2402B, 2405B that perform a rearrangement similar to that of interleaver 2301B.

In this configuration, signal processing section 2400 returns an estimated baseband signal about transmission digital signal TA separated by separation section 501 to the original arrangement by deinterleaver 2401A, then sends it to soft decision section 503, and returns an estimated baseband signal about transmission digital signal TB to the original arrangement by deinterleaver 2401B, and then sends it to soft decision section 506. Furthermore, the decision value obtained by soft decision section 503 is sent to signal point reduction sections 1303, 1304 after being interleaved by interleaver 2402A and the decision value obtained by soft decision section 506 is sent to signal point reduction sections 1301, 1302 after being interleaved by interleaver 2402B. Moreover, the decision value obtained by soft decision section 512 is input to signal point reduction sections 1303, 1304 after being interleaved by interleaver 2405A and the decision value obtained by soft decision section 518 is input to signal point reduction sections 1301, 1302 after being interleaved by interleaver 2405B.

In this way, signal point reduction sections 1301, 1302 reduce signal points of interleaved modulated signal B from the interleaved received signal, and can thereby obtain reduced candidate signal points about modulated signal A. However, since these reduced candidate signal points are the interleaved signal points, they are input to soft decision section 512 after being deinterleaved by deinterleavers 2403A, 2404A. In the same way, signal point reduction sections 1303, 1304 reduce signal points of interleaved modulated signal A from an interleaved received signal, and can thereby obtain reduced candidate signal points about modulated signal B. However, since these reduced candidate signal points are the interleaved signal points, they are input to soft decision section 512 after being deinterleaved by deinterleavers 2403B, 2404B.

Here, the configuration example of decoding a signal interleaved on the transmitting side based on signal processing section 1300 explained in Embodiment 3 has been explained. However, if the reception apparatus explained in Embodiment 1 and Embodiment 2, Embodiment 4 and Embodiment 5 is provided with a deinterleaver and interleaver corresponding to the interleaver on the transmitting side as appropriate, each modulated signal can be decoded when signals in different interleaving patterns are transmitted from the respective antennas as described above.

Next, an interleaving pattern (switching sequence of transmission signal) will be explained in detail. The most important point in this embodiment is that an interleaving pattern for modulated signal A is made different from an interleaving pattern for modulated signal B. This allows the error rate characteristic on the receiving side to be improved. Especially, by selecting interleaving patterns in such a way that an interleaving pattern of modulated signal A and an interleaving pattern for modulated signal B have substantially no correlation, the reception quality can be improved considerably. This point will be explained in detail.

Figure 25:
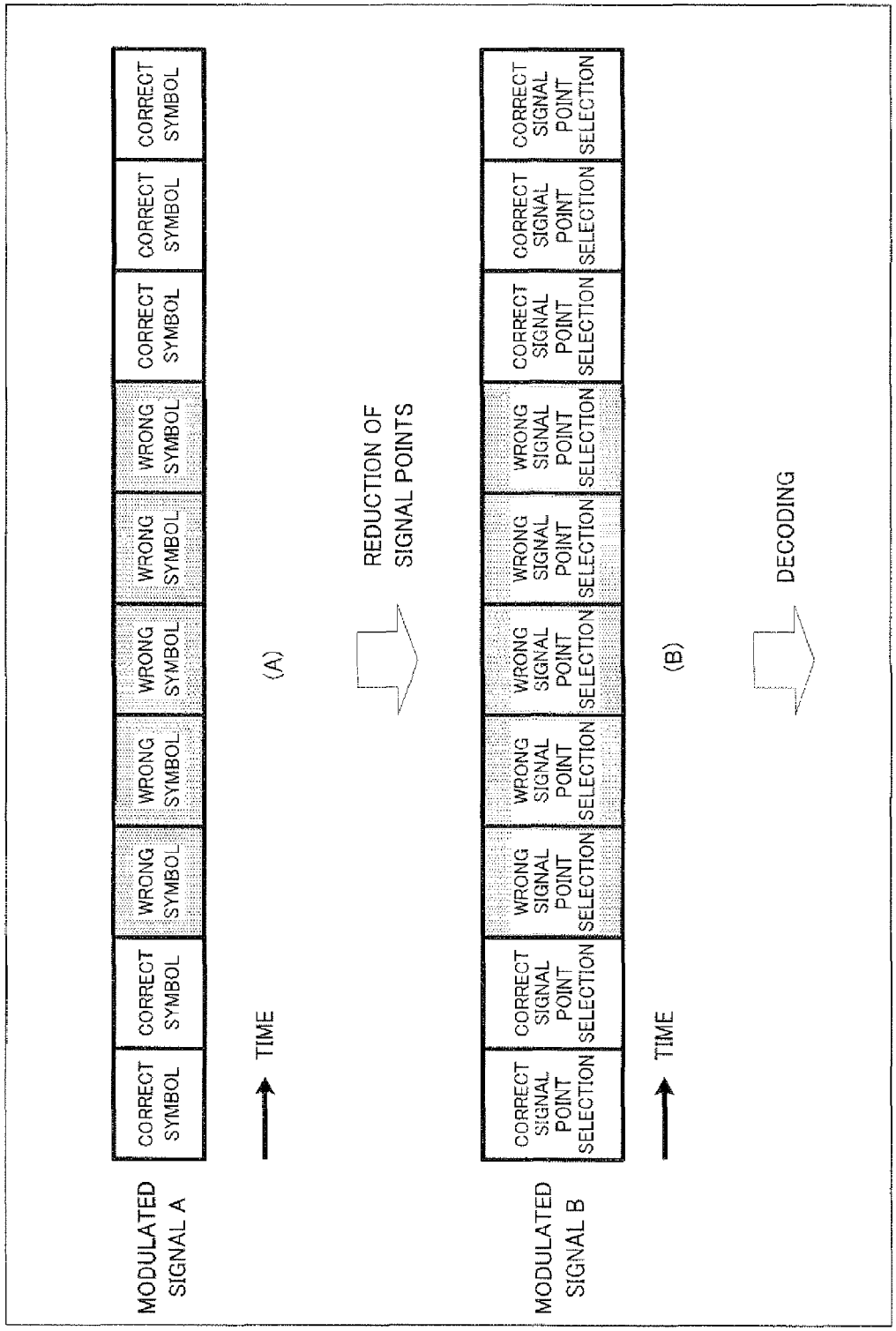
FIG. 25 shows an example of symbol states when interleaving patterns of modulated signal A and modulated signal B are identical; (A) shows the state of a modulated signal after a first decision, (B) shows the state after a reduction of the number of signal points.

FIG. 25 shows an example of symbol states when the interleaving patterns of modulated signal A and modulated signal B are identical. Suppose soft decision section 503 in FIG. 5 decodes modulated signal A, and as a result, 5 consecutive symbols have been decided as errors as shown in FIG. 25(A). In this regard, errors generally occur consecutively when convolutional codes or the like are used. As a result, when the number of signal points is reduced by signal point number reduction sections 514, 516, errors occur in 5 consecutive symbols due to signal point selection through signal point reduction as shown in FIG. 25(B). As a result, the reception quality is not improved effectively when soft decision section 518 decodes modulated signal B. This is because an error correcting code has low performance of correcting consecutive errors.

Figure 26:
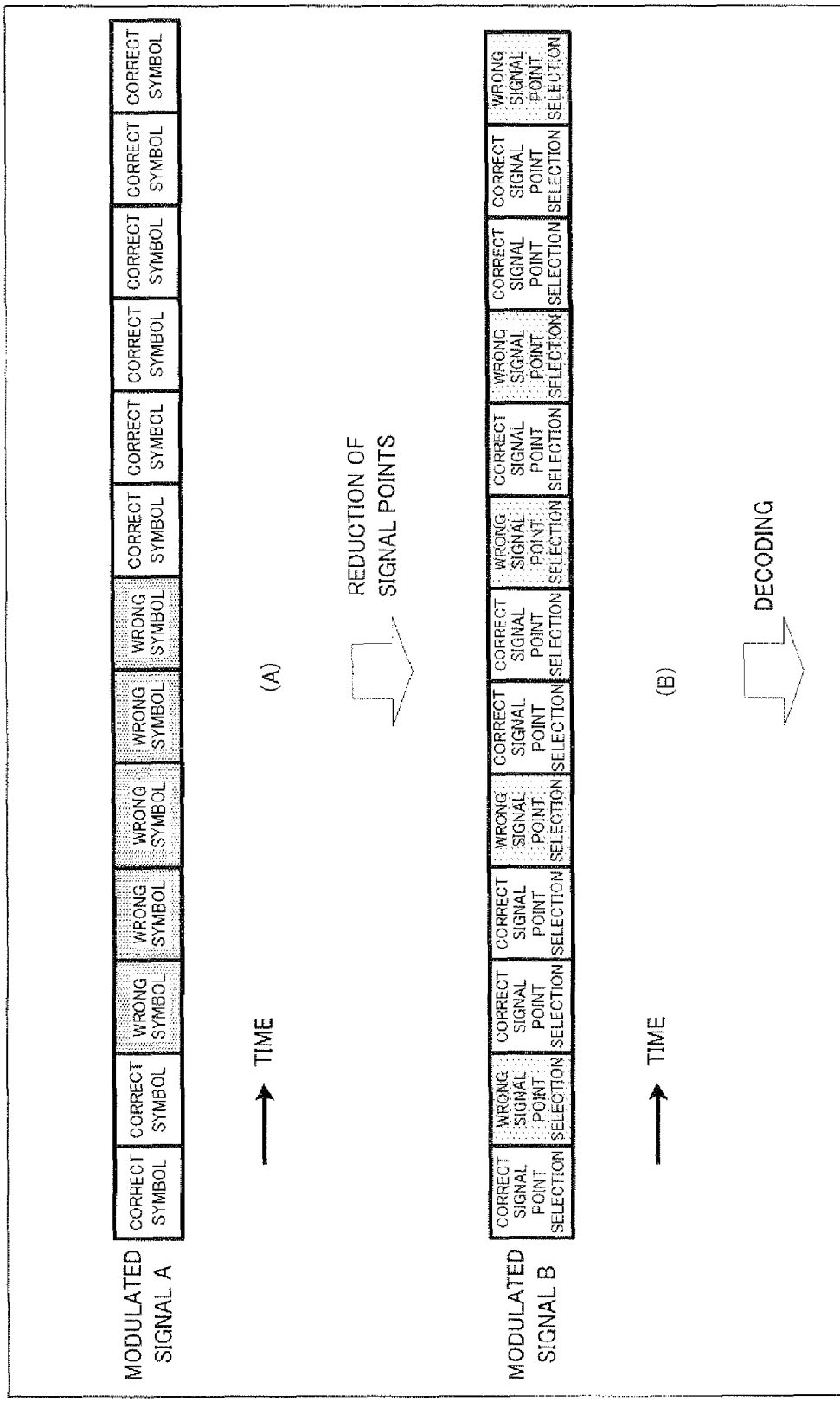
FIG. 26 shows an example of symbol states when an interleaving pattern for modulated signal A is made to differ from an interleaving pattern for modulated signal B by applying the method of Embodiment 6; (A) shows the state of the modulated signal after a first decision and (B) shows the state after the number of signal points is reduced.

Next, as in the case of this embodiment, a case where an interleaving pattern for modulated signal A is made to differ from an interleaving pattern for modulated signal B on the transmitting side will be explained. In this case, when signal points are reduced, the states of symbols are as shown in FIG. 26. Suppose soft decision section 503 in FIG. 24 decodes modulated signal A, and as a result, 5 consecutive symbols have been decided as errors as shown in FIG. 26(A). Then, when signal point number reduction sections 1303, 1304 reduce the number of signal points, the interleaving pattern of modulated signal A differs from the interleaving pattern of modulated signal B unlike FIG. 25(B), and therefore as shown in FIG. 26(B), signal point selecting errors due to a signal point reduction occur discretely. That is, errors due to signal point selection through signal point reduction do not occur consecutively as shown in FIG. 25(B). In this way, when soft decision section 518 decodes modulated signal B, the reception quality improves effectively. This is because an error correcting code has high performance of correcting discrete errors.

This operation and the effect are the same in the case of a configuration using an iteration technology.

A similar operation effect will be obtained even when operation is performed by replacing modulated signal A with modulated signal B and replacing modulated signal B with modulated signal A and the reception quality of the decoding of modulated signal A also improves effectively.

In this way, according to this embodiment, the interleaving pattern of a modulated signal to be transmitted from each antenna is made to differ from one modulated signal to another, and therefore it is possible to reduce the influence of burst errors when decoding is performed on the receiving side and realize a multi-antenna transmission apparatus which can obtain received data with a good error rate characteristic.

Especially, this is suitable for use in a multi-antenna transmission apparatus which transmits a modulated signal to a multi-antenna reception apparatus which has signal point reduction sections like Embodiments 1 to 4.

Figure 27:
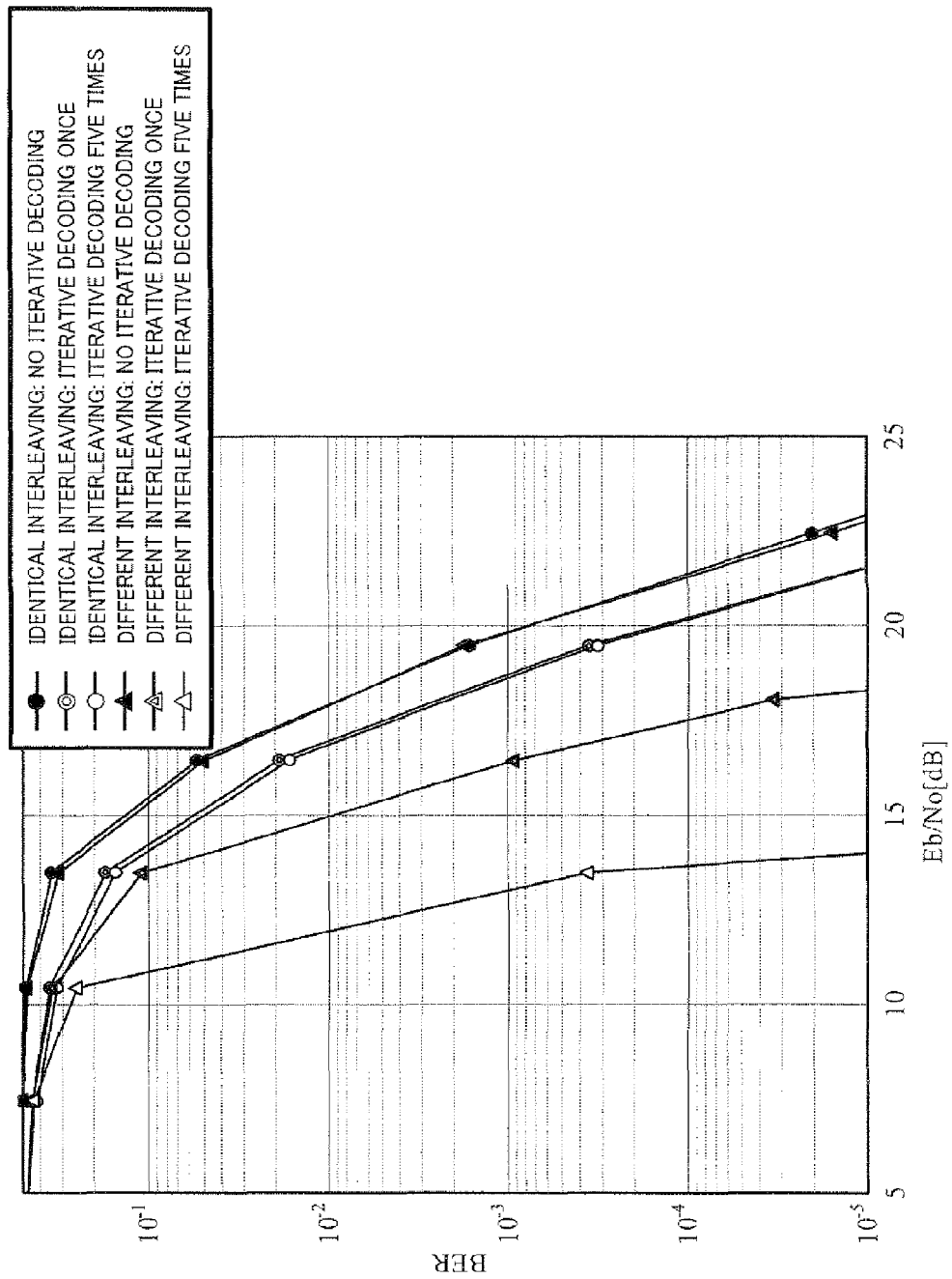
FIG. 27 shows a reception characteristic when interleaving patterns are made to differ among modulated signals and when interleaving patterns are identical.

FIG. 27 shows simulation results of the reception characteristic when using different interleaving patterns among modulated signals like this embodiment and the reception characteristic when using an identical interleaving pattern between modulated signals. In FIG. 27, the horizontal axis shows Eb/No (energy per bit-to-noise spectral density ratio) and the vertical axis shows BER (Bit Error Rate).

Circle marks in the figure denote the characteristic when the configuration of this embodiment is used, that is, when a signal transmitted from multi-antenna transmission apparatus 2300 in the configuration as shown in FIG. 23 is received and demodulated by the multi-antenna reception apparatus having signal processing section 2400 in the configuration as shown in FIG. 24. On the other hand, triangle marks in the figure denote the reception characteristic when an identical interleaving pattern is used among modulated signals. The simulation examined the characteristic when iterative decoding is not performed, when iteration is performed once and when iteration is performed five times. Furthermore, this simulation is the result of a case where convolutional coding is performed at a coding rate ½ assuming that the propagation environment is a Rician fading environment having a Rician factor of 10 dB and the modulation scheme is QPSK.

As is clear in this simulation result, when the identical interleaving pattern is used among modulated signals, improvement of the reception quality is only a little even when the count of iterative decoding is increased as shown with the circle marks in the figure. On the other hand, when interleaving patterns which are different among modulated signals are selected, it is possible to effectively improve the reception quality by increasing the iteration count as shown with the triangle marks in the figure.

This embodiment has described the case where when interleaving patterns of modulated signals transmitted from their respective antennas are made to differ from one modulated signal to another, interleavers 2301A, 2301B are provided so as to make a symbol sequence of each modulated signal differ from one modulated signal to another, but the method of making interleaving patterns differ from one modulated signal to another is not limited to this.

Examples of a method of making interleaving differ from one modulated signal to another include the following methods.

Figure 28:
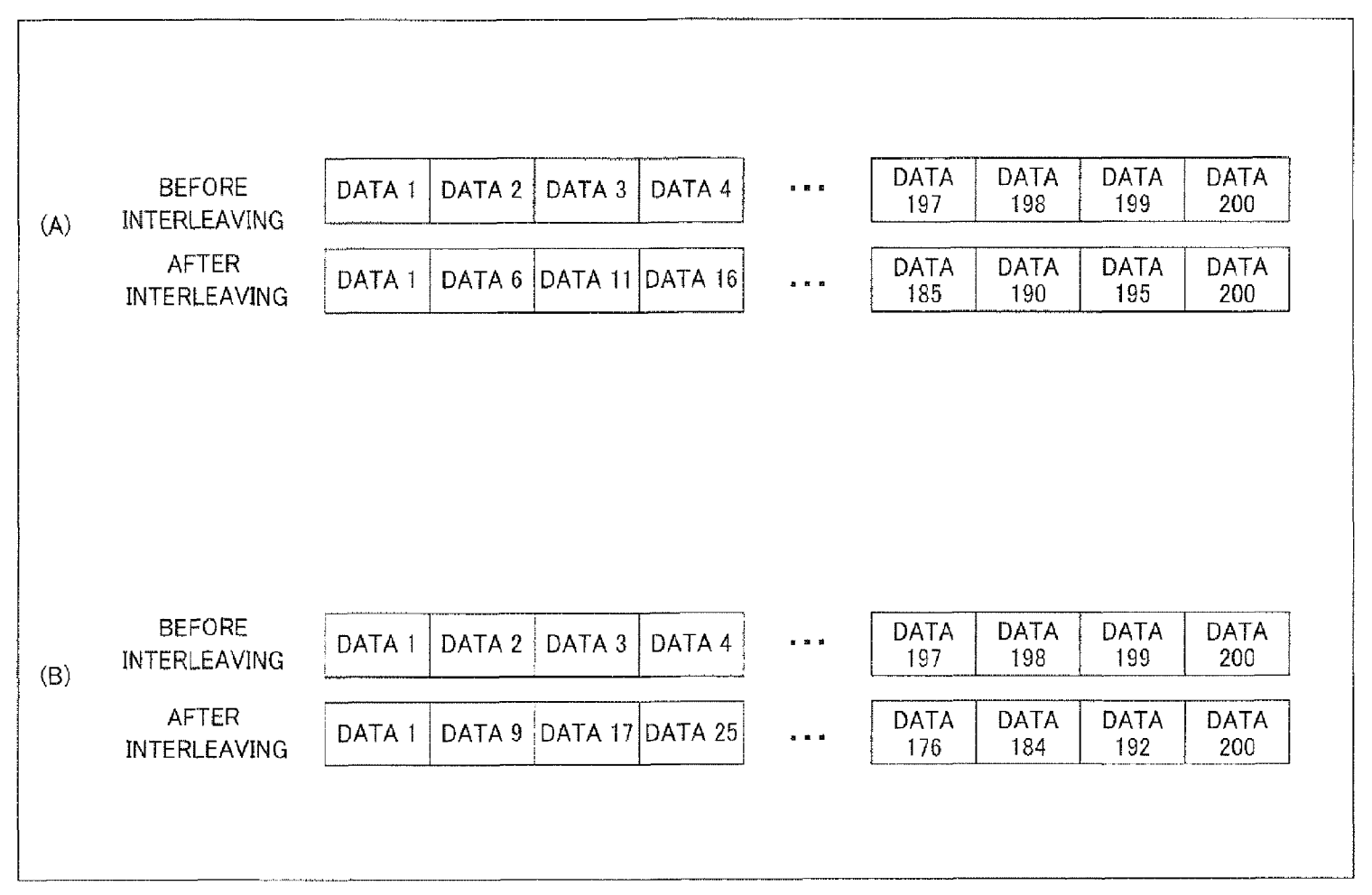

(i) Method of Changing Sequence of Data Making Up Symbols of Each Modulated Signal Itself as in the Case of this Embodiment Specific examples of this method will be shown in FIG. 28. As for modulated signal A, a data sequence of data 1, data 2, . . . , data 200 is rearranged, for example, for every fifth data through interleaving the data into a sequence of data 1, data 6, . . . data 196, data 2, data 7, . . . data 197, data 3, data 8, . . . data 198, data 4, data 9, . . . data 199, data 5, data 10, . . . data 200. On the other hand, as for modulated signal B, a data sequence of data 1, data 2, . . . , data 200 before interleaving is rearranged, for example, for every eighth data through interleaving the data into a sequence of data 1, data 9, data 193, data 2, data 10, . . . data 194, data 3, data 11, . . . data 195, data 4, data 12, . . . data 196, data 5, data 13, . . . data 197, data 6, data 14, . . . data 198, data 7, data 15, . . . data 199, data 8, data 16 . . . . Standing next to data 200. That is, the data sequence per se is made to change between modulated signal A and modulated signal B.

(ii) Method Whereby Symbol and Data Sequences are Identical Among Modulated Signals, but when Arranging Symbol and Data in Subcarrier Frequency Direction and Time Direction, Arrangement Per Se is Made to Differ As Will be Described Later Using FIG. 31

Figure 29:
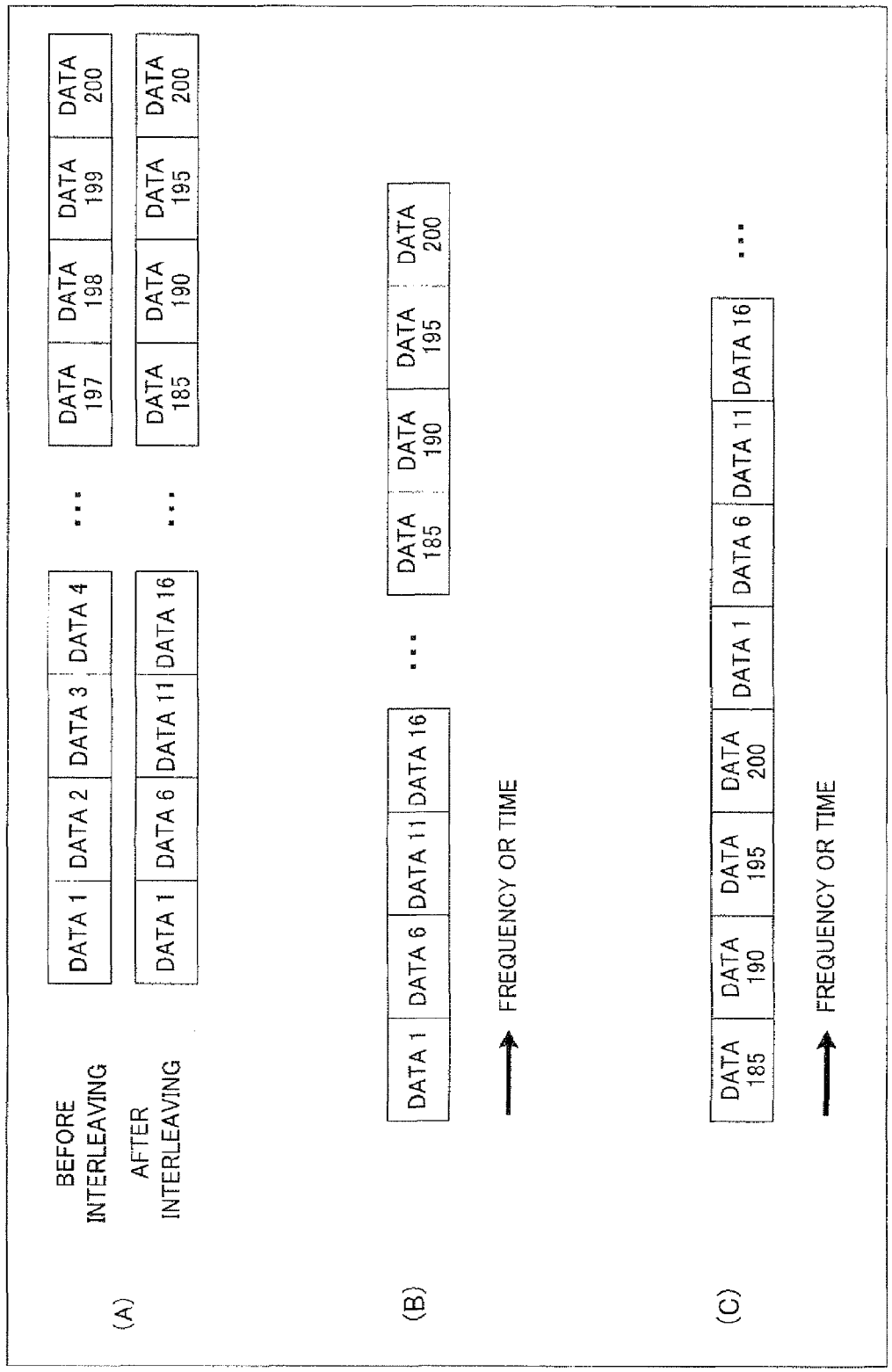
FIG. 29 shows an example of interleaving patterns of Embodiment 6; (A) shows an arrangement of symbols before and after interleaving, (B) shows an arrangement of symbols of modulated signal A and (C) shows an arrangement of symbols of modulated signal B.

A specific example of this method will be shown in FIG. 29. As shown in FIG. 29(A), a data sequence of data 1, data 2, . . . , data 200 before interleaving is rearranged for every fifth data through interleaving the data into data 1, data 6, . . . data 196, data 2, data 7, . . . data 197, data 3, data 8, . . . data 198, data 4, data 9, . . . data 199, data 5, data 10, . . . data 200. This is performed on each of modulated signals A, B. That is, the interleaving pattern is identical among the modulated signals at this point. Then, as shown in FIGS. 29(B), (C), the patterns of arrangement of modulated signals A, B on subcarriers are made to differ from each other. FIGS. 29(B), (C) show a case where the number of subcarriers of an OFDM signal is 200 and with respect to the frequency axis or the time axis, a data sequence for modulated signal A is data 1, data 6, . . . data 196, data 2, data 7, . . . data 197, data 3, data 8, . . . data 198, data 4, data 9, . . . data 199, data 5, data 10, . . . data 200. In contrast, for modulated signal B, an offset corresponding to 5 carriers is provided with respect to the arrangement of modulated signal A to obtain a data sequence of data 185, data 190, data 195, data 200, data 1, data 6, . . . data 175, data 180. In this way, it is also possible to make interleaving different among modulated signals by providing for one modulated signal an offset corresponding to some carriers or a certain time with respect to another modulated signal.

(iii) Method Using Both Methods (i) and (ii) Together

That is, the different interleaving patterns described in the present invention not only refer to the case where a sequence of symbols and data per se is made to differ but also include the case where a sequence of symbols and data in the frequency direction or sequence in the time direction per se is made to differ. The same will also apply to any one of the following embodiments which explain interleaving patterns.

Embodiment 7

This embodiment will describe a case where the feature of the above described embodiment is applied to a multicarrier communication. Especially, the embodiment will describe a case where an OFDM (Orthogonal Frequency Division Multiplexing) scheme is used.

Figure 30:
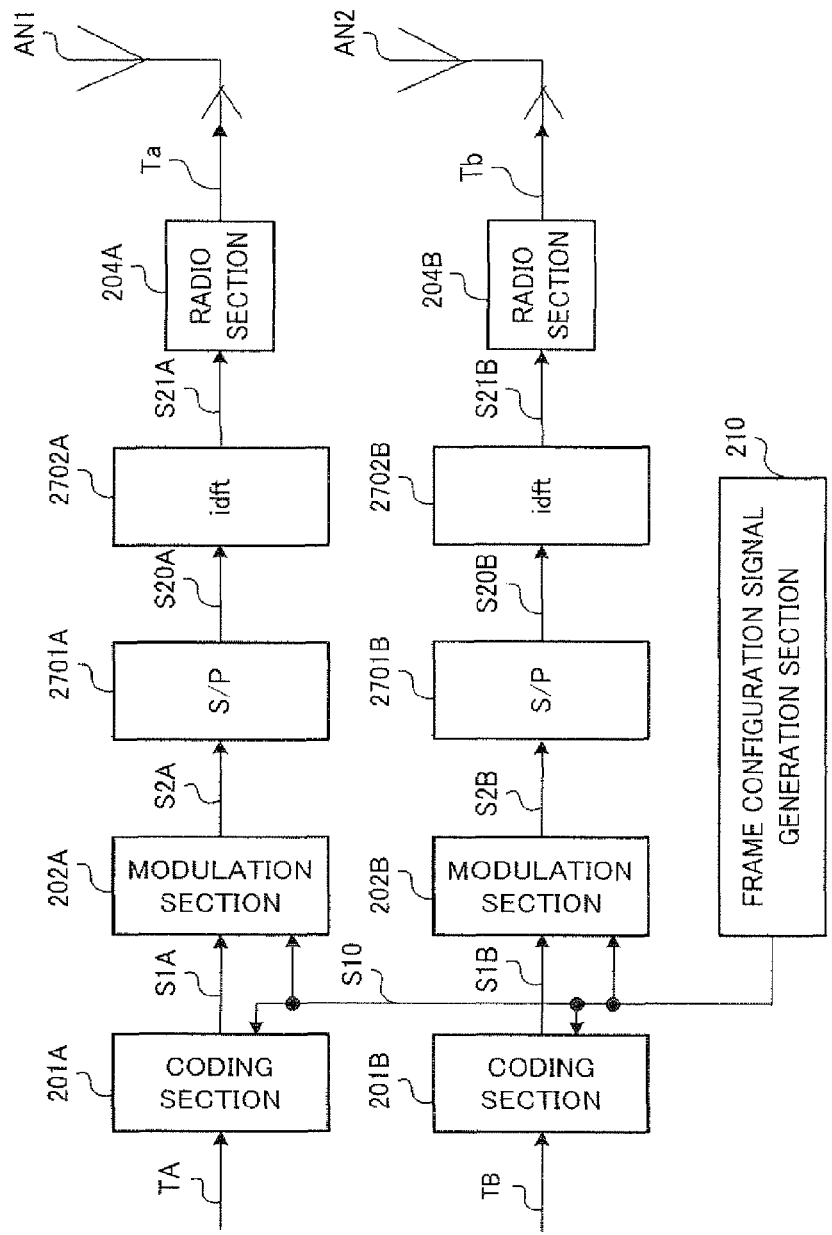
FIG. 30 is a block diagram showing the configuration of a multi-antenna transmission apparatus of Embodiment 7.

FIG. 30 which shows parts corresponding to those in FIG. 2 assigned the same reference numerals shows the configuration of the multi-antenna transmission apparatus of this embodiment. Compared to multi-antenna transmission apparatus 110 in FIG. 2, multi-antenna transmission apparatus 2700 has the same configuration as that of multi-antenna transmission apparatus 110 in FIG. 2 except in that it includes serial/parallel conversion sections (S/P) 2701A, 2701B that convert baseband signals S2A, S2B output from modulation sections 202A, 202B from serial to parallel instead of spreading sections 203A, 203B and inverse Fourier transform sections (idft) 2702A, 2702B that apply an inverse Fourier transform to parallel signals S20A, S20B.

Figure 31:
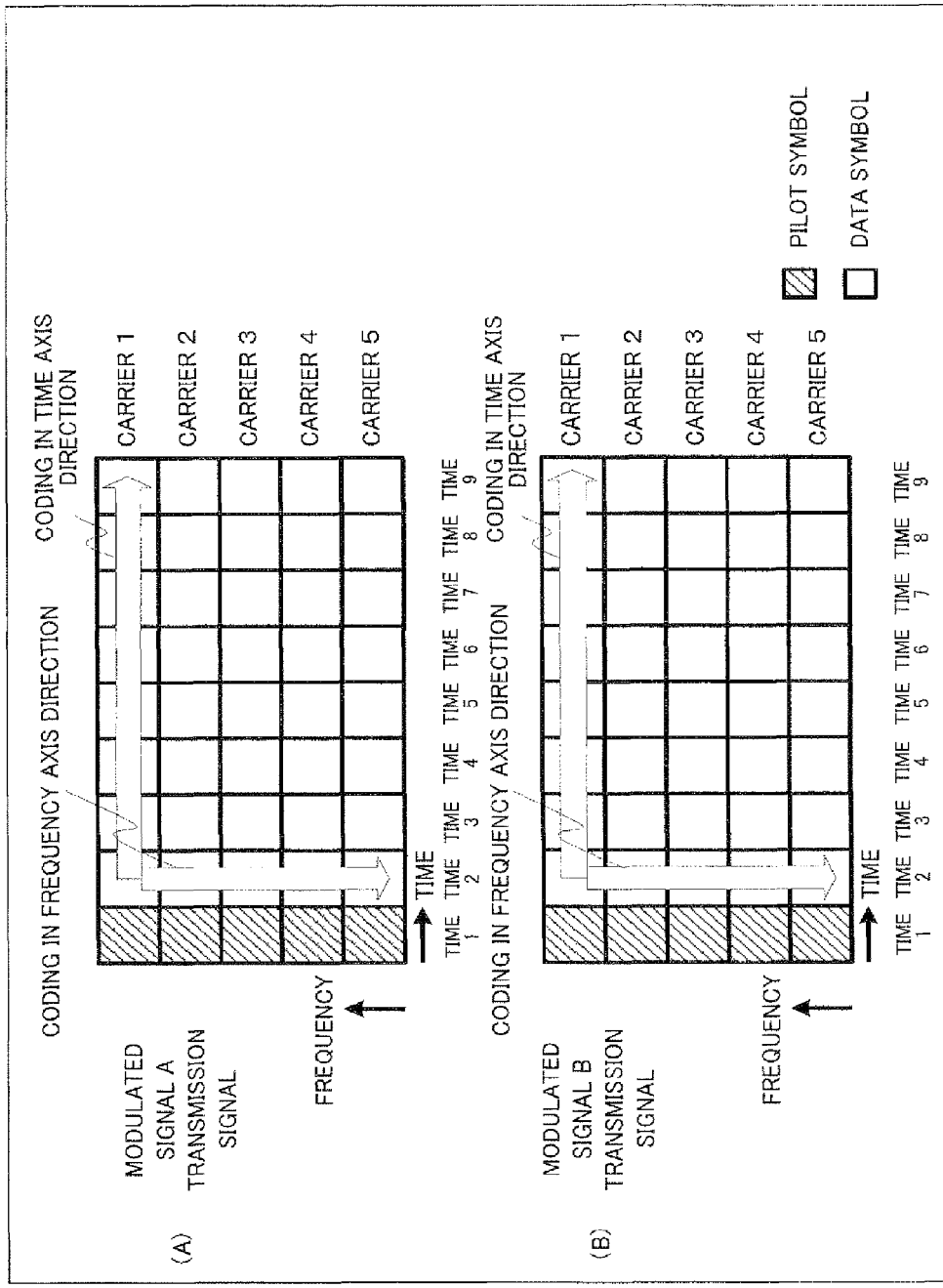
FIG. 31 shows a frame configuration example of each modulated signal of Embodiment 7; (A) shows a frame configuration of modulated signal A and (B) shows a frame configuration of modulated signal B.

FIG. 31 shows a frame configuration on the time-frequency axis of an OFDM signal sent from multi-antenna transmission apparatus 2700. This figure shows a case where an OFDM signal is composed of carrier 1 to carrier 5 and symbols are sent simultaneously at an identical time as an example. The parts shown with hatching in the figure are pilot symbols (known signals) and are symbols for the reception apparatus to estimate a propagation environment (channel fluctuation). They are called "pilot symbols" here but they may also be called differently such as "preambles." On the other hand, blank fields show data symbols.

There are two kinds of coding methods for data symbols; method of coding in the frequency axis direction and method of coding in the time axis direction. When symbols are coded in the time axis direction, this is equivalent to the case where there are a plurality of carriers in the frame configuration of FIG. 3 (5 carriers in FIG. 31). One feature when using an OFDM scheme is that coding is possible in the frequency axis direction. Furthermore, coding is also possible in both the frequency axis and time axis directions.

Figure 32:
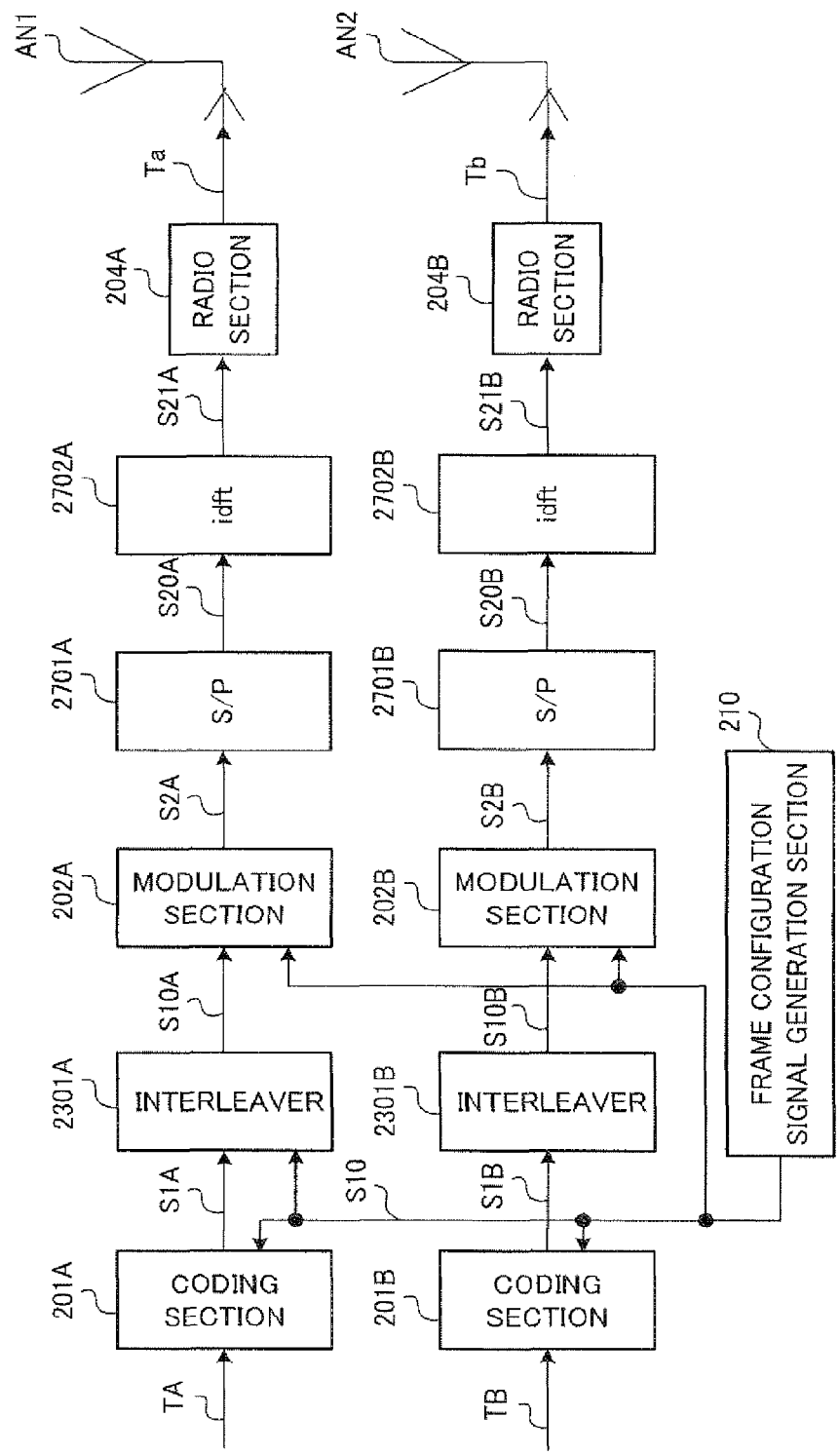
FIG. 32 is a block diagram showing another configuration of the multi-antenna transmission apparatus of Embodiment 7.

FIG. 32 shows another configuration of the multi-antenna transmission apparatus of this embodiment. This configuration corresponds to the multi-antenna transmission method using different interleaving patterns in Embodiment 6 applied to a multicarrier transmission. In FIG. 32 which shows parts corresponding to those in FIG. 23 explained in Embodiment 6 assigned the same reference numerals, multi-antenna transmission apparatus 2900 has the same configuration as that of multi-antenna transmission apparatus 2300 in FIG. 23 except in that it is provided with serial/parallel conversion sections (SIP) 2701A, 2701B which convert baseband signals S2A, S2B output from modulation sections 202A, 202B from serial to parallel and inverse Fourier transform sections (idft)

2702A, 2702B which apply an inverse Fourier transform to parallel signals S20A, S20B instead of spreading sections 203A, 203B.

As the method of selecting an interleaving pattern when the feature of Embodiment 6 is applied to an OFDM transmission, this embodiment proposes such a method that data in the interleaving pattern of interleaver 2301A is rearranged from low frequency subcarriers to high frequency subcarriers and data in the interleaving pattern of interleaver 2301E is rearranged from high frequency subcarriers to low frequency subcarriers.

For example, when 1 frame is composed as shown in FIG. 31, interleaver 2301A arranges data about modulated signal A in a sequence of subcarrier 5, subcarrier 3, subcarrier 1, subcarrier 4, subcarrier 2 and interleaver 2301B arranges data about modulated signal B in a sequence of subcarrier 1, subcarrier 3, subcarrier 5, subcarrier 2, subcarrier 4. By so doing, it is possible to bring the interleaving pattern in the frequency direction close to one with no correlation, and therefore the probability that both of two OFDM modulated signals may result in burst errors can be decreased.

Similarly, as the method of selecting an interleaving pattern when the feature of Embodiment 6 is applied to an OFDM transmission, this embodiment proposes such a method that data in the interleaving pattern of interleaver 2301A is arranged from earlier times to later times and data in the interleaving pattern of interleaver 2301B is arranged from later times to earlier times.

When, for example, 1 frame is composed as shown in FIG. 31, interleaver 2301A arranges data about modulated signal A on subcarrier 1 in a sequence of time 2, time 4, time 6, time 8, time 3, time 5, time 7, time 9 and interleaver 2301B arranges data about modulated signal B in a sequence of time 9, time 7, time 5, time 3, time 8, time 6, time 4, time 2. By so doing, it is possible to bring the interleaving pattern in the time direction close to one with no correlation, and therefore the probability that both of two OFDM modulated signals may result in burst errors can be decreased.

Moreover, each modulated signal may be interleaved randomly in both the frequency direction and the time direction. By so doing, it is possible to bring the interleaving pattern in the frequency direction close to one with no correlation, and therefore the probability that both of two OFDM modulated signals may result in burst errors can be decreased.

FIG. 33 which shows parts corresponding to those in FIG. 4 assigned the same reference numerals shows the configuration of the multi-antenna reception apparatus of this embodiment. Multi-antenna reception apparatus 3000 has the same configuration as that of multi-antenna reception apparatus 120 in the FIG. 4 explained in Embodiment 1 except in that it includes Fourier transform sections (dft) 3001-1, 3001-2 instead of despreading sections 402-1, 402-2. Furthermore, any one of the configurations proposed in Embodiments 1 to 6 can be applied to signal processing section 3002.

Fourier transform section 3001-1 applies Fourier transform processing to baseband signal R1-1 and sends signal R1-2 after the Fourier transform to channel fluctuation estimation section 403-1A of modulated signal A, channel fluctuation estimation section 403-1B of modulated signal B and signal processing section 3002.

In the same way, Fourier transform section 3001-2 applies Fourier transform processing to baseband signal R2-1, sends signal R2-2 after the Fourier transform to channel fluctuation estimation section 403-2A of modulated signal A, channel fluctuation estimation section 403-2B of modulated signal B and signal processing section 3002.

Each of channel fluctuation estimation sections 403-1A, 403-1B, 403-2A, 403-2B estimates a channel fluctuation about each subcarrier using pilot symbols arranged on each subcarrier as shown in FIG. 31. In this way, channel fluctuation estimation sections 403-1A, 403-1B, 403-2A, 403-2B obtain channel fluctuation estimated values for each channel and for each subcarrier. That is, channel fluctuation estimated values h11, h21, h12, h22 include channel fluctuation estimated values of each of subcarriers 1 to subcarrier 5.

Here, signal processing section 3002 receives signals R1-2, R2-2 after the Fourier transform, channel fluctuation signal groups h11, h12 of modulated signal A and channel fluctuation signal groups h21, h22 of modulated signal. B, decides signals R1-2, R2-2 after the Fourier transform using channel fluctuation signal groups h11, h12, h21, h22 and thereby obtains received data RA of modulated signal A and received data RB of modulated signal B.

The flow of the signal processing at signal processing section 3002 is same as that in above described Embodiments 1 to 6. For example, a case where signal processing section 2400 explained in Embodiment 6 is used as signal processing section 3002 will be explained as an example. Separation section 501 receives channel fluctuation estimation groups h11, h12 of modulated signal A, channel fluctuation estimation groups h21, h22 of modulated signal B, signals R1-2, R2-2 after the Fourier transform, applies inverse matrix calculations and thereby separates modulated signal A from modulated signal B. Then, deinterleavers 2401A, 2401B, 2403A, 2404A, 2403B, 2404B apply deinterleaving processing corresponding to interleaving patterns on the frequency-time axis and interleavers 2402A, 2402B, 2405A, 2405B apply interleaving processing corresponding to interleaving patterns on the frequency-time axis.

Embodiment 8

This Embodiment proposes to reflect reliability in a provisional decision performed to reduce signal points in main decision processing after signal point reduction. This can further improve a data error rate characteristic obtained through the main decision processing. As a preferred example, this embodiment proposes a method of weighting a branch metric of each symbol at main decision processing using the path metric value of each symbol when a soft decision is performed as a provisional decision.

This embodiment will explain signal processing section 2400 in the configuration in FIG. 24 explained in Embodiment 6 as an example. That is, a case where modulated signal A and modulated signal B interleaved in different interleaving patterns are received, separated and decoded will be explained as an example.

Figure 34:
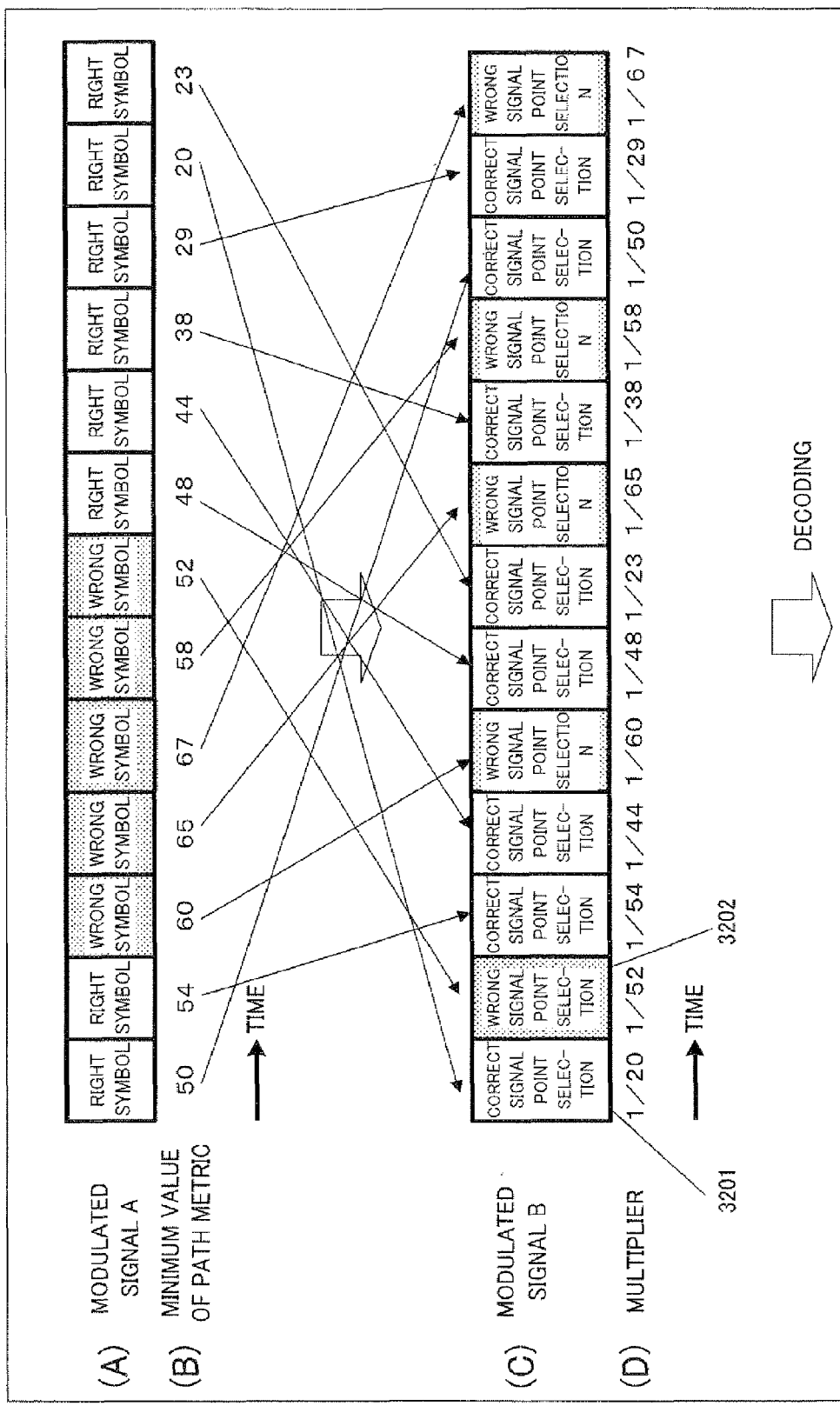
FIG. 34 illustrates the principle of Embodiment 8.

As explained in FIG. 26, suppose the decision values of the respective symbols output from soft decision section 503 are as shown in FIG. 34(A). Then, the state after signal point reductions at signal point reduction sections 1303, 1304 is as shown in FIG. 34(C). As shown in FIG. 34(C) here, it is because the interleaving pattern of modulated signal A and the interleaving pattern of modulated signal B are different as explained in Embodiment 6 that, for modulated signal B, symbols for which wrong candidate signal points are selected can be made discrete.

This embodiment reflects the path metric obtained by soft decision section 503 in the soft decision processing in soft decision section 518. It also reflects the path metric obtained by soft decision section 506 in the soft decision processing in the soft decision processing by soft decision section 512. Actually, the path metric can be notified to soft decision section 518 from soft decision section 503 in FIG. 24 and the path metric can be notified to soft decision section 512 from soft decision section 506.

More specifically, suppose that soft decision section 503 acquires a value as shown in FIG. 34(B) as a minimum value of the path metric in path memory length n to each symbol about modulated signal A. When deciding each symbol of modulated signal B using the candidate signal point about reduced modulated signal B, soft decision section 518 makes a decision using the minimum value of the path metric of symbols of modulated signal A used when reducing signal points.

Here, there is a correlation between the minimum value of the path metric of each symbol about modulated signal A and an error of the symbol. More specifically, the bigger the minimum value of the path metric is, the more the symbol is likely to result in an error.

This embodiment uses the minimum value of a path metric of symbols of other modulated signals used when reducing signal points in making a main decision based on a consideration that as the minimum value of the path metric at the time of a soft decision of the other modulated signals (e.g., modulated signal A) used for a signal point reduction increases, the reliability of the reduced signal points decreases and when a main decision is made on the subject modulated signal (e.g., modulated signal B) using the signal points, the reliability of the decision also decreases.

Actually, when determining a path metric after determining the branch metric of modulated signal B, soft decision section 518 multiplies the branch metric of each symbol by the reciprocal of the minimum value of the path metric of the corresponding symbol (that is, the symbol of modulated signal A used for a reduction of candidate signal points of the symbol) as shown in FIG. 34(D). For example, soft decision section 518 multiplies the branch metric of symbol 3201 of modulated signal B by $1/20$ and multiplies the branch metric of symbol 3202 by $1/52$.

In this way, when making a main decision using the reduced signal points, this embodiment multiplies the branch metric by the value corresponding to reliability of signal point reduction, and can thereby improve reliability of the path metric. As a result, it is possible to improve the error rate characteristic of data obtained through the main decision.

In this way, according to this embodiment, reliability in a provisional decision (soft decision on other modulated signals) performed to reduce signal points is reflected in a main decision (soft decision on the subject modulated signal) after the signal point reduction, and therefore it is possible to further improve the error rate characteristic of data obtained through the main decision processing.

This embodiment has described the case where reliability at the time of a provisional decision is reflected in a main decision by multiplying the branch metric at the time of the main decision by the reciprocal of the minimum value of the path metric at the time of the provisional decision, but the method of reflecting the reliability at the time of a provisional decision in a main decision is not limited to this and it is essential only that a main decision be made using a coefficient related to a minimum value of the path metric.

Moreover, as the method of reflecting the reliability at the time of a provisional decision in a main decision, a difference between the minimum value of the path metric and the second smallest value of the path metric may also be reflected in the main decision. The bigger the difference between the minimum value of the path metric and the second smallest value of the path metric, the higher the reliability of the decision is. Considering this, it is also possible to calculate a multiplication coefficient using this difference instead of the above described reciprocal of the minimum value of the path metric.

Furthermore, in this embodiment, the feature of this embodiment has been explained using FIG. 24, but the scope of application of this embodiment is not limited to this. The feature of this embodiment can be widely applied to cases where candidate signal points of the subject modulated signal is reduced using the decision result of other modulated signals and the subject modulated signal is decided using the reduced candidate signal points. For example, it is applicable to all above described Embodiments 1 to 7.

Embodiment 9

In addition to the features of Embodiment 1 to Embodiment 8, a feature of this embodiment is to transmit specific symbols at a predetermined timing. First, this embodiment proposes to transmit space-time codes (this embodiment uses a Space-Time Block Code (STBC)) as the specific symbols. Second, this embodiment proposes to transmit special symbols as the specific symbols.

By transmitting specific symbols at a predetermined timing in this way, the error rate characteristic of received data can be further improved in addition to the effects of Embodiment 1 to Embodiment 8.

(i) When Transmitting Space-Time Block Codes

Figure 35:
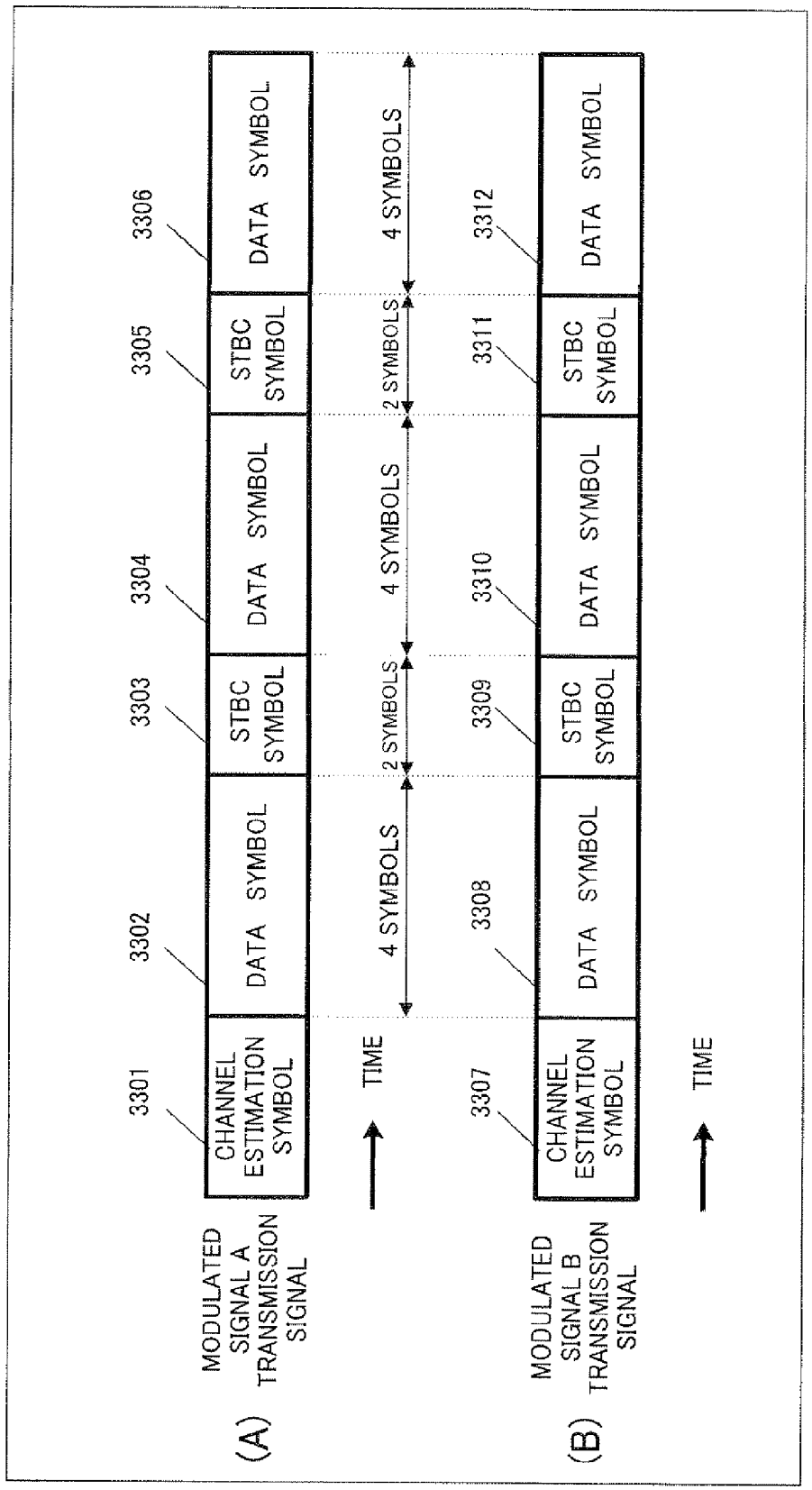
FIG. 35 shows a frame configuration example when STBC symbols are inserted.

First, the principle of transmitting/receiving space-time block codes will be explained. FIG. 35 shows a frame configuration example of modulated signal A and modulated signal B transmitted from each antenna of the transmission apparatus. As shown in the figure, the transmission apparatus transmits STBC symbol 3303 regularly in addition to channel estimation symbol 3301, data symbols 3302, 3304, 3306 as modulated signal A from first antenna AN1 (FIG. 1). Furthermore, the transmission apparatus transmits STBC symbol 3309 regularly in addition to channel estimation symbols 3307, data symbols 3308, 3310, 3312 as modulated signal B from second antenna AN2.

The time axes in FIG. 35(A) and FIG. 35(B) are identical. In other words, channel estimation symbols 3301 and 3307, data symbols 3302 and 3308, STBC symbols 3303 and 3309, data symbols 3304 and 3310, STBC symbols 3305 and 3311, data symbols 3306 and 3312 are transmitted at the same time, respectively. Also, in the example of FIG. 35, two STBC symbols are inserted between four data symbols and transmitted.

Figure 36:
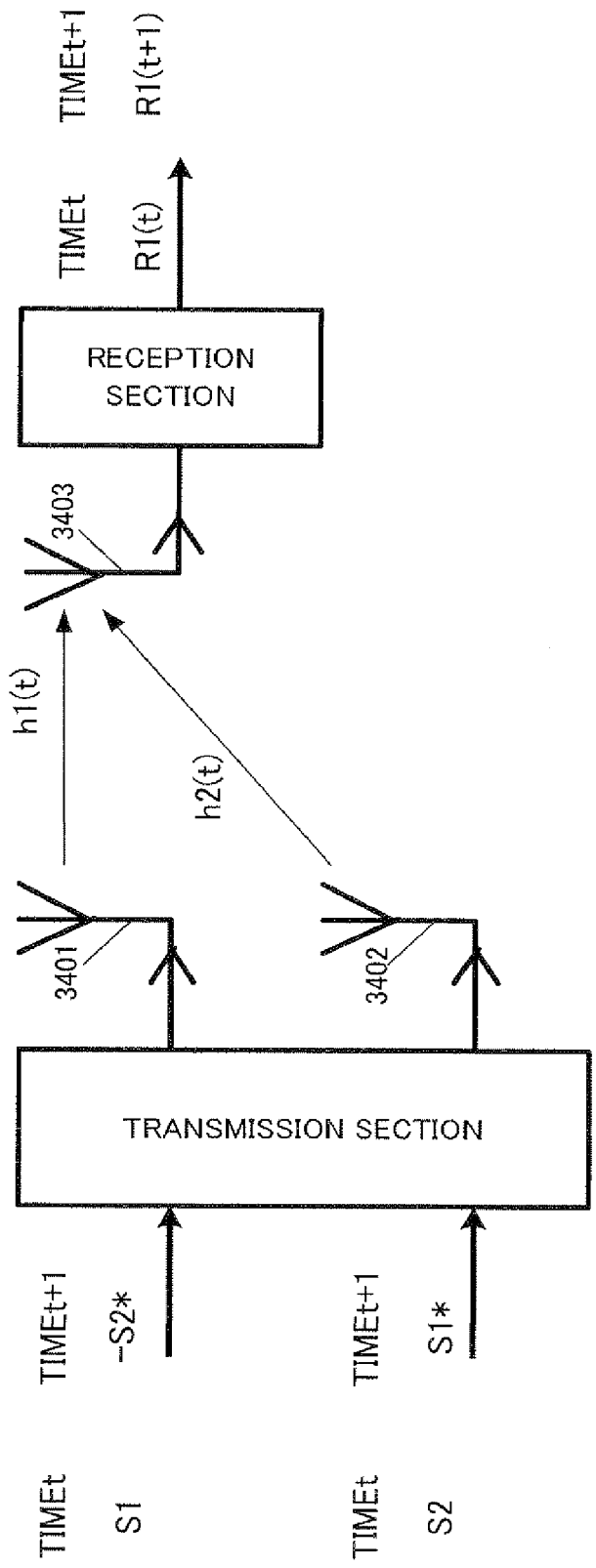
FIG. 36 illustrates transmission and reception of STBC.

Though use of STBC for the multi-antenna communication is a known technology, this will be explained briefly using FIG. 36. According to STBC, at time t, a modulated signal of signal S1 is transmitted from antenna 3401 and at the same time a modulated signal of signal S2 is transmitted from antenna 3402. Then, at time t+1, a modulated signal of signal −S2* is transmitted from antenna 3401 and a modulated signal of signal S1* is transmitted from antenna 3402. Here, "*" denotes a conjugate complex.

At this time, if it is assumed that the received signal at time t of antenna 3403 is $R1(t)$ and the received signal at time t+1 is $R1(t+1)$, the following relational expression holds.

[Expression 2]

$$\begin{pmatrix} R1(t) \\ R1(t+1) \end{pmatrix} = \begin{pmatrix} h1(t) & h2(t) \\ h2*(t+1) & -h1*(t+1) \end{pmatrix} \begin{pmatrix} S1 \\ S2 \end{pmatrix} \qquad (2)$$

The reception section demodulates transmission signals S1, S2 by solving Expression (2) but as is understandable from Expression (2), a big diversity gain can be obtained, and therefore signals S1, S2 can be obtained with high quality.

Here, when STBC is inserted as shown in FIG. 35, it is preferable to perform coding such as convolutional coding, turbo coding, LDPC (Low Density Parity Check) coding using data symbols 3302, 3304, 3306 and signal S1 in STBC symbols 3303, 3305 to form modulated signal A. It is also preferable to perform coding such as convolutional coding, turbo coding, LDPC coding using data symbols 3308, 3310, 3312 and signal S2 in STBC symbols 3309, 3311 to form modulated signal B.

Next, a configuration example of the multi-antenna transmission apparatus to transmit the signal shown in FIG. 35 and a configuration example of the multi-antenna reception apparatus to receive and demodulate the signal will be explained.

Figure 37:
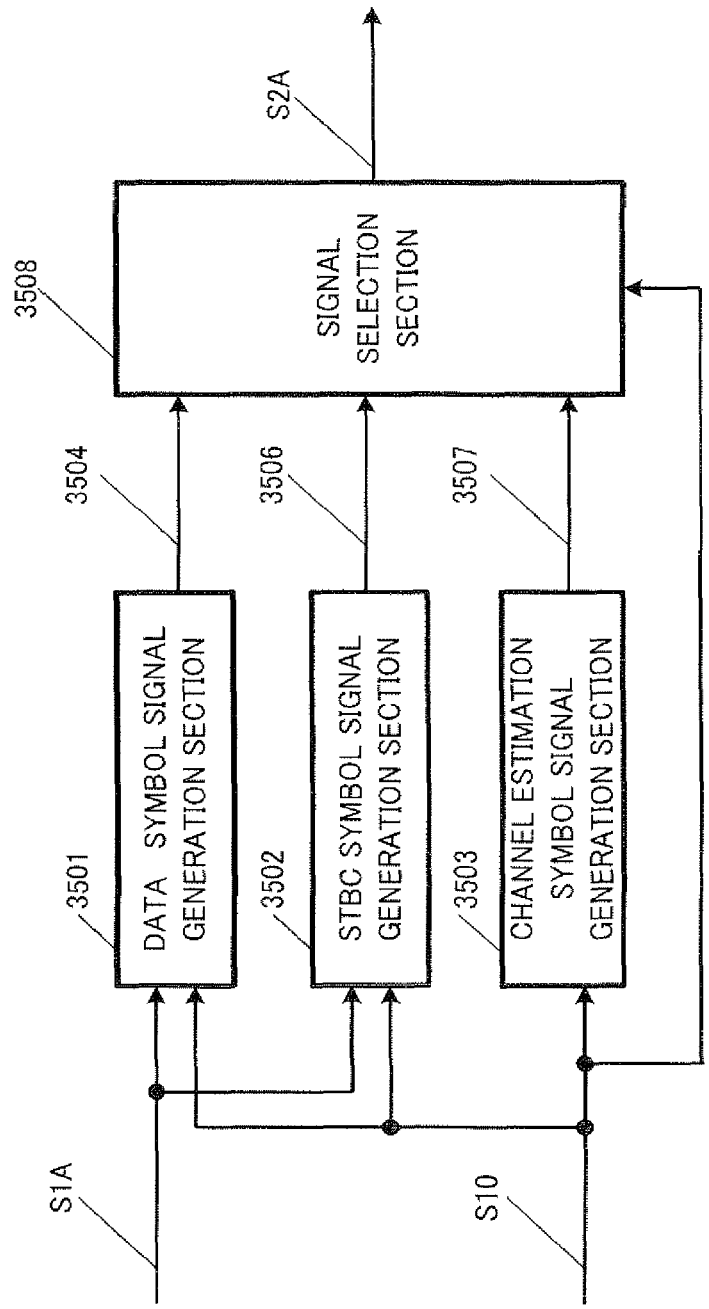
FIG. 37 is a block diagram showing a configuration example for insertion of STBC symbols.

For the multi-antenna transmission apparatus, modulation sections 202A, 202B in FIG. 2 and FIG. 30 may be composed as shown in FIG. 37, for example. Since modulation section 202A and modulation section 202B can have substantially the same configuration, only modulation section 202A will be explained here.

Modulation section 202A inputs coded data S1A to data symbol signal generation section 3501 and STBC symbol signal generation section 3502. Furthermore, modulation section 202A inputs frame configuration signal S10 to data symbol signal generation section 3501, STBC symbol signal generation section 3502, channel estimation symbol signal generation section 3503 and signal selection section 3508.

Data symbol signal generation section 3501 modulates coded data S1A when frame configuration signal S10 indicates a data symbol and outputs data symbol baseband signal 3504. STBC symbol signal generation section 3502 modulates coded data S1A when frame configuration signal S10 indicates an STBC symbol and outputs STBC symbol baseband signal 3506. Channel estimation symbol signal generation section 3503 outputs channel estimation symbol baseband signal 3507 when frame configuration signal S10 indicates a channel estimation symbol.

Signal selection section 3508 selects a baseband signal indicated by frame configuration signal 510 from among input baseband signals 3504, 3506, 3507 and outputs it as baseband signal S2A. This allows a modulated signal in the frame configuration as shown in FIG. 35 to be sent.

Figure 38:
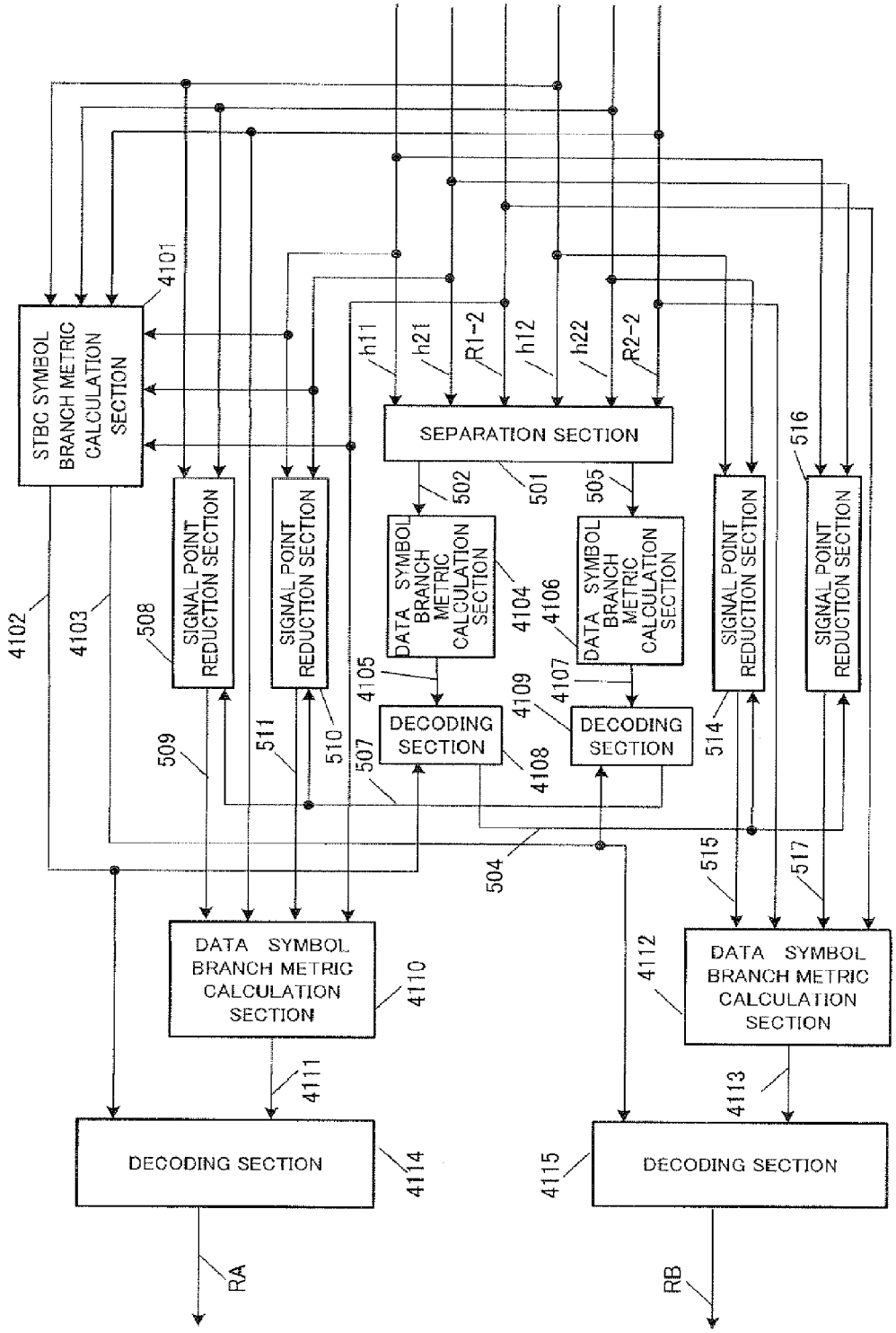
FIG. 38 is a block diagram showing a configuration example of a signal processing section of a multi-antenna reception apparatus of Embodiment 9.
Figure 39:
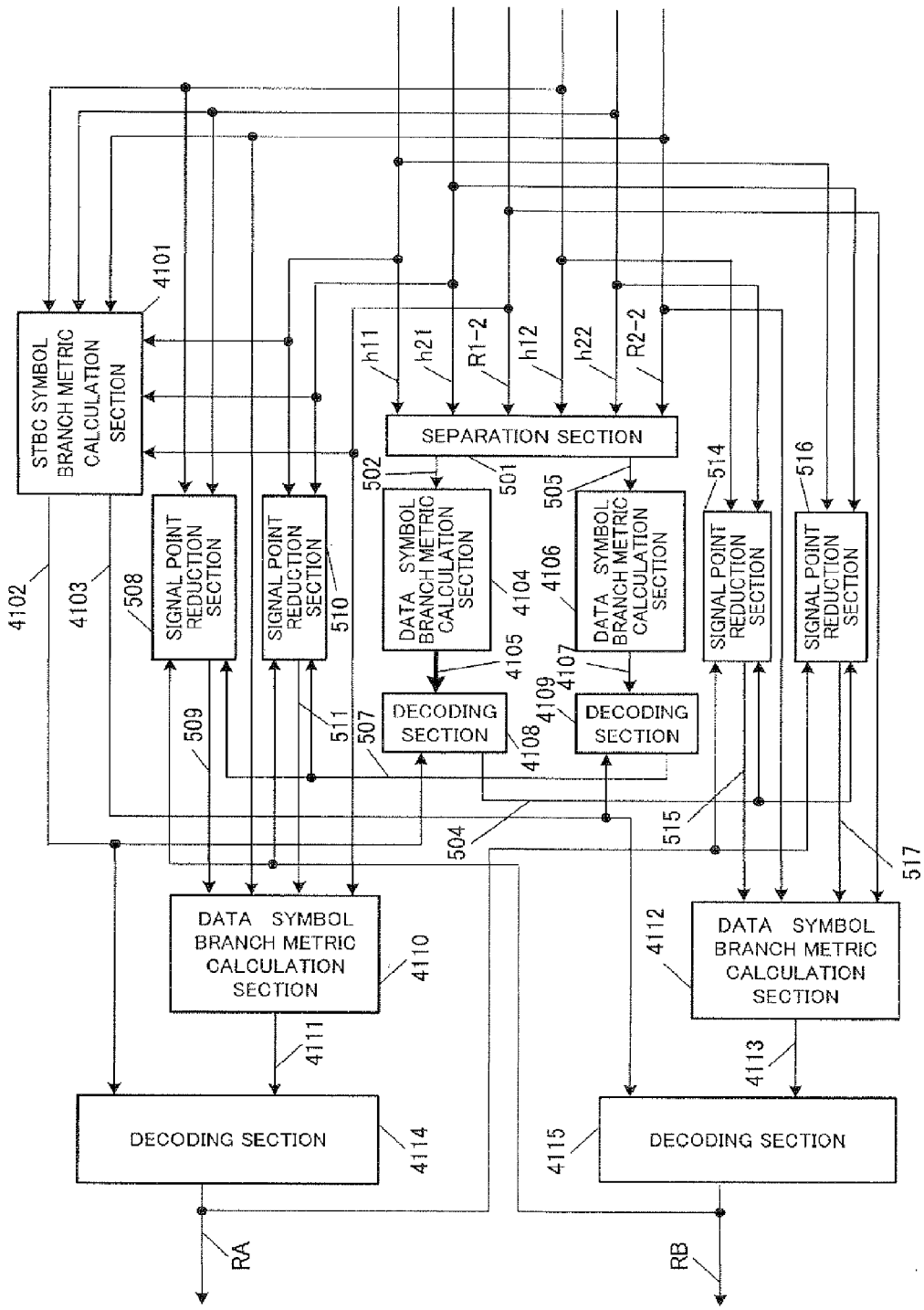
FIG. 39 is a block diagram showing a configuration example of the signal processing section of the multi-antenna reception apparatus of Embodiment 9.

FIG. 38 and FIG. 39 show configuration examples of the signal processing section of the multi-antenna reception apparatus of this embodiment. FIG. 38 shows the configuration of the signal processing section when iterative decoding is not used and parts corresponding to those in FIG. 5 are assigned the same reference numerals. FIG. 39 shows the configuration of the signal processing section when iterative decoding is used.

First, the configuration of the signal processing section 3600 in FIG. 38 will be explained. STBC symbol branch metric calculation section 4101 in signal processing section 3600 receives channel fluctuation estimated values h11, h21, h12, h22 and baseband signals R1-2, R2-2, obtains a branch metric of an STBC symbol and outputs STBC symbol branch metric signals 4102, 4103.

At this time, 2 lines of branch metric signals of STBC symbols are output. This is because s branch metric exists for each of S1, S2 in Expression (2). Reference numeral 4102 denotes the branch metric signal of STBC symbols transmitted as modulated signal A and 4103 denotes the branch metric signal of STBC transmitted as modulated signal B.

Separation section 501 performs signal separation according to Expression (1) only on data symbols in FIG. 35 and outputs estimated baseband signals 502, 505.

Data symbol branch metric calculation section 4104 receives estimated baseband signal 502 of modulated signal A, calculates a branch metric of data symbols of modulated signal A and outputs data symbol branch metric signal 4105. In the same way, data symbol branch metric calculation section 4106 receives estimated baseband signal 505 of modulated signal B, calculates a branch metric of data symbols of modulated signal B and outputs data symbol branch metric signal 4107.

Decoding section 4108 receives STBC symbol branch metric signal 4102, data symbol branch metric signal 4105, obtains a path metric, decodes it and thereby outputs decision value 504 about transmission digital signal TA. In the same way, decoding section 4109 receives STBC symbol branch metric signal 4103, data symbol branch metric signal 4107, obtains a path metric, decodes it and thereby outputs decision value 507 about transmission digital signal TB.

Signal point reduction sections 508, 510, 514, 516 reduce signal points about data symbols as explained in Embodiment 1 and output signal point information after the signal point reduction. Data symbol branch metric calculation sections 4110, 4112 receive the signal point information after the signal point reduction and baseband signals R1-2, R2-2 and output data symbol branch metric signals 4111, 4113. Decoding sections 4114, 4115 receive the branch metric signal of data symbols and the branch metric signal of STBC symbols, obtain path metrics and decode them.

Next, the configuration in FIG. 39 will be explained. As described above, FIG. 39 shows the configuration of the signal processing section when using iterative decoding, which corresponds to a combination of the configuration in FIG. 38 and the configuration in FIG. 13. In other words, the relationship between FIG. 38 and FIG. 39 is the same as the already explained relationship between FIG. 5 and FIG. 13. Therefore, parts in FIG. 39 corresponding to those in FIG. 38 are assigned the same reference numerals and explanations thereof will be omitted.

Next, the operation and effect during reception when space-time codes are regularly transmitted as in this embodiment will be explained.

Figure 40:
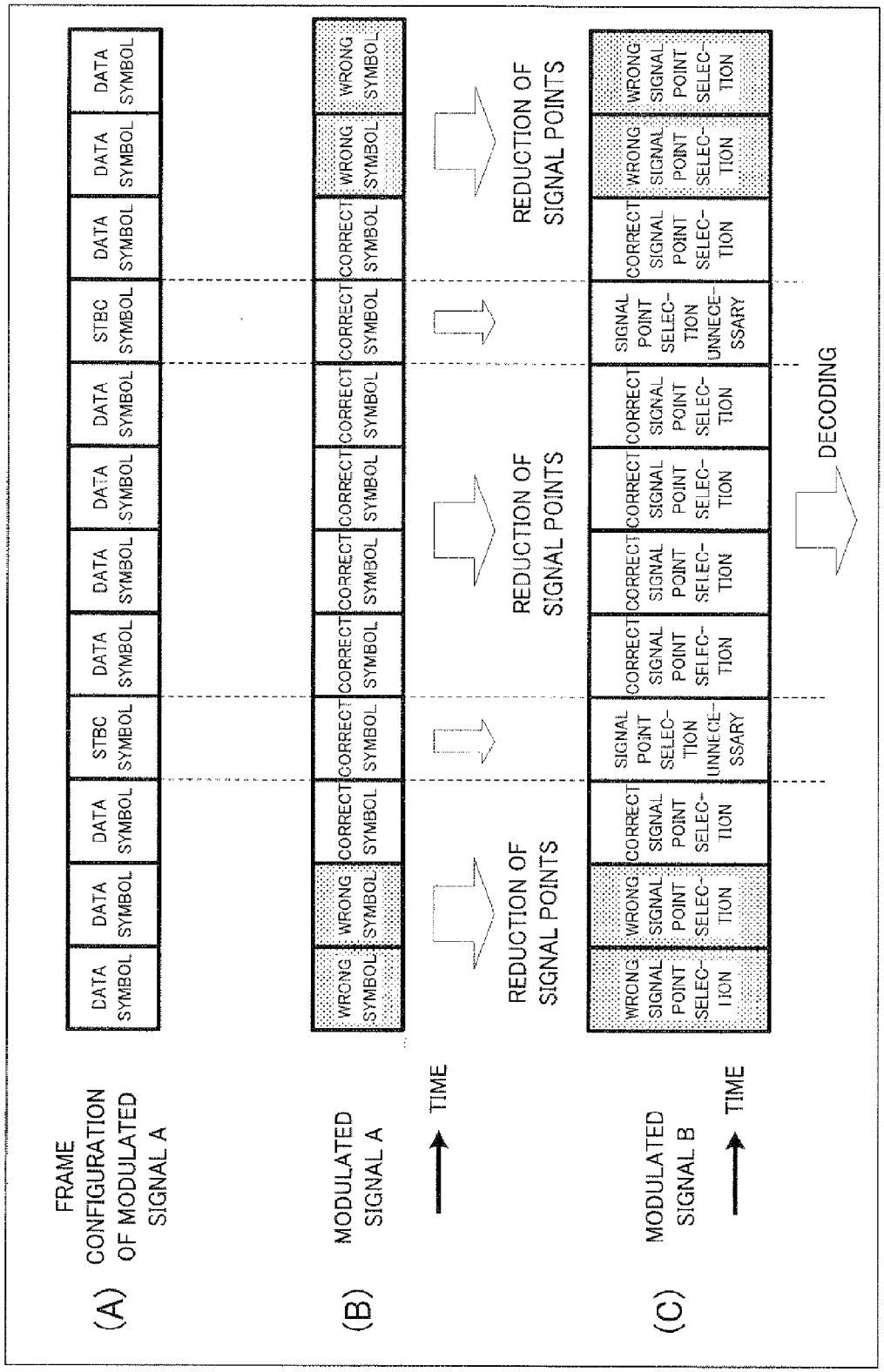
FIG. 40 shows an example of the reception state when STBC symbols are inserted.

FIG. 40 shows an example of the reception state when the signal in the frame configuration as shown in FIG. 35 is received. FIG. 40(A) shows a frame configuration of modulated signal A. FIG. 40(B) shows an example of the state of modulated signal A after a first decision. FIG. 40(C) shows the state of modulated signal B after a signal point reduction. The same also applies when modulated signal A is switched to modulated signal B in FIG. 40(A), FIG. 40(B) and modulated signal B is switched to modulated signal A in FIG. 40(C).

Since a diversity gain by coding and a diversity gain at the receive antenna are obtained with STBC symbols, STBC symbols have very high reliability when a branch metric is determined. Moreover, STBC symbols do not need signal point reduction as in the case of Embodiments 1 to 8. On the other hand, since a diversity gain is small with data symbols, when a branch metric is obtained, data symbols have low reliability.

With such a characteristic, the state of modulated signal A after a first soft decision will be considered. Since the reliability of a branch metric about STBC symbols is very high, the possibility that correct symbols may be obtained becomes very high when a path metric of STBC symbols is obtained and then a soft decision is performed.

Therefore, since symbols of modulated signal A can be decided correctly, when signal points about data symbols are reduced using this decision result, the possibility that a wrong signal point may be selected becomes low. As a result, when a branch metric of modulated signal B is obtained using the reduced signal points, the reliability of the branch metric becomes high.

In addition, STBC symbols are also inserted in modulated signal B, and the reliability of a branch metric obtained with STBC symbols is very high due to the diversity gain through coding on the STBC symbols and the diversity gain at the receive antenna.

With these two effects, the error rate characteristic of modulated signal B can be improved considerably when a path metric is obtained and soft decision decoding is performed.

Considering the case where the iteration processing in Embodiments 3, 4 is performed, adopting the frame configuration with STBC symbols inserted as in the case of this embodiment reduces the number of iterations to obtain a good error rate characteristic and contributes to a further improvement of the error rate characteristic. Furthermore, using different interleaving patterns for modulated signal A and modulated signal B as in the case of Embodiment 6 further improves the error rate characteristic. Since the configuration has been explained in detail in Embodiment 6, explanations thereof will be omitted here. It is essential only to provide a plurality of interleavers having different interleaving patterns on the transmitting side, transmit the modulated signal interleaved in the interleaving pattern which is different from each antenna and provide a deinterleaver and interleaver corresponding to each interleaver on the receiving side.

(ii) When Transmitting Special Symbol

Figure 41:
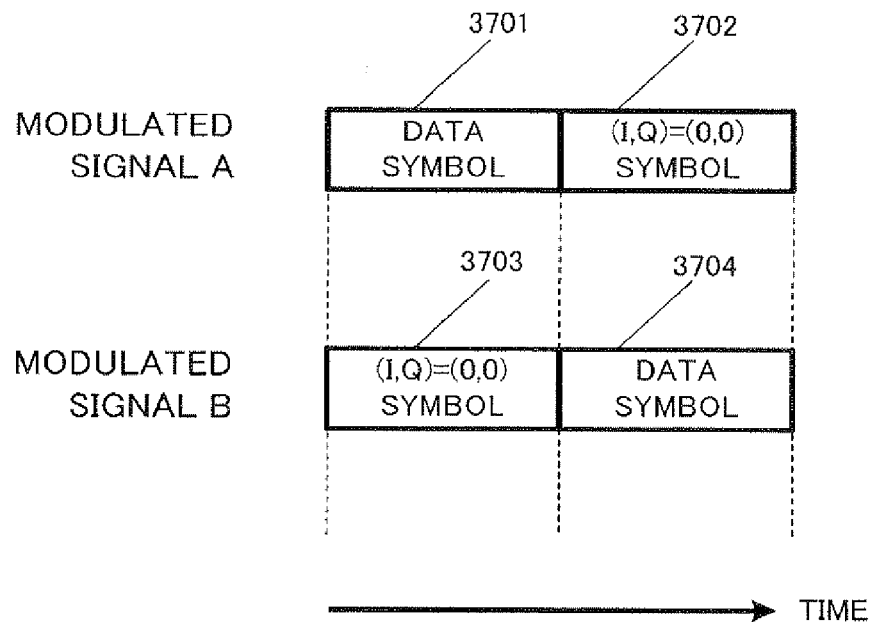
FIG. 41 shows an example of the frame configuration of special symbols.
Figure 42:
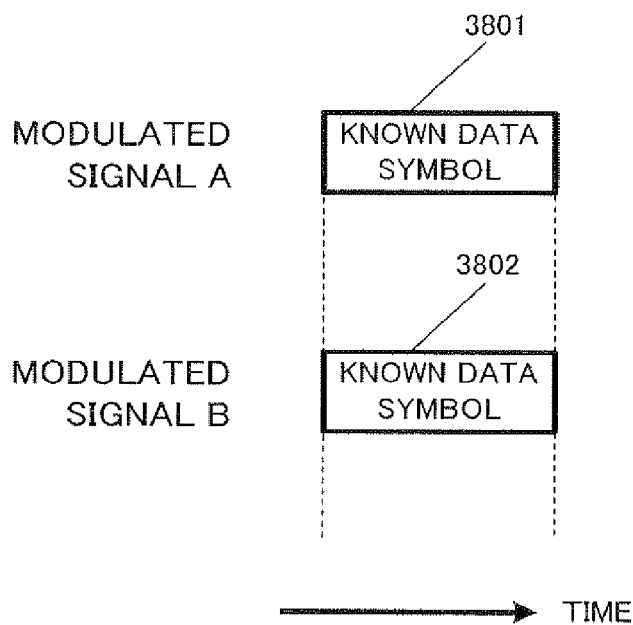
FIG. 42 shows an example of the frame configuration of special symbols.

Next, the principle of transmitting/receiving special symbols will be explained. FIG. 41 and FIG. 42 show a frame configuration example of a special symbol.

The frame configuration in FIG. 41 will be explained in detail. According to this frame configuration, at the same time as data symbol 3701 is being transmitted as modulated signal A, symbol 3703 made up of a signal of (0,0) on the in-phase plane I—quadrature plane Q is transmitted as modulated signal B. That is, modulated signal B is not transmitted. Furthermore, at the same time as data symbol 3704 is being transmitted as modulated signal B, symbol 3702 made up of a signal of (0,0) on the in-phase plane I—quadrature plane Q is transmitted as modulated signal A. That is, modulated signal A is not transmitted.

In the example of FIG. 41, when a data symbol is transmitted only from one antenna and not transmitted from the other antenna, this is called a "special symbol." That is, it is proposed here to switch such a special symbol to an STBC symbol and transmit it regularly.

In this way, when the receiver receives data symbol 3701 of modulated signal A, no signal exists in modulated signal B and a plurality of antennas receive only modulation symbol A, and therefore it is possible to obtain a diversity gain and obtain a branch metric with high reliability for data symbol 3701. In addition, there is no need to reduce signal points. Likewise, when the receiver receives data symbol 3704 of modulated signal B, no signal exists in modulated signal A and a plurality of antennas receive only modulation symbol B, and therefore it is possible to obtain a diversity gain and obtain a branch metric with high reliability for data symbol 3704. In addition, there is no need to reduce signal points.

Data symbols 3701, 3704 in the special symbol are coded together with other data symbols temporally before and after this symbol. In this way, the special symbol is associated with the other data symbols before and after this symbol.

The frame configuration in FIG. 42 will be explained in detail. In this frame configuration, modulated signal A is assumed to be known data symbol 3801 and modulated signal B is assumed to be known data symbol 3802 and these known data symbols 3801, 3802 are transmitted at the same, time. Here, the "known data symbol" refers to transmission of known data. That is, in the example of FIG. 42, transmission of known data symbols from a plurality of antennas is called a "special symbol." That is, regularly transmitting special symbols instead of STBC symbols is proposed here.

In this way, when the receiver receives known data symbols 3801, 3802 of modulated signal A and modulated signal B, each symbol can be correctly identified because these symbols are known. Therefore, a sufficient diversity gain is obtained in each modulation symbol through receptions by a plurality of antennas and a branch metric with high reliability about each symbol can be obtained. In addition, signal points need not be reduced.

Known data symbols 3801, 3802 in the special symbol are coded together with other data symbols temporally before and after this symbol. In this way, the special symbol is associated with the other data symbols before and after this symbol.

In FIG. 42, an example where a known data symbol is composed of 1 symbol has been explained, but the known data symbol may also be composed of 2 symbols using an STBC scheme. In any case, it is important that known data symbols be involved in the coding.

Next, a configuration examples of the multi-antenna transmission apparatus for transmitting signals as shown in FIG. 41 and FIG. 42 and a configuration example of the multi-antenna reception apparatus for receiving and demodulating the signals will be explained.

Figure 43:
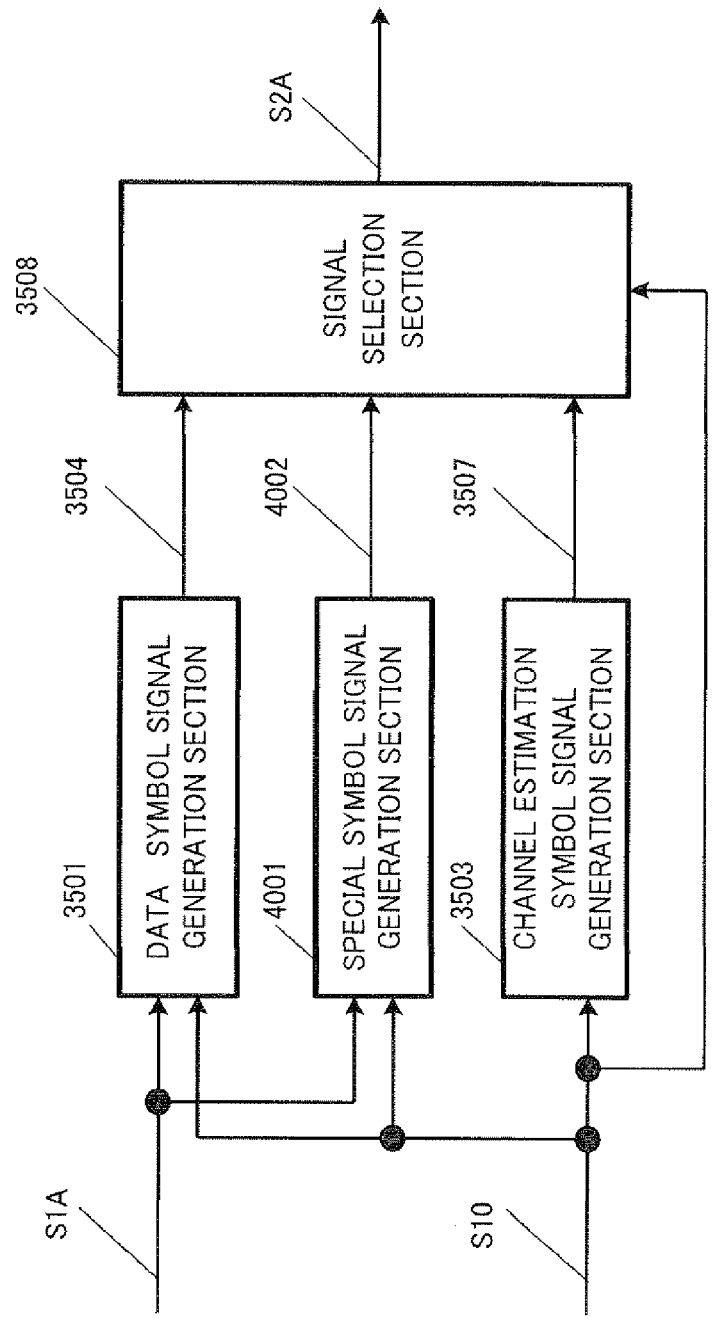
FIG. 43 is a block diagram showing a configuration example for insertion of STBC symbols.

Modulation sections 202A, 202B in FIG. 2 and FIG. 30 of the multi-antenna transmission apparatus can be configured, for example, as shown in FIG. 43. Because modulation section 202A and modulation section 202B can have substantially the same configuration, modulation section 202A will be explained here.

The configuration in FIG. 43 is different from the configuration in FIG. 37 only in that STBC symbol signal generation section 3502 is replaced by special symbol signal generation section 4001, and therefore parts corresponding to those in FIG. 37 are assigned the same reference numerals and explanations thereof will be omitted. Special symbol signal generation section 4001 receives coded data S1A and frame configuration signal S10 and outputs baseband signal 4002 of the special symbol shown in FIG. 41 and FIG. 42 when frame configuration signal S10 indicates a special symbol.

Furthermore, the configuration of the multi-antenna reception apparatus which receives and demodulates the modulated signal in which such a special symbol is inserted can be realized by replacing STBC symbol branch metric calculation section 4101 in FIG. 38 and FIG. 39 with the special symbol branch metric calculation section.

Figure 44:
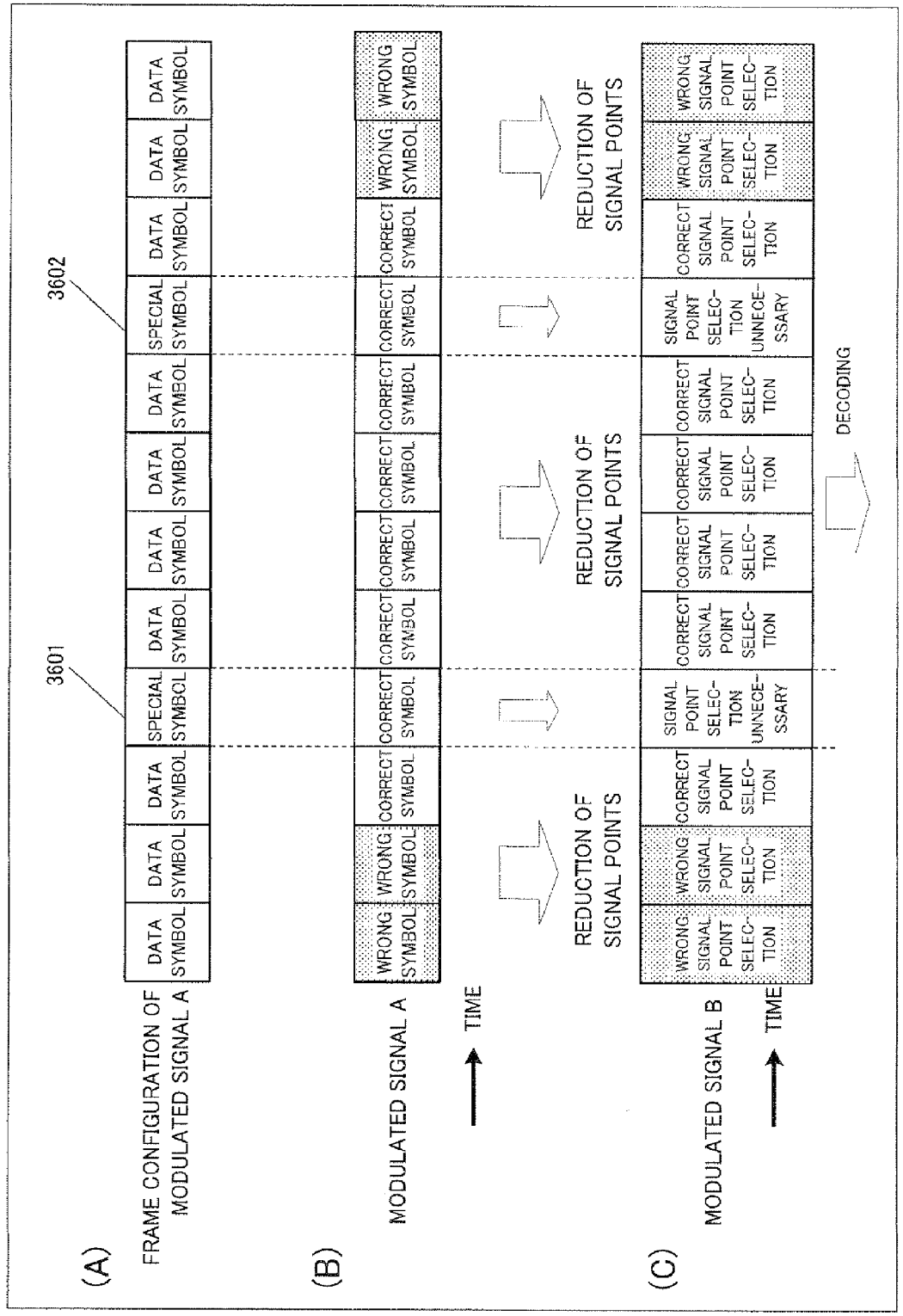
FIG. 44 shows an example of the reception state when special symbols are inserted.

FIG. 44 shows an example of the reception state when a special symbol is received. FIG. 44(A) shows the frame configuration of modulated signal A. FIG. 44(B) shows an example of the state of modulated signal A after a first decision. FIG. 44(C) shows the state of modulated signal B after a signal point reduction. The same also applies to a case where modulated signal A is switched to modulated signal B in FIG. 44(A), FIG. 44(B) and modulated signal B is switched to modulated signal A in FIG. 44(C).

When a special symbol is inserted as in the case where an STBC symbol is inserted, the reliability of the branch metric in the special symbol is very high, and therefore if a path metric of the special symbol is obtained and a soft decision is performed, the possibility that a correct symbol may be obtained becomes very high.

Therefore, a symbol decision on modulated signal A can be made correctly, and therefore reducing signal points about data symbols using this decision result reduces the possibility that wrong signal points may be selected. As a result, the reliability of the branch metric improves when determining the branch metric of modulated signal B using the reduced signal points.

In addition, special symbols are also inserted in modulated signal B, the reliability of the branch metric obtained with special symbols is very high due to the diversity gain through coding of special symbols and diversity gain at the receive antenna.

With these two effects, it is possible to improve the error rate characteristic of modulated signal B when obtaining a path metric and performing soft decision decoding.

Also, considering the case where the iteration processing of Embodiments 3, 4 is performed, adopting the frame configuration with special symbols inserted as in the case of this embodiment decreases the iteration count to obtain a good error rate characteristic and also contributes to further improvement of the error rate characteristic. Furthermore, using different interleaving patterns for modulated signal A and modulated signal B as in the case of Embodiment 6 further improves the error rate characteristic.

(iii) Other Configuration Example

The above described embodiment has described the case where STBC symbols are inserted in positions shown in FIG. 40 and special symbols 3601, 3602 are inserted in position shown in FIG. 44, but the insertion positions and the intervals of the STBC symbols and special symbols are not limited to this. Furthermore, symbols to be inserted among data symbols are not limited to STBC symbols and special symbols shown in the FIG. 41, FIG. 42 and the present invention is applicable if the branch metric is highly reliable and there are symbols which do not require signal point reduction and effects similar to those described above can be obtained for such symbols.

Furthermore, high reliability symbols (STBC symbol in FIG. 40 and special symbols in FIG. 44) of the branch metric to be inserted can also be called "pilot symbols to obtain a high reliability branch metric."

Furthermore, the above described embodiment has explained the case where the present invention is applied to a spectrum spreading communication scheme, but the present invention is not limited to this and is also applicable to, for example, an OFDM scheme. In this case, coding can also be performed in the time axis direction as shown in FIG. 40, FIG. 44 as the frequency axis direction or coding can also be performed in the frequency axis direction considering the horizontal axis in FIG. 40, FIG. 44 as the frequency axis. In addition, coding can also be performed in both the time axis and frequency axis directions. Furthermore, the present invention is also naturally applicable to a single carrier scheme which is not a spread spectrum communication scheme.

Moreover, the configuration of the reception apparatus is not limited to the configurations in FIG. 38, FIG. 39 and the configuration for demodulating modulated signal A and modulated signal B alternately as shown in FIG. 12, FIG. 18 can also be adopted. In this case, the circuit scale can be reduced more than the configuration in FIG. 38, FIG. 39.

Embodiment 10

This Embodiment proposes to always switch antennas from which modulated signals are transmitted at least once within a coded block. This can change the steady state by influences of direct waves and thereby avoid a situation that the error rate characteristic degrades within the entire coded block and lead to an improved error rate characteristic.

First, the principle of this embodiment will be explained. A prospect propagation environment will be considered. At this time, the channel matrix in Expression (1) can be considered, divided into channel elements of the direct wave components $h_{11,d}$, $h_{12,d}$, $h_{21,d}$, $h_{22,d}$ and channel elements of scattered wave components $h_{11,s}$, $h_{12,s}$, $h_{21,s}$, $h_{22,s}$ and can be expressed as shown in the following expression.

[Expression 3]

$$\begin{pmatrix} Rx_1 \\ Rx_2 \end{pmatrix} = \left( \rho_d \begin{pmatrix} h_{11,d} & h_{12,d} \\ h_{21,d} & h_{22,d} \end{pmatrix} + \rho_r \begin{pmatrix} h_{11,s} & h_{12,s} \\ h_{21,s} & h_{22,s} \end{pmatrix} \right) \begin{pmatrix} Tx_a \\ Tx_b \end{pmatrix} + \begin{pmatrix} n_1 \\ n_2 \end{pmatrix} \quad (3)$$

When the channel elements of a direct wave fall into a steady state, the channel elements are known to exhibit completely different reception quality according to the state even if the reception field intensity is identical (for example, see the document "MIMO System Analysis in Rician Fading" Institute of Electronics, Information and Communication, TECHNICAL REPORT OF IEICE RCS2003-90, pp. 1-6, July 2003). Especially, in a prospect environment in which a direct wave is dominant, there is a possibility of falling into a steady state in which the effect as in Embodiment 6 that an interleaving pattern is made to differ from one modulated signal to another does not appear sufficiently. Once fallen into such a state, even if the sufficient reception field intensity is achieved, it is considered that a good error rate characteristic cannot be obtained. This embodiment has been implemented based on such considerations.

Figure 45:
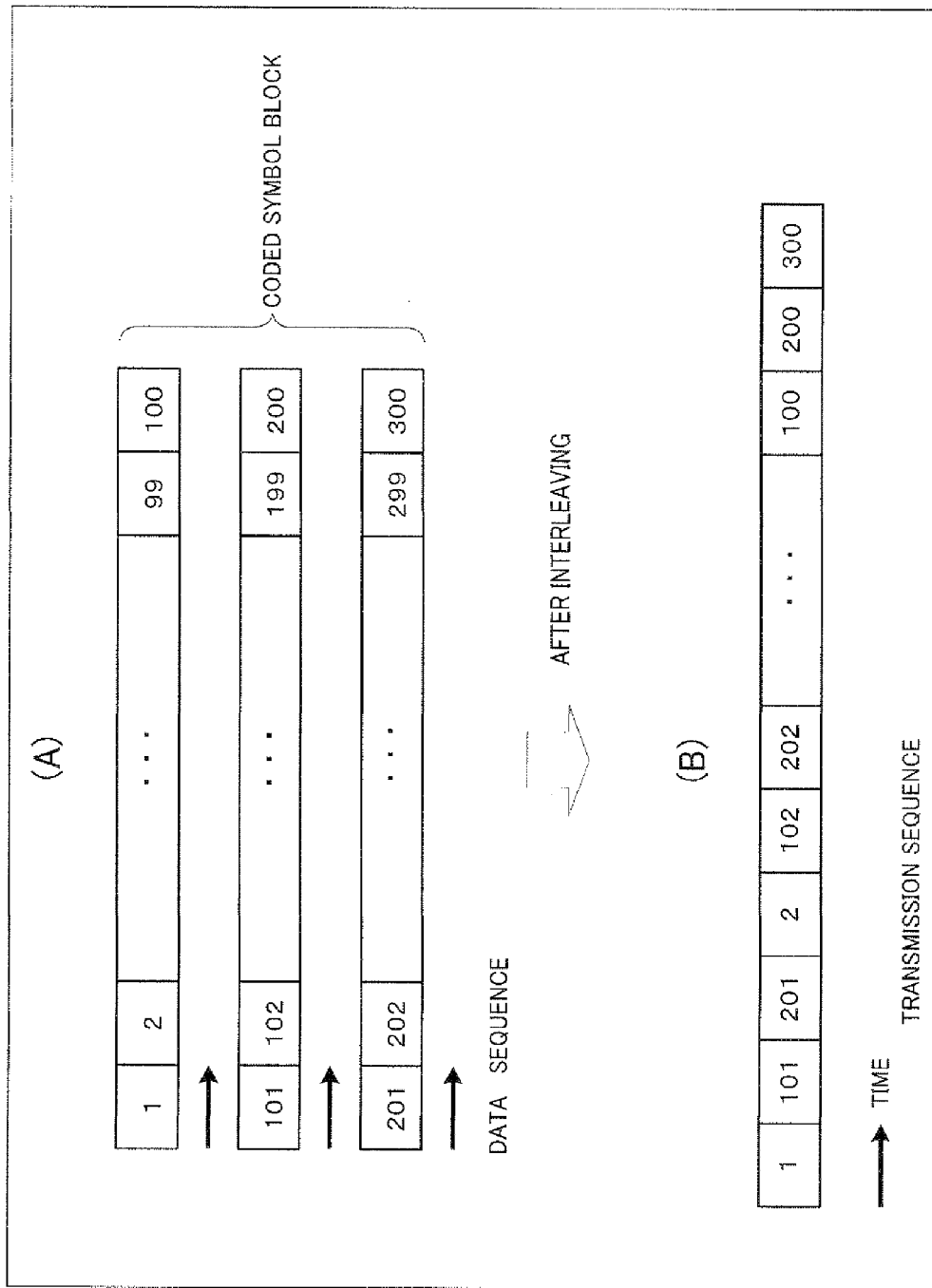
FIG. 45 shows coded symbol blocks and coded symbol blocks after interleaving.

First, explanation will be started with a coded symbol block. FIG. 45 shows examples of the configuration of a coded symbol block and the transmission sequence in this embodiment. FIG. 45(A) shows an example of the configuration of a coded symbol block. A coded symbol is composed in a finite length. The coded symbol block means a block which is composed in the finite length (here, it is composed of 300 symbols). FIGS. 1, 2, . . . , 299,300 denote the sequence of data coding. When interleaving is performed, the data is divided in units of, for example, 100 symbols and symbols are read vertically in FIG. 45(A) and the data is transmitted in the sequence as shown in FIG. 45(B).

By the way, in an environment in which direct waves are dominant, the variation of the propagation environment is small even when 1 sequence of conventional modulated signals which is not MIMO communication are transmitted, and therefore the effect of interleaving is small, but because the reception field intensity is sufficient, good reception quality (error rate characteristic) is obtained.

On the other hand, in the case of MIMO communication, in an environment in which direct waves are dominant, the variation of the propagation environment is small, and therefore the effect of interleaving is small as in the conventional case, but what is different is that even if the reception field intensity is sufficient, the reception quality may degrade depending on the state of the matrix of direct wave in Expression (3).

Figure 46:
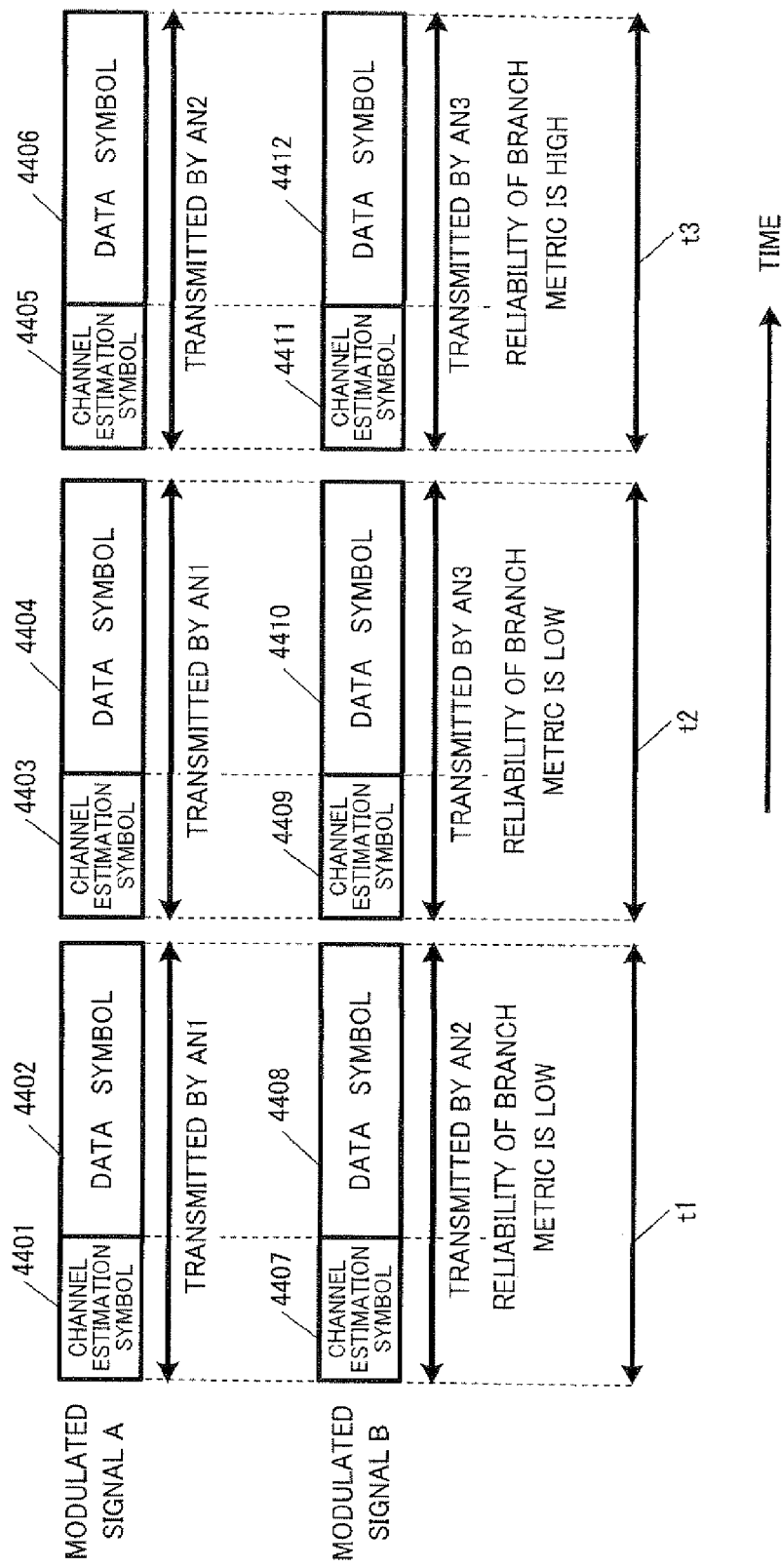
FIG. 46 illustrates the operation of Embodiment 10.

Thus, in this embodiment, antennas for transmitting modulated signals are always switched within the coded block at least once. A specific frame configuration example thereof is shown in FIG. 46. The interleaving as shown in FIG. 45(B) is applied to modulated signal A, FIG. 45(B) is divided into three portions (hereinafter, each divided block is called "XA block", "YA block", "ZA block") and at least one of the divided blocks is transmitted through the other antenna.

For example, as shown in FIG. 46, when it is assumed that the XA block corresponds to data symbol 4402 of modulated signal A, the YA block corresponds to data symbol 4404 and the ZA block corresponds to data symbol 4406, data symbols 4402, 4404 (i.e., XA block and YA block) are transmitted from identical antenna AN1, but the antenna from which data symbol 4406 (i.e., ZA block) is transmitted is switched to other antenna AN2.

In the same way, the interleaving shown in FIG. 45(B) is also applied to modulated signal B (however, as explained in Embodiment 6, using an interleaving pattern different from that in FIG. 45(B) for modulated signal B will improve the error rate characteristic), FIG. 45(B) is divided into three portions (hereinafter, the divided blocks will be called "XB block", "YB block", "ZB block") and at least one of the divided blocks is always transmitted from the other antenna.

For example, as shown in FIG. 46, when it is assumed that the XB block corresponds to data symbol 4408, the YB block corresponds to data symbol 4410 and the ZB block corresponds to data symbol 4412 for modulated signal B, data symbol 4408 (i.e., XB block) is transmitted from antenna AN2 but data symbols 4410, 4412 (i.e., YB block and ZB block) are transmitted from other antenna AN3.

When modulated signals A, B are transmitted from antenna AN1, antenna AN2 here, suppose that the state of the matrix which is steady due to influences of direct waves is bad, and therefore the branch metric has low reliability even if the reception field intensity is sufficient. In the same way, when modulated signals A, B are transmitted from antenna AN1 and antenna AN3, suppose that the state of the matrix which is steady due to influences of direct waves is bad, and therefore the branch metric has low reliability even if the reception field intensity is sufficient.

On the other hand, when modulated signals A, B are transmitted from antenna AN2 and antenna AN3, suppose that the state of the matrix which is steady due to influences of direct waves is good, and therefore the branch metric has high reliability.

In this way, the state of the matrix when fallen into a steady state by direct waves can be changed by switching the antennas which transmit modulated signals. As a result, the reliability of the branch metric can be changed by switching the antennas which transmit modulated signals. More specifically, while only a branch metric with low reliability can be obtained in periods t1, t2 in FIG. 46, the branch metric with high reliability can be obtained in period t3. When the antennas which transmit modulated signals are switched, the reception field intensity does not change but the state of the matrix changes. However, when the selection patterns of the transmit antennas are identical, the state is substantially the same.

Furthermore, because the antennas which transmit modulated signals are switched, within a coded block, a branch metric with high reliability and a branch metric with low reliability are rearranged randomly within the coded block through deinterleaving. As a result, when a path metric is obtained and then decoding is performed, it is possible to obtain data having a certain level of reliability. When iterative decoding is performed using signal point reduction, by iteratively decoding data based on data having certain reliability, it is possible to obtain data with sufficient reliability.

Figure 47:
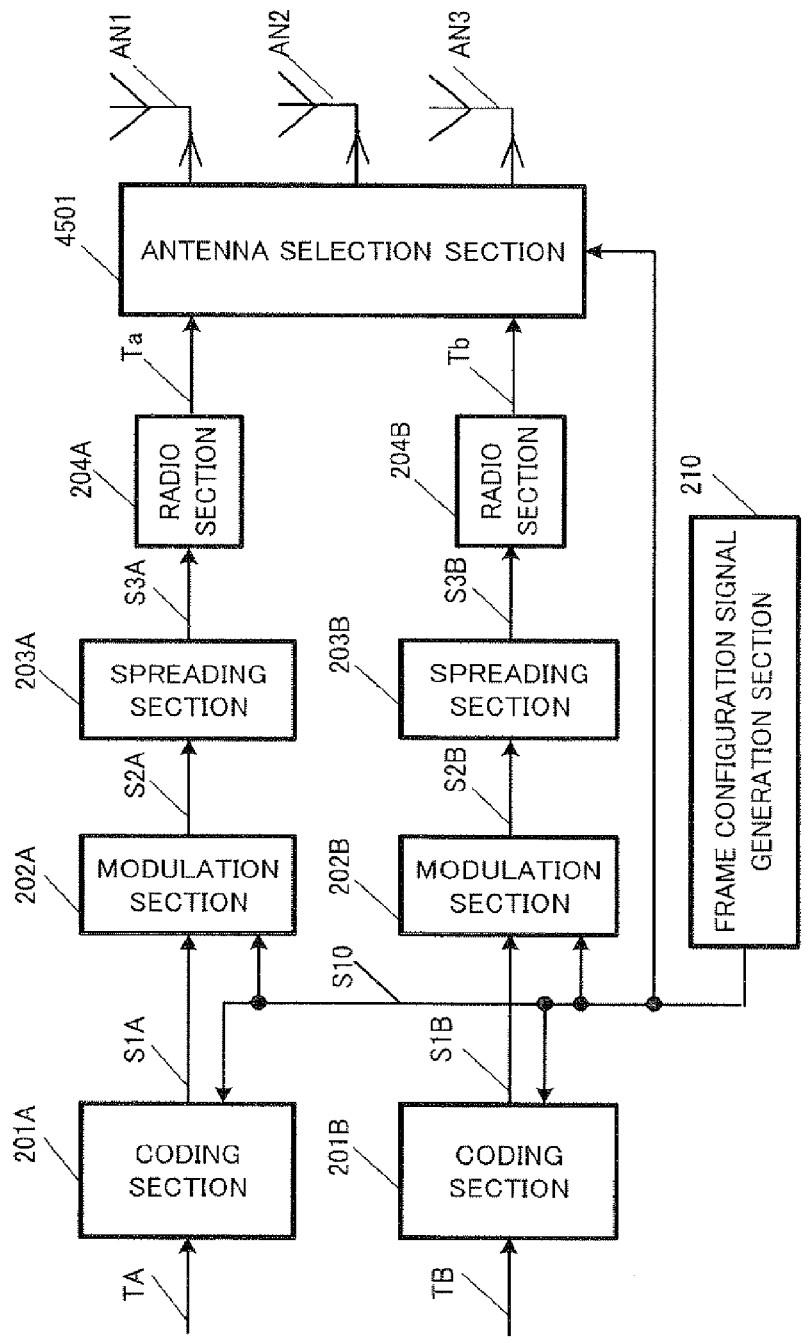
FIG. 47 is a block diagram showing the configuration of a multi-antenna transmission apparatus of Embodiment 10.

FIG. 47 shows a configuration example of the multi-antenna transmission apparatus of this embodiment. In FIG. 47, parts corresponding to those in FIG. 2 are assigned the same reference numerals. Antenna selection section 4501 of multi-antenna transmission apparatus 4500 receives modulated signals Ta, Tb and frame configuration signal S10 and selects antennas AN1 to AN3 which transmit modulated signals Ta, Tb according to frame configuration signal S10. In this way, the modulated signal in the frame configuration in FIG. 46 can be transmitted.

In this way, according to this embodiment, the antennas which transmit modulated signals are always switched at least once within a coded block, and therefore it is possible to change the steady state due to influences of direct waves and thereby lead to a state in which the error rate characteristic is improved. As a result, when combined with the features of above described Embodiments 1 to 9, it is possible to obtain received data with a better error rate characteristic. In order to lead to a state in which the error rate characteristic is improved, it is effective to select an interleaving pattern which differs from one modulated signal to another or apply iterative decoding through a signal point reduction.

Embodiment 11

This Embodiment proposes to form modulated signals in different interleaving patterns especially using bit interleaving, when transmitting modulated signals in different interleaving patterns from their respective antennas. Moreover, considering a signal point reduction on the receiving side, this embodiment proposes a method of bit interleaving so as to obtain received data with a good error rate characteristic.

Figure 48:
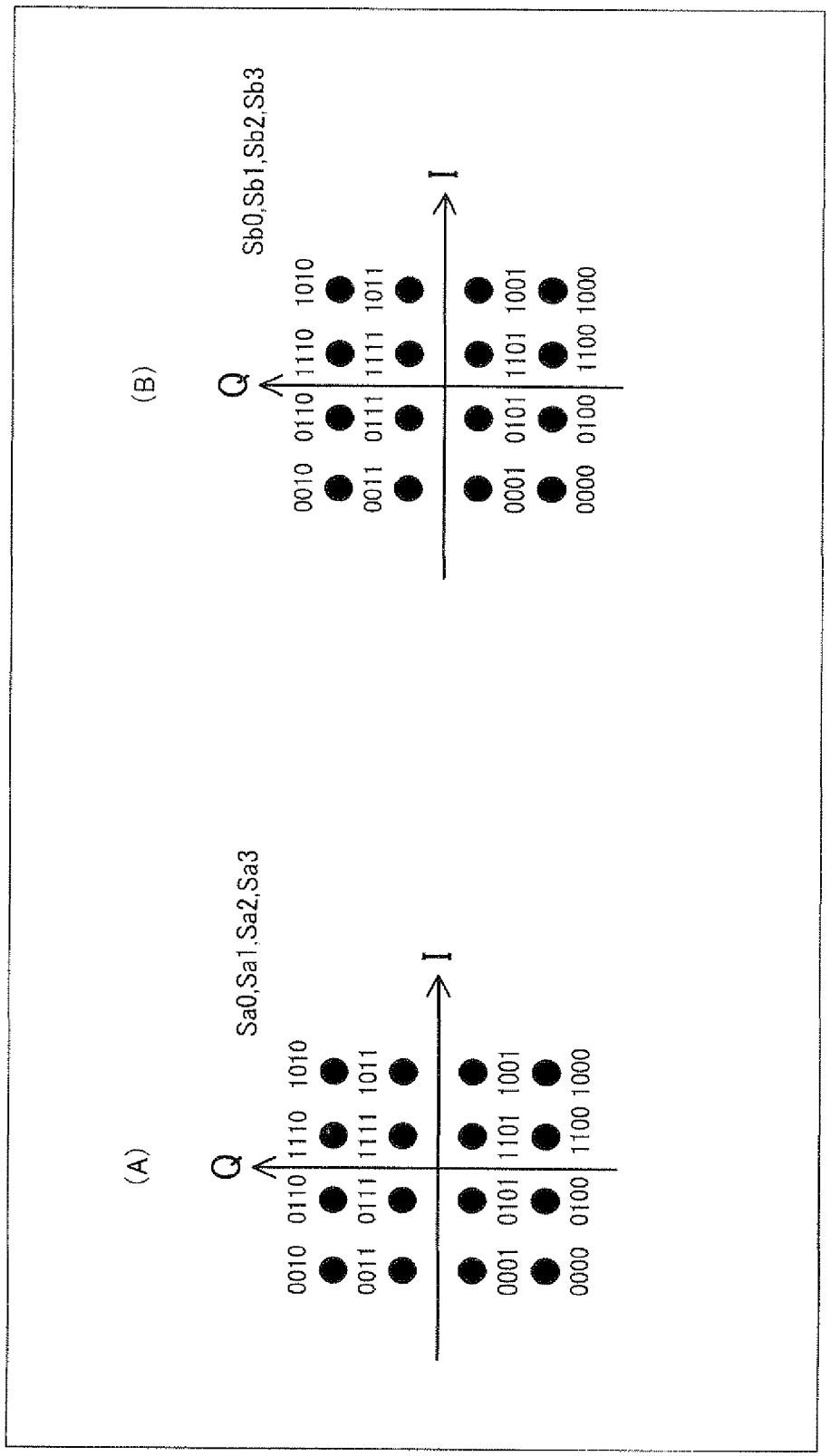
FIG. 48 illustrates a signal constellation of each modulated signal; (A) shows a signal constellation of modulated signal A and (B) shows a signal constellation of modulated signal B.

FIG. 48 shows an example of signal constellation on the I-Q plane of modulated signal A and modulated signal B transmitted by the multi-antenna transmission apparatus of this embodiment.

Figure 49:
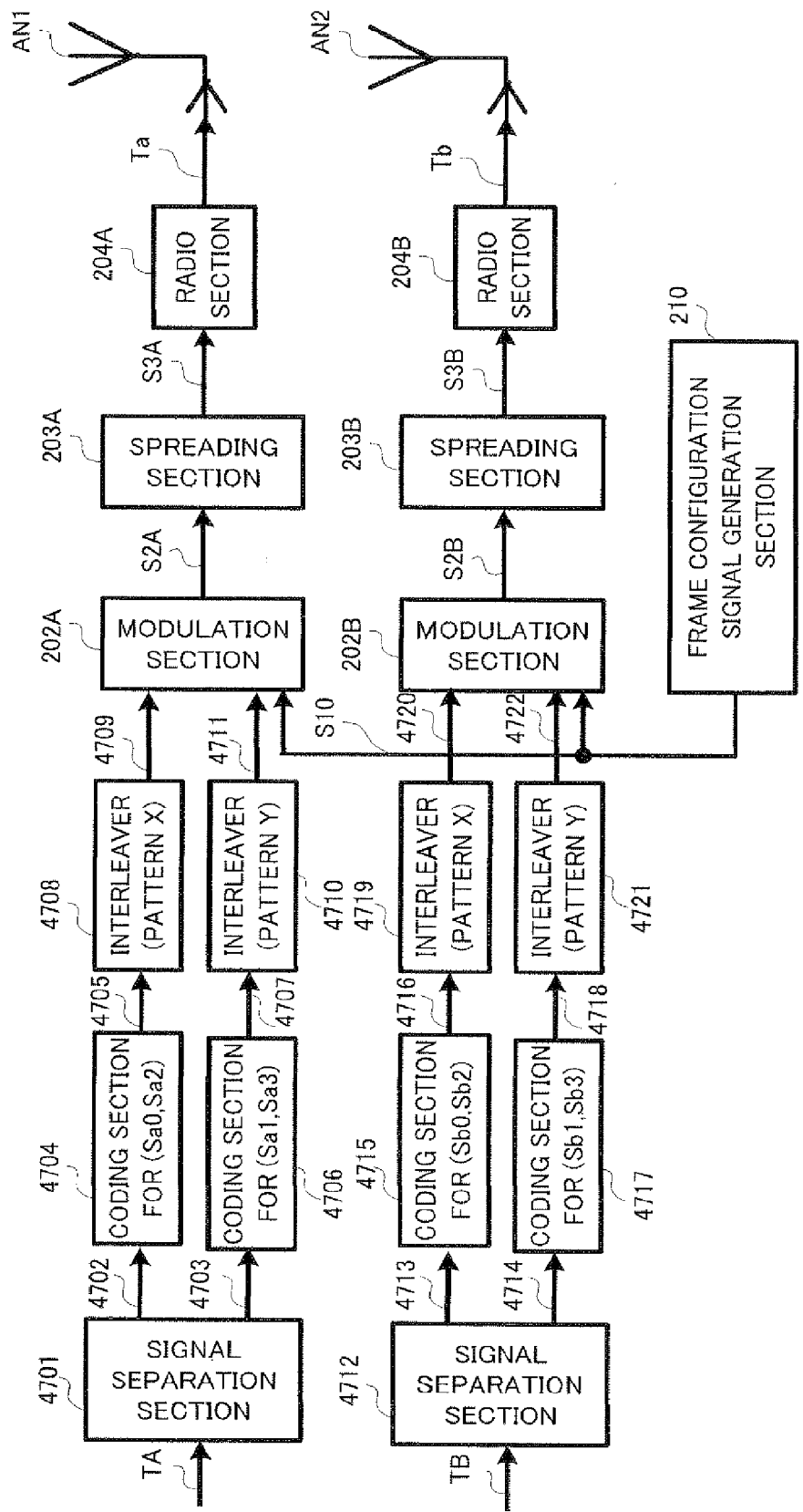
FIG. 49 is a block diagram showing the configuration of a multi-antenna transmission apparatus of Embodiment 11.

FIG. 49 which shows parts corresponding to those in FIG. 2 assigned the same reference numerals shows the configuration of the multi-antenna transmission apparatus of this embodiment. Here, when modulation section 202A of multi-antenna transmission apparatus 4700 performs 16QAM, the signal constellation of modulated signal A (baseband signal 2A) is as shown in FIG. 48(A). More specifically, any one of 16 points of FIG. 48(A) is assigned according to four coded bits Sa0, Sa1, Sa2, Sa3 obtained by coding transmission digital signal TA.

In the same way, when modulation section 202B performs 16QAM, the signal constellation of modulated signal B (baseband signal 2B) is as shown in FIG. 48(B). More specifically, any one of 16 points of FIG. 48(B) is assigned according to four coded bits Sb0, Sb1, Sb2, Sb3 obtained by coding transmission digital signal TB.

Multi-antenna transmission apparatus 4700 inputs transmission digital signal TA to signal separation section 4701. Signal separation section 4701 separates transmission digital signal TA into digital signal 4702 and digital signal 4703, and sends digital signal 4702 to coding section 4704 for (Sa0,Sa2) and at the same time sends digital signal 4703 to coding section 4706 for (Sa1,Sa3). Coding section 4704 for (Sa0, Sa2) obtains coded bit sequence 4705 made up of coded bits Sa0, Sa2 by coding digital signal 4702 and sends this to interleaver 4708. Coding section 4706 for (Sa1,Sa3) obtains coded bit sequence 4707 made up of coded bits Sa1, Sa3 by coding digital signal 4703 and sends this to interleaver 4710.

In the same way, multi-antenna transmission apparatus 4700 inputs transmission digital signal TB to signal separation section 4712. Signal separation section 4712 separates transmission digital signal TB into digital signal 4713 and digital signal 4714, and sends digital signal 4713 to coding section 4715 for (Sb0,Sb2) and at the same time sends digital signal 4714 to coding section 4717 for (Sb1,Sb3). Coding section 4715 for (Sb0,Sb2) obtains coded bit sequence 4716 made up of coded bits Sb0, Sb2 by coding digital signal 4713 and sends this to interleaver 4719. Coding section 4717 for (Sb1,Sb3) obtains coded bit sequence 4718 made up of coded bits Sb1, Sb3 by coding digital signal 4714 and sends this to interleaver 4721.

Interleavers 4708, 4710 obtain coded bit sequences 4709, 4711 by bit interleaving coded bit sequences 4705, 4707 respectively and send this to modulation section 202A. In the same way, interleavers 4719, 4721 obtain coded bit sequences 4720, 4722 by bit interleaving coded bit sequences 4716, 4718 respectively and send this to modulation section 202B.

In the case of this embodiment, the interleaving patterns of interleaver 4708 and interleaver 4719 are identical interleaving pattern X and the interleaving patterns of interleaver 4710 and interleaver 4721 are identical interleaving pattern Y.

In this way, by creating sets in the same bit interleaving pattern among the modulated signals instead of using all different bit interleaving patterns about modulated signals to be transmitted from their respective antennas, it is possible to obtain received data with a good error rate characteristic when signal points are reduced on the receiving side. The reason will be described later.

Figure 50:
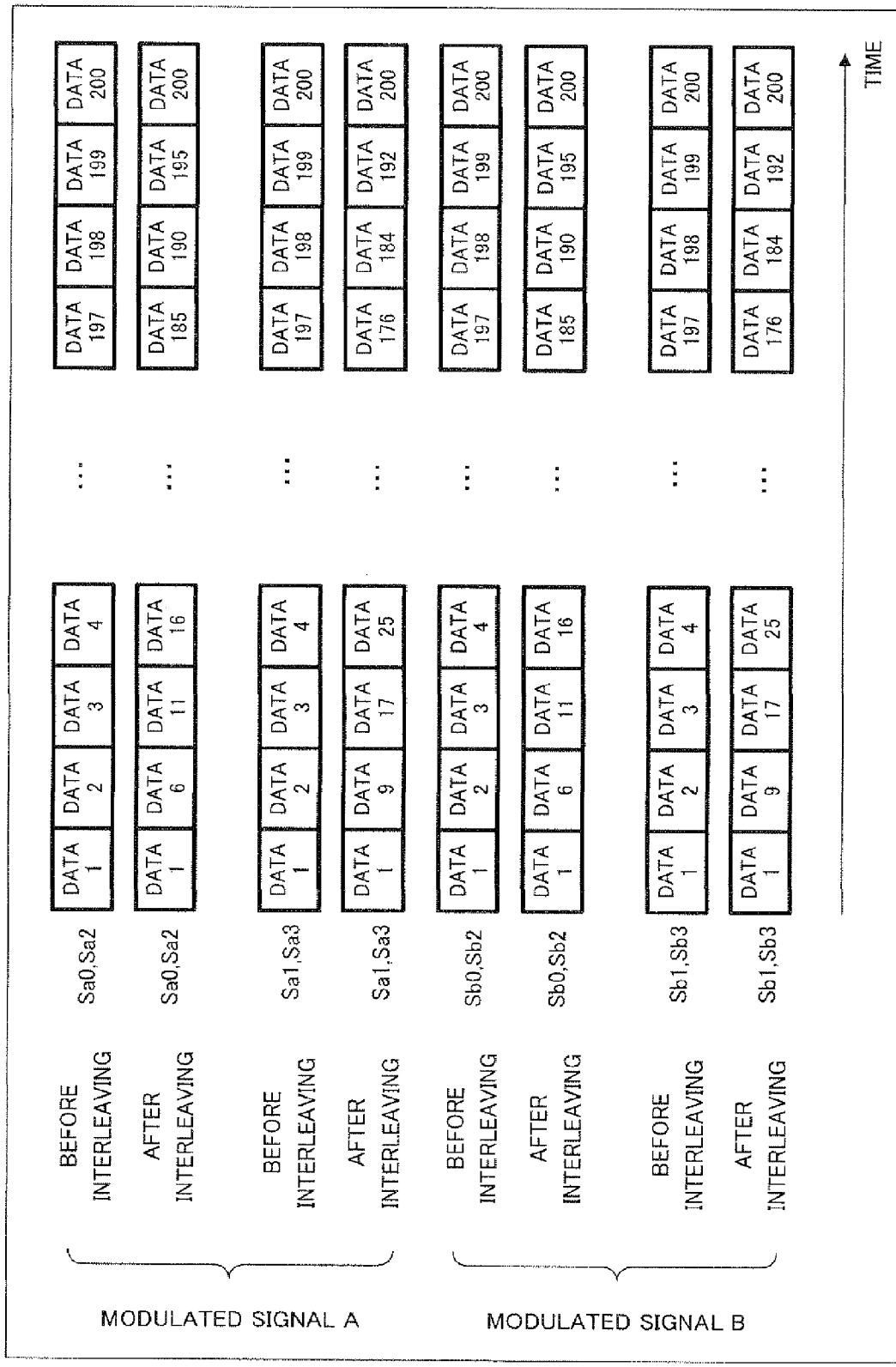
FIG. 50 illustrates bit interleaving processing of Embodiment 11.

Examples of bit interleaving by interleavers 4708, 4710, 4719, 4721 are shown in FIG. 50. FIG. 50 shows a data sequence before interleaving and after interleaving.

The sequence before interleaving of coded bits Sa0, Sat about modulated signal A is numbered as data 1, data 2, . . . , data 200. Here, suppose interleaver 4708 performs bit interleaving of rearranging the sequence for every fifth data. First, the data sequence is rearranged as data 1, data 6, . . . , data 196. Next, the data sequence is arranged as data 2, data 7, . . . , data 197. Hereinafter, the data sequence is arranged as data 3, data 8, . . . , data 198, then data 4, data 9, data 199 and then data 5, data 10, . . . , data 200. As for the data of coded bits Sb0, Sb2 about modulated signal B, a similar rearrangement is also performed by interleaver 4719.

Furthermore, the sequence before interleaving of coded bits Sa1, Sa3 about modulated signal A is numbered as data 1, data 2, . . . , data 200. Here, suppose that interleaver 4710 performs bit interleaving of rearranging the sequence for every eighth data. First, the data sequence is arranged as data 1, data 9, . . . , data 193. Next, the data sequence is arranged as data 2, data 10, data 194. Hereinafter, the data sequence is arranged as data 3, data 11, . . . , data 195, then data 4, data 12, . . . , data 196, then data 5, data 13, . . . , data 197, then data 6, data 14, . . . , data 198, then data 7, data 15, . . . data 199 and then data 8, data 16, . . . , data 200. As for the data of coded bits Sb1, Sb3 about modulated signal B, similar rearrangement is also performed by interleaver 4721.

Next, the configuration and operation of the multi-antenna reception apparatus of this embodiment will be explained. The overall configuration of the multi-antenna reception apparatus is same as that of FIG. 4. However, signal processing section 4900 in the configuration as shown in FIG. 51 is provided instead of signal processing section 404 in FIG. 4.

Figure 51:
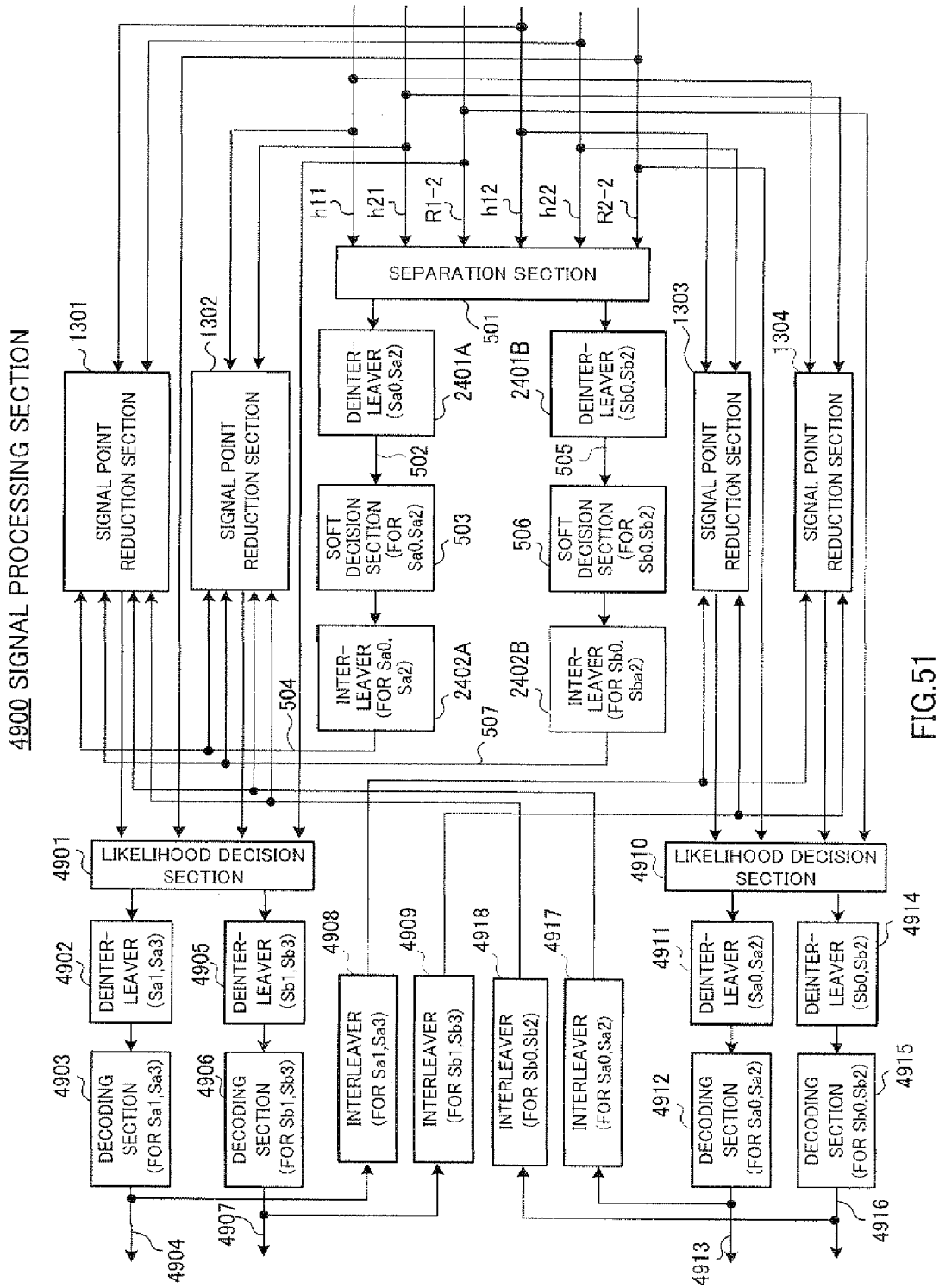
FIG. 51 is a block diagram showing a configuration example of a signal processing section of a multi-antenna reception apparatus of Embodiment 11.

In FIG. 51 which shows parts corresponding to those in FIG. 24 assigned the same reference numerals, signal processing section 4900 obtains estimated baseband signal 502 by rearranging the sequence of transmission digital signal A by deinterleaver 2401A for coded bits Sa0, Sa2, and then it obtains information on coded bits Sa0, Sa2 by performing soft decision decoding by soft decision decoding section 503 for coded bits Sa0, Sa2. Next, it rearranges the sequence by interleaver 2402A for coded bits Sa0, Sa2 and outputs coded bit sequence 504 of coded bits Sa0, Sa2 after interleaving.

The same applies to modulated signal B and estimated baseband signal 505 is obtained by rearranging the sequence of transmission digital signal B by deinterleaver 2401B for coded bits Sb0, Sb2 and then information on coded bits Sb0, Sb2 is obtained by performing soft decision decoding through soft decision decoding section 506 for coded bits Sb0, Sb2. Next, the sequence is rearranged by interleaver 2402B for coded bits Sb0, Sb2 and coded bit sequence 507 of coded bits Sb0, Sb2 after interleaving is output.

Processing of signal point reduction sections 1301, 1302 which operate next will be explained using FIG. 52.

FIG. 52(A) shows candidate signal points before signal point reduction (○: the candidate signal point) and a candidate signal point in this embodiment transmits 8 bits, and therefore there are 256 candidate signal points. Since 4 bits are determined from information 504 on coded bits Sa0, Sa2 after interleaving and information 507 on coded bits Sb0, Sb2 after interleaving, signal point reduction sections 1301, 1302 reduce 256 candidate signal points to 16 candidate signal points as shown in FIG. 52(B).

Then, likelihood decision section 4901 calculates the square of a Euclid distance between 16 candidate signal points and received baseband signal (■) as shown in FIG. 52(B) and obtains a branch metric. Since the branch metric is obtained for each antenna, 2 lines of branch metrics are obtained. Likelihood decision section 4901 calculates the sum of the branch metrics obtained from the respective antennas, determines coded bits Sa1, Sa3, Sb1, Sb3 based on the branch metrics and outputs coded bit Sa1, Sa3 to deinterleaver 4902 and outputs coded bits Sb1, Sb3 to deinterleaver 4905.

Deinterleaver 4902 rearranges the sequence of coded bits Sa1, Sa3 and sends coded bits Sa1, Sa3 after deinterleaving to decoding section 4903. Decoding section 4903 performs, for example, hard decision decoding on coded bits Sa1, Sa3 after deinterleaving and outputs information 4904 on coded bits Sa1, Sa3 after error correction.

In the same way, deinterleaver 4905 rearranges the sequence of coded bits Sb1, Sb3 and sends out coded bits Sb1, Sb3 after deinterleaving to decoding section 4906. Decoding section 4906 outputs information 4907 on coded bits Sb1, Sb3 after error correction by performing, for example, hard decision decoding on the coded bits after deinterleaving.

As shown above, coded bit Sa3 is obtained from coded bit Sa0 and also coded bit Sb3 is obtained from coded bit Sb0. At this time, because signal points are reduced, the conventional method would require 256 calculations to determine a Euclid distance for each antenna, but this method requires only 16 calculations, and can thereby reduce the calculation scale.

Hereinafter, the method of applying iterative decoding for further improvement of reception quality and the reason that an interleaving pattern is made to differ as shown above will be explained in detail.

First, the method of applying iterative decoding will be explained in detail. Interleaver 4908 receives coded bits Sa1, Sa3 after error correction obtained as shown above, applies interleaving for coded bit Sa1, Sa3 and sends coded bits Sa1, Sa3 after interleaving to signal point reduction sections 1303, 1304. In the same way, interleaver 4909 receives coded bits Sb1, Sb3 after error correction obtained as shown above, applies interleaving for coded bits Sb1, Sb3 and sends coded bits Sb1, Sb3 after interleaving to signal point reduction sections 1303, 1304.

Figure 52:
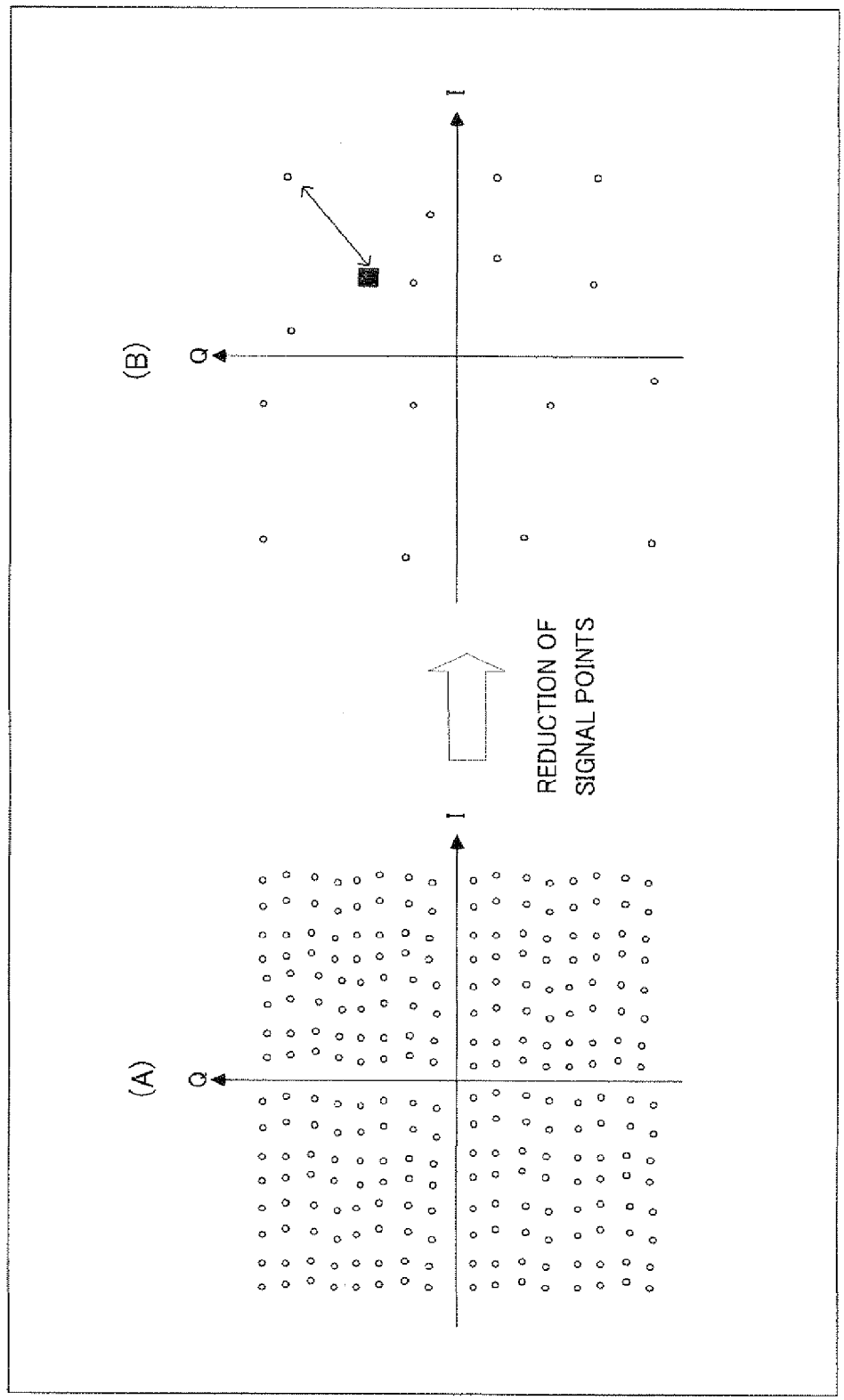
FIG. 52 illustrates signal point reduction processing by the signal point reduction section.

Signal point reduction sections 1303, 1304 receive information on coded bits Sa1, Sa3 after interleaving and information on coded bits Sb1, Sb3 after interleaving and reduces 256 candidate signal points to 16 candidate signal points using 4 bits determined by coded bits Sa1, Sa3 after interleaving and coded bits Sb1, Sb3 after interleaving as shown in FIG. 52.

Then, likelihood decision section 4910 calculates the square of a Euclid distance between 16 candidate signal points and received baseband signal (■) as shown in FIG. 52(B) and determines a branch metric. Since the branch metric is determined for each antenna, two lines of branch metrics are obtained. Likelihood decision section 4910 calculates the sum of the branch metrics calculated for the respective antennas, determines coded hits Sa0, Sa2, Sb0, Sb2 based on the branch metric and outputs coded bits Sa0, Sa2 to deinterleaver 4911 and outputs coded bits Sb0, Sb2 to deinterleaver 4914.

Deinterleaver 4911 rearranges the sequence of coded bits Sa0, Sa2 and sends coded bits Sa0, Sa2 after deinterleaving to decoding section 4912. Decoding section 4912 performs, for example, hard decision decoding on coded bits Sa0, Sa2 after deinterleaving and thereby outputs information 4913 on coded bits Sa0, Sa2 after error correction.

In the same way, deinterleaver 4914 rearranges the sequence of coded bits Sb0, Sb2 and sends coded bits Sb0, Sb2 after deinterleaving to decoding section 4915. Decoding section 4915 performs, for example, hard decision decoding on coded bits Sb0, Sb2 after deinterleaving and thereby outputs information 4916 on coded bits Sb0, Sb2 after error correction.

As shown above, information 4913, 4916 on coded bits Sa0, Sa2, Sb0, Sb2 with improved reception quality (error rate characteristic) is obtained.

Moreover, interleaver 4917 receives information 4913 on coded bits Sa0, Sa2 after error correction and sends information on coded bits Sa0, Sa2 after interleaving to signal point reduction sections 1301, 1302. In the same way, interleaver 4918 receives information 4916 on coded bits Sb0, Sb2 after error correction and sends information on coded bits Sb0, Sb2 after interleaving to signal point reduction sections 1301, 1302.

Then, by performing the above described operation by signal point reduction sections 1301, 1302, likelihood decision section 4901, deinterleavers 4902, 4905, decoding sections 4903, 4906, information 4904, 4907 on coded bits Sa1, Sa3, Sb1, Sb3 with the improved reception quality is obtained.

Figure 53:
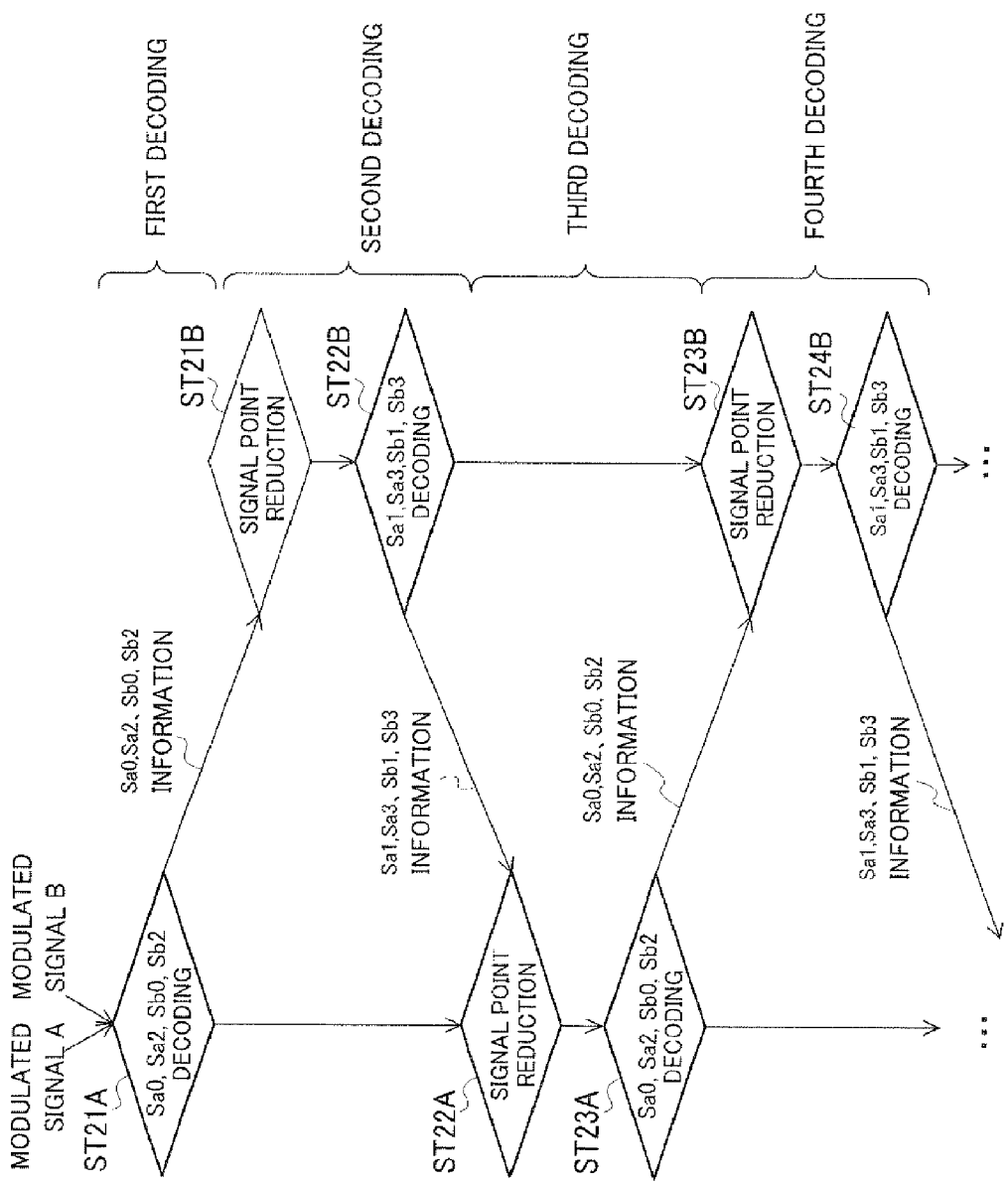
FIG. 53 shows an image of the decoding procedure in Embodiment 11.

The reception quality can be improved by performing the above operation a plurality of times. The flow chart of the processing is shown in FIG. 53.

First, coded bit Sa0, Sa2 of modulated signal A and coded bit Sb0, Sb2 of modulated signal B are decoded (ST21A). Next, signal points are reduced based on information on coded bits Sa0, Sa2, Sb0, Sb2 obtained (ST21B) and coded bits Sa1, Sa3 and coded bits Sb1, Sb3 are decoded (ST22B). Next, signal points are reduced based on information on coded bits Sa1, Sa3, Sb1, Sb3 obtained (ST22A) and coded bits Sa0, Sa2 and coded bits Sb0, Sb2 are decoded (ST23A). Hereinafter, similar processing will be repeated.

This embodiment proposes that the interleaving patterns of the interleaver for coded bits Sa0, Sa2 and the interleaver for coded bits Sb0, Sb2 are identical and the interleaving patterns of the interleaver for coded bits Sa1, Sa3 and the interleaver for coded bits Sb1, Sb3 are identical. The effect produced by this is that it is possible to reduce the error rate when signal points are reduced compared to the case where all interleaving patterns are made to differ.

However, the fact that the interleaving pattern of the interleaver for coded bits Sa0, Sa2 is made to differ from the interleaving pattern of the interleaver for coded bits Sa1, Sa3 is essentially important for improvement of reception quality. The reason will be described in detail below.

Figure 54:
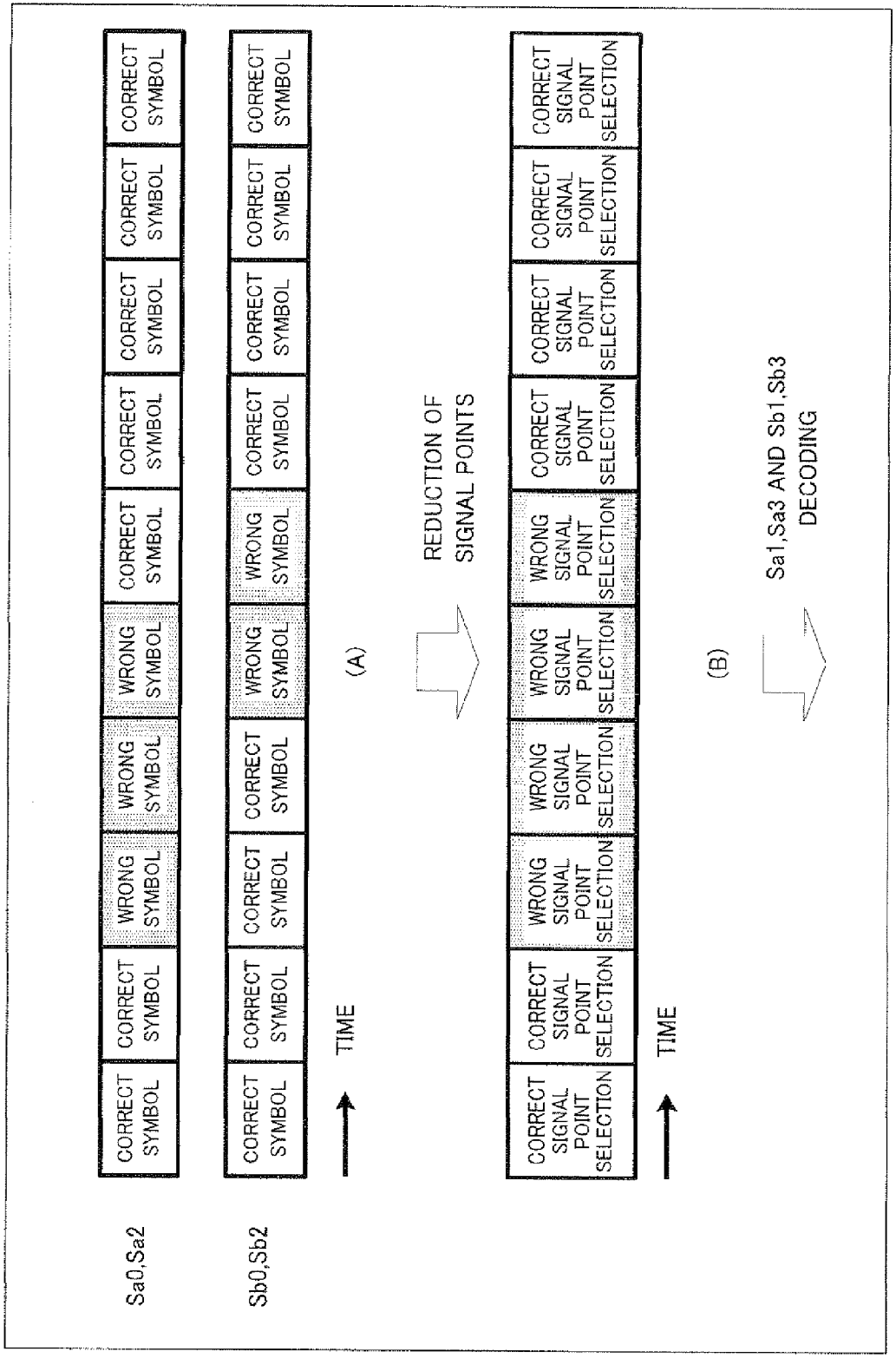
FIG. 54 shows the state of signal point selection when bit interleaving patterns are identical among modulated signals; (A) shows the state after a first decision and (B) shows the state after the number of signal points is reduced.

FIG. 54 shows an example of the reception state when the interleaving pattern of the interleaver for coded bits Sa0, Sa2 is identical to that of the interleaver for coded bits Sb0, Sb2, the interleaving pattern of the interleaver for coded bits Sa1, Sa3 is identical to that of the interleaver for coded bits Sb1, Sb3 and the interleaving pattern of the interleaver for coded bits Sa0, Sa2 is identical to that of the interleaver for coded bits Sa1, Sa3. That is, this is an example when the interleaving patterns of all interleavers are identical.

In such an interleaving pattern, suppose that symbols have been decided as errors consecutively as a result of decoding coded bits Sa0, Sa2 by soft decision section 503 in FIG. 51 as shown in FIG. 54(A). When a convolutional code or the like is used, errors generally occur consecutively. Then, when signal point number reduction sections 1301, 1302 reduce the number of signal points, errors occur consecutively when signal points are selected by a signal point reduction as shown in FIG. 54(B). As a result, even if decoding sections 4903, 4906 decode coded bits Sa1, Sa3 and coded bits Sb1, Sb3, the reception quality (error rate characteristic) does not improve effectively. This is because the ability to correct consecutive errors of error correcting codes is low.

Figure 55:
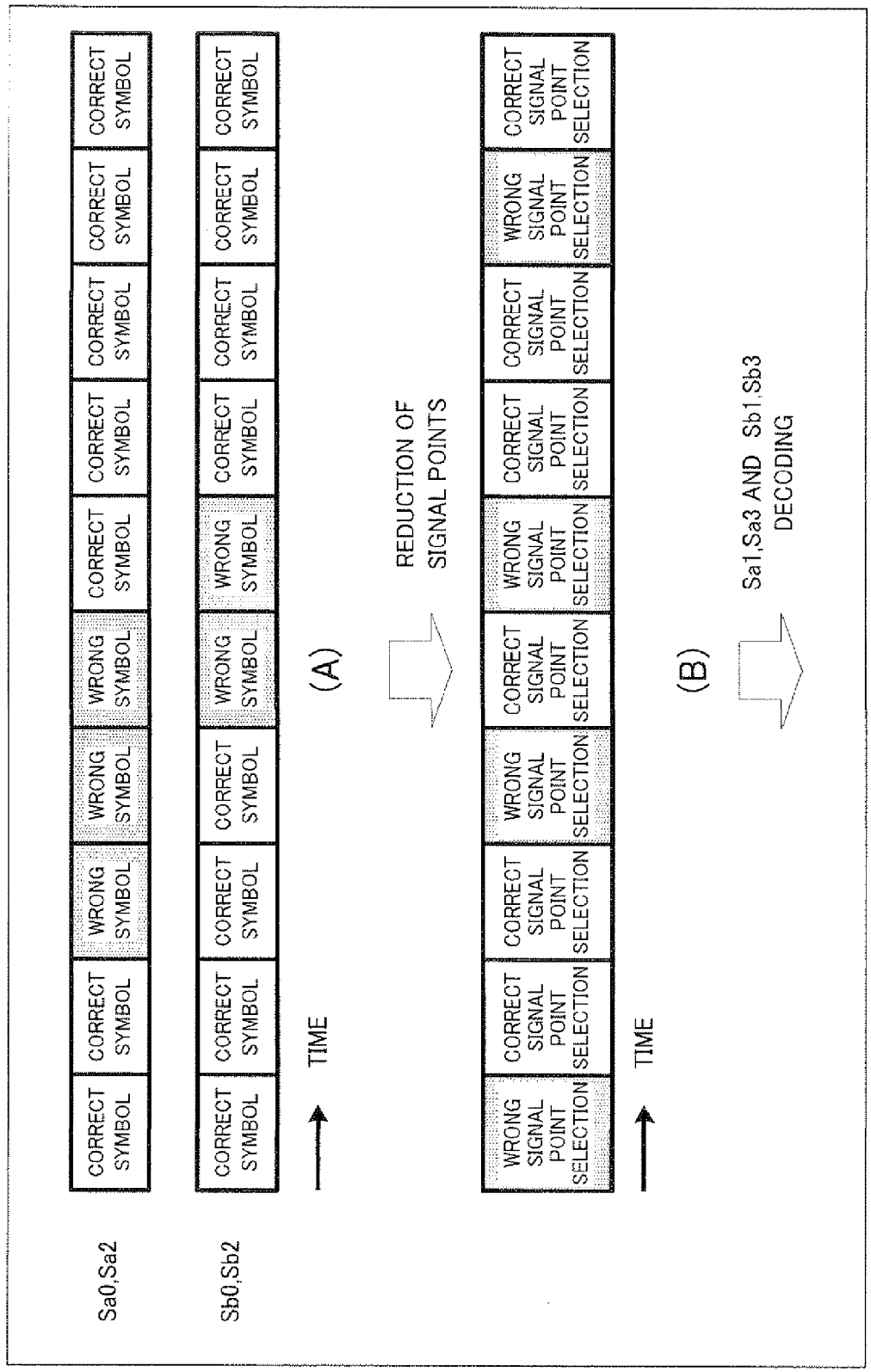
FIG. 55 shows the state of signal point selection when the bit interleaving pattern of Embodiment 11 is used; (A) shows the state after a first decision and (B) shows the state after the number of signal points is reduced.

FIG. 55 shows an example of the reception state when the interleaving pattern of the interleaver for coded bits Sa0, Sa2 is identical to that of the interleaver for coded bits Sb0, Sb2, the interleaving pattern of the interleaver for coded bits Sa1, Sa3 is identical to that of the interleaver for coded bits Sb1, Sb3 and the interleaving pattern of the interleaver for coded bits Sa0, Sa2 is different from that of the interleaver for coded bits Sa1, Sa3.

In such an interleaving pattern, suppose that symbols have been decided as errors consecutively as a result of decoding coded bits Sa0, Sa2 by soft decision section 503 in FIG. 51 as shown in FIG. 55(A). Then, when signal point number reduction sections 1301, 1302 reduce the number of signal points, unlike FIG. 55(B), the interleaving pattern of coded bits Sa0, Sa2 is different from the interleaving pattern of coded bits Sa1, Sa3, and therefore through deinterleaving, errors occur discretely when signal points are selected by a signal point reduction as shown in FIG. 55(B). That is, errors in signal point selection by a signal point reduction do not occur consecutively as shown in FIG. 54(B). When decoding sections 4903, 4906 decode coded bits Sa1, Sa3 and coded bits Sb1, Sb3, the error rate characteristic improves effectively. This is because the ability to correct discrete errors of the error correcting codes is high.

Moreover, because the interleaving pattern of the interleaver for coded bits Sa0, Sa2 is made identical to the interleaving pattern of the interleaver for coded bits Sb0, Sb2, the occurrence of errors in coded bits Sa0, Sa2 can be made identical to that of coded bit Sb0, Sb2.

For example, suppose the probability that coded bits Sa0, Sa2 may result in errors is $1/100$ and the probability that coded bits Sb0, Sb2 may result in errors is $1/100$. At this time, if the occurrence of errors of coded bit Sa0, Sa2 and that of coded bits Sb0, Sb2 are identical, the probability that the signal point reduction may result in errors is $1/100$. However, when the error occurrence pattern is different, the probability that the signal point reduction may result in errors becomes 1/100+1/100=1/50. Then, when the interleaving pattern is different, the possibility that the error occurrence pattern may differ increases.

Considering that signal points are reduced in this way, the interleaving pattern of the interleaver for coded bits Sa0, Sa2 is preferably identical to the interleaving pattern of the interleaver for coded bits Sb0, Sb2.

However, even if all interleaving patterns are different, it is possible to cause errors in signal point selection by a signal point reduction to occur discretely as described above, and therefore it is possible to obtain the effect of improving the error rate characteristic in the same way. That is, making all interleaving patterns different is not an indispensable requirement and it is possible to demonstrate similar effects in the respect that if not all patterns are identical, it is possible to cause errors in signal point selection by a signal point reduction to occur discretely.

In this way, according to this embodiment, the bit interleaving pattern of the modulated signal to be transmitted from each antenna is made different, and therefore when the receiving side performs decoding, it is possible to realize a multi-antenna transmission apparatus capable of reducing influences of burst errors and obtaining received data with a good error rate characteristic.

Furthermore, out of the plurality of interleavers provided for each modulated signal, the interleaver between modulated signals is made to create a pair of the same interleaving pattern (interleaver 4708 and interleaver 4719, and interleaver 4710 and interleaver 4721), and therefore it is possible to reduce the probability that errors occur when signal points are reduced and obtain received data with a much better error rate characteristic.

The above described embodiment has explained an example in which the present invention is applied to a spectrum spreading communication scheme, but the present invention is not limited to this and the present invention is also applicable to a single carrier scheme or an OFDM scheme which is not a spectrum spreading communication scheme. When applied to the OFDM scheme, the coding method can be a method of coding in the time axis direction as shown in FIG. 54 or can be a method of coding in the frequency axis direction considering the horizontal axis in FIG. 54 as the frequency axis. In addition, coding can also be performed in both the time axis and frequency axis directions.

At this time, as explained in Embodiment 7, when interleaving pattern X is such a pattern that data is rearranged from high frequency subcarriers to low frequency subcarriers and interleaving pattern Y is such a pattern that data is rearranged from low frequency subcarriers to high frequency subcarriers, it is possible to effectively improve the error rate characteristic and also further simplify the circuit configuration.

Moreover, the interleaving method explained in this embodiment using the figures is only an example and not limited to this. Ideally, random interleaving is suitable.

The above described Embodiment has described the ease where interleaving is performed using interleavers as an example, but when the present invention is applied to an OFDM scheme, it is possible to perform interleaving through processing of mapping to each subcarrier. By so doing, interleavers can be omitted.

Embodiment 12

This embodiment proposes a method of bit interleaving which is different from Embodiment 11.

Figure 56:
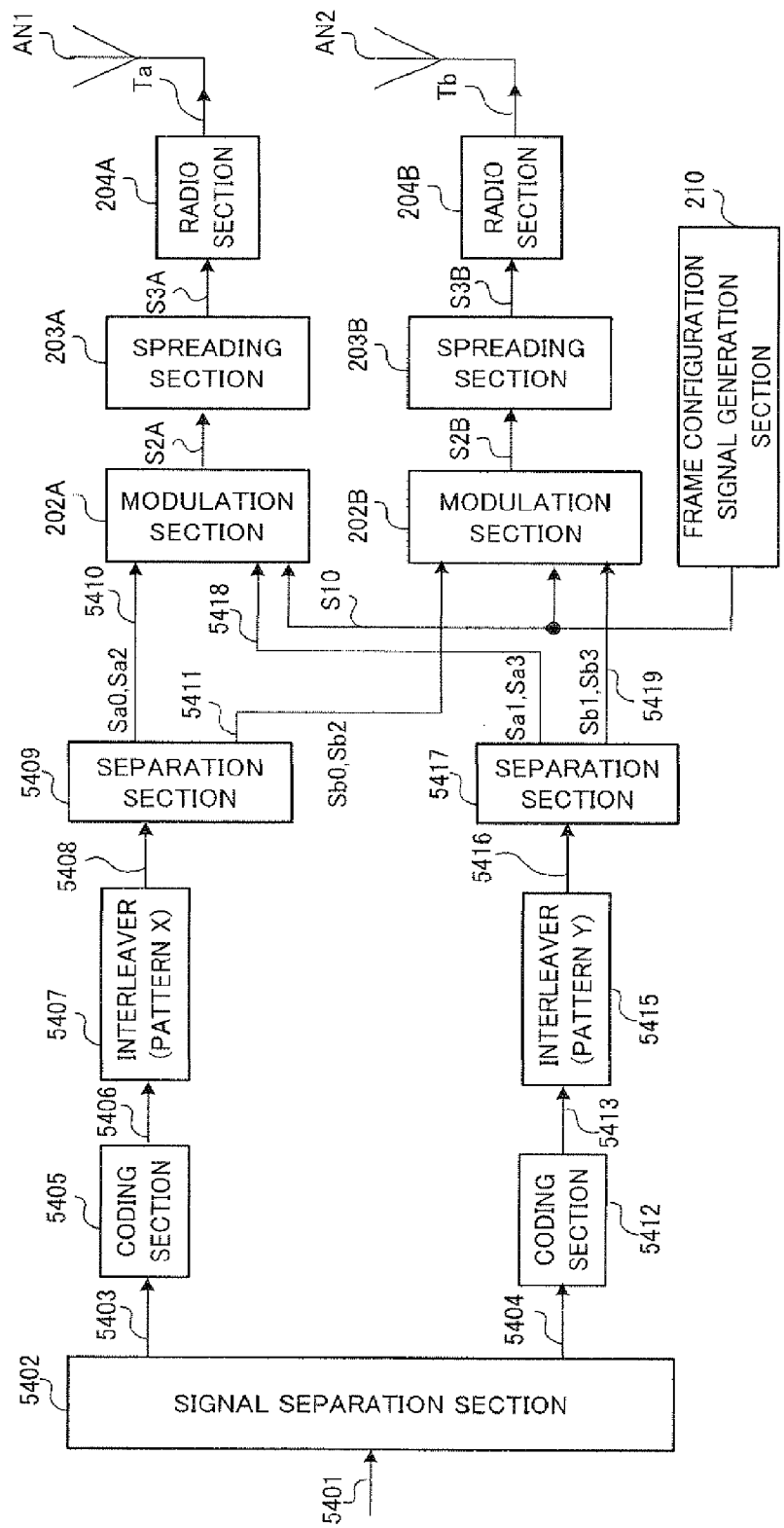
FIG. 56 is a block diagram showing the configuration of a multi-antenna transmission apparatus of Embodiment 12.

FIG. 56 which shows parts corresponding to those in FIG. 2 assigned the same reference numerals shows the configuration of the multi-antenna transmission apparatus of this embodiment. Multi-antenna transmission apparatus 5400 of this embodiment differs from multi-antenna transmission apparatus 4700 of Embodiment 11 in that coded bits Sa0, Sa2 of modulated signal A are coded together with coded bits Sb0, Sb2 of modulated signal B and also coded bits Sa1, Sa3 of modulated signal A are coded together with coded bits Sb1, Sb3 of modulated signal B.

Multi-antenna transmission apparatus 5400 inputs transmission digital signal 5401 to signal separation section 5402. Signal separation section 5402 separates transmission digital signal 5401 into 2 lines of digital signal 5403 and digital signal 5404, sends digital signal 5403 to coding section 5405 and sends digital signal 5404 to coding section 5412. Coding section 5405 performs coding (e.g., convolutional coding) on digital signal 5403, obtains bit sequence 5406 and sends this bit sequence to interleaver 5407. Coding section 5412 performs coding (e.g., convolutional coding) on digital signal 5404, obtains bit sequence 5413 and sends this bit sequence to interleaver 5415.

Interleaver 5407 applies interleaving in interleaving pattern X to coded bit sequence 5406 and sends coded bit sequence 5408 after interleaving to separation section 5409. Separation section 5409 separates coded bit sequence 5408 after interleaving into coded bit sequence 5410 including coded bits Sa0, Sa2 and coded bit sequence 5411 including coded bits Sb0, Sb2, sends coded bit sequence 5410 to modulation section 202A and sends coded bit sequence 5411 to modulation section 202B respectively.

Interleaver 5415 applies interleaving in interleaving pattern Y to coded bit sequence 5413 and sends coded bit sequence 5416 after interleaving to separation section 5417. Separation section 5417 separates coded bit sequence 5416 after interleaving into coded bit sequence 5418 including coded bits Sa1, Sa3 and coded bit sequence 5419 including coded bits Sb1, Sb3, sends coded bit sequence 5418 to modulation section 202A and sends coded bit sequence 5419 to modulation section 202B respectively.

Modulation section 202A assigns any one of 16 points in FIG. 48(A) according to coded bits Sa0, Sa2 and coded bits Sa1, Sa3 and outputs baseband signal S2A indicating the signal point. In the same way, modulation section 202B assigns any one of 16 points in FIG. 48(B) according to coded bits Sb0, Sb2 and coded bits Sb1, Sb3 and outputs baseband signal S2B indicating the signal point.

Here, interleaving pattern X of interleaver 5407 and interleaving pattern Y of interleaver 5415 are supposed to be different. This allows the receiving side to obtain received data having a good error rate characteristic when signal points are reduced.

Figure 57:
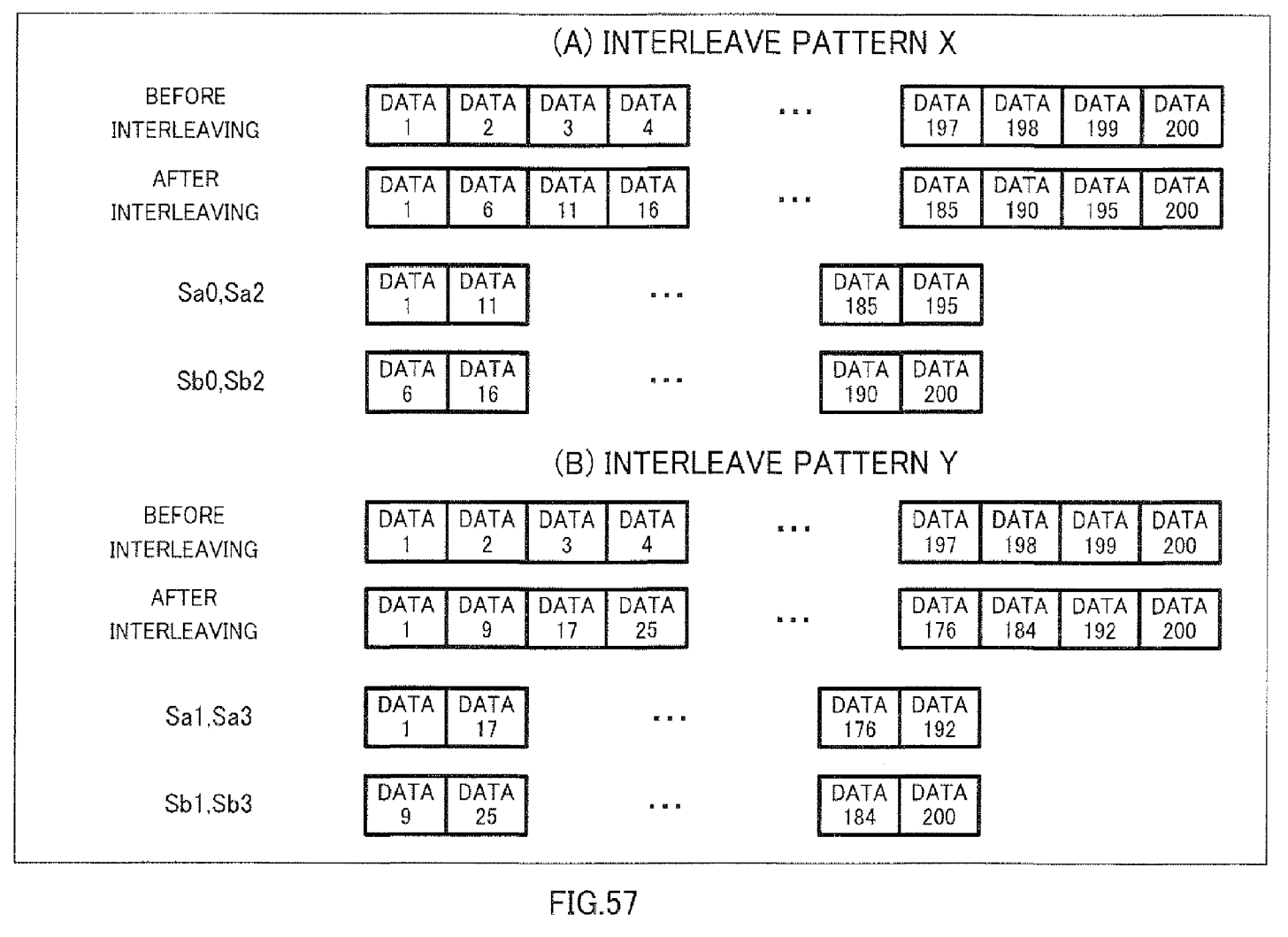

Example of bit interleaving by interleavers 5407, 5415 are shown in FIG. 57. FIG. 57 shows a data sequence before interleaving and after interleaving.

FIG. 57(A) shows an interleaving method in interleaving pattern X. The data sequence before interleaving is numbered as data 1, data 2, data 200. Here, interleaver 5407 rearranges data for every fifth data (since this processing is the same as the interleaving processing of coded bits Sa0, Sa2 in FIG. 50 explained in Embodiment 11, detailed explanations thereof will be omitted).

Then, the data lined after interleaving is assigned alternately to coded bits Sa0, Sa2 and coded bits Sb0, Sb2. Therefore, the data of coded bits Sa0, Sa2 has a sequence of data 1, data 11, ..., data 185, data 195, and the data of coded bits Sb0, Sb2 has a sequence of data 6, data 16, ..., data 190, data 200.

FIG. 57(B) shows an interleaving method in interleaving pattern Y. The data sequence before interleaving is numbered as data 1, data 2, . . . , data 200. Here, interleaver 5415 rearranges data for every eighth data (since this processing is the same as the interleaving processing of coded bits Sa0, Sa2 in FIG. 50 explained in Embodiment 11, detailed explanations thereof will be omitted).

Then, the data lined after interleaving is assigned alternately to coded bits Sa0, Sa3 and coded bits Sb1, Sb3. Therefore, the data of coded bits Sa1, Sa3 has a sequence of data 1, data 17, . . . , data 176, data 192, and the data of coded bits Sb0, Sb2 has a sequence of data 9, data 25, . . . , data 184, data 200.

Figure 58:
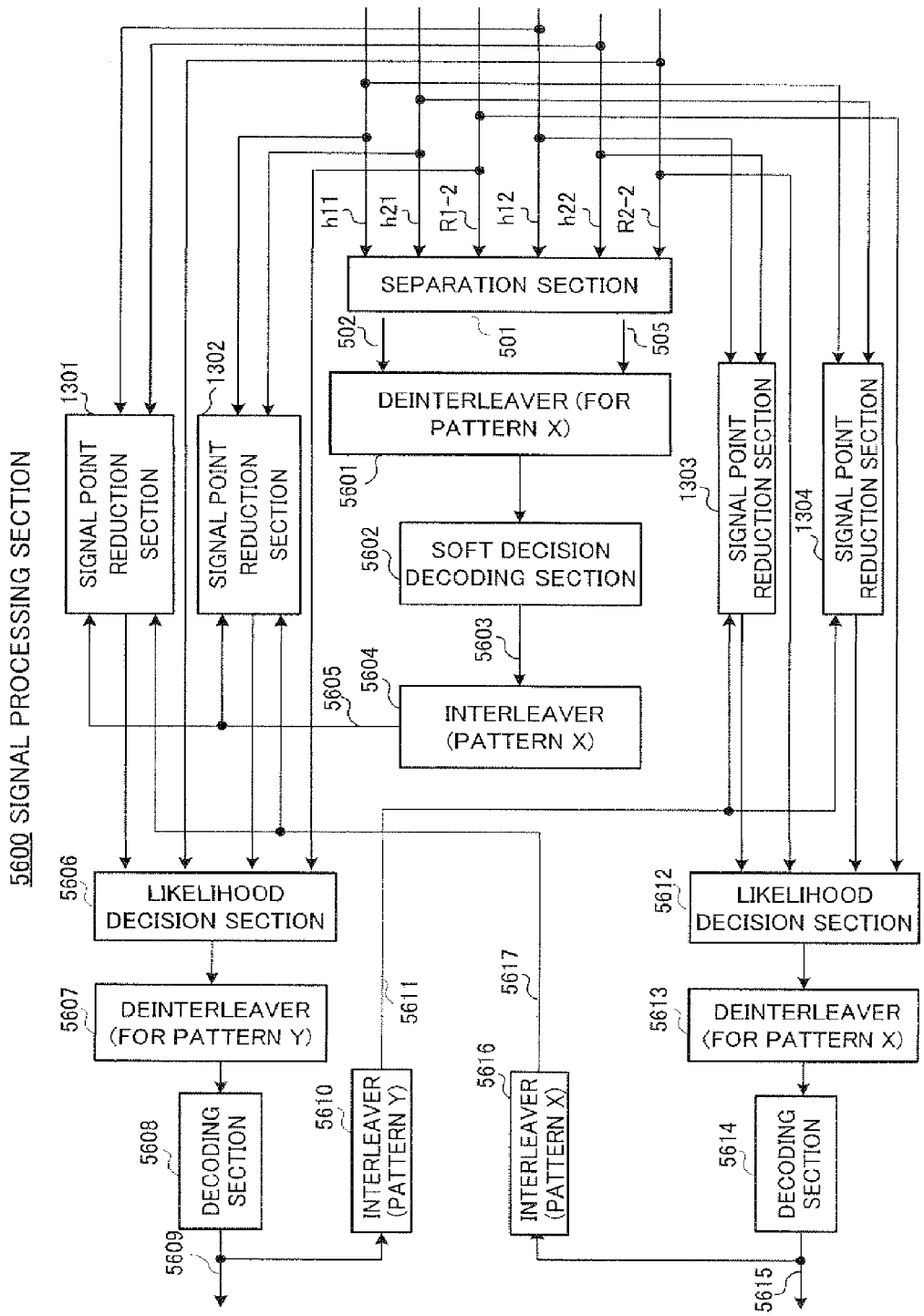
FIG. 58 is a block diagram showing a configuration example of a signal processing section of the multi-antenna reception apparatus of Embodiment 12.

Next, the configuration and operation of the multi-antenna reception apparatus of this embodiment will be explained. The overall configuration of the multi-antenna reception apparatus is the same as that shown in FIG. 4. However, signal processing section 5600 in a configuration as shown in FIG. 58 is provided instead of signal processing section 404 in FIG. 4.

In FIG. 56 which shows parts corresponding to those in FIG. 13 assigned the same reference numerals, signal processing section 5600 rearranges estimated baseband signal 504 of modulated signal A and estimated baseband signal 505 of modulated signal B by deinterleaver 5601 for pattern X. Estimated baseband signal after deinterleaving is sent to soft decision decoding section 5602.

Soft decision decoding section 5602 obtains information 5603 on coded bits Sa0, Sa2 and coded bits Sb0, Sb2 by applying soft decision decoding processing to the estimated baseband signal after deinterleaving and sends this to interleaver 5604 for pattern X. Interleaver 5604 for pattern X applies interleaving in pattern X to information 5603 on coded bits Sa0, Sa2 and coded bits Sb0, Sb2 and sends information 5605 on coded bits Sa0, Sa2 and coded bit Sb0, Sb2 after interleaving to signal point reduction sections 1301, 1302.

Processing of signal point reduction sections 1301, 1302 which operate next will be explained using FIG. 52.

FIG. 52(A) shows candidate signal points before a signal point reduction (○: candidate signal point) and a candidate signal point in this embodiment transmits 8 bits, and therefore there are 256 candidate signal points. Since 4 bits are determined from information 5605 on coded bits Sa0, Sa2 and coded bits Sb0, Sb2 after interleaving, signal point reduction sections 1301, 1302 reduce 256 candidate signal points to 16 candidate signal points as shown in FIG. 52(B).

Then, likelihood decision section 5606 calculates the square of a Euclid distance between 16 candidate signal points and received baseband signal (■) as shown in FIG. 52(B) and obtains a branch metric. Since a branch metric is obtained for each antenna, 2 lines of branch metrics are obtained. Likelihood decision section 5606 calculates the sum of the branch metrics obtained from the respective antennas, determines coded bits Sa1, Sa3 and coded bits Sb1, Sb3 based on the branch metrics and outputs these coded bits to deinterleaver 5607 for pattern Y.

Deinterleaver 5607 for pattern Y rearranges the sequence of information on coded bits Sa1, Sa3 and coded bits Sb1, Sb3 and sends out the information on coded bits Sa1, Sa3 and coded bits Sb1, Sb3 after deinterleaving to decoding section 5608. Decoding section 5608 outputs information 5609 on coded bits Sa1, Sa3 and coded bits Sb1, Sb3 after error correction by performing, for example, hard decision decoding on the information on coded bits Sa1, Sa3 and coded bits Sb1, Sb3 after deinterleaving.

As shown above, coded bit Sa3 is obtained from coded bit Sa0 and coded bit Sb3 is obtained from coded bit Sb0. At this time, because signal points are reduced, the conventional method would require 256 calculations to determine a Euclid distance for each antenna, but this method requires only 16 calculations, and can thereby reduce the calculation scale.

Hereinafter, the method of applying iterative decoding to further improve reception quality and the reason that an interleaving pattern is made to differ as described above will be explained in detail.

First, the method of applying iterative decoding will be explained in detail. Interleaver 5610 for pattern Y applies interleaving in pattern X to information 5609 on coded bits Sa1, Sa3 and coded bits Sb1, Sb3 after error correction obtained as shown above and sends information 5611 on coded bits Sa1, Sa3 and coded bits Sb1, Sb3 after interleaving to signal point reduction sections 1303, 1304.

Signal point reduction sections 1303, 1304 receive information 5611 on coded bits Sa1, Sa3 after interleaving and coded bits Sb1, Sb3 after interleaving and reduces 256 candidate signal points to 16 candidate signal points using 4 bits determined by coded bits Sa1, Sa3 and coded bits Sb1, Sb3 after interleaving as shown in FIG. 52.

Then, likelihood decision section 5612 calculates the square of a Euclid distance between 16 candidate signal points and received baseband signal (■) as shown in FIG. 52(B) and determines a branch metric. Since a branch metric is determined for each antenna, two lines of branch metrics are obtained. Likelihood decision section 5612 calculates the sum of the branch metrics calculated from the respective antennas, determines coded bits Sa0, Sa2, Sb0, Sb2 based on the branch metric and sends information on coded bits Sa0, Sa2, Sb0, Sb2 to deinterleaver 5613 for pattern X.

Deinterleaver 5613 for pattern X rearranges the sequence of information on coded bits Sa0, Sa2 and coded bits Sb0, Sb2, thereby obtains information on coded bits Sa0, Sa2 and coded bits Sb0, Sb2 after deinterleaving and sends this information to decoding section 5614. Decoding section 5614 performs, for example, hard decision decoding on coded bits Sa0, Sa2 and coded bits Sb0, Sb2 after deinterleaving and thereby outputs information 5615 on coded bits Sa0, Sa2 and Sb0, Sb2 after error correction.

As shown above, information 5609, 5615 on coded bits Sa0, Sa2, Sb0, Sb2 with improved reception quality (error rate characteristic) are obtained.

Moreover, interleaver 5616 receives information 5615 on coded bits Sa0, Sa2 and coded bits Sb0, Sb2 after error correction and sends information on coded bits Sa0, Sa2 and coded bits Sb0, Sb2 after interleaving to signal point reduction sections 1301, 1302.

Then, information 5609, 5615 on coded bits Sa1, Sa3, Sb1, Sb3 with the improved reception quality are obtained by performing the above described operations at signal point reduction sections 1301, 1302, likelihood decision section 5606, deinterleaver 5607 and decoding section 5608.

The reception quality can be improved by performing the above described operations a plurality of times. The flow chart of this processing is shown in FIG. 53.

First, coded bits Sa0, Sa2 of modulated signal A and coded bits Sb0, Sb2 of modulated signal B are decoded (ST21A). Next, signal points are reduced based on the information on coded bits Sa0, Sa2, Sb0, Sb2 obtained (ST21B) and coded bits Sa1, Sa3 and coded bits Sb1, Sb3 are decoded (ST22B). Next, signal points are reduced based on the information on coded bits Sa1, Sa3, Sb1, Sb3 obtained (ST22A) and coded bits Sa0, Sa2 and coded bits Sb0, Sb2 are decoded (ST23A). Hereinafter, similar processing will be repeated.

The fact that the interleaving pattern of the interleaver is made different (pattern X and pattern Y are different) in this embodiment is important for improvement of the reception quality. The reason will be explained in detail below.

Figure 59:
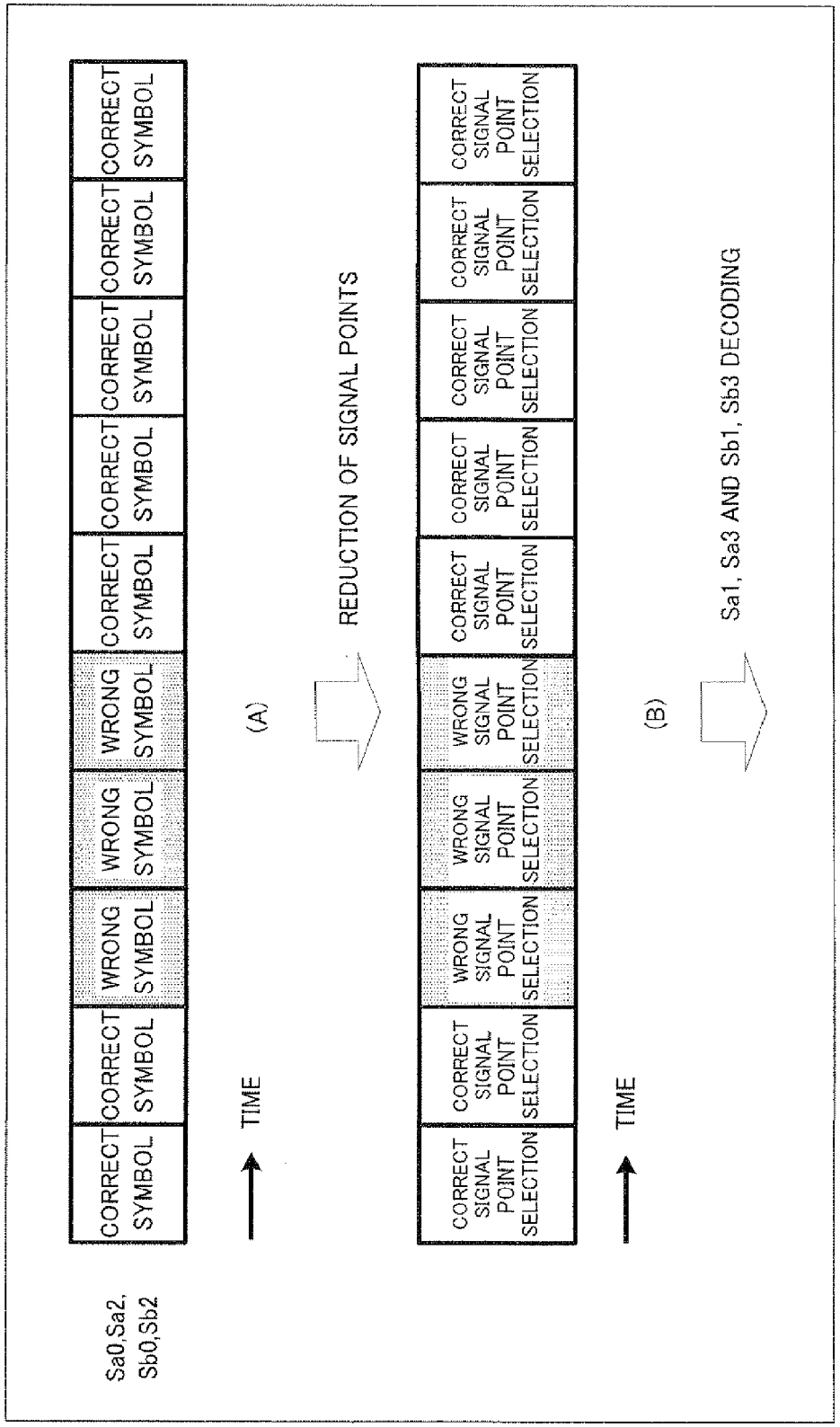
FIG. 59 shows the state of signal point selection when bit interleaving patterns are identical among modulated signals; (A) shows the state after a first decision and (B) shows the state after the number of signal points is reduced.

FIG. 59 shows an example of the reception state when pattern X (the interleaving pattern for coded bits Sa0, Sa2, Sb0, Sb2) is identical to pattern Y (the interleaving pattern for coded bits Sa1, Sa3, Sb1, Sb3).

In such an interleaving pattern, suppose that symbols have been decided as errors consecutively as shown in FIG. 59(A) as a result of decoding coded bits Sa0, Sa2, Sb0, Sb2 at soft decision section 5602 in FIG. 58. When a convolutional code or the like is used, errors generally occur consecutively. Then, when signal point number reduction sections 1301, 1302 reduce the number of signal points, errors occur consecutively in signal point selection by a signal point reduction as shown in FIG. 59(B). As a result, even if decoding section 5608 decodes coded bits Sa1, Sa3 and coded bits Sb1, Sb3, the reception quality (error rate characteristic) does not improve effectively. This is because the ability to correct consecutive errors of the error correcting code is low.

Figure 60:
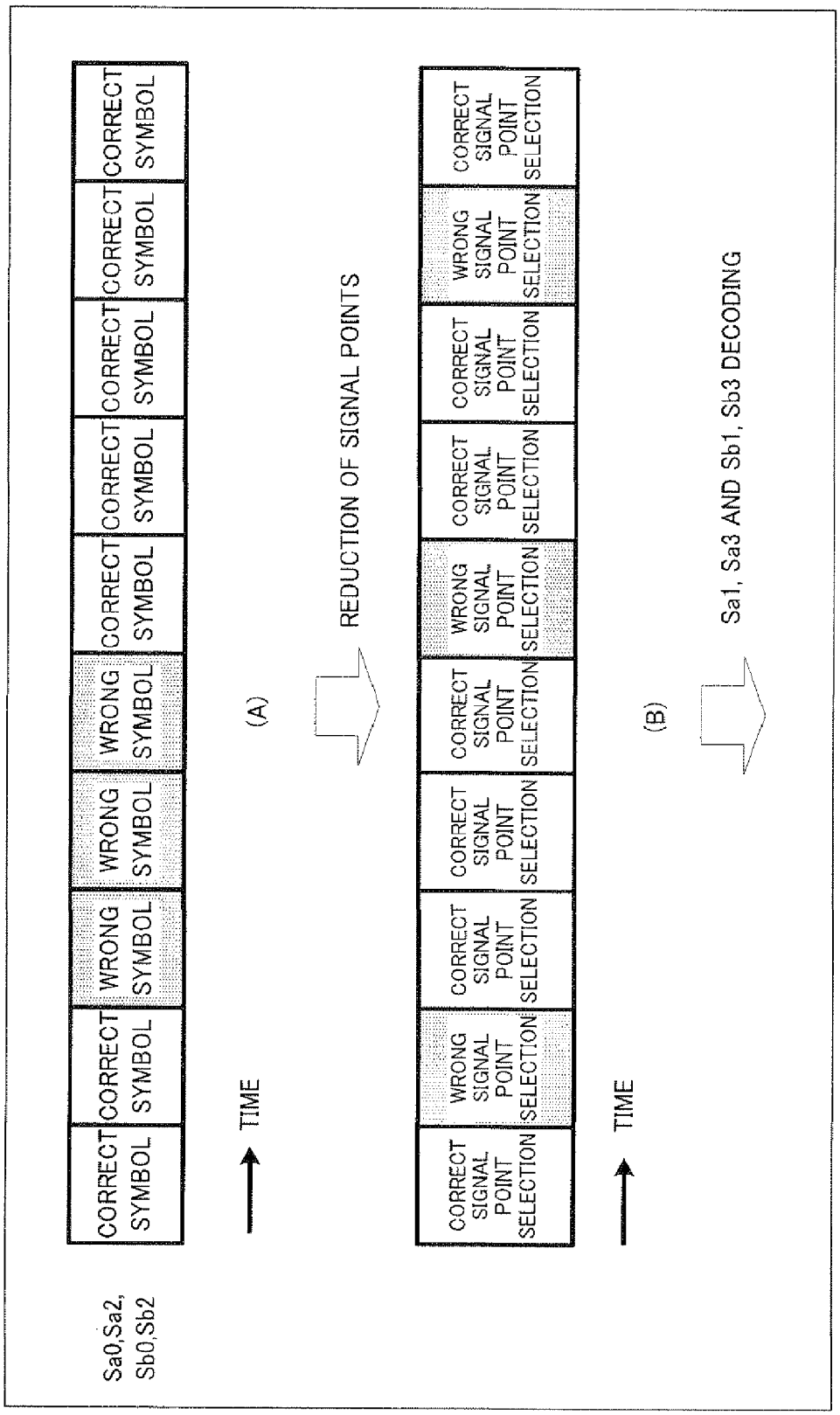
FIG. 60 shows the state of signal point selection when the bit interleaving pattern of Embodiment 12 is used; (A) shows the state after a first decision and (B) shows the state after the number of signal points is reduced.

FIG. 60 shows an example of the reception state when pattern X (the interleaving pattern for coded bits Sa0, Sa2, Sb0, Sb2) is made different from pattern Y (the interleaving pattern for coded bits Sa1, Sa3, Sb1, Sb3).

In such an interleaving pattern, suppose that symbols have been decided as errors consecutively as shown in FIG. 60(A) as a result of decoding coded bits Sa0, Sa2, Sb0, Sb2 at soft decision section 5602 in FIG. 58. Then, when signal point number reduction sections 1301, 1302 reduce the number of signal points, unlike FIG. 59(B), interleaving pattern X is different from interleaving pattern Y, and therefore through deinterleaving, errors in signal point selection by a signal point reduction occur discretely as shown in FIG. 60(B). That is, errors in signal point selection by a signal point reduction do not occur consecutively as shown in FIG. 60(B). In this way, when decoding section 5608 decodes coded bits Sa1, Sa3 and coded bits Sb1, Sb3, the error rate characteristic improves effectively. This is because the ability to correct discrete errors of the error correcting code is high.

In this way, according to this embodiment, bit interleaving patterns of modulated signals to be transmitted from different antennas are made to differ from each other, and therefore when the receiving side performs decoding, it is possible to realize a multi-antenna transmission apparatus capable of reducing influences of burst errors and obtaining received data with a good error rate characteristic. Furthermore, because this embodiment makes it possible to reduce the number of coding sections compared to Embodiment 11, it contributes to a reduction of the amount of calculation and a reduction of the circuit scale.

The above described Embodiment has explained an example where the present invention is applied to a spectrum spreading communication scheme, but the present invention is not limited to this and the present invention is also applicable to a single carrier scheme or an OFDM scheme which is not a spectrum spreading communication scheme. When applied to an OFDM scheme, the coding method can be a method of coding in the time axis direction as shown in FIG. 60 or coding in the frequency axis direction assuming the horizontal axis in FIG. 60 as the frequency axis. In addition, coding can also be performed in both the time axis and frequency axis directions.

At this time, as explained in Embodiment 7, adopting a pattern in which data is rearranged from high frequency subcarriers to low frequency subcarriers for interleaving pattern X and adopting a pattern in which data is rearranged from low frequency subcarriers to high frequency subcarriers for interleaving pattern Y can effectively improve the error rate characteristic and also simplify the circuit configuration.

Moreover, the interleaving method explained in this embodiment with drawings is only an example and the interleaving method is not limited to this. Ideally, random interleaving is suitable.

Furthermore, the above described embodiment has described the case where interleaving is performed using an interleaver, but when applied to an OFDM scheme, for example, it is also possible to perform interleaving through processing of mapping to each subcarrier. By so doing, the interleaver can be omitted.

Embodiment 13

Embodiment 6 has proposed the multi-antenna transmission apparatus in which interleaving patterns of modulated signals transmitted from different antennas are made to differ from one modulated signal to another. This embodiment will describe a specific example of the apparatus when bit interleaving is applied as interleaving. That is, this embodiment is basically the same as Embodiment 11 and Embodiment 12 in the aspect of carrying out bit interleaving processing, but this embodiment will explain an example where bit interleaving is applied to the basic configuration of Embodiment 6 as is.

FIG. 48 shows a signal constellation example on the I-Q plane of modulated signal A and modulated signal B transmitted by the multi-antenna transmission apparatus of this embodiment.

The basic configuration of the multi-antenna transmission apparatus in this embodiment is same as that in FIG. 23 explained in Embodiment 6 and the operation is same as that in Embodiment 6.

The method of bit interleaving by interleavers 2301A, 2301B when adopting the configuration as shown in F10.23 will be explained in detail using FIG. 61. Interleaver 2301A performs interleaving processing using interleaving pattern X in FIG. 61(A) and interleaver 2301B performs interleaving processing using interleaving pattern Y in FIG. 61(B).

Figure 61:
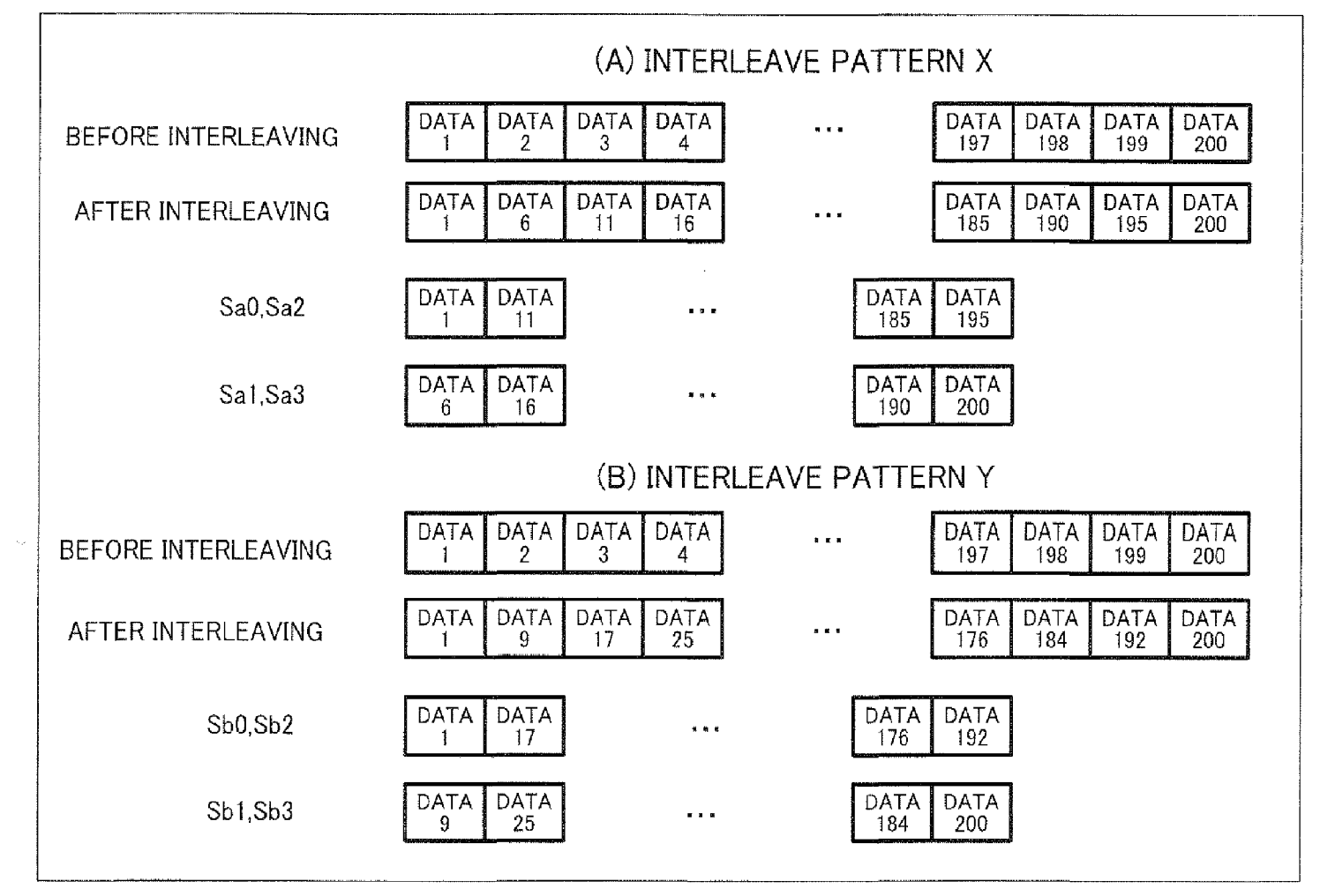

FIG. 61 shows an example of data sequence before interleaving, after interleaving and after separation. FIG. 61(A) shows an interleaving method in interleaving pattern X. The sequence before interleaving is numbered as data 1, data 2, ..., data 200. Through interleaving, data is rearranged for every fifth data (since this processing is the same as the interleaving processing of coded bits Sa0, Sa2 in FIG. 50 explained in Embodiment 11, detailed explanations thereof will be omitted).

Then, the data lined after interleaving is assigned alternately to coded bits Sa0, Sa2 and coded bits Sa1, Sa3. Therefore, the data of coded bits Sa0, Sa2 has a sequence of data 1, data 11, ..., data 185, data 195, and the data of coded bits Sa1, Sa3 has a sequence of data 6, data 16, ..., data 190, data 200.

FIG. 61(B) shows an interleaving method in interleaving pattern Y. The data sequence before interleaving is numbered as data 1, data 2, ..., data 200. Through interleaving, data is rearranged for every eighth data (since this processing is the same as the interleaving processing of coded bits Sa1, Sa3 in FIG. 50 explained in Embodiment 11, detailed explanations thereof will be omitted).

Then, the data lined after interleaving is assigned alternately to coded bits Sb0, Sb2 and coded bits Sb1, Sb3. Therefore, the data of coded bits Sb0, Sb2 has a sequence of data 1, data 17, ..., data 176, data 192, and the data of coded bits Sb0, Sb2 has a sequence of data 9, data 25, ..., data 184, data 200.

Modulation sections 202A, 202B in FIG. 23 perform modulation by assigning any one of 16 points in FIG. 48(A), 48(B) according to coded bits bit-interleaved as shown above.

Next, the configuration of the multi-antenna reception apparatus which receives the plurality of modulated signals A, B subjected to bit interleaving processing in this way will be explained. The configuration in FIG. 24 explained in Embodiment 6 is considered as one of the configurations of the multi-antenna reception apparatus (configuration of the signal processing section) and the operation is the same as that of Embodiment 6 except in that bit deinterleaving processing and interleaving processing are performed by each deinterleaver and interleaver.

Figure 62:
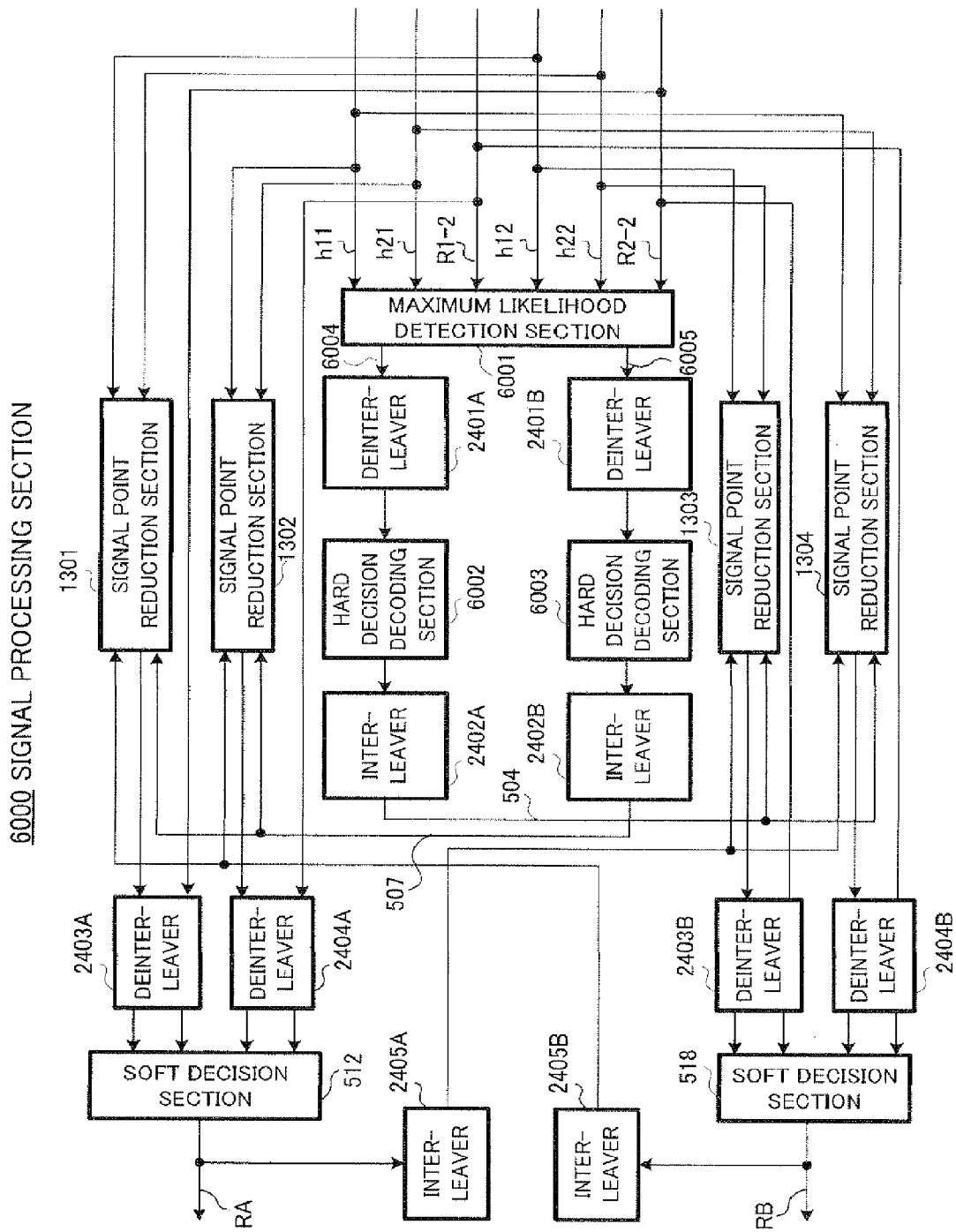
FIG. 62 is a block diagram showing a configuration example of a signal processing section of a multi-antenna reception apparatus of Embodiment 13.

This embodiment has the configuration different from that in FIG. 24 and will explain a configuration example as shown in FIG. 62. In FIG. 62 which shows parts corresponding to those in FIG. 24 assigned the same reference numerals, maximum likelihood detection section 6001 of signal processing section 6000 receives channel estimated values h11, h21, h12, h22, baseband signals R1-2, R2-2, performs a maximum likelihood detection, and thereby obtains information 6004 on coded bits Sa0, Sa1, Sa2, Sa3, sends this information to deinterleaver 2401A and obtains information 6005 on coded bits Sb0, Sb1, Sb2, Sb3 and sends this information to deinterleaver 2401B.

Information 6004 on coded bits Sa0, Sa1, Sa2, Sa3 and information 6005 on coded bits Sb0, Sb1, Sb2, Sb3 deinterleaved by deinterleavers 2401A, 2401B are subjected to hard decision decoding by hard decision decoding sections 6002, 6003 and output. The other parts operate in the same way as in Embodiment 6.

In signal processing section 6000, bit interleaving pattern X of modulated signal A is different from bit interleaving pattern Y of modulated signal B, and therefore it is possible to obtain received data RA, RB with a good error rate characteristic for the same reason as that explained in Embodiment 11 and Embodiment 12.

In this way, according to this embodiment, when interleaving patterns of modulated signals transmitted from different antennas are made to differ from one modulated signal to another, bit interleaving patterns are made to differ from one modulated signal to another, and therefore when decoding on the receiving side, it is possible to realize a multi-antenna transmission apparatus and multi-antenna reception apparatus capable of reducing influences of burst errors and obtaining received data with a good error rate characteristic.

The configuration of signal processing section 6000 explained in this embodiment can also be applied to embodiments such as Embodiment 6. That is, the maximum likelihood detection can be used for a provisional decision.

This embodiment has explained the configuration of a multi-antenna transmission apparatus in which bit interleaving patterns are made to differ from one modulated signal to another using multi-antenna transmission apparatus 2300 in FIG. 23 and the bit interleaving patterns in FIG. 61, but the overall configuration of the multi-antenna apparatus and bit interleaving patterns are not limited to those shown in FIG. 23 and FIG. 61. Especially, various types of bit interleaving patterns can be applied and it is essential only that the bit interleaving patterns be different from one modulated signal to another.

Figure 63:
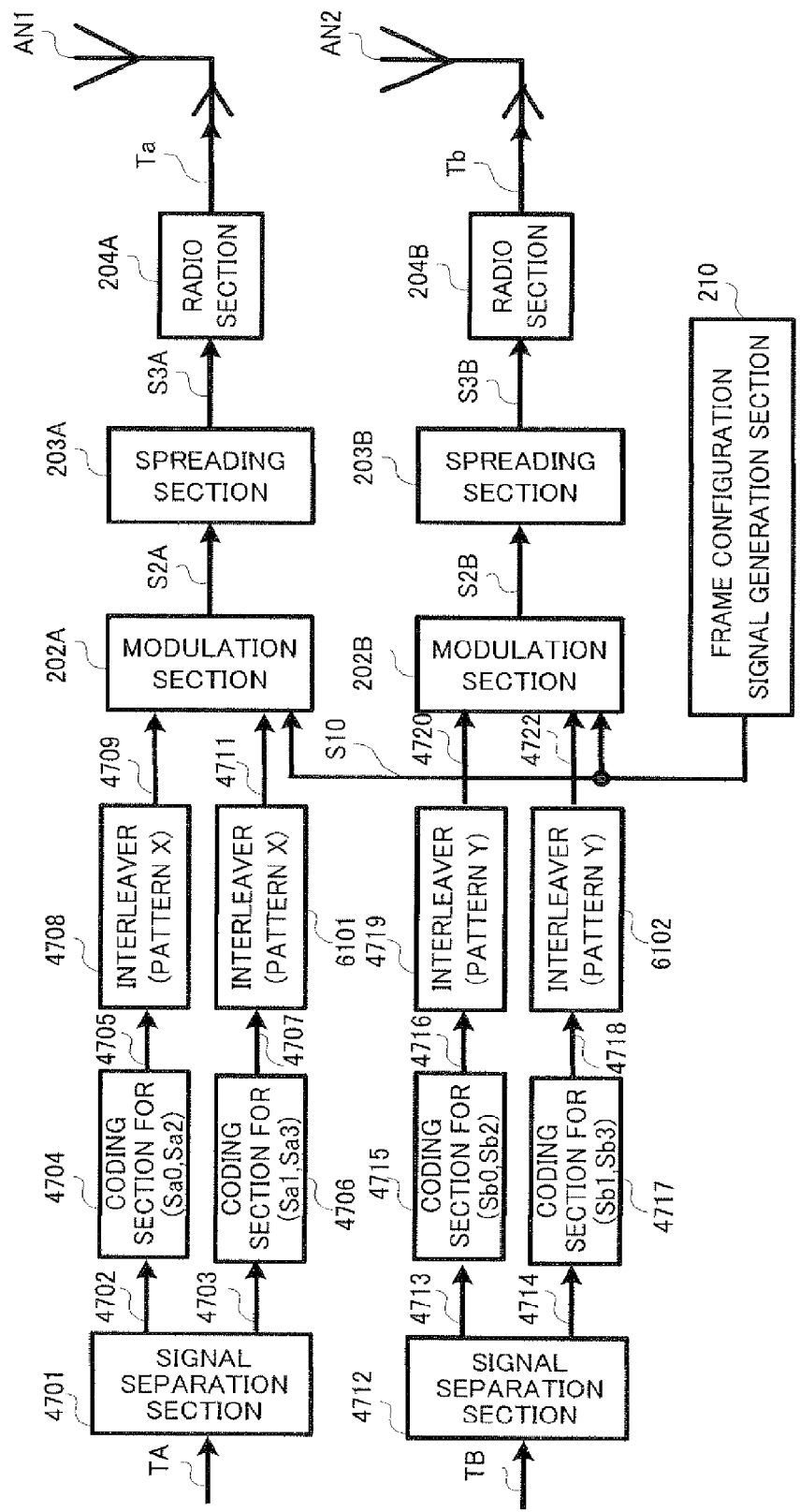
FIG. 63 is a block diagram showing a configuration example of a multi-antenna transmission apparatus of Embodiment 13.

As a configuration example different from the configuration of multi-antenna transmission apparatus 2300 in FIG. 23, for example, the configuration shown in FIG. 63 can be considered. In FIG. 63 which shows parts corresponding to those in FIG. 23 assigned the same reference numerals, the most characteristic point of multi-antenna transmission apparatus 6100 is that "the interleaving pattern for coded bits Sa0, Sa2 (interleaver 4708) and interleaving pattern for coded bits Sa1, Sa3 (interleaver 6101) are identical and the interleaving pattern for coded bits Sb0, Sb2 (interleaver 4719) and interleaving pattern for coded bits Sb1, Sb3 (interleaver 6102) are identical." This improves the error correction ability and improves the reception quality in the reception apparatus. Furthermore, all bit interleaving patterns can also be different, but this will cause degradation of the reception quality as explained in Embodiment 11.

Moreover, the interleaving method explained with drawings in this embodiment is only an example and is not limited to this method. Ideally, random interleaving is suitable.

Embodiment 14

This embodiment proposes a multi-antenna transmission apparatus which can set the above described interleaving patterns in a simple configuration when LDPC (Low Density Parity Check) is applied. In other words, when forming modulated signals in the above described interleaving patterns, this embodiment proposes a method of utilizing LDPC effectively.

In above described Embodiments 6, 7, 11, 12, 13, the interleaving pattern of interleaver 2301A is basically made different from the interleaving pattern of interleaver 2301B as shown in FIG. 23 so that the interleaving patterns differ from one modulated signal to another. This embodiment proposes to replace interleavers 2301A, 2301B with LDPC coders which have different generation matrices G_i (inspection matrices H_i) when LDPC is applied. This allows an effect similar to that when different interleavers are provided to be obtained so as to have different interleaving patterns.

Figure 64:
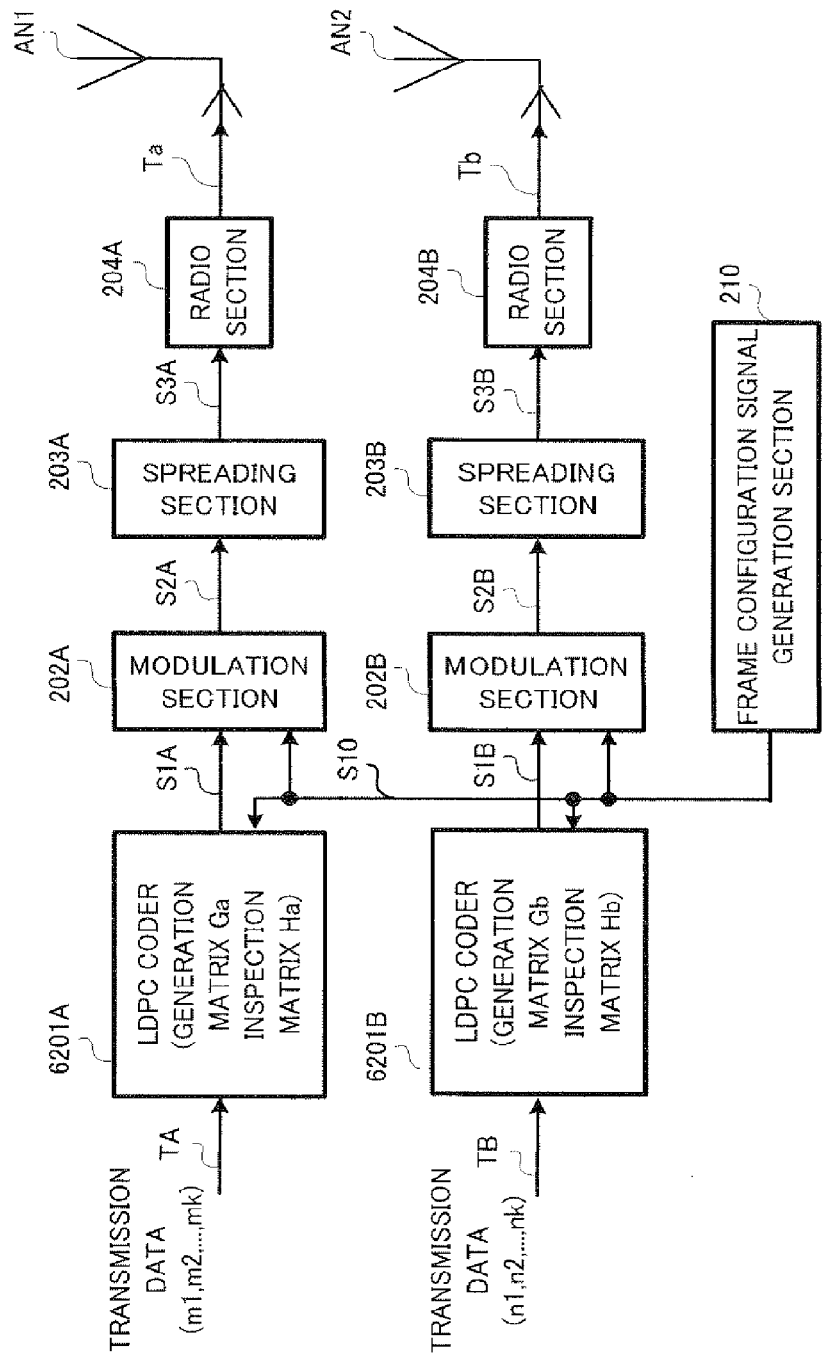
FIG. 64 is a block diagram showing the configuration of a multi-antenna transmission apparatus of Embodiment 14.

FIG. 64 which shows parts corresponding to those in FIG. 2 assigned the same reference numerals shows the configuration of the multi-antenna transmission apparatus of this embodiment. Multi-antenna transmission apparatus 6200 is provided with LDPC coders 6201A, 6201E instead of coding sections 201A, 201B compared to multi-antenna transmission apparatus 110 in FIG. 2.

LDPC coder 6201A for modulated signal A is expressed by generation matrix Ga and inspection matrix Ha and it receives transmission data TA and outputs coded data S1A. LDPC coder 6201B for modulated signal B is expressed by generation matrix Gb and inspection matrix Hb and it receives transmission data TB and outputs coded data S1B.

This embodiment is characterized in that generation matrix Ga of LDPC coder 6201A for modulated signal A is made different from generation matrix G of LDPC coder 6201B for modulated signal B. The reason will be explained below.

LDPC is a linear code which is defined by a very sparse inspection matrix and one of its features is to have the flexibility capable of composing codes of various code lengths and coding rates easily. In the same way, it is also easy to compose a plurality of types of codes of an identical code length and coding rate. Configurable parameters are limited for many other error correcting codes depending on the type of code.

In decoding of a turbo code or a convolutional code, all bits use information on neighboring bits to update likelihood information. Therefore, when handling a communication channel where there is memory of a fading environment or the like (channel with memory), an interleaver is used for whiting noise having a correlation with neighboring bits in a pseudo manner. Therefore, the present invention adopts a transmitter configuration which applies an interleaving pattern which differs from one stream to another.

However, in decoding of LDPC, when some bit n is updated by a parity check which is related to the bit, that is, inspection m, it uses only information from some bits related to inspection m. Inspection matrix H of the LDPC code is generally composed randomly, and therefore the probability that information bits to be used for the update may be neighboring each other is very small. Therefore, even if bit n is in deep fading, the probability that other bits related to bit n may also be in deep fading in the same way is low and those bits provide information with higher reliability for bit n.

That is, this means that inspection matrix H of LDPC is essentially provided with an interleaving function and in the case of the design of inspection matrix H, all non-zero elements of matrix H can be arranged in principle so that an interleaving gain becomes a maxim.

This result is also presented in J. Hou, P. Siegel, and L. Milstein, "Performance Analysis and Code Optimization for Low Density Parity-Check Codes on Rayleigh Fading Channels" IEEE JSAC, Vol. 19, No. 5, May, 2001.

Next, the coding of LDPC will be explained. Because LDPC is a kind of a linear code, it can be obtained by multiplying information vectors (m1, m2, ..., mk), (n1, n2, ..., nk) by generation matrices Ga, Gb. That is, generation matrices Ga, Gb corresponding to inspection matrices Ha and Hb designed beforehand are obtained (generation matrices Ga, Gb satisfy $G_a H_a^T = 0$ and $G_b H_b^T = 0$) and codewords c and d can be obtained as $c = mG_a$ or $d = nG_b$.

Next, decoding of LDPC will be explained. The overall configuration of the multi-antenna reception apparatus of this embodiment can be, for example, as shown in FIG. 4. Signal processing section 404 in FIG. 4 can be configured as shown in FIG. 65, for example.

Figure 65:
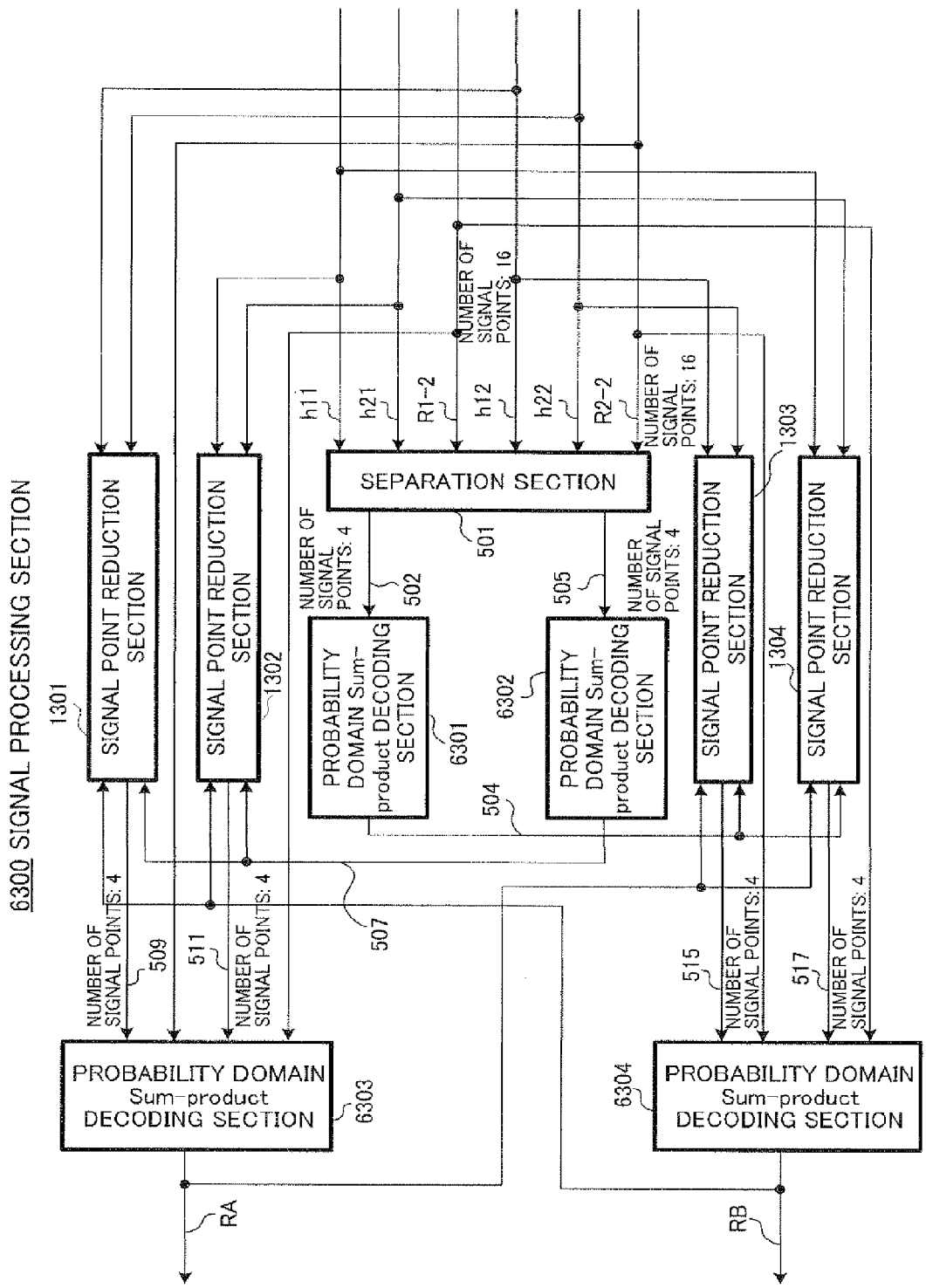
FIG. 65 is a block diagram showing a configuration example of a signal processing section of a multi-antenna reception apparatus of Embodiment 14.

In FIG. 65 which shows parts corresponding to those in FIG. 13 assigned the same reference numerals, signal processing section 6300 has a configuration in which soft decision sections 503, 506, 512, 518 of signal processing section 1300 in FIG. 13 are replaced with probability domain sum-product decoding sections 6301, 6302, 6303, 6304 which are decoding methods for LDPC.

When LDPC is used, instead of combining a deinterleaver and a Viterbi decoding circuit (when a convolutional code is applied), it is possible to use a probability domain sum-product decoding method (probability domain sum-product decoding algorithm) which is a typical method of decoding when using LDPC or logarithmic domain sum-product decoding method (log domain sum-product decoding algorithm) which is suitable for mounting in hardware or software or the like.

Sum-product decoding sections 6301, 6303 of modulated signal A perform decoding corresponding to inspection matrix Ha used on the transmitting side. Also, sum-product decoding sections 6302, 6304 of modulated signal B perform decoding corresponding to inspection matrix Hb used on the transmitting side. The received digital signals of modulated signals A, B subjected to error correction processing are re-coded and modulated using LDPC of the same generation matrices Ga and Gb as those used during retransmission and signal points are reduced.

The detailed operation is same as the operation explained in cases other than LDPC, only operations of parts related to LDPC are different and other parts operate in the same way as in the above described embodiments.

In this way, this embodiment adopts the configuration applying LDPC having different generation matrices G_i (inspection matrix H_i) to their respective streams and performs processing equivalent to the interleaving processing through the generation matrix, and therefore as shown in FIG. 23, it is possible to obtain effects similar to those in the case of adopting the configuration using an interleaver which provides different interleaving patterns for the respective streams and an error correcting coder which is different from LDPC such as a turbo code and convolutional code. Moreover, the LDPC code includes the interleaver function itself, and can thereby reduce the circuit scale.

This embodiment has explained the case where modulated signals A, B having different interleaving patterns are formed using only LDPC coders, but in addition to the LDPC coders, it is also possible to provide interleavers as in the case of Embodiments 6, 7 to form modulated signals having different interleaving patterns and even in such a case, it is also possible to improve reception quality.

Figure 66:
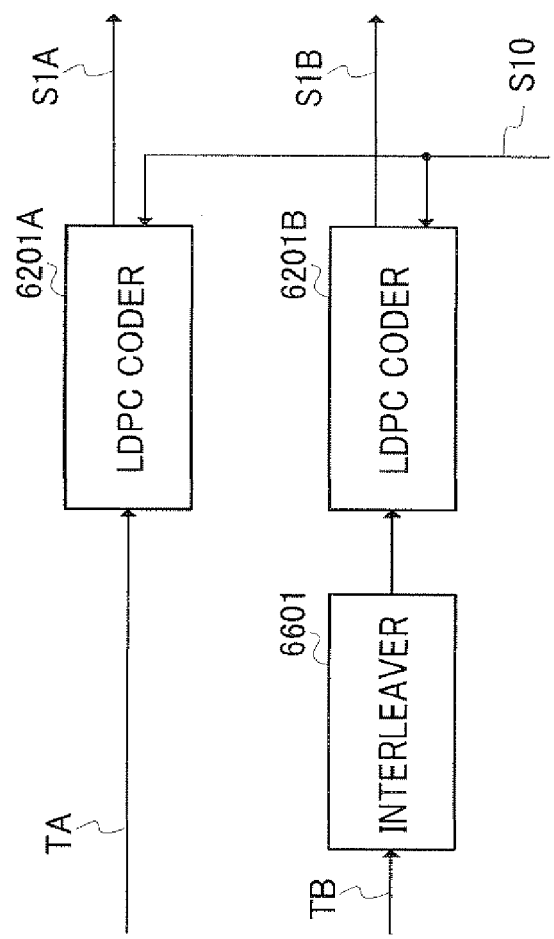
FIG. 66 is a block diagram showing another configuration example of Embodiment 14.

Moreover, as shown in FIG. 66, it is also possible to use the same LDPC coder for LDPC coder 6201A and LDPC coder 6201B and provide interleaver 6601 only for one of the LDPC coders. Adopting such a configuration can also make the interleaving pattern for modulated signal A different from the interleaving pattern for modulated signal B and thereby improve reception quality.

Embodiment 15

This embodiment proposes a retransmission method which is suitable for the above described reception apparatus and method (that is, the apparatus and method for reducing candidate signal points and decoding them).

Figure 67:
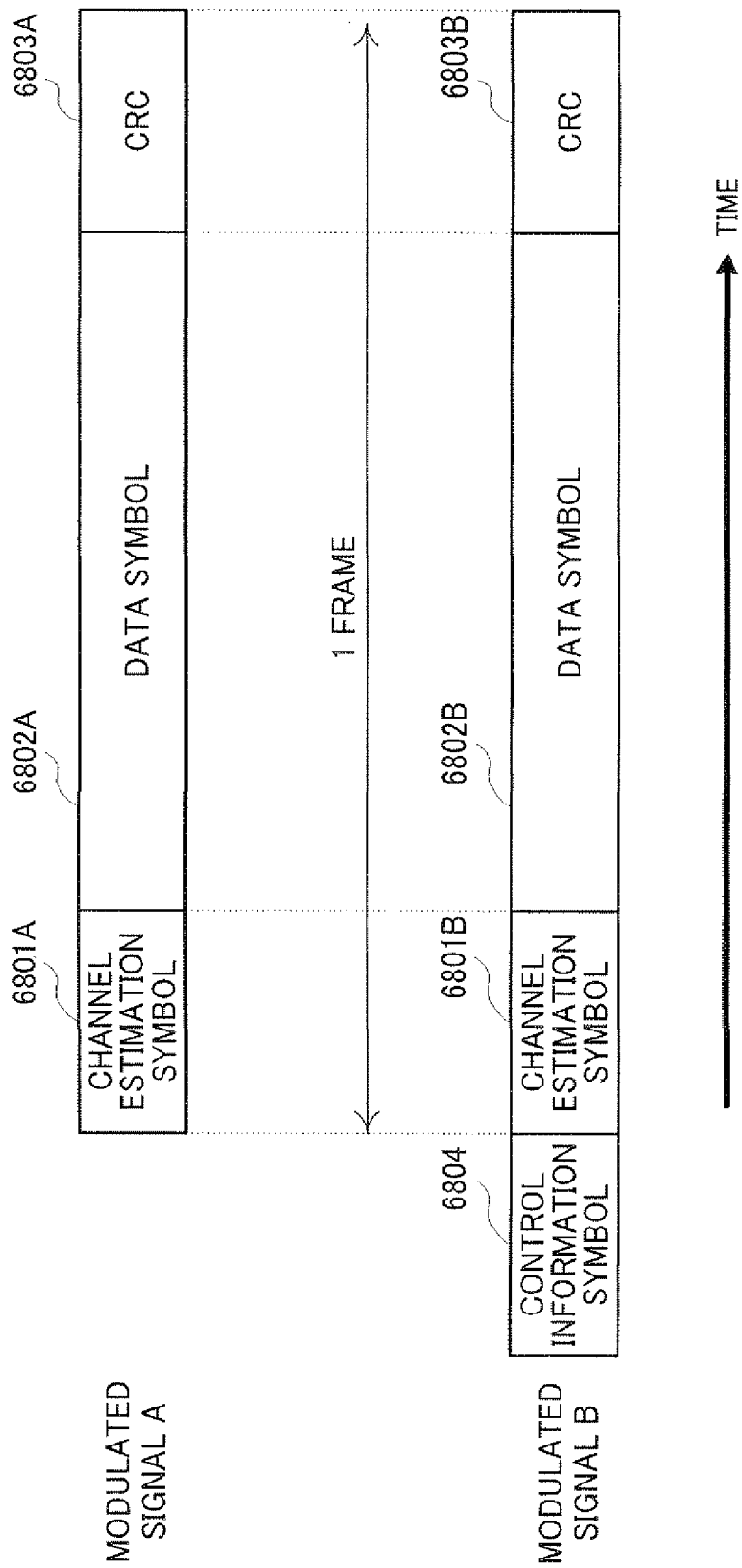
FIG. 67 shows a transmission frame configuration example of Embodiment 15.

First, FIG. 67 shows a frame configuration example of transmission signal A and transmission signal B transmitted on the transmitting side (e.g., base station). Channel estimation symbols 6801A, 6802B of modulated signals A, B, are transmitted at the same time and the receiver estimates each channel fluctuation due to fading or the like using these channel estimation symbols 6801A, 6802B. Data symbols 6802A, 6802B of modulated signals A, B are formed based on transmission digital signals TA, TB and data is transmitted with these data symbols 6802A, 6802B. Furthermore, CRC (Cyclic Redundancy Check) symbols 6803A, 6803B are added to modulated signals A, B and the receiver confirms whether there is an error in each of the data transmitted with modulated signals A, B or not by inspecting CRC symbols 6803A, 6803B. Control information symbol 6804 is provided for the receiver to detect a frequency offset, perform AGC (Automatic Gain Control) and identify whether it is a retransmission signal or not.

Figure 68:
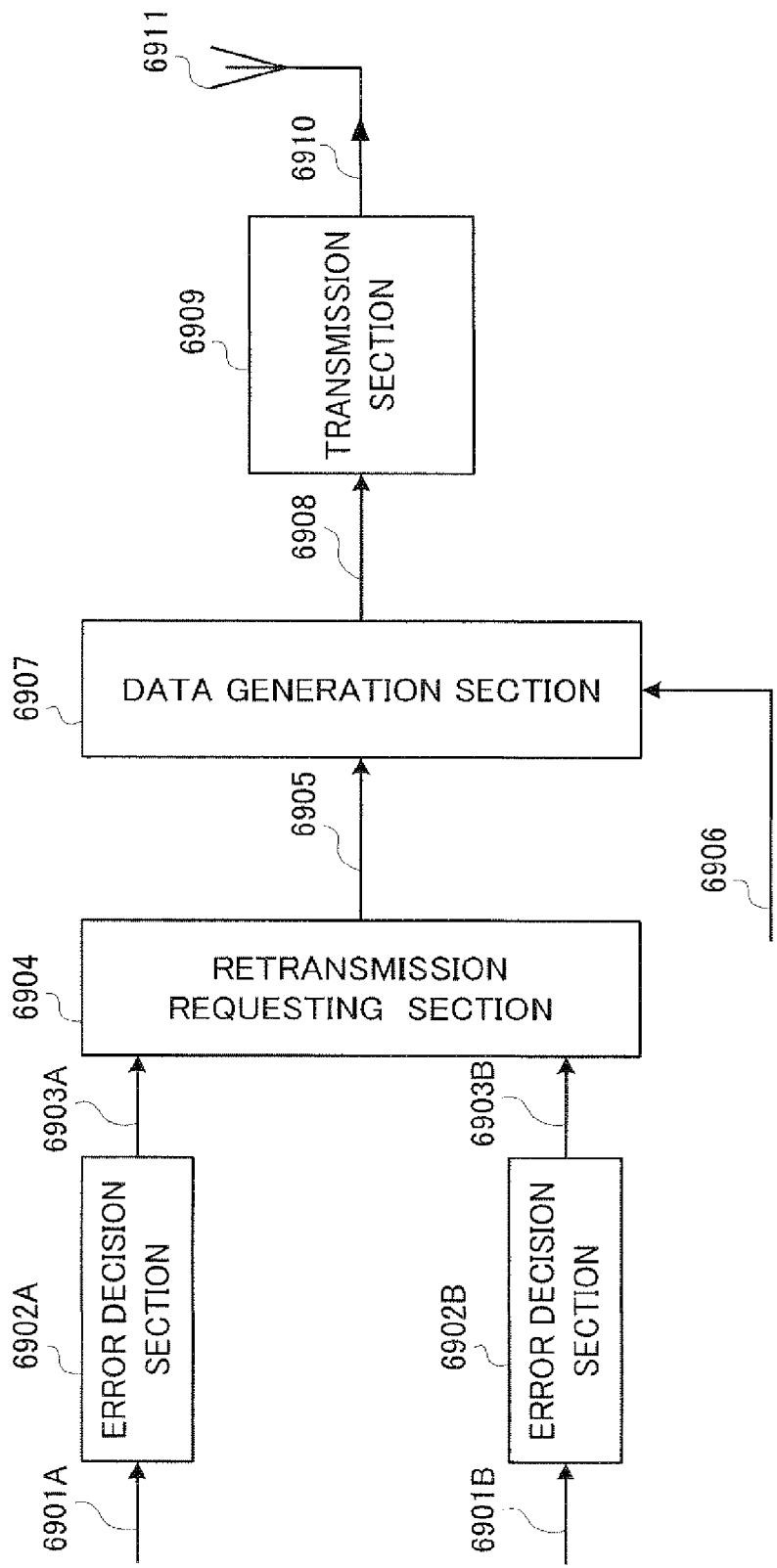
FIG. 68 is a block diagram showing a configuration example of a transmission system of a multi-antenna reception apparatus of Embodiment 15.

FIG. 68 shows a configuration example of a transmission system of the receiver (e.g., communication terminal). Error decision section 6902A receives digital signal 6901A of modulated signal A obtained by demodulating the signal transmitted from the base station and outputs error presence/absence information 6903A indicating whether there is an error in modulated signal A or not using CRC symbol 6803A in FIG. 67. In the same way, error decision section 6902B receives digital signal 6901E of the modulated signal B obtained by demodulating the signal transmitted from the base station and outputs error presence/absence information 6903B indicating whether there is an error in modulated signal B or not using CRC symbol 6803B in FIG. 67.

Retransmission request section 6904 determines whether or not to request retransmission based on error presence/absence information 6903A, 6903B of modulated signals A, B and outputs retransmission request information 6905 (for example, information on ACK/NACK). This retransmission request information 6905 is information on whether or not retransmit modulated signal A or retransmit modulated signal B.

Data generation section 6907 receives retransmission request information 6905 and transmission data 6906, generates and outputs transmission digital signal 6908. Transmission section 6909 applies predetermined modulation processing to transmission digital signal 6908 to form modulated signal 6910. Modulated signal 6910 is output from antenna 6911 as a radio wave.

Figure 69:
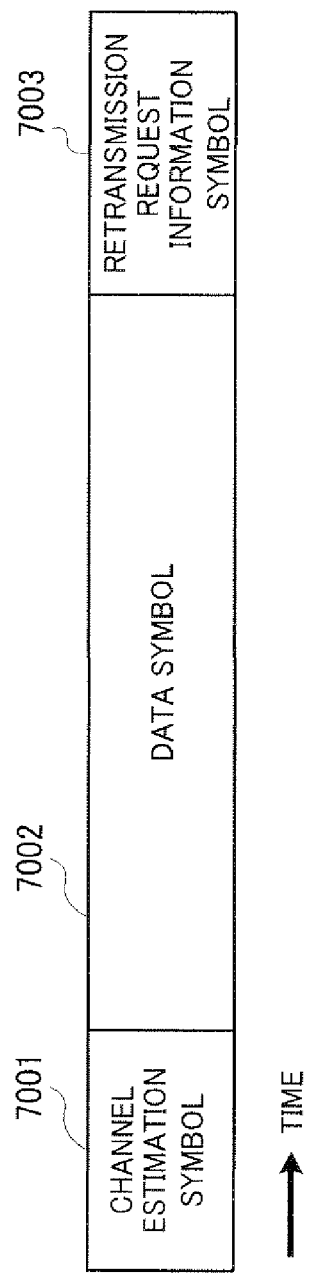
FIG. 69 shows the configuration of a frame transmitted from the transmission system of the multi-antenna reception apparatus.

FIG. 69 shows a frame configuration example of modulated signal 6910 transmitted by a communication terminal. Modulated signal 6910 is composed of channel estimation symbol 7001 for the receiving side to perform channel estimation, data symbol 7002 and retransmission request information symbol 7003.

Figure 70:
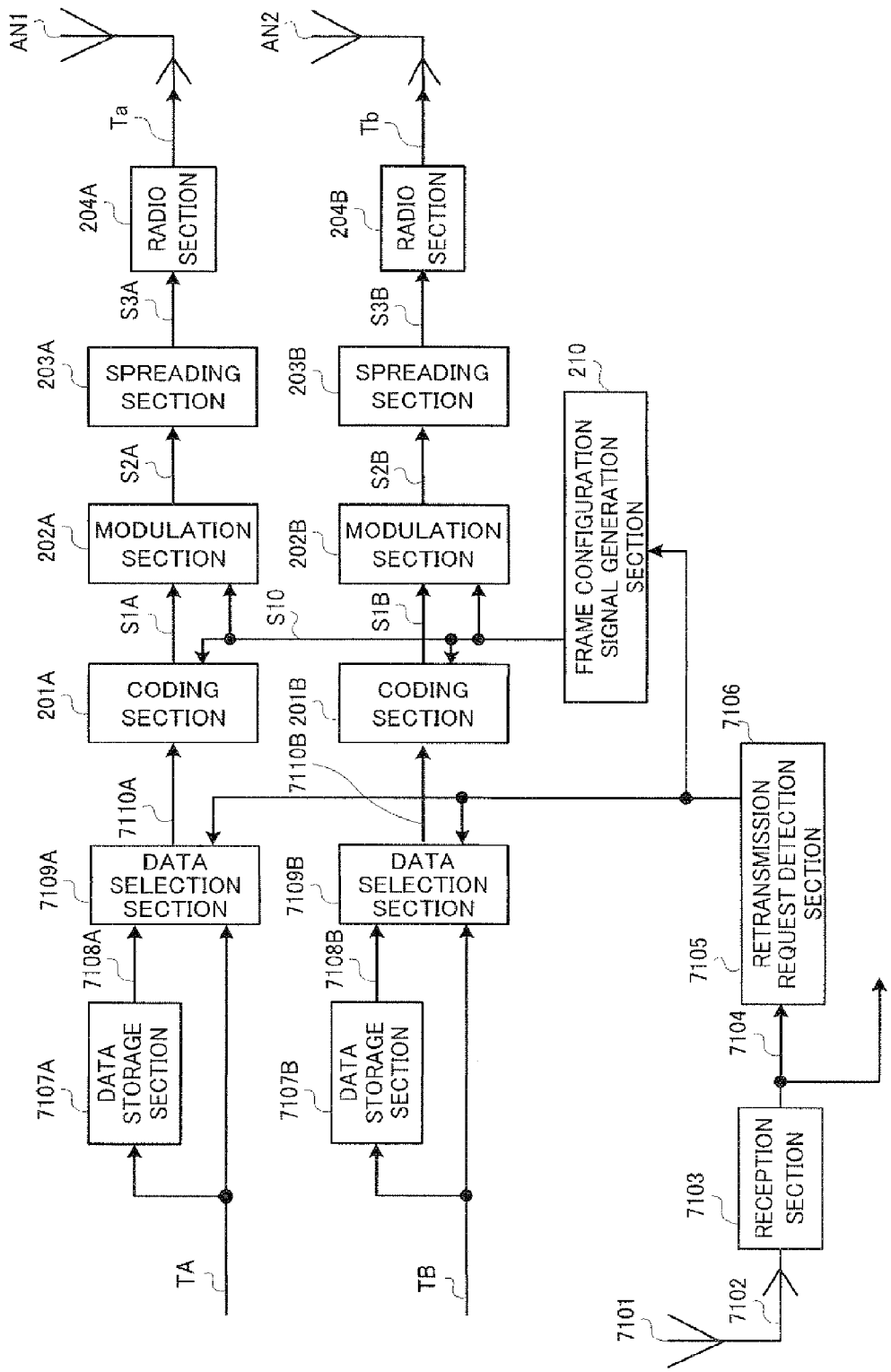
FIG. 70 is a block diagram showing the configuration of a multi-antenna transmission apparatus of Embodiment 15.

FIG. 70 shows the configuration of the multi-antenna transmission apparatus of this embodiment. Multi-antenna transmission apparatus 7000 is provided for a base station, for example.

In FIG. 70 which shows parts corresponding to those in FIG. 2 assigned the same reference numerals, multi-antenna transmission apparatus 7000 receives a signal transmitted from the communication terminal in FIG. 68 by antenna 7101. Received signal 7102 (corresponding to the modulated signal in FIG. 69) is input to reception section 7103. Reception section 7103 obtains received digital signal 7104 by demodulating received signal 7102 and outputs this. Retransmission request detection section 7105 extracts retransmission request information 7106 from received digital signal 7104 and outputs this. This retransmission request information 7106 includes information on whether to retransmit modulated signal A or retransmit modulated signal B as described above.

The transmission system of multi-antenna transmission apparatus 7000 is provided with data storage sections 7107A, 7107B and data selection sections 7109A, 7109B and retransmission request information 7106 is input to data selection sections 7109A, 7109B. When retransmission request information 7106 indicates a request for retransmission of modulated signal A, data selection section 7109A selects and outputs retransmission data 7108A stored in data storage section 7107A. In the same way, when retransmission request information 7106 indicates a request for retransmission of modulated signal B, data selection section 7109B selects and outputs retransmission data 7108B stored in data storage section 7107B.

Furthermore, more specifically, when retransmission request information 7106 is requesting retransmission and requesting retransmission of modulated signal A, data selection section 7109A selects and outputs transmission digital signal 7108A of stored modulated signal A. On the other hand, when retransmission request information 7106 is requesting retransmission and requesting retransmission of modulated signal B, data selection section 7109A outputs nothing. When retransmission request information 7106 is requesting no retransmission, data selection section 7109A selects and outputs transmission digital signal TA.

In the same way, when retransmission request information 7106 is requesting retransmission and requesting retransmission of modulated signal B, data section 7109B selects and outputs transmission digital signal 7108B of stored modulated signal B. On the other hand, when retransmission request information 7106 is requesting retransmission and requesting retransmission of modulated signal A, data selection section 7109B outputs nothing. When retransmission request information 7106 is requesting no retransmission, data selection section 7109B selects and outputs transmission digital signal TB.

In this way, when retransmitting one of the modulated signals, multi-antenna transmission apparatus 7000 does not transmit the other modulated signal.

Frame configuration signal generation section 210 determines a frame configuration based on retransmission request information 7106 and outputs frame configuration signal S10. An example of the method of determining a frame configuration will be explained below using FIG. 71.

Figure 71:
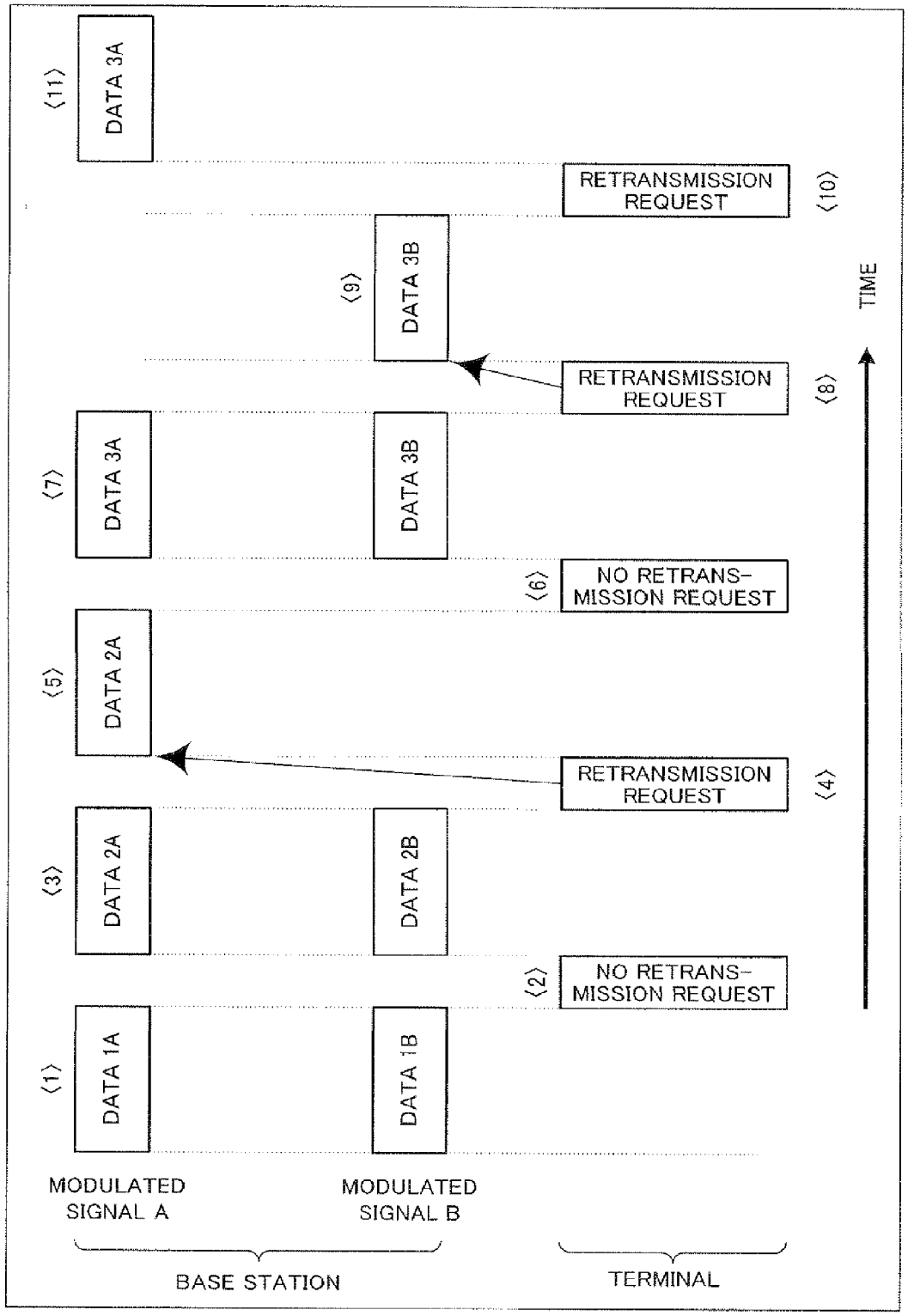
FIG. 71 illustrates the operation of Embodiment 15.

FIG. 71 shows the flow of a transmission signal of the base station and the communication terminal of this embodiment. Though simplified in FIG. 71, the signal transmitted by the base station is actually a signal on a frame-by-frame basis composed of control information and CRC symbols or the like in addition to data symbols.

The base station transmits data 1A, data 1B as shown in <1> first. Then, the terminal receives data 1A, data 1B, confirms that no error has occurred and requests no retransmission as shown in <2>.

Next, the base station transmits data 2A, data 2B as shown in <3>.

Then, the terminal receives data 2A, data 2B and confirms that an error has occurred. At this time, the terminal compares the reception field intensity of modulated signal A and the reception field intensity of modulated signal B and requests retransmission of the modulated signal of low reception field intensity. Because it has been detected that the reception field intensity of modulated signal A is low in the case of the figure, the terminal requests retransmission of modulated signal A as shown in <4>. By retransmitting the modulated signal of lower reception field intensity in this way, the effect of improving the error rate characteristic by retransmission can be improved. This is because the modulated signal of low reception field intensity has low reception quality, and therefore the reception quality of the modulated signal of low reception field intensity can be secured through retransmission. Furthermore, because retransmitting modulated signals of low reception field intensity improves the accuracy in reducing candidate signal points about the other modulated signal using the modulated signal, it is also possible to improve the error rate characteristic of the other modulated signal.

Here, modulated signal of low reception field intensity is retransmitted, but when, for example, an error occurs in data 2B out of data 2A and data 2B, it is also possible to use a simple method of requesting retransmission of data 2B as another method.

When the base station receives a signal requesting retransmission of data 2A, it retransmits data 2A as shown in <5>.

Then, because no error occurs in data 2A, data 2B, the terminal does not request retransmission as shown in <6>.

Next, the base station transmits data 3A, data 3B as shown in <7>.

Then, the terminal receives data 3A, data 3B and confirms that an error has occurred. At this time, the terminal compares the reception field intensity of modulated signal A and the reception field intensity of modulated signal B and when it detects that field intensity of modulated signal B is lower, the terminal requests retransmission of modulated signal B as shown in <8>.

Then the base station retransmits data 3B as shown in <9>.

If an error has occurred in data 3A, data 3B, the terminal still requests retransmission once again as shown in <10>. At this time, the terminal requests retransmission of a modulated signal which is different from the modulated signal requested first time. That is, the terminal requests retransmission of a modulated signal A. It is possible to improve the error rate characteristic by retransmission. That is, data 3B retransmitted first time is considered to have excellent reception quality through the retransmission in <9>, whereas the reception quality of data 3A is considered to be lower than data 3B at this point because there is no improvement operation of the reception quality through the retransmission. Therefore, when retransmitting data for the second time, it is preferable to retransmit data of a modulated signal such as data 3A, which is different from the modulated signal first time.

When the base station receives a signal requesting retransmission of data 3B, it retransmits data 3A as shown in <11>.

In this way, this embodiment retransmits data of only one of the modulated signals instead of retransmitting data of both modulated signal A, modulated signal B. This reason will be explained hereinafter.

Figure 72:
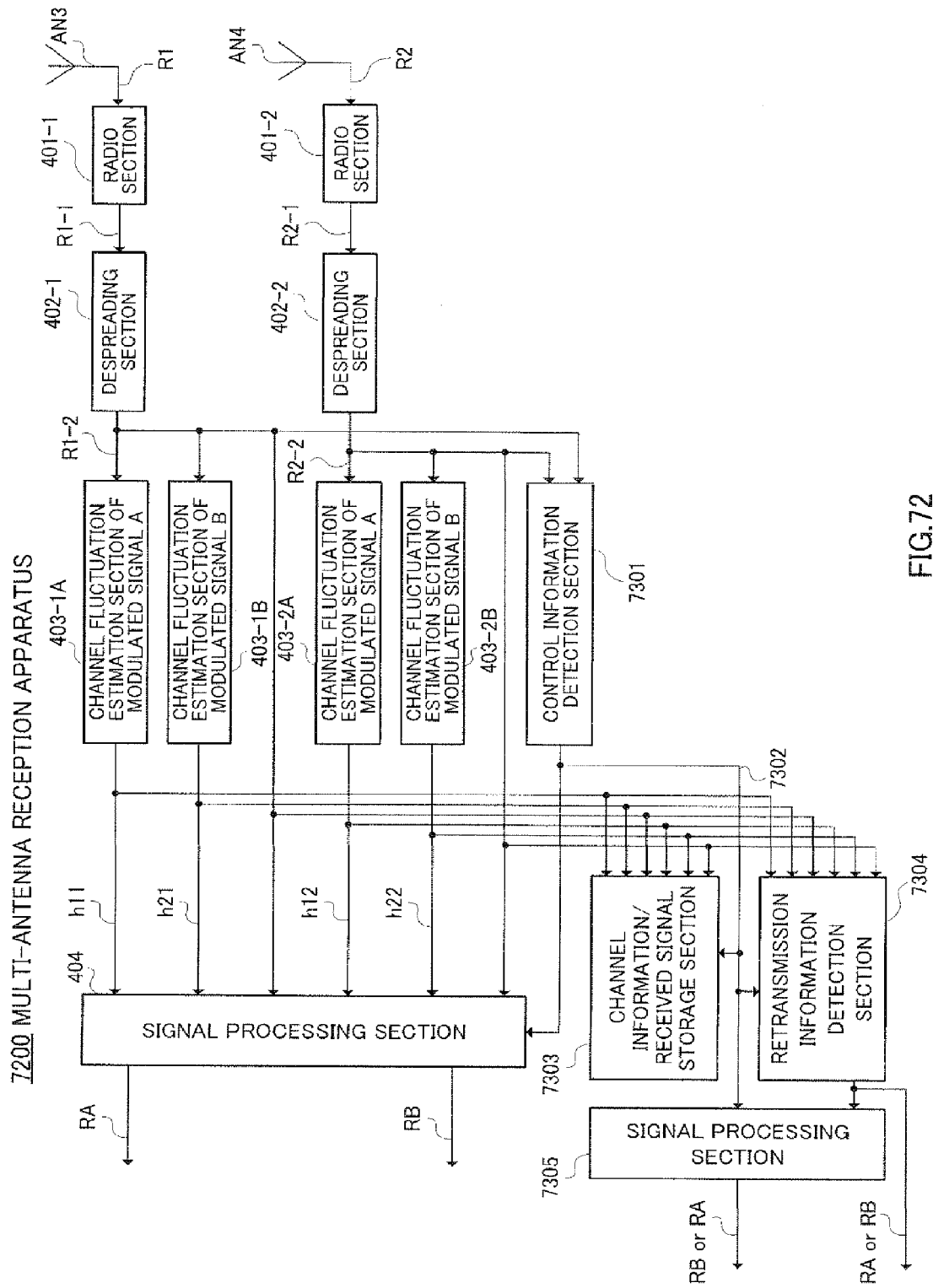
FIG. 72 is a block diagram showing the configuration of a reception system of the multi-antenna reception apparatus of Embodiment 15.

FIG. 72 shows the configuration of the multi-antenna reception apparatus of this embodiment. Multi-antenna reception equipment 7200 is provided for a communication terminal, for example.

In FIG. 72 which shows parts corresponding to those in FIG. 4 assigned the same reference numerals, multi-antenna reception apparatus 7200 receives a signal transmitted from multi-antenna transmission apparatus 7000 (FIG. 70) and decodes the signal.

Control information detection section 7301 receives despread baseband signals R1-2, R2-2 and detects control information indicated by control information symbol 6804 in the frame in FIG. 67 transmitted by multi-antenna transmission apparatus 7000 (base station). That is, based on control information symbol 6804, control information detection section 7301 detects control information which indicates whether the received signal is not a retransmission signal and whether modulated signal. A and modulated signal B are transmitted simultaneously or whether the retransmission signal, is modulated signal A or modulated signal B when the received signal is a retransmission signal. Control information detection section 7301 outputs the detected control information as transmission method information 7302.

Signal processing section 404 receives channel fluctuation estimated values h11, h12, h21, h22, despread baseband signals R1-2, R2-2 and transmission method information 7302, and when transmission method information 7302 indicates that it is a transmission method of transmitting modulated signals A, B at the same time, signal processing section 404 performs a demodulation operation and obtains received digital signal RA of modulated signal A and received digital signal RB of modulated signal B. The detailed configuration of this signal processing section 404 is as shown in FIG. 5, FIG. 11, FIG. 12, FIG. 13, FIG. 17, FIG. 18 or the like and the operation is as described above. Signal processing section 404 operates, for example, in <1>, <3>, <7> in FIG. 71.

Channel information/received signal storage section 7303 receives channel estimated values h11, h12, h21, h22 and despread baseband signals R2-1, R2-2 and stores the information. Furthermore, channel information/received signal storage section 7303 receives transmission method information 7302 and outputs the stored channel estimated values and despread baseband signals when transmission method information 7302 indicates the transmission method at the time of retransmission.

Retransmission information detection section 7304 receives channel fluctuation estimated values h11, h12, h21, h22, despread baseband signals R1-2, R2-2 and transmission method information 7302 and demodulates modulated signal A and outputs received digital signal RA of modulated signal A when transmission method information 7302 indicates a retransmission and that the retransmitted modulated signal is modulated signal A. Furthermore, when transmission method information 7302 indicates a retransmission and that the retransmitted modulated signal is modulated signal B, retransmission information detection section 7304 demodulates modulated signal B and outputs received digital signal RB of modulated signal B. This operation is performed, for example, in <5>, <9>, <11> in FIG. 71.

Signal processing section 7305 receives stored channel estimated values h11, h12, h21, h22 (not shown), stored despread baseband signals R1-2, R2-2 (not shown), transmission method information 7302 and received digital signal RA or RB (output of retransmission information detection section 7304) of the retransmitted modulated signal.

When transmission method information 7302 indicates a retransmission and that the retransmitted modulated signal is modulated signal A (corresponds to the situation of <5> in FIG. 71), retransmission information detection section 7304 outputs RA (data 2A is output in the situation of <5> in FIG. 71), signal processing section 7305 performs a demodulating operation using a signal point reduction using stored channel estimated values h11, h12, h21, h22, stored despread baseband signals R1-2, R2-2 and received digital signal RA of retransmitted modulated signal A (data 2A in the situation <5> in FIG. 71) and outputs digital signal RB of modulated signal B (corresponds to data 2B in FIG. 71).

On the other hand, when transmission method information 7302 indicates a retransmission and that the retransmitted modulated signal is modulated signal B (corresponds to the situation of <9> in FIG. 71), retransmission information detection section 7304 outputs RB (data 3B is output in the situation of <9> in FIG. 71), and signal processing section 7305 performs a demodulation operation using a signal point reduction using stored channel estimated values h11, h12, h21, h22, stored despread baseband signals R1-2, R2-2 and the received digital signal RB (data 3B in the situation of <9> in FIG. 71) of retransmitted modulated signal and outputs digital signal RA of modulated signal A (corresponds to data 3A in FIG. 71).

Figure 73:
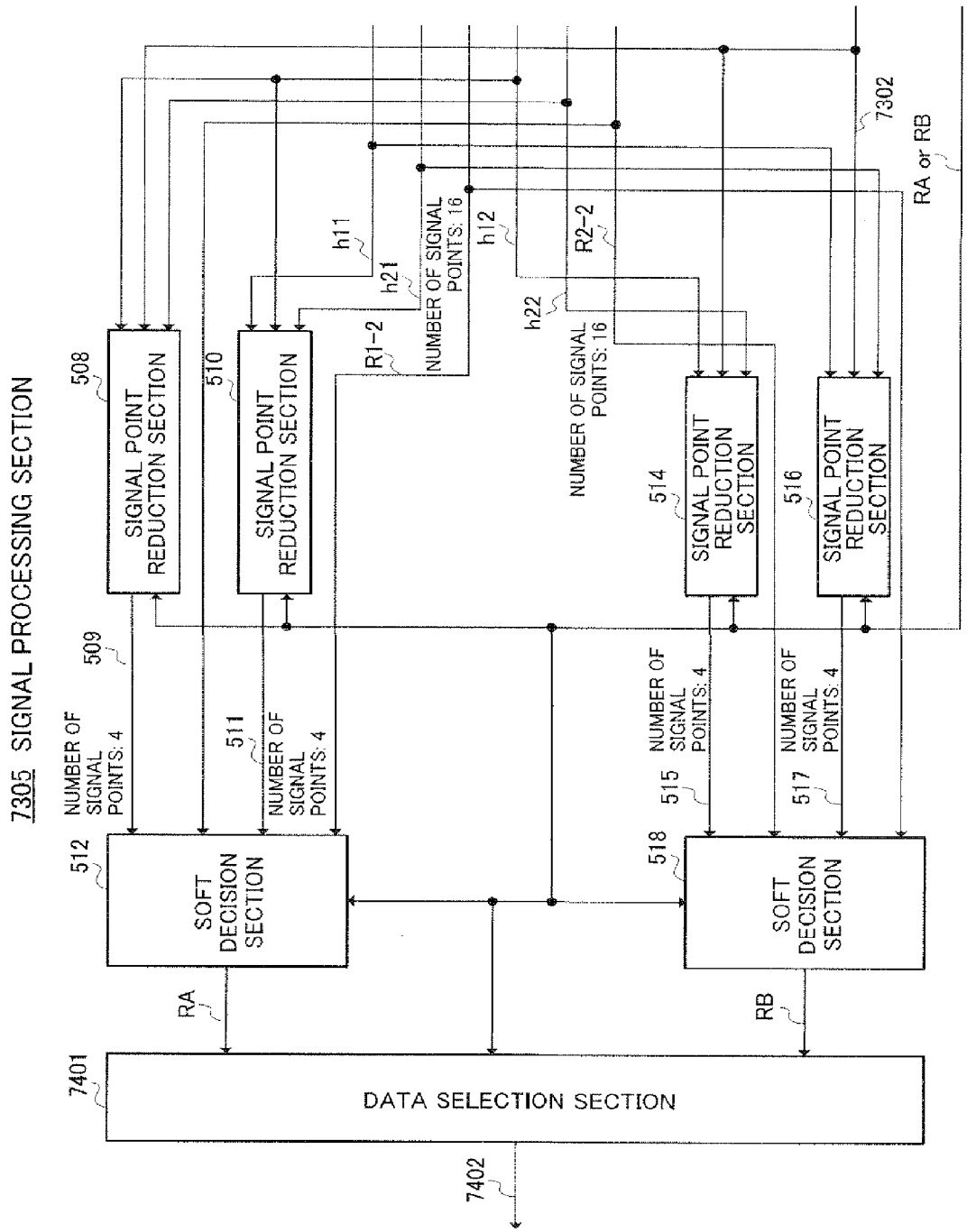
FIG. 73 is a block diagram showing the configuration of the signal processing section in FIG. 72.

FIG. 73 which shows parts corresponding to those in FIG. 5 assigned the same reference numerals shows a configuration example of signal processing section 7305. Signal processing section 7305 inputs transmission method information 7302 to signal point reduction sections 508, 510, 514, 516. Signal processing section 7305 also inputs received digital signal RA or RB which is output from retransmission information detection section 7304 to signal point reduction sections 508, 510, 514, 516, soft decision sections 512, 518 and data selection section 7401.

When transmission method information 7302 indicates a retransmission and that the retransmitted modulated signal is modulated signal A (corresponds to the situation in <5> in FIG. 71), received digital signal RA of modulated signal A is input to signal point reduction sections 508, 510, 514, 516. At this time, signal point reduction sections 514, 516 use determined received digital signal RA of the modulated signal A to leave signal points of only modulated signal B as candidates as described in the above described embodiment and output reduced signal point information 515, 517 respectively. Soft decision section 518 performs soft decision decoding on modulated signal B and outputs received digital signal RB of modulated signal B. Data selection section 7401 selects received digital signal RB of this modulated signal B and outputs this as received digital signal 7402. At this time, signal point reduction sections 508, 510 and soft decision section 512 do not operate.

On the other hand, when transmission method information 7302 indicates a retransmission and that the retransmitted modulated signal is modulated signal B (corresponds to the situation in <9> in FIG. 71), received digital signal RB of modulated signal B is input to signal point reduction sections 508, 510, 514, 516. At this time, signal point reduction sections 508, 510 use received digital signal RB of determined modulated signal B to leave signal points of only modulated signal A as candidates as described in the above described embodiment and output reduced signal point information 509, 511 respectively. Soft decision section 512 performs soft decision decoding on modulated signal A and outputs received digital signal RA of modulated signal A. Data selection section 7401 selects received digital signal. RA of this modulated signal A and outputs this as received digital signal 7402. At this time, signal point reduction sections 514, 516 and soft decision section 518 do not operate.

Figure 74:
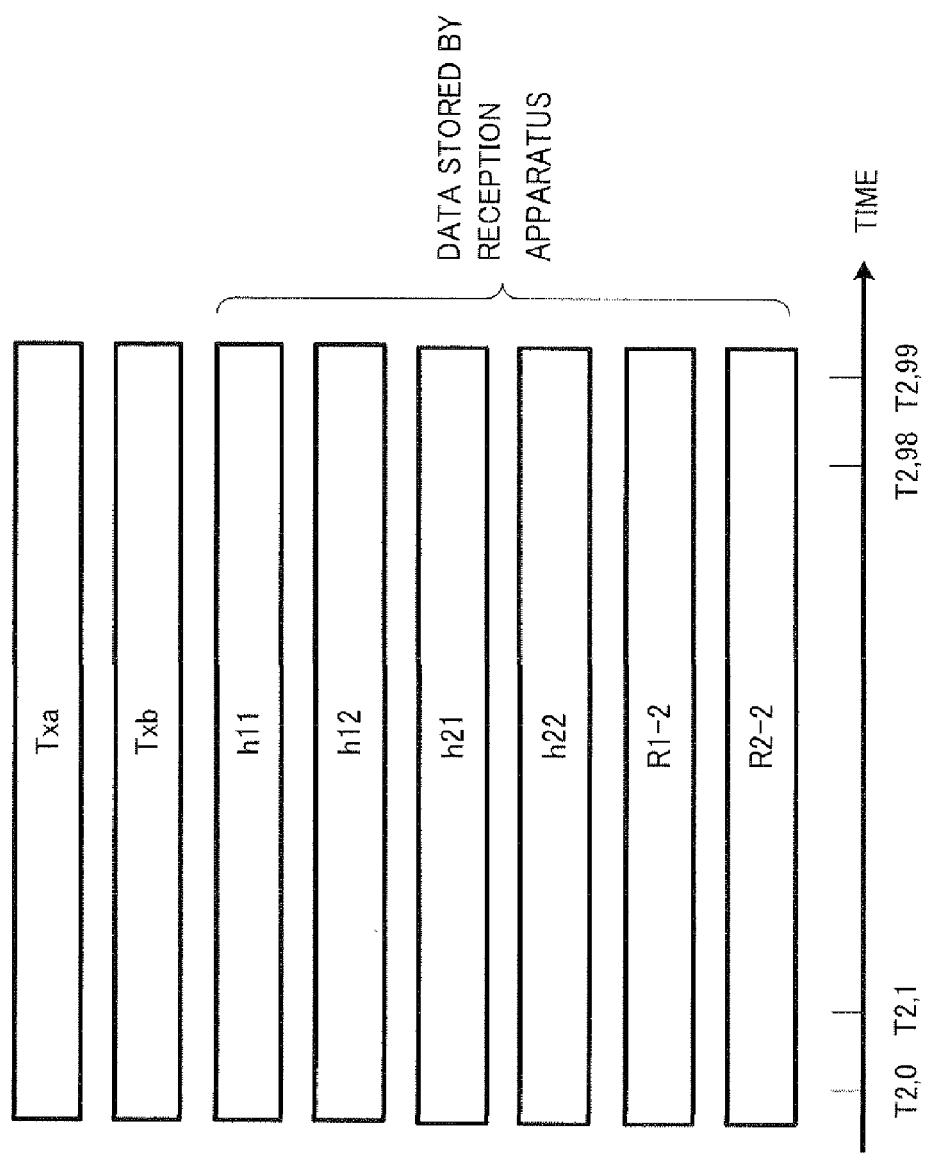
FIG. 74 illustrates data stored in the channel information/received signal storage section.

Next, the data stored in channel information/received signal storage section 7303 of multi-antenna reception apparatus 7200 will be explained in detail using FIG. 74. Consider, for example, a case where data 2A and data 2B are transmitted as shown in <3> of FIG. 71. Data 2A, data 2B are composed of 100 symbols and suppose each symbol is transmitted at time T2,0, T2,1, ... T2,99 as shown in FIG. 74. At this time, if time t=T2,0, T2,1, ... , T2,99, the channel fluctuation can be expressed by h11(t), h12(t), h21(t), h22(t) and received baseband signals received at antennas AN3, AN4 can be expressed by R1-2(t), R2-2(t). Furthermore, received baseband signals R1-2(t), R2-2(t) can be expressed by the following expression using channel fluctuations h11(t), h12(t), h21(t), h22(t), transmission signal Txa(t) of modulated signal A and transmission signal Txb(t) of modulated signal B.

[Expression 4]

$$\begin{pmatrix} R1-2(t) \\ R2-2(t) \end{pmatrix} = \begin{pmatrix} h11(t) & h21(t) \\ h12(t) & h22(t) \end{pmatrix} \begin{pmatrix} Txa(t) \\ Txb(t) \end{pmatrix} \quad (4)$$

Channel information/received signal storage section 7303 stores channel fluctuations h11(t), h12(t), h21(t), h22(t) and received baseband signals R1-2(t), R2-2(t).

According to this embodiment, during a retransmission only one of the modulated signals is retransmitted, and therefore the error rate characteristic of received digital signals RA, RB can be improved. This will be explained.

When data 2A is retransmitted as shown in <5> in FIG. 71, the modulated signal of data 2A is received by two receive antennas AN3, AN4, and combined at a maximum ratio by retransmission information detection section 7304 and demodulated. Therefore, data 2A of very good (good error rate characteristic) reception quality can be obtained as received digital signal RA by retransmission information detection section 7304. When data 2A is demodulated from a signal in which data 2A and data 2B are mixed using Expression (4) as shown in <3> in FIG. 71, the modulated signal of data 2B becomes interference, it is difficult to obtain data 2A of good quality (good error rate characteristic) compared with the case where data 2B is singly received. That is, this embodiment retransmits only one of the modulated signals, and can thereby obtain an estimated value (estimated value of modulated signal. A) of Txa(t) of high quality at time t=T2,0, T2,1, ... , T2,99.

Then, since all estimated values other than Txb(t) of Expression (4) are obtained at time t=T2,0, 12,1, T2,99, signal processing section 7305 can demodulate Txb(t) which corresponds to a combination at a maximum ratio at two receive antennas from channel fluctuations h11(t), h12(t), h21(t), h22(t), received baseband signals R1-2(t), R2-2(t) and the estimated value (estimated value of modulated signal A) of Txa(t) of excellent quality which has been combined at a maximum ratio and demodulated stored in channel information/received signal storage section 7303. As a result, data 2B of excellent reception quality can be obtained as with data 2A. This is a series of operations by channel information/received signal storage section 7303, retransmission information detection section 7304 and signal processing section 7305.

In this way, in carrying out a retransmission, this embodiment retransmits data of only one of the modulated signals instead of retransmitting data of both modulated signal A, modulated signal B, and can thereby have a merit of increasing the possibility of reproducing data in which a frame error has occurred.

Especially, compared to the configuration whereby data of both modulated signal A and modulated signal B are retransmitted, reception quality improves significantly in a propagation environment in which the existence of direct waves is dominant. When, for example, direct waves exist, as explained in Embodiment 10, good reception quality may not always be obtained even if reception field intensity is obtained. In such a case, even if data of both modulated signal A, modulated signal B are retransmitted once again, no significant improvement effect on the reception quality is obtained.

However, when data of only one of the modulated signals is retransmitted as with this embodiment, as explained above, the retransmitted modulated signal can be combined at a maximum ratio, that is, demodulated with strong field intensity, and therefore it is possible to obtain excellent quality. In addition, with regard to the signal which has not been retransmitted, by demodulating the signal after canceling the retransmitted modulated signal from the signal in which both modulated signals are mixed (that is, stored signal), it is possible to demodulate the signal in a state of maximum ratio combining. As a result, a considerable improvement effect on the reception quality can be obtained even in an environment in which direct waves are dominant because both modulated signals can be demodulated in a state of maximum ratio combining.

This embodiment has explained the ease where two modulated signals A, B are transmitted at any time other than a retransmission and only one of the modulated signals is transmitted at the time of retransmission, but the point is that if the number of modulated signals to be transmitted at the time of retransmission is smaller than the number of modulated signals to be transmitted at any time other than a retransmission, the effects similar to those of the above described embodiments can be obtained.

Furthermore, this embodiment has explained an example where the present invention is used for a spectrum spreading communication scheme, but the present invention is not limited to this and it is also applicable to a single carrier scheme or an OFDM scheme which is not a spectrum spreading communication scheme. When applied to an OFDM scheme, information can be transmitted not only in the time direction but also in the frequency axis direction, and therefore when, for example, data 1A in FIG. 71 is considered, data 1A can be placed in the time axis direction and frequency axis direction. The same will apply to Embodiment 16 which will be explained next.

Furthermore, as shown in FIG. 71, this embodiment has explained the case where any one of modulated signal A and modulated signal B is transmitted at the time of retransmission, but it is also possible to change the number of modulated signals to be transmitted according to the retransmission.

Figure 75:
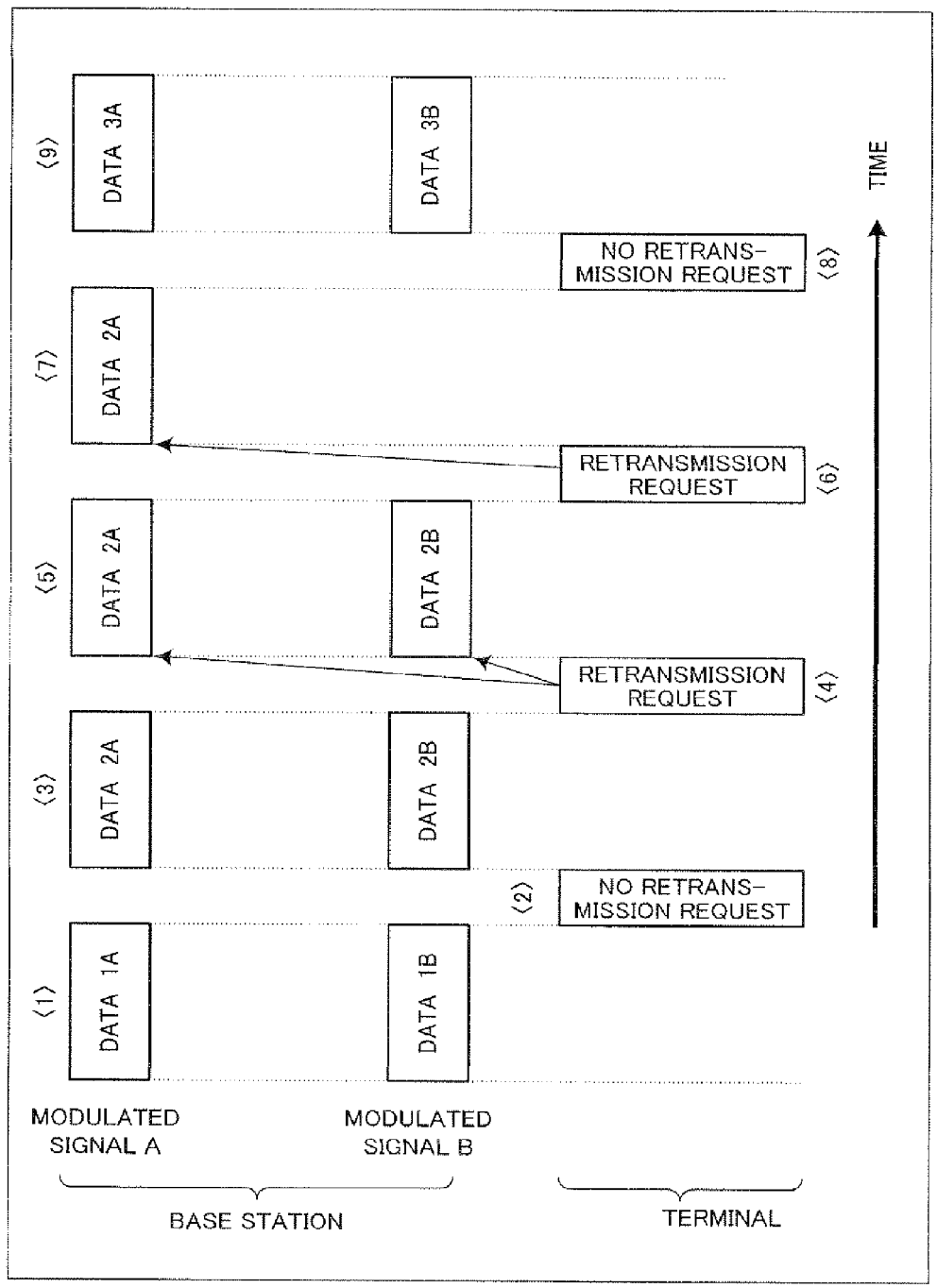
FIG. 75 illustrates the operation of Embodiment 15.

FIG. 75 shows an example of the signal flow of the base station and communication terminal in this case. The base station transmits data 1A with modulated signal A and transmits data 1B with modulated signal B as shown in <1> of FIG. 75. The terminal will not request a retransmission unless an error occurs as shown in <2>.

Next, the base station transmits data 2A with modulated signal A and data 2B with modulated signal B as shown in <3>. Then, when an error occurs, the terminal requests a retransmission as shown in <4>.

The base station retransmits data according to a retransmission request from the terminal. In the beginning, as shown in <5>, the base station retransmits data 2A with modulated signal A and data 2B with modulated signal B. Then, when an error occurs again, the terminal requests a retransmission again as shown in <6>.

Then, the base station retransmits data according to a retransmission request from the terminal. At this time, a retransmission is carried out under a scheme different from the retransmission scheme in <5>. Here, only data 2A is retransmitted as shown in <7>. The terminal does not request a retransmission unless an error occurs as shown in <8>. The base station then transmits the next data (data 3A and data 3B) as shown in <9>.

In this way, different retransmission methods are used for the first retransmission and second retransmission. In the example of FIG. 75, a retransmission method is performed at the first retransmission whereby the same data is retransmitted with a plurality of modulated signals from a plurality of antennas, while a retransmission method is performed at the second retransmission whereby the modulated signal of only one of the channels is retransmitted. Changing the number of modulated signals to be transmitted according to the retransmission in this way can further suppress the number of retransmissions, which contributes to an improvement of transmission efficiency.

This is because the propagation environment which is appropriate for improvement of the reception quality differs depending on the method of retransmitting a modulated signal of only one of the channels and the method of retransmitting the same data with a plurality of modulated signals from a plurality of antennas. The method of retransmitting a modulated signal of only one of the channels is appropriate for a retransmission in an environment in which direct waves are dominant. On the other hand, the method of retransmitting the same data with a plurality of modulated signals from a plurality of antennas is appropriate for an environment in which scattered waves are dominant. Therefore, when the propagation environment is not estimated, retransmitting data using different retransmission methods increases the probability that data errors may not occur through any one of retransmissions, and this can reduce the number of retransmissions and thereby improve the data transmission efficiency.

Furthermore, this embodiment has explained here the case where different retransmission methods are used for the first retransmission and the second retransmission without estimating any propagation environment, but when a propagation environment is estimated and the propagation environment estimation information is shared between the base station and the terminal, it is also effective to fix any one of the retransmission schemes based on this propagation environment estimation information.

In this way, when a MIMO transmission is used, using a plurality of retransmission methods (here, the method of retransmitting a modulated signal of only one of the channels and the method of retransmitting a plurality of modulated signals from a plurality of antennas) considering that the suitable retransmission method differs depending on the propagation environment can decrease the number of retransmissions and improve the data transmission efficiency.

This embodiment has explained the case where the number of transmit antennas is 2 as an example, but the present invention can also be implemented likewise when the number of transmit antennas is 3 or more and the number of modulated signals is 3 or more.

Embodiment 16

This embodiment proposes a retransmission method using a frame configuration which is different from the frame configuration in FIG. 71 explained in Embodiment 15 as the retransmission method which is suitable for the apparatus and method for reducing candidate signal points and decoding.

The configuration of the base station, the configuration of the communication terminal, the configuration of 1 frame, the frame configuration of modulated signals transmitted from the terminal to the base station or the like are the same as those in Embodiment 15. Here, the signal flow of the base station and the terminal different from FIG. 71 will be explained using FIG. 76.

The base station transmits data 1A, data 1B, data 2A, data 2B, data 3A, data 3B, data 4A, data 4B as shown in <1> first.

Then, the terminal receives data 1A, data 1B, data 2A, data 2B, data 3A, data 3B, data 4A, data 4B. Then, when the terminal detects that errors have occurred in data 2A, data 2B, data 4A, data 4B, the terminal requests retransmissions of these symbols as shown in <2>.

Next the base station retransmits data 2A, data 4A as shown in <3>.

Then, the terminal uses a channel estimated value obtained and stored in <1>, baseband signal and retransmitted data 2A to cancel the modulated signal of data 2A from the stored baseband signal and demodulates data 2B from the signal after cancellation. In the same way, the terminal uses the stored channel estimated value, baseband signal and retransmitted data 4A to cancel the modulated signal of data 4A from the stored baseband signal and demodulates data 4B from the signal after cancellation.

However, when the terminal still detects that an error has occurred in data 2B, the terminal requests a retransmission of data 2B as shown in <4>.

Then, the base station transmits data 2B as shown in <5>.

When the terminal receives data 2B and confirms that no error has occurred, it notifies the base station that there is no need for a retransmission as shown in <6>.

Then, the base station is released from the retransmission operation and transmits new data, data 5A, data 5B, data 6A, data 6B, data 7A, data 7B, data 8A and data 8B as shown in <7>.

This operation is repeated.

Requesting a retransmission every plurality of frames as in this embodiment reduces the number of times the terminal sends retransmission requests compared to the case where a retransmission is requested every frame as in the case of Embodiment 15, and therefore the data transmission efficiency improves.

Embodiment 17

This embodiment proposes a method of further improving reception quality through retransmissions by improving the method of transmitting retransmission data when adopting the retransmission method as shown in Embodiment 15 and Embodiment 16. More specifically, this embodiment applies a space-time block code or cycled delay diversity to Embodiment 15 and Embodiment 16.

First, the process that led up to this embodiment will be explained. When not carrying out any retransmission, the multi-antenna transmission apparatus of the base station transmits modulated signal A and modulated signal B which are different modulated signals from two antennas. Therefore, it is more stable for the system to utilize two antennas effectively for data to be retransmitted than the case where only one antenna is used. Focusing on this point, this embodiment transmits retransmission data using a transmission method whereby a diversity gain is obtained such as space-time code or cyclic delay diversity shown in FIG. 84. This allows retransmission data of high quality to be obtained on the receiving side, and can thereby further improve the error rate characteristic when modulated signals A, B are demodulated.

Because the configuration of a space-time code has already been explained, cycled delay diversity will be explained using FIG. 92 and FIG. 77 here.

Figure 77:
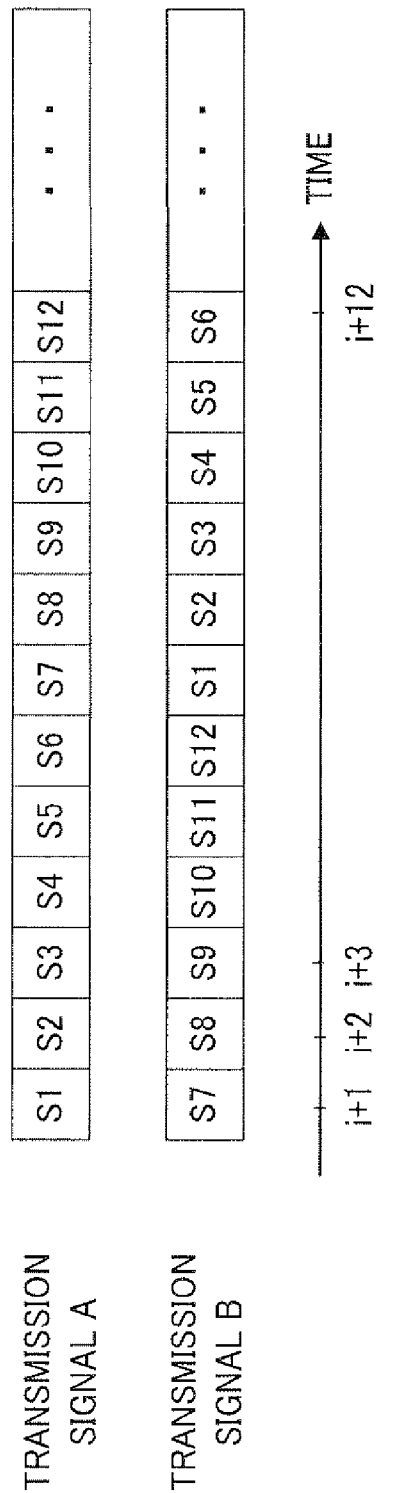
FIG. 77 illustrates cycled delay diversity.

FIG. 77 shows a frame configuration example when cycled delay diversity is realized using 12 symbols. The signal transmitted using antenna AN1 in FIG. 92 is transmission signal A in FIG. 77 and the signal transmitted using antenna AN2 in FIG. 92 is transmission signal B in FIG. 77. In the case of transmission signal A, S1, S2, . . . S11, S12 are transmitted at time i+1, i+2, i+11, i+12. Transmission signal B has a frame configuration which is shifted by a certain time with respect to transmission signal A. Here, S7, S8, . . . , S5, S6 are transmitted at time i+1, i+2, i+11, i+12. When such a frame configuration is adopted, the reception apparatus can obtain a diversity gain by equalizing the received signal, and therefore the reception quality of signals S1 to S12 improves and the error rate characteristic of the data improves.

Figure 78:
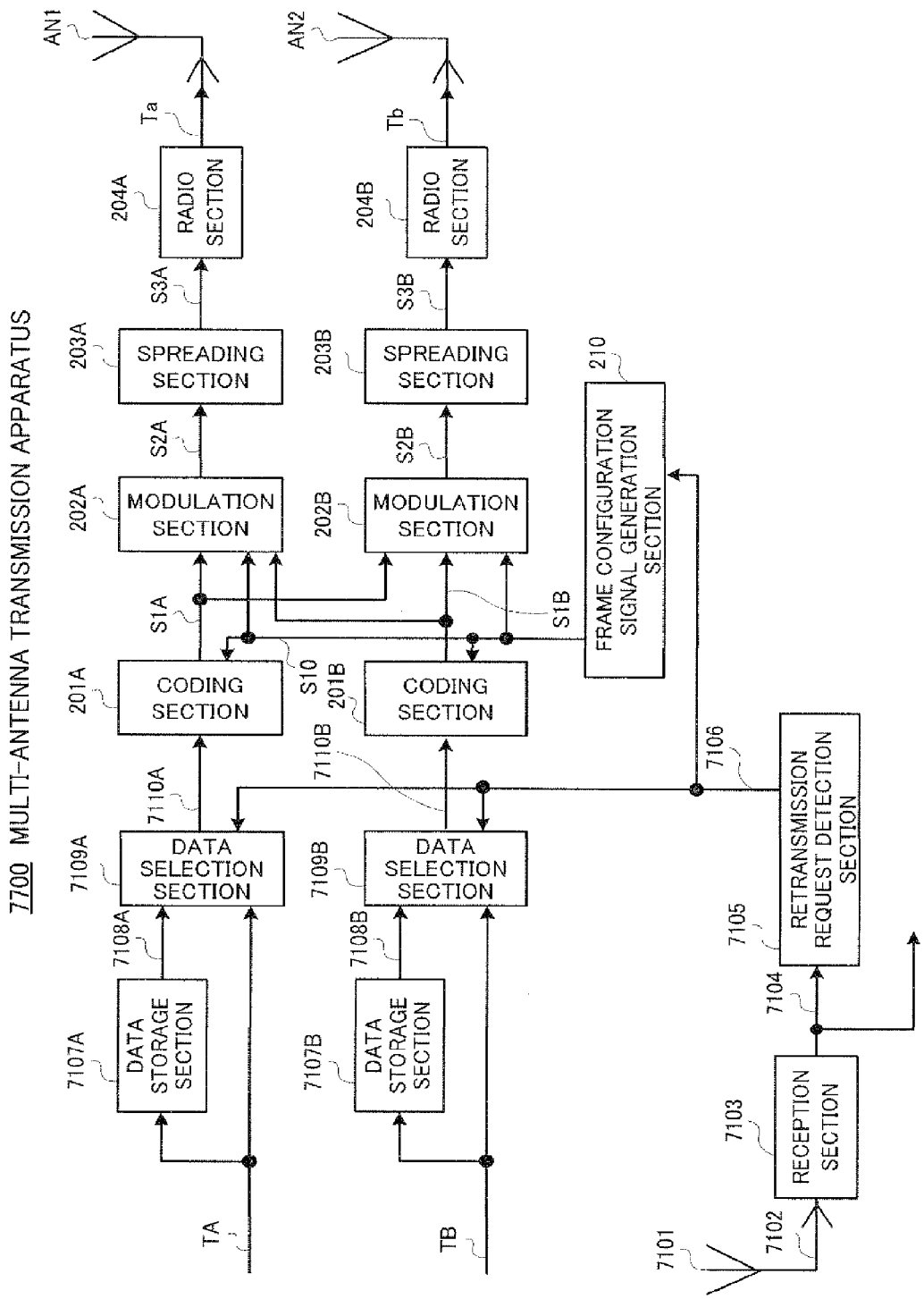
FIG. 78 is a block diagram showing the configuration of a multi-antenna transmission apparatus of Embodiment 17.

FIG. 78 shows a configuration example of the multi-antenna transmission apparatus to realize this. In FIG. 78 which shows parts corresponding to those in FIG. 70 assigned the same reference numerals, multi-antenna transmission apparatus 7700 has the same configuration as that of multi-antenna transmission apparatus 7000 in FIG. 70 except in that coded data S1A is also input to modulation section 2028 in addition to modulation section 202A and coded data S1B is also input to modulation section 202A in addition to modulation section 202B.

Figure 76:
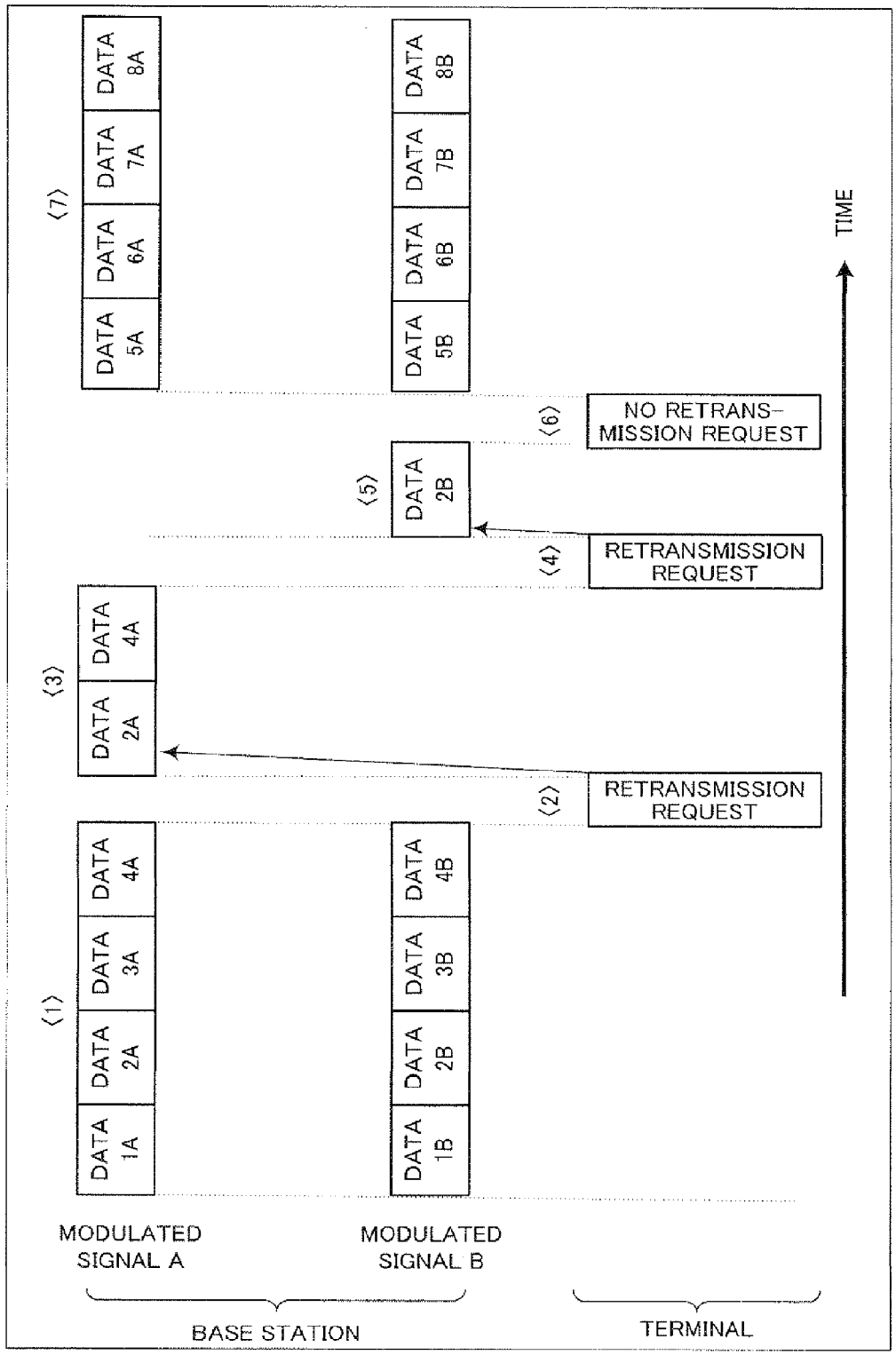
FIG. 76 illustrates the operation of Embodiment 16.

The retransmission operation in this embodiment will be explained using FIG. 71 and FIG. 76.

When transmitting data which is not retransmission data such as data 1A, data 1B in FIG. 71, modulation sections 202A, 202B operate in the same way as in Embodiment 15. On the other hand, when retransmitting data 2A as shown in <5> in FIG. 71, modulation section 202A, modulation section 202B modulate coded data S1A (i.e., data 2A) according to the rules of a space-time code or Cyclic Delay Diversity. In the same way, when retransmitting data 3B as shown in <9> in FIG. 71, modulation section 202A, modulation section 202B modulate coded data S1B (i.e., data 3B) according to the rules of the space-time code or Cyclic Delay Diversity.

As for the configuration of such a multi-antenna reception apparatus, for example, the one as shown in FIG. 72 can be used. However, retransmission information detection section 7304 is designed to perform demodulation according to the rules of the space-time code or cycled delay diversity. Other operations are the same as those explained in Embodiment 15 and Embodiment 16.

In this way, when carrying out a retransmission, in addition to retransmitting data of only one of the modulated signals instead of retransmitting data of both modulated signal A, modulated signal B, this embodiment performs a retransmission using a transmission method capable of obtaining diversity gains such as space-time code or Cyclic Delay Diversity, and can thereby further increase the possibility of reproducing data in which a frame error has occurred.

This embodiment has explained an example where the present invention is applied to a spectrum spreading communication scheme, but the present invention is not limited to this and the present invention is applicable to, for example, a single carrier scheme or an OFDM scheme which is not a spectrum spreading communication scheme. When applied to an OFDM scheme, a space-time code and cycled delay diversity can also be realized by developing them in the frequency axis direction as well as the time axis direction.

Embodiment 18

This embodiment proposes a multi-antenna reception apparatus and method capable of obtaining received digital data with a further improved error rate characteristic by improving the method of MLD (Maximum Likelihood Detection) carried out at soft decision sections 1101, 1705 of the signal processing section shown, for example, in FIG. 11, FIG. 17 and improving the accuracy of a provisional decision.

In a detection by MLD, a signal whose square Euclid distance between all candidate signal points created using estimated channel fluctuations h11, h12, h21, h22 and received signals R1-2, R2-2 becomes a minimum is decided as a transmission signal.

The detection by MLD can obtain the best reception quality (error rate characteristic) out of the detection methods such as ICD (Inverse Channel Detection) which uses an inverse matrix calculation and MMSE (Minimum Mean Square Error) but the signal point distances are not uniform, and therefore it is not possible to perform soft decision decoding as with the case using ICD.

Therefore, by weighting a Hamming distance after a hard decision with the difference between minimum square Euclid distance $U_{min}^2$ and next smallest square Euclid distance $U_{min2}^2$ and carrying out soft decision decoding in a pseudo form, it is possible to improve the BER characteristic (in this embodiment, this detection/decoding method is called an "MLD-H (MLD-Hard Decision Decoding)").

When four Hamming distances using QPSK modulation for both channels A, B are defined as $d_{H[0,0]}$, $d_{H[0,1]}$, $d_{H[1,0]}$, $d_{H[1,1]}$ respectively, branch metrics met $Tx_{a[i,j]}$, met $Tx_{b[i,j]}$ of respective channels A, B of MLD-H decoding methods are defined as shown in the following expression.

[Expression 5]

$$metTx_{a[i,j]} = \sum_{R_{x1}, R_{x2}} (U_{min2}^2 - U_{min}^2) d_{H[i,j]} (i = 0, 1; j = 0, 1) \quad (5)$$

[Expression 6]

$$metTx_{b[i,j]} = \sum_{R_{x1}, R_{x2}} (U_{min2}^2 - U_{min}^2) d_{H[i,j]} (i = 0, 1; j = 0, 1) \quad (6)$$

The MLD-H decoding method in the MIMO system is performed based on Expression (5), Expression (6) and a path where the sum of the branch metrics becomes a minimum is selected. Received digital data is obtained based on the selected path.

The MLD-H decoding method performs hard decision decoding using a Hamming distance, and therefore it has a disadvantage that the coding gain is smaller than when soft decision decoding is performed using a Euclid distance. Soft decision decoding is generally known to have a greater coding gain than hard decision decoding.

Considering this, as the soft decision decoding method in the case where a detection by MLD is used, this embodiment proposes an MLD-S (MLD-Soft Decision Decoding) decoding method whereby candidate signal points are classified into two sets for each transmission bit and soft decision decoding is performed using a minimum square Euclid distance between points of each set and the received signal points.

Figure 79:
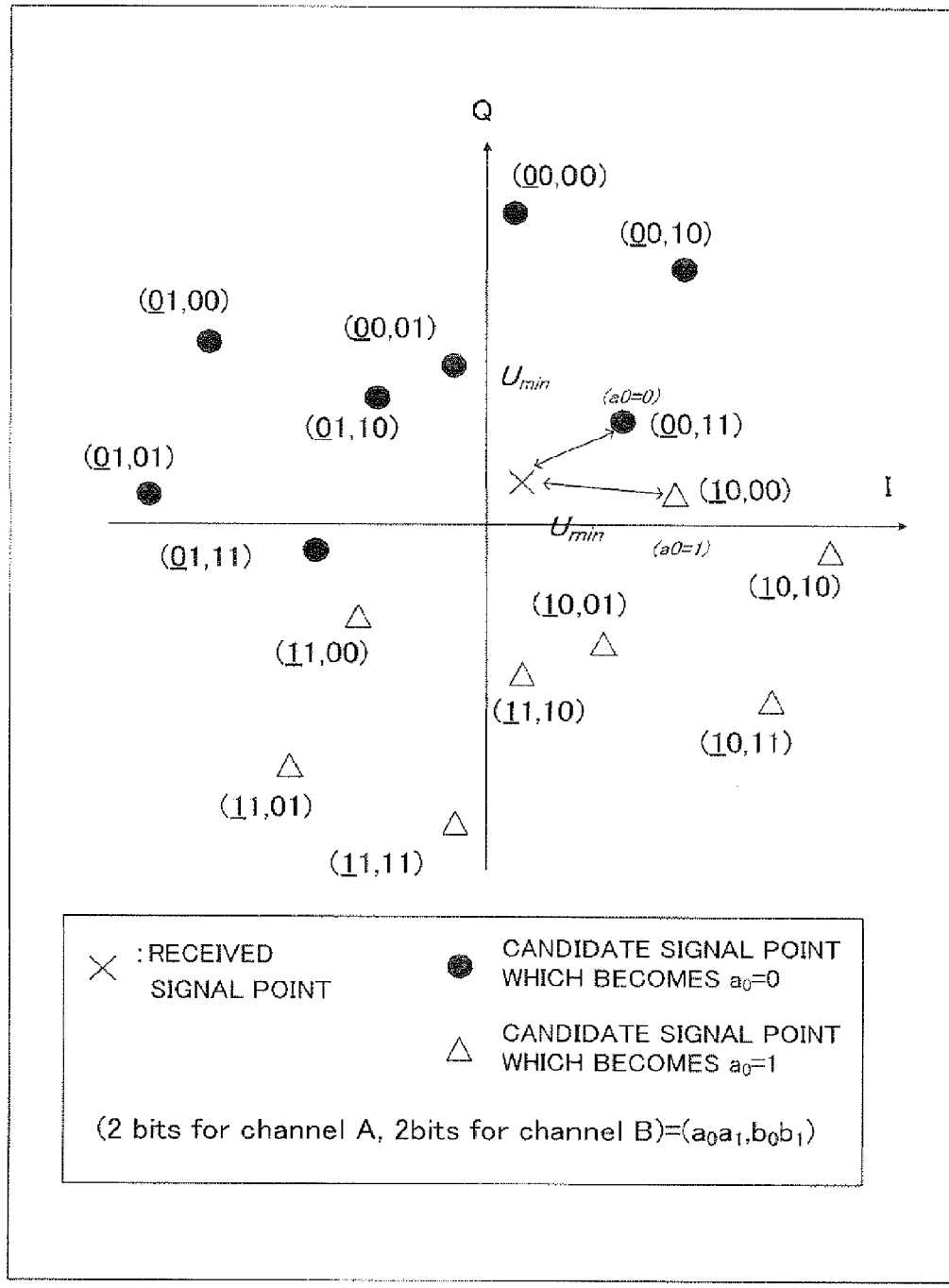
FIG. 79 illustrates an MLD-S (MLD-Soft Decision Decoding) decoding method of Embodiment 18.

This will be explained more specifically. FIG. 79 shows a case where a QPSK-modulated transmission signal is decoded using the MLD-S decoding method. The minimum square Euclid distance corresponding to $a_0=0$ and $a_0=1$ out of two bits $a_0$, $a_1$ transmitted on channel A is calculated.

$4^2=16$ candidate signal points shown in FIG. 79 can be classified into sets of 8 points corresponding to $a_0=0$ and $a_0=1$. Minimum square Euclid distance $U_{min(a0=0)}^2$ and $U_{min(a0=1)}^2$ between 8 candidate signal points and received signal points are calculated for each set. Such a classification and calculation are performed on another bit $a_1$ transmitted on channel A and 2 bits $b_0$, $b_1$ transmitted on channel B likewise and soft decision decoding is performed using these minimum square Euclid distances.

The branch metrics met $Tx_{a[i,j]}$, met $Tx_{b[i,j]}$ of channels A, B are defined as shown in the following expressions.

[Expression 7]

$$metTx_{a[i,j]} = \sum_{R_{x1}, R_{x2}} (U_{min2}^2 - U_{min}^2) d_{S[i,j]} (i=0,1; j=0,1) \quad (7)$$

[Expression 8]

$$metTx_{b[i,j]} = \sum_{R_{x1}, R_{x2}} (U_{min2}^2 - U_{min}^2) d_{S[i,j]} (i=0,1; j=0,1) \quad (8)$$

Here, $d_{S[i,j]}$ in Expression (7) is defined as shown in the following expression.

[Expression 9]

$$dS[i,j] = U_{min(a0=i)}^2 + U_{min(a1=j)}^2 \quad (9)$$

Furthermore, $d_{S[i,j]}$ in Expression (8) is defined as shown in the following expression.

[Expression 10]

$$dS[i,j] = U_{min(b0=i)}^2 + U_{min(b1=j)}^2 \quad (10)$$

In this embodiment, MLD-S decoding in the MIMO system is carried out based on Expression (7) to Expression (10) and a path where the sum of the branch metrics becomes a minimum is selected. Received digital data is obtained based on the selected path.

In this way, according to this embodiment, when using detection by MLD at the time of a provisional decision, candidate signal points are classified into two (a plurality of) sets and soft decision decoding is performed using a minimum square Euclid distance between the points of each set and the point of the received signal, and therefore it is possible to perform MLD with a reduction of the coding gain suppressed and improve the error rate characteristic at the time of a provisional decision. As a result, the received digital data with the further improved error rate characteristic can be obtained.

This embodiment has explained the case where MLD-S decoding is performed using only a minimum square Euclid distance of the two classified sets, but it is also possible to perform MLD-S decoding using a plurality of square Euclid distances, for example, using the second smallest square Euclid distance.

Furthermore, this embodiment has explained the case using QPSK modulation, but the present invention can also be likewise implemented using other modulation schemes such as BPSK, 16QAM, 64QAM.

The decoding method proposed in this embodiment is not limited to an apparatus which performs iterative decoding and effects similar to those of the above described embodiment can be obtained even when single decoding is performed.

Embodiment 19

This embodiment proposes to change intervals at which specific symbols are inserted according to a retransmission request when inserting specific symbols (STBC symbols or special symbols as shown in FIG. 41, FIG. 42) explained in Embodiment 9 at regular timing.

A schematic configuration of the terminal (retransmission requesting apparatus) of this embodiment is as shown in FIG. 68, the frame configuration of a modulated signal transmitted by the terminal is as shown in FIG. 69 and a schematic configuration of the base station (apparatus which retransmits data) is as shown in FIG. 70. Since FIG. 68, FIG. 69 and FIG. 70 have already been explained in Embodiment 15, overlapping explanations will be omitted and only the configuration specific to this embodiment will be explained here.

Figure 80:
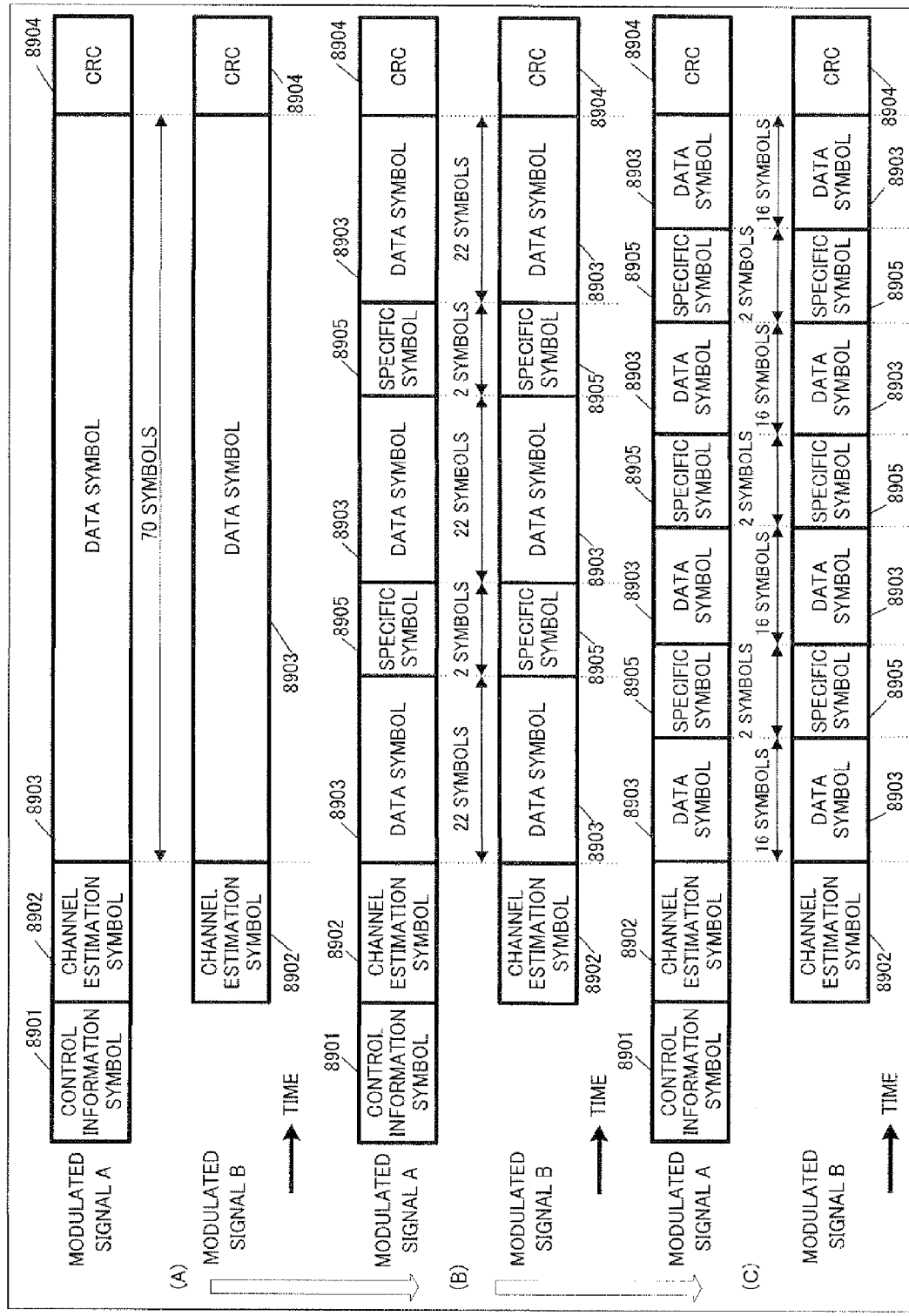
FIG. 80 shows the transmission frame configuration of Embodiment 19.

In this embodiment, coding sections 201A, 201B, modulation sections 202A, 202B in FIG. 70 receive frame configuration signal S10, change the frame configuration based on a frame switching rule in FIG. 80 and performs a retransmission.

The frame configuration in FIG. 80 will be explained in detail. Control information symbol 8901 is a symbol to transmit information on the frame configuration or the like. Channel estimation symbol 8902 is a symbol to estimate each channel fluctuation due to fading or the like on the receiving side. Data symbol 8903 is a symbol which is formed based on each of transmission digital signals TA, TB and transmits data. The data symbol of modulated signal A and the data symbol of modulated signal B at the same time are transmitted from different antennas.

CRC symbol 8904 is a symbol to inspect whether or not there is an error in data symbols of modulated signals A, B on the receiving side. Specific symbol 8905 is a specific symbol (STBC symbol or special symbol as shown in FIG. 41, FIG. 42) as explained in Embodiment 9.

As shown in (A), (B), (C) of FIG. 80, this embodiment uses transmission frames having different intervals of insertion of specific symbols. FIG. 80(A) shows a frame configuration in which no specific symbol is inserted. FIG. 80(B) shows a frame configuration in which specific symbols are inserted at intervals of 22 symbols and FIG. 80(C) shows a frame configuration in which specific symbols are inserted at intervals of 16 symbols. This embodiment performs transmission selectively using any one of the frame configurations in FIGS. 80(A), (B), (C). For example, it is possible to consider a method of changing intervals of insertion of specific symbols by selecting any one of FIG. 80(A), (B), (C) according to a request (information on the reception field intensity and the error rate and so on) from the terminal. Hereinafter, the method of changing a frame configuration at the time of retransmission in particular will be explained in detail.

Figure 81:
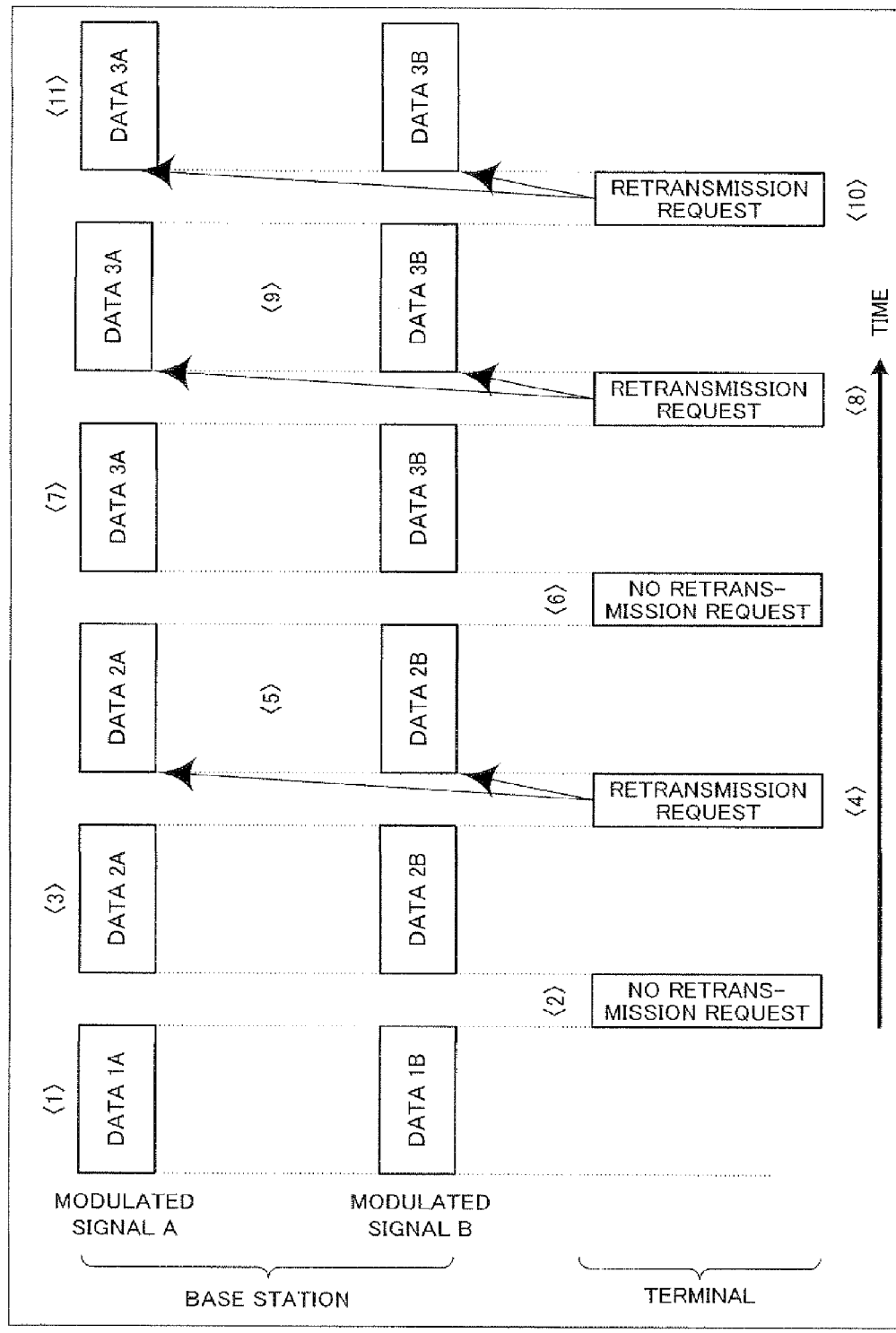
FIG. 81 shows an example of retransmission operation of Embodiment 19.

FIG. 81 shows a flow of transmission signals of the base station and the terminal of this embodiment. Though, the figure is simplified in FIG. 81, a signal transmitted from the base station is actually a signal on a frame-by-frame basis composed of control information, CRC symbol, specific symbol (STBC symbol or special symbol as shown in FIG. 41, FIG. 42) or the like in addition to data symbol.

In FIG. 81, as shown in <1>, the base station transmits data 1A with modulated signal A and data 1B with modulated signal B in the frame configuration with no specific symbols inserted as shown in FIG. 80(A). When the terminal receives the data without any error, it requests no retransmission as shown in <2>.

Next, the base station transmits data 2A with modulated signal A and data 2B with modulated signal B as shown in <3> in the frame configuration with no specific symbol inserted as shown in FIG. 80(A). When the terminal receives this data with an error, it requests a retransmission as shown in <4>.

Then, the base station transmits data 2A with modulated signal A and data 2B with modulated signal B in the frame configuration with specific symbols inserted as shown in FIG. 80(B) which improves reception quality compared to that of the frame configuration in FIG. 80(A) as shown in <5>. When the terminal receives this data without errors, it requests no retransmission as shown in <6>.

Next, as shown in <7>, the base station transmits data 3A with modulated signal A and data 3B with modulated signal B in the frame configuration with no specific symbols inserted as shown in FIG. 80(A). When the terminal receives this data with an error, it requests a retransmission as shown in <8>.

Then, the base station transmits data 3A with modulated signal A and data 3B with modulated signal B in the frame configuration with specific symbols inserted as shown in FIG. 80(B) which improves reception quality compared to that of the frame configuration in FIG. 80(A) as shown in <9>. When the terminal receives this data with errors, it requests a retransmission as shown in <10>.

Then, the base station transmits data 3A with modulated signal A and data 3B with modulated signal B in the frame configuration with shorter intervals of symbol insertion than the frame configuration in FIG. 80(B) which further improves reception quality compared to that of the frame configuration in FIGS. 80(A), (B) as shown in <11>.

Figure 82:
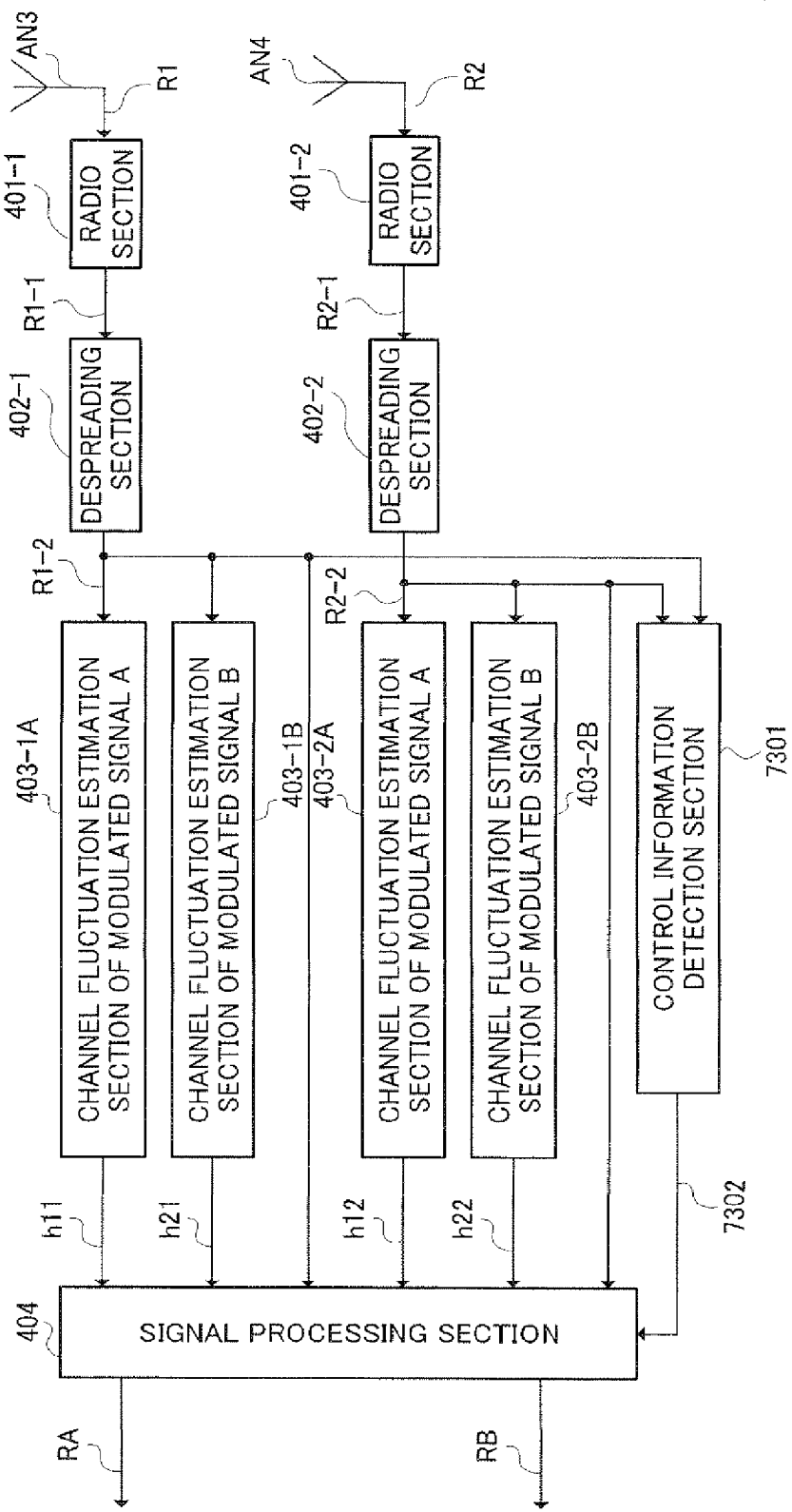
FIG. 82 is a block diagram showing the configuration of a multi-antenna reception apparatus of Embodiment 19.

FIG. 82 shows a configuration example of the reception apparatus of the terminal of this embodiment. In FIG. 82, parts which operate in the same way as those in FIG. 72 are assigned the same reference numerals. In FIG. 82, what is different from the reception apparatus in FIG. 72 is that there are no parts that reduce signal points using stored signals during a retransmission as shown in FIG. 72. Control information detection section 7301 extracts information on the transmission method (frame configuration) from control information symbol 8901 which is included in the frame in FIG. 80 and outputs frame configuration signal 7302. Then, signal processing section 404 applies demodulating processing based on frame configuration signal 7302 and outputs digital signals RA, RB.

In this way according to this embodiment, by shortening intervals of insertion of specific symbols which contributes to an improvement of reception quality (in other words, increasing the number of times symbols are inserted) as the number of retransmissions increases, it is possible to reduce the number of retransmissions. This can further improve data transmission efficiency. This is because reception quality improves as the number of insertions of specific symbols increases (however, the transmission speed decreases). That is, when there is a retransmission request and a modulated signal is transmitted, if a transmission method similar to the transmission method used for the preceding transmission (number of times similar specific symbols are inserted) is used, errors may recur, and it is more appropriate to increase the number of times specific symbols are inserted to reduce the probability of errors. Furthermore, according to the method of increasing the number of times specific symbols are inserted as the number of retransmissions increases, the data transmission speed decreases as the number of times specific symbols are inserted increases, but when compared to, for example, the modulation scheme is changed (using a modulation scheme whereby the amount of data transmitted with one symbol is decreased as the number of retransmissions increases), the reduction of the data transmission speed is significantly small.

This embodiment has explained the method and apparatus for changing the number of times specific symbols are inserted according to the number of retransmissions, but changing the number of times specific symbols are inserted is not only applicable to cases where retransmissions are performed. For example, changing the number of times specific symbols are inserted according to a request from the terminal or the like may also improve the reception quality and data transmission speed.

Working Example 1

This Working Example will explain a Working Example related to a multi-antenna transmission apparatus in which an interleaving pattern of a modulated signal transmitted from each antenna is made to differ from one modulated signal to another which has been explained in Embodiment 6 and Embodiment 7.

Figure 83:
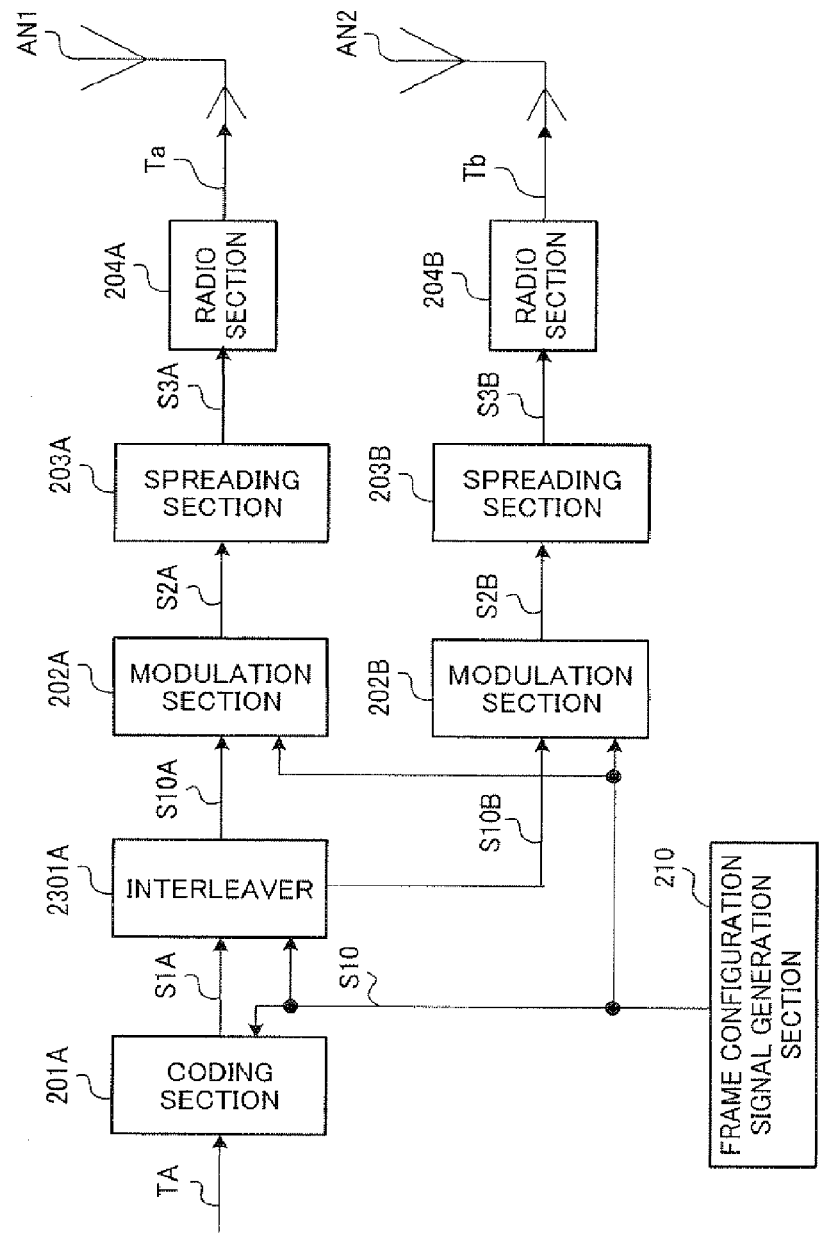
FIG. 83 is a block diagram showing the configuration of a multi-antenna transmission apparatus of Working Example 1.

FIG. 83 shows the configuration of a multi-antenna transmission apparatus in the case where only one coding section and one interleaver are assumed to be used in FIG. 23 explained in Embodiment 6.

Multi-antenna transmission apparatus 7900 has a configuration similar to that of multi-antenna transmission apparatus 2300 in FIG. 23 explained in Embodiment 6 except in that coding section 201B and interleaver 2301B have been removed from FIG. 23. Therefore, explanations of parts operating in the same way as those explained in Embodiment 6 will be omitted.

This embodiment will explain a method of improving reception quality using different interleaving patterns explained in Embodiment 6 when there are one coding section and one interleaver.

Interleaver 2301A receives coded digital signal S1A, changes the sequence and sends digital signals S10A, S10B after interleaving to modulation sections 202A, 202B.

Figure 84:
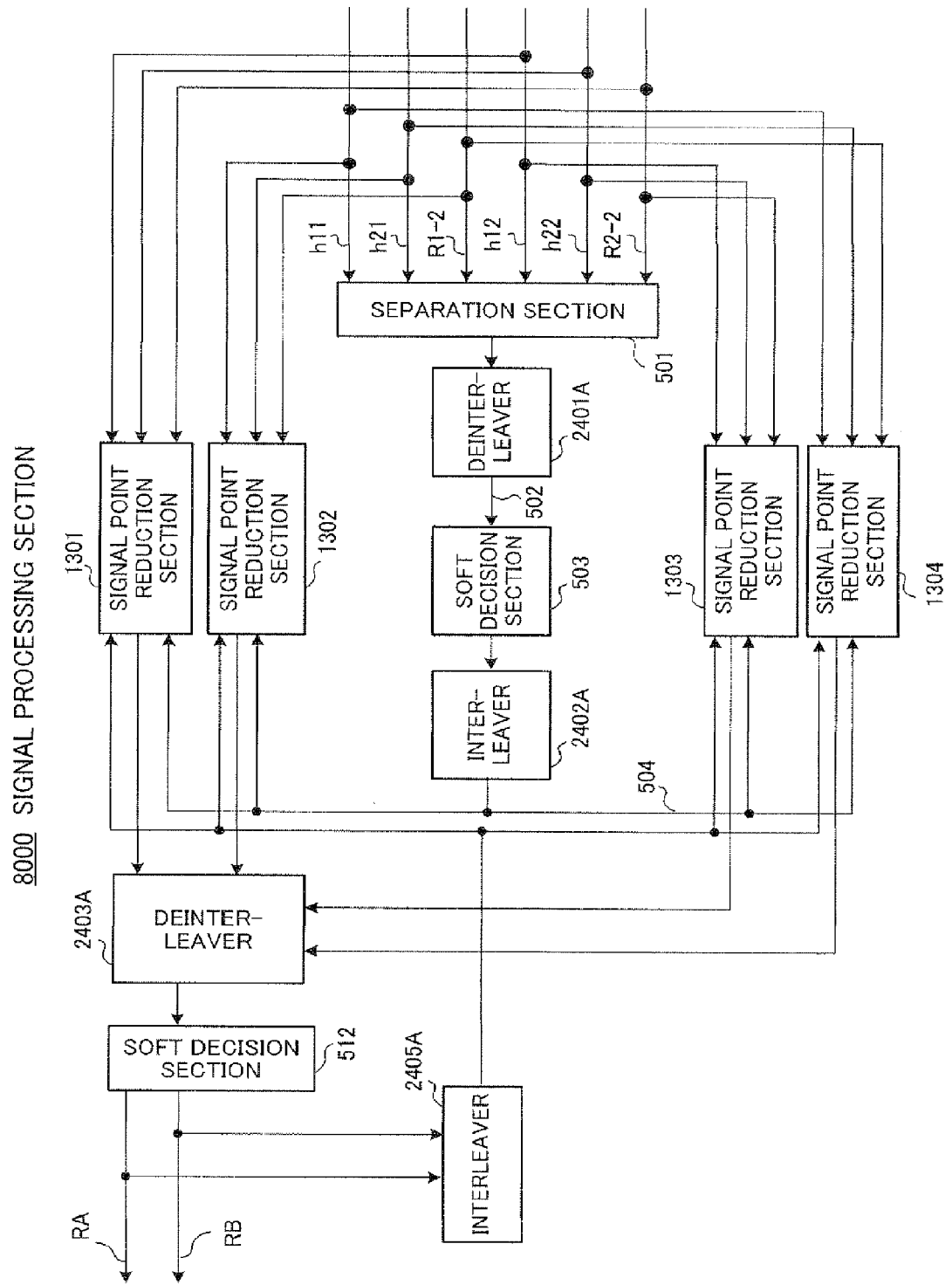
FIG. 84 is a block diagram showing a configuration example of a signal processing section of a multi-antenna reception apparatus of Working Example 1.

When interleaving processing is carried out on the transmission apparatus side in this way, the receiving side needs to perform deinterleaving processing as in the case of FIG. 23. FIG. 84 shows a configuration example of the reception apparatus in this case. The configuration example in FIG. 84 corresponds to signal processing section 2400 in FIG. 24 explained in Embodiment 6. What is different from FIG. 24 is that it is provided with only deinterleavers 2401A, 2403A, only interleavers 2402A, 2405A and only soft decision sections 503, 512. Though deinterleavers 2401A, 2403A, interleavers 2402A, 2405A and soft decision sections 503, 512 are shown as separate sections respectively in FIG. 84, they function in the same way, and therefore the actual apparatus can be provided with one of each pair.

Next, the operation of this Working Example will be described in detail. Furthermore, this Working Example will be explained assuming that BPSK modulation is used as the modulation scheme.

Figures 1, 85:
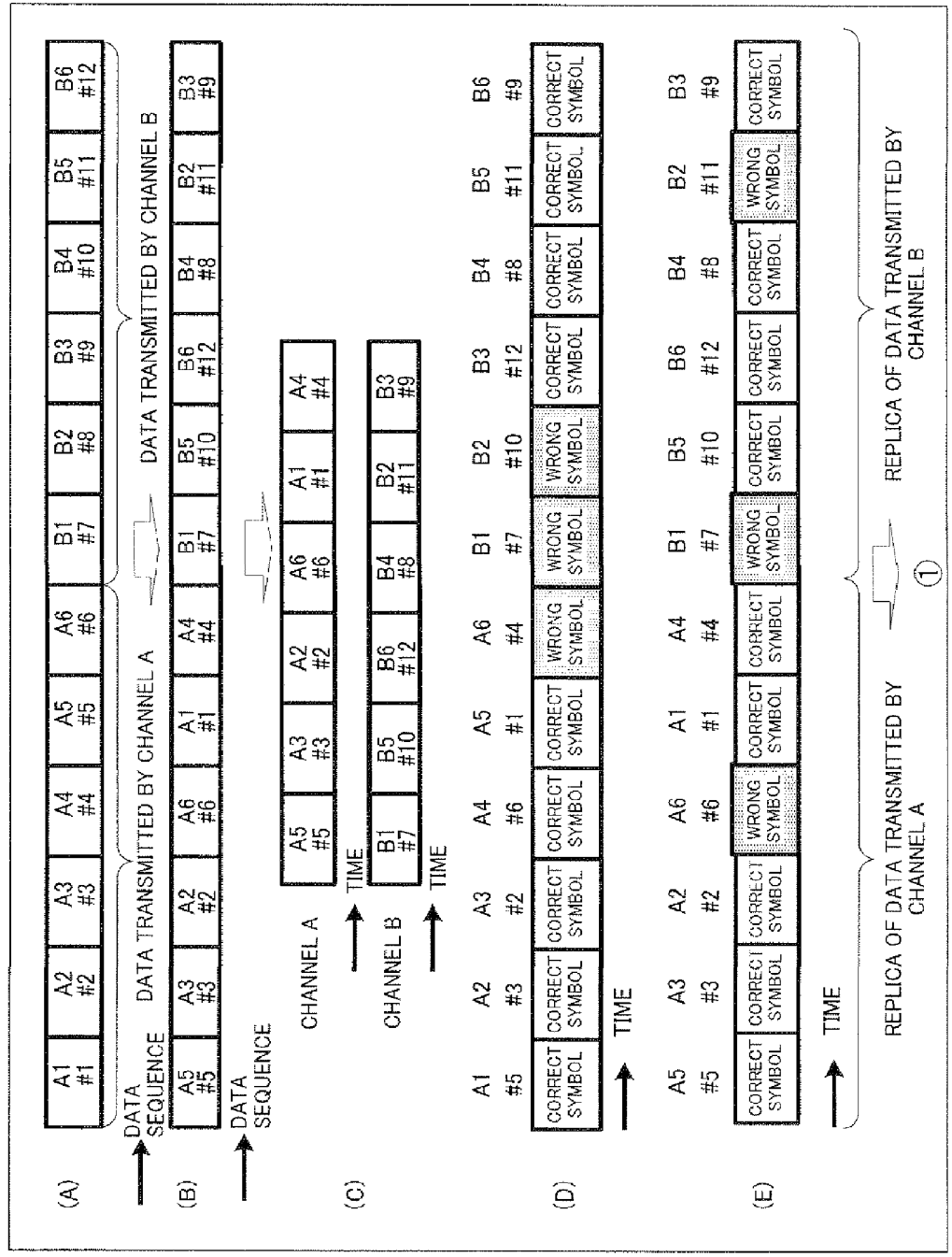
Figures 2, 85:
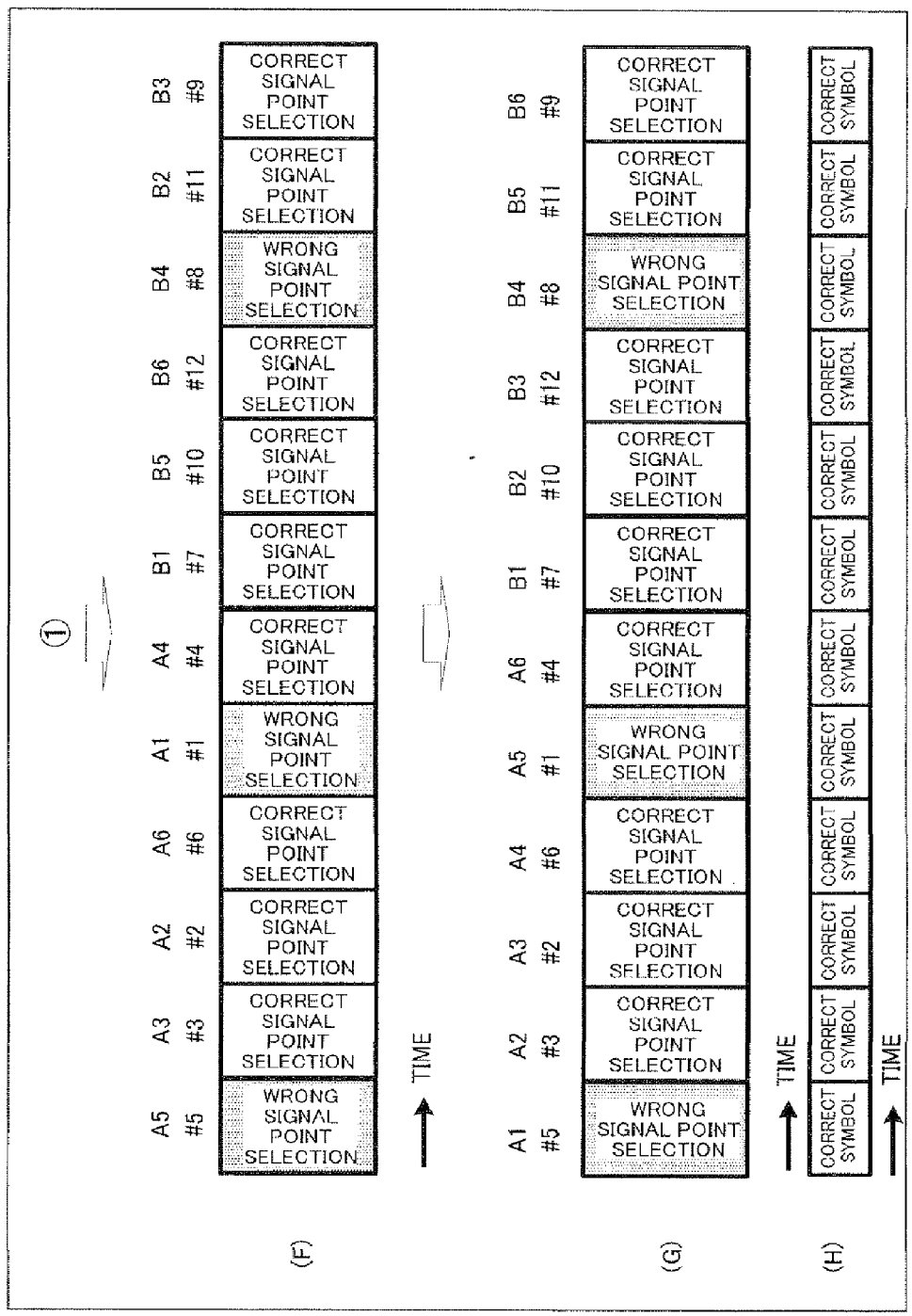

When, for example, 12 bits are input, interleaver 2301A of multi-antenna transmission apparatus 7900 interleaves these bits and then arranges 6 bits for each channel A, B. This situation is shown in FIG. 85-1, FIG. 85-2. In these figures, #1, #2, . . . , #12 show the data sequence before interleaving. #1 to #6 are symbols on channel A and #7 to #12 are symbols on channel B.

Multi-antenna transmission apparatus 7900 applies interleaving using first 6 symbols #1 to #6 and applies interleaving using second 6 symbols #7 to #12 to input data as shown in FIG. 85-1(A). Then, the first 6 symbols are regarded as symbols on channel A and second 6 symbols are regarded as symbols on channel B.

At this time, multi-antenna transmission apparatus 7900 makes the rearrangement of the data sequence on channel A differ from the rearrangement of the data sequence on channel B. This is obvious from the fact that the arrangement of symbols A1 to A6 on channel A shown in the interleaved data shown in FIG. 85-1(B) is different from the arrangement of symbols B1 to B6 on channel B. However, the interleaving pattern shown in FIG. 85-1(B) is an example and what is important here is that the interleaving pattern is made to differ between channels.

In this way, as shown in FIG. 85-1(B), transmission frame configurations of channel A and channel B having different sequences are formed in the time axis direction. As shown in FIG. 85-1(C), for example, symbols A5 and B1 are transmitted from different antennas at the same time and likewise, symbols A3 and B5 are transmitted from different antennas at the same time.

Interleaver 2301A sends digital signals S10A, S10B after interleaving about channels A, B formed in this way to modulation sections 202A, 202B. Modulation section 202A generates a modulated signal based on S10A and transmits it from transmit antenna AN1. In the same way, modulation section 202B generates a modulated signal based on S10B and transmits it from transmit antenna AN2.

Signal processing section 8000 on the receiving side returns estimated baseband signals (both of channel A, B) of the transmission digital signals separated by separation section 501 to their original sequences by deinterleaver 2401A and then outputs them to soft decision section 503.

FIG. 85-1(D) shows a correct/wrong state of each symbol after being decoded by soft decision section 503. As explained in Embodiment 6, errors generally occur consecutively when a convolutional code or the like is used.

Signal processing section 8000 performs iterative decoding using the result shown in FIG. 85-1(D).

FIG. 85-1(E) shows states of replica signals (signals estimated to reduce signal points) to which interleaving is applied once again based on the decoding result in FIG. 85-1(D) at signal processing section 8000 and corresponds to the output of interleaver 2402A of signal processing section 8000. In 85-1(E), first 6 symbols are replicas of the data transmitted on channel A and the 7th to 12th symbols are replicas of the data transmitted on channel B.

FIG. 85-2(F) shows a state in which candidate signal points of the subject modulated signal are reduced using the replicas of the other channel signal, that is, the state when data is input to deinterleaver 2403A of signal processing section 8000.

FIG. 85-2(G) shows a state of output of deinterleaver 2403A, that is, the state when data is input to soft decision section 512.

As is also understandable from FIG. 85-2(G), wrong signal point selections occur discretely. In this way, when soft decision section 512 decodes modulated signals A, B (e.g., Viterbi decoding), reception quality improves effectively as shown in FIG. 85-2(H) as in the case explained in Embodiment 6 where the interleaving patterns of modulated signals A, B are made to differ from each other.

Figure 86:
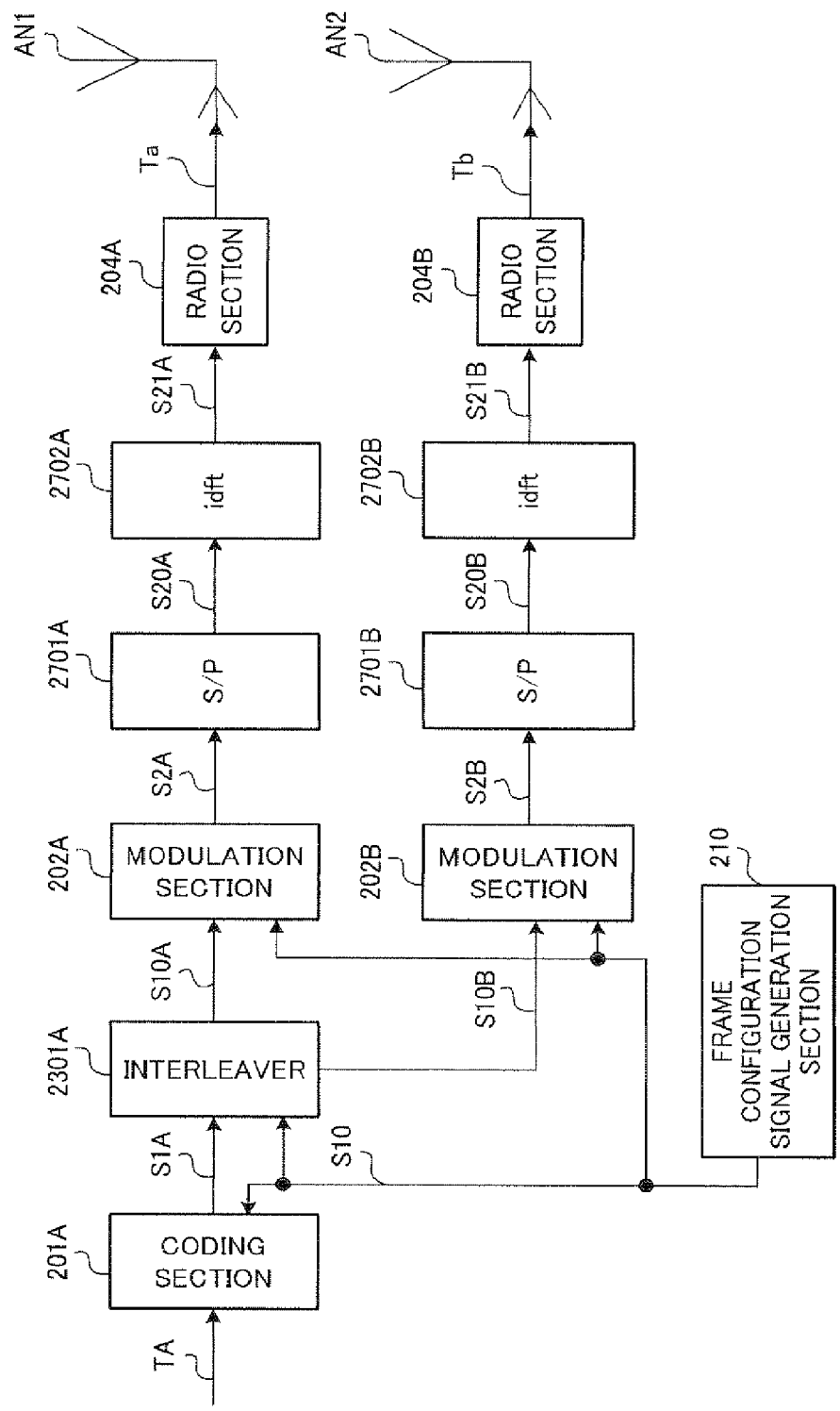
FIG. 86 is a block diagram showing the configuration of the multi-antenna transmission apparatus of Working Example 1

The example explained in this embodiment is also applicable to a multicarrier communication exemplified by OFDM explained in Embodiment 7. In this case, it is possible to adopt a configuration with coding section 201B and interleaver 2301B excluded from the multi-antenna transmission apparatus 2900 explained in FIG. 32. For example, it is possible to adopt the configuration shown in FIG. 86. FIG. 86 shows parts corresponding to those in FIG. 32 assigned the same reference numerals. Multi-antenna transmission apparatus 8200 in FIG. 86 is different from multi-antenna transmission apparatus 2900 in FIG. 32 in that it is provided with only one coding section, and one interleaver.

When the configuration in FIG. 86 is adopted, coding may be performed in the time axis direction or coding may be performed in the frequency axis direction. That is, it is possible to perform a rearrangement of a data sequence as shown in FIG. 85-1 so that data on channel A, channel 13 are arranged in the time axis direction of some subcarriers (coding in the time axis direction) or perform a rearrangement of a data sequence similar to that in FIG. 85-1 in the frequency axis direction (that is, coding is performed in the subcarrier direction) (coding in frequency axis direction).

On the other hand, when considered theoretically, in the configuration having one coding section and one interleaver, there is a possibility that good reception quality may be given even when the interleaving section carries out random interleaving. However, there is a possibility that errors may be concentrated on one of the modulated signals such that many errors occur only in modulated signal A. Therefore, it is technically important to use an interleaving pattern such that errors are not concentrated on one of the modulated signals. One example thereof is shown in FIG. 85-1.

Figure 87:
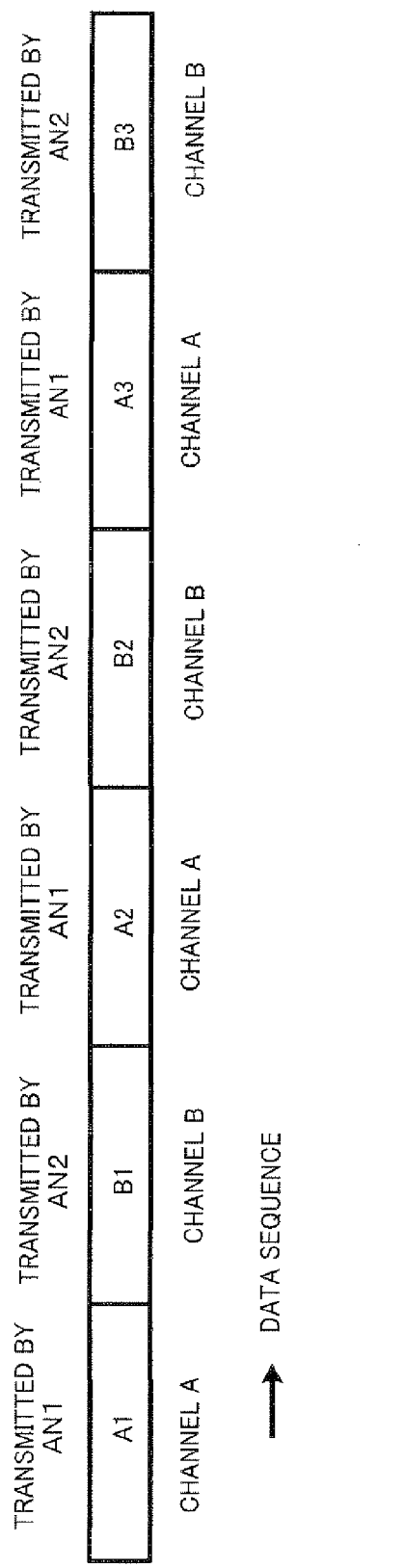
FIG. 87 shows a transmission frame of Working Example 1.

As an application example of FIG. 85-1, it is possible to consider a method of composing 1 frame by repeating the frame in FIG. 85-1 a plurality of times as shown in FIG. 87. In FIG. 87, A1, A2, A3 each correspond to the symbol group (symbol group composed of 6 symbols) on channel A in FIG. 85-1, B1, B2, B3 each correspond to the symbol group (symbol group composed of 6 symbols) on channel B in FIG. 85-1, A1, A2, A3 are transmitted from antenna AN1 in FIG. 83 and B1, B2, B3 are transmitted from antenna AN2 in FIG. 83. Furthermore, A1, A2, A3 may have different interleaving patterns and B1, B2, B3 may have different interleaving patterns.

It is essential only that interleaving be performed in units of a symbol group composed of a plurality of symbols and symbols making up the symbol group also be interleaved.

Figure 88:
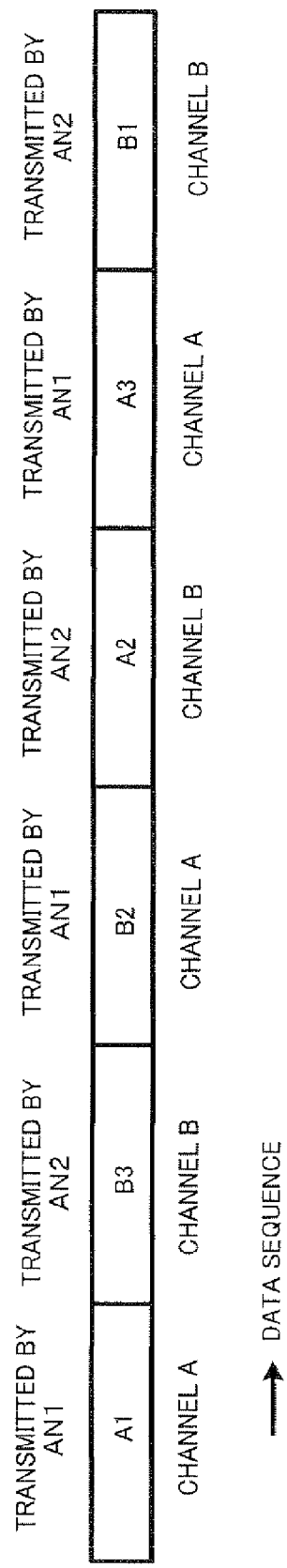
FIG. 88 shows a transmission frame of Working Example 1.

Therefore, the sequence may be as shown in FIG. 88. At this time, A1, B2, A3 are transmitted from antenna AN1 in FIG. 83 and B3, A2, B1 are transmitted from antenna AN2 in FIG. 83.

Furthermore, interleaving may be performed across A1, A2 A3 or interleaving may also be performed across B1, B2, B3. For example, if it is assumed that A1, A2, A3 are each composed of 6 symbols, there are a total of 18 symbols in A1, A2, A3. Then, interleaving may be applied within these 18 symbols and symbols may be divided into three symbol groups of A1, A2, A3. Furthermore, A1, A2, A3 need not always have the same number of symbols.

Figure 89:
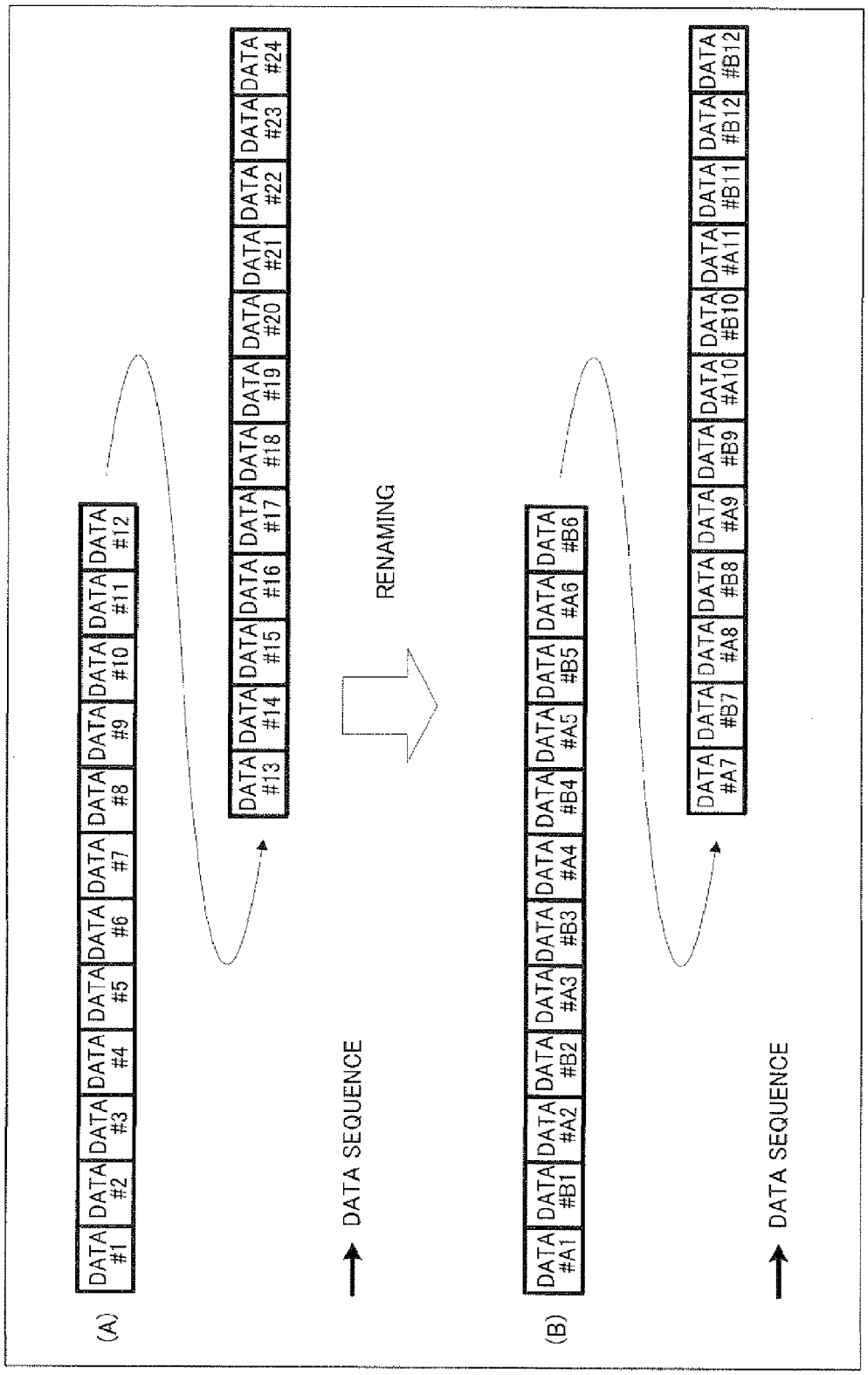
FIG. 89 illustrates interleaving of Working Example 1.

A preferred way of ideal interleaving may be summarized as follows. Here, a case where one referred to as a "symbol group" so far is assumed to have 1 symbol will be described. First, one sequence of data is alternately assigned to channel A and channel B. This situation is shown in FIG. 89. FIG. 89(A) shows a sequence of original data which is named #1 to #24 according to the data sequence. Then, suppose these are assigned to channel A and channel B alternately and transmitted. Therefore, since "data #1" is assigned to the first of channel A, it is named "data #A1" as shown in FIG. 89(B) and since "data #2" is assigned to the first of channel B, it is named "data #B1" as shown in FIG. 89(B). In like fashion, since "data #3" is assigned to the second of channel A, it is named "data #A2" and since "data #4" is assigned to the second of channel B, it is named "data #B2." In like fashion, data sequentially assigned to channel A are named "data #A3" to "data #A12" and data sequentially assigned to channel B are named "data #B3" to "data #B12."

As shown in FIG. 89(B), examples of interleaving of the data assigned to channels A, B are shown in FIG. 90(A) to (D). In FIG. 90, the horizontal axis shows a frequency (sub-carriers in OFDM) and signals on channels A, B are supposed to be transmitted from different antennas (for example, antennas AN1, AN2 in FIG. 86) at the same time from 12 subcarriers of carriers 1 to 12.

According to the result, FIG. 90(A) shows an example of interleaving with a small reception quality improvement effect and FIGS. 90(B), (C), (D) show examples of interleaving with a large reception quality improvement effect.

First, interleaving in FIG. 90(A) will be explained. Suppose that both channel A and channel B arrange data regularly for every third carrier (here, arranging data regularly for every third carrier means the following processing. That is, when carrier 1, carrier 4, carrier 7, carrier 10 are arranged in that order first, the sequence is then returned to carrier 2 followed by carrier 5, carrier 8 and carrier 11. Then, the sequence is returned to carrier 3 followed by carrier 6, carrier 9 and carrier 12. Next, the sequence is returned to carrier 1 followed by carrier 4, carrier 7 and carrier 10). According to this rule, suppose a case where symbols are assigned to channel A and channel B, channel A is deinterleaved on the receiving side and signal points of channel B are reduced using the result of decoding deinterleaved channel A. If it is assumed that burst errors have occurred in the decoding result on channel A such as data #A6, data #A7, data #A8, burst errors occur in the reduction of signal points in data #B9, data #B10, data #B11 on channel B. As a result, the improvement effect of the reception quality through interleaving becomes small.

Next, interleaving in FIG. 90(B) will be explained. In short, the way of interleaving in FIG. 90(B) is a method whereby a symbol interleaving pattern itself is made to differ between channel A and channel B. This can avoid burst errors in a signal point reduction caused by burst errors due to decoding of channel A. As a result, it is possible to significantly improve the reception quality of both channel A and channel B.

Next, interleaving in FIG. 90(C) will be explained. In FIG. 90(C), channel A arranges data regularly for every third carrier and channel B arranges data regularly for every second carrier (here, arranging data regularly for every second carrier means the following processing. That is, suppose arrangement follows such a rule that when carrier 1, carrier 3, carrier 5, carrier 7, carrier 9, carrier 11 are arranged in that order first, the sequence is then returned to carrier 2 followed by carrier 4, carrier 6, carrier 8, carrier 10 and carrier 12. Next, the sequence is returned to carrier 1 followed by carrier 3, carrier 5, carrier 7, carrier 9 and carrier 11).

In this way, channel A arranges data regularly for every xth carrier and channel B arranges data regularly for every yth (x≠y) carrier, and it is possible to thereby avoid burst errors in a signal point reduction caused by burst errors through decoding of channel A. As a result, the reception quality can be improved significantly for both channel A and channel B.

In other words, the interleaving as shown in FIG. 90(C) corresponds to applying block interleaving to every xth symbol (x=2 in the figure) about channel A and applying block interleaving to every yth (y=3: x≠y in the figure) symbol about channel B. This effectively reduces burst errors in a signal point reduction. In FIG. 28 which has already been explained, it can be said that block interleaving is applied to every 5th symbol about channel A (modulated signal A) and block interleaving is applied to every 8th symbol about channel B (modulated signal B). Furthermore, in FIG. 45, it can be said that interleaving is applied to every 100th symbol.

Here, as a more preferable way of selecting x and y (x≠y), this embodiment proposes to use a prime number for at least one of x and y. This makes it possible to realize interleaving much similar to random interleaving between the signal on channel A and the signal on channel B and further reduce burst errors.

For example, suppose x=31 (prime number), y=30, or x=30, y=31 (prime number). The block size at this time becomes 31×30=930. Then, on channel A, a block interleaver for every 31 symbols performs interleaving using an interleaving pattern of block size 930. On channel B, a block interleaver for every 30 symbols performs interleaving using an interleaving pattern of block size 930. Then, the period of the interleaving pattern between channel A and channel B becomes 31×30. On the other hand, consider interleaving which has a block size of 1000 which is bigger than 930. For example, suppose x=25, y=40, or x=40, y=25. Then, on channel A, suppose a block interleaver for every 25 symbols performs interleaving using an interleaving pattern of block size 1000 (=25×40). Then, on channel B, suppose a block interleaver for every 40 symbols performs interleaving using an interleaving pattern of block size 1000 (=40×25). Then, the period of the interleaving pattern between channel A and channel B is 200, which is the least common multiple of x and y, which is smaller than 25×40. As a result, the randomness between the signal on channel A and the signal on channel B decreases compared to a case where a prime number is used for any one of x and y.

This concept can also be applied to a case where the number of channels is equal to or more than 3. As an example, a case where the number of transmit antennas is 3 and there are 3 transmit antennas will be explained. Here, a case where block interleaving is applied to channel A for every x symbols, to channel B for every y symbols and to channel C for every z symbols is considered. In this case, x≠y≠z and at least two values may be prime numbers. That is, when x, y are prime numbers, the block size becomes xyz which is the least common multiple thereof. Then, on channel A, a block interleaver for every x symbols performs interleaving in an interleaving pattern of block size xyz. On channel B, a block interleaver for every y symbols performs interleaving in an interleaving pattern of block size xyz. On channel C, a block interleaver for every z symbols performs interleaving in an interleaving pattern of block size xyz. Then, the period of the interleaving pattern between channel A, channel B and channel C becomes xyz. By so doing, it is possible to maximize the period of the interleaving pattern and thereby secure randomness. Moreover, the same concept can also be applied when the number of antennas is increased and the number of transmission channels is increased.

When improving randomness, it is important to ensure that the least common multiple of x, y=a block size in addition to the case where a prime number is used for any one of x, y. For example, x=16, y=27. The block size at this time becomes 16×27=432. Then, on channel A, a block interleaver for every 16 symbols performs interleaving in an interleaving pattern of block size 432. On channel B, a block interleaver for every 27 symbols performs interleaving in an interleaving pattern of block size 432. Then, the period of the interleaving pattern between channel A and channel B becomes 16×27.

However, when a primer number is used for at least one of x and y, x×y necessarily becomes the least common multiple of x, y, and therefore it is possible to simplify the design of the interleaver, which is preferable.

Interleaving processing using a prime number proposed here is not limited to the application example of this embodiment and even when it is applied to such an embodiment explained in the section "(i) Method of changing sequence of data making up symbols of each modulated signal itself as in the case of this embodiment" in Embodiment 6, for example, this is effective as the method of easily performing interleaving processing with a high level of randomness between channels using block interleaving. That is, this interleaving processing can be applied to all methods described in the present specification.

Moreover, in the interleaving in FIG. 90(C), the block interleaving on channel B is offset in the frequency direction with respect to the block interleaving on channel A. This makes it possible to further reduce burst errors.

As for x, y described above, it is possible to reduce the probability of burst errors when a greater value is selected.

Next, the interleaving in FIG. 90(D) will be explained. In FIG. 90(D), data is arranged regularly for every 3 carriers on both channel A, channel B, but data is arranged from higher frequencies to lower frequencies for channel A while data is arranged from lower frequencies to higher frequencies for channel B. This can prevent burst errors in a reduction of signal points on channel B caused by burst errors due to decoding of channel A. As a result, the reception quality can be considerably improved for both channel A and channel B.

Figure 91:
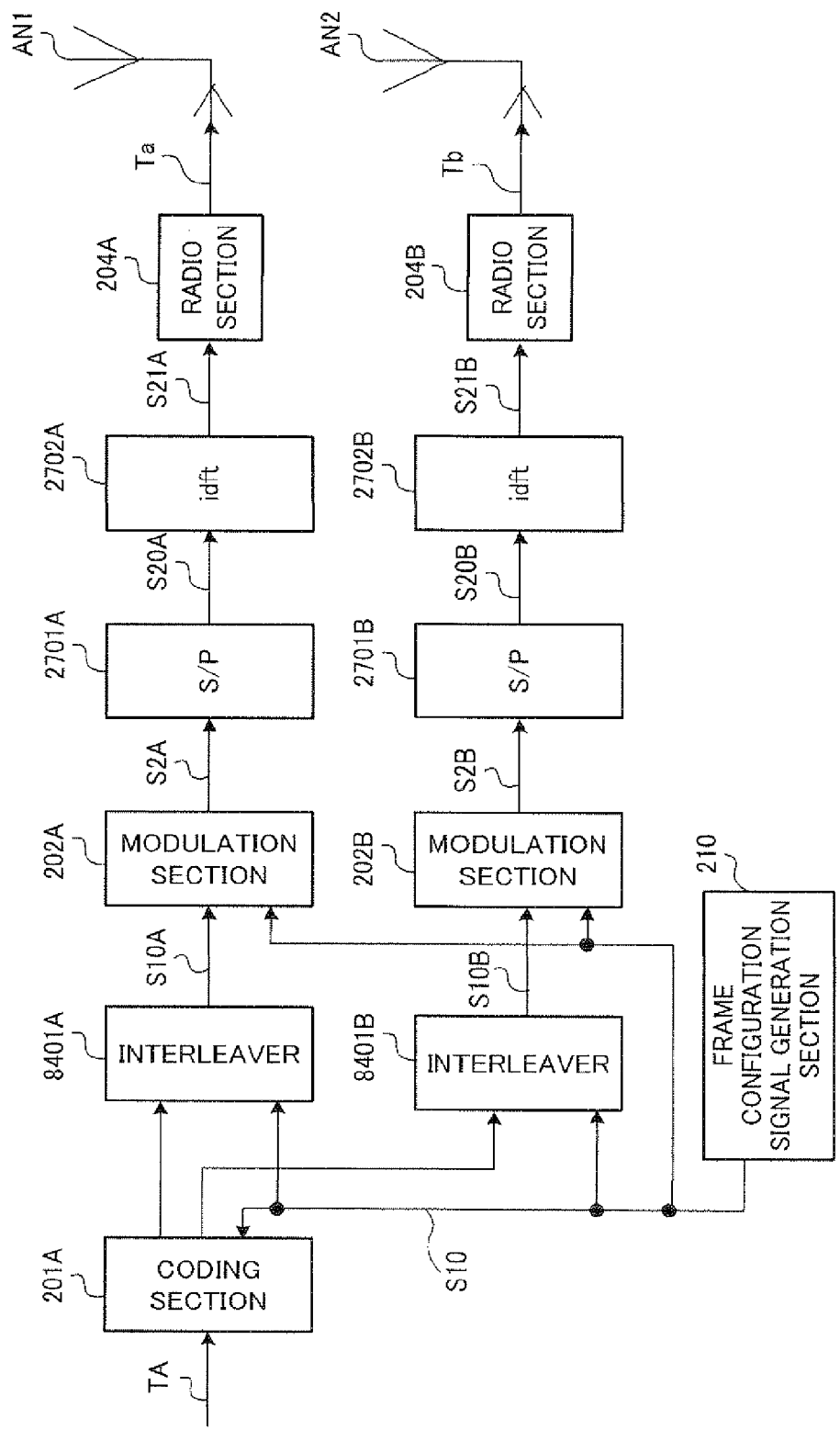
FIG. 91 is a block diagram showing another configuration of the multi-antenna transmission apparatus of Working Example 1.

Processing as shown in FIG. 90(B), FIG. 90(C), FIG. 90(D) may also be realized, for example, by multi-antenna transmission apparatus 7900 in the configuration as shown in FIG. 83 or may be realized by multi-antenna transmission apparatus 8400 in the configuration as shown in FIG. 91. FIG. 91 shows parts corresponding to those in FIG. 83 assigned the same reference numerals. The difference between multi-antenna transmission apparatus 7900 in FIG. 83 and multi-antenna transmission apparatus 8400 of FIG. 91 is whether the interleaving processing in FIG. 90(B), FIG. 90(C), FIG. 90(D) is performed by one interleaver 2301A or by interleavers 8401A, 8401B provided for their respective channels. More specifically, multi-antenna transmission apparatus 8400 converts coded data from serial to parallel and assigns the parallel data to interleaver 8401A on channel A and interleaver 8401B on channel B. Then, interleaver 8401A on channel A and interleaver 8401B on channel B apply the above described interleaving.

The configuration of the transmission apparatus is not limited to those in FIG. 86 and FIG. 91 and any configuration can be used if it is the one which can realize the interleaving processing shown in FIG. 90(B), FIG. 90(C), FIG. 90(D). Furthermore, any configuration can be used as the configuration on the receiving side if it at least includes a part carrying out deinterleaving processing which corresponds to the interleaving and the above described part that reduces signal points.

Furthermore, the preferred interleaving methods explained in the embodiments in FIG. 90(B), FIG. 90(C), FIG. 90(D) and other embodiments as examples have explained the case where interleaving is applied in any one of the frequency axis direction and the time axis direction for simplicity of explanation, but the example of interleaving in the frequency axis direction may be equally executed in the time axis direction and the example of interleaving in the time axis direction may be equally executed in the frequency axis direction. Moreover, the above described explanations are only examples to explain the features of the present invention and the interleaving and deinterleaving methods are not limited to them and similar effects can be obtained if the characteristic parts in the above explanation are used.

Working Example 2

While Working Example 1 has described an example where the interleaving pattern of a signal transmitted from each antenna is made to differ depending on the interleaver, this embodiment will explain an example where an interleaver performs interleaving processing on signals transmitted from the respective antennas in the same interleaving pattern and when symbols are assigned to subcarriers, different ways of symbol assignment are performed between antennas to thereby obtain effects similar to those in Embodiment 1.

Figure 92:
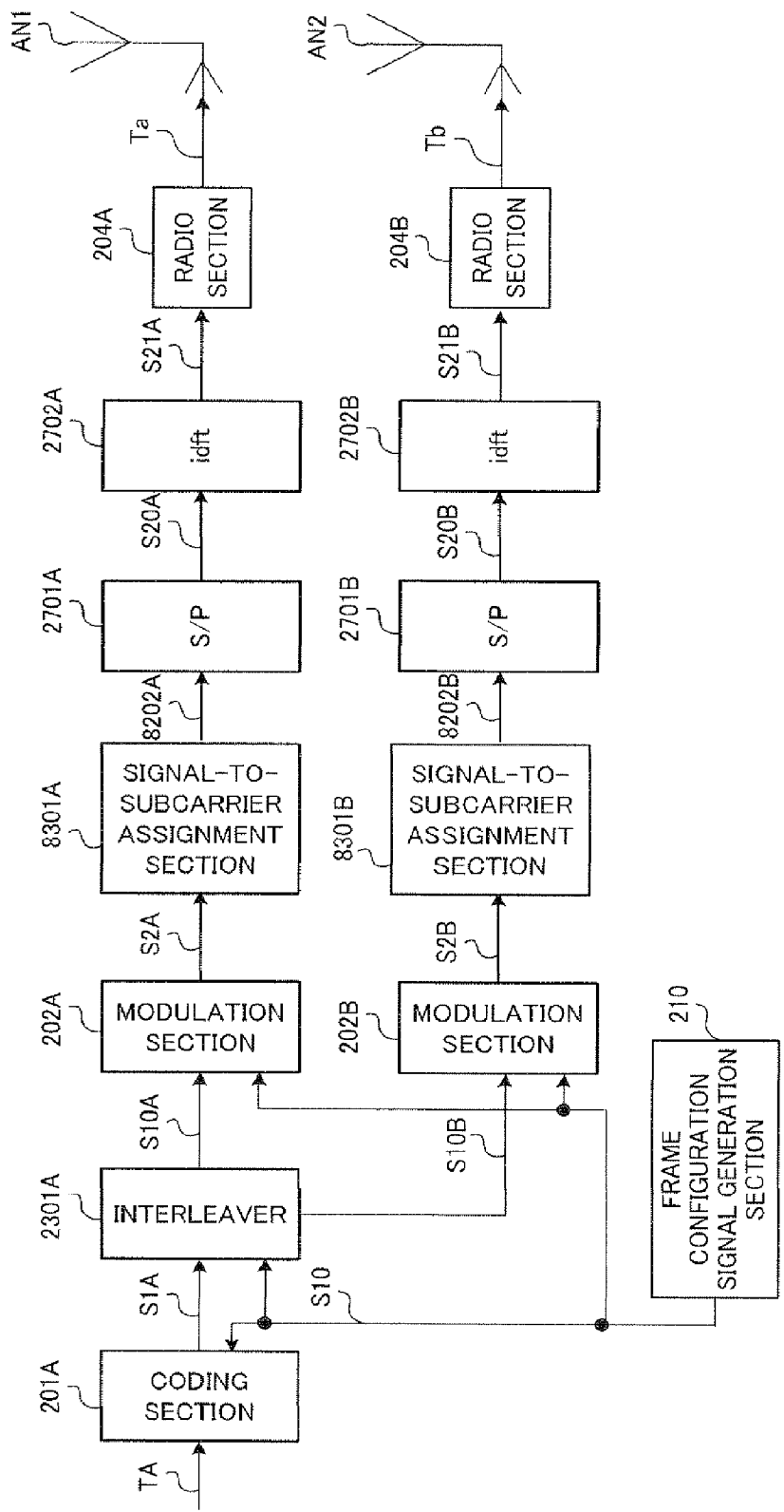
FIG. 92 is a block diagram showing the configuration of a multi-antenna transmission apparatus of Working Example 2.

FIG. 92 shows the configuration of multi-antenna transmission apparatus 8300 of this embodiment. In FIG. 92, parts which operate in the same way as those in FIG. 86 are assigned the same reference numerals. Multi-antenna transmission apparatus 8300 differs from multi-antenna transmission apparatus 8200 in that it is provided with signal-to-subcarrier assignment sections 8301A, 8301B.

Here, the order in which input baseband signals S2A, S2B are output differs between signal assignment sections 8301A and 8301B and this allows the order in which symbols are assigned to subcarriers to differ between an OFDM signal transmitted from antenna AN1 and OFDM signal transmitted from antenna AN2. As a result, signal-to-subcarrier assignment sections 8301A, 8301B of multi-antenna transmission apparatus 8300 can realize a function similar to that of interleaver 2301A of Embodiment 1 of forming a signal in an interleaving pattern which differs between channels (antennas).

Next, the operation of multi-antenna transmission apparatus 8300 will be explained using FIG. 93. As shown in FIG. 93(A), in the case of data before interleaving, one data sequence is composed of channel A and channel B. Here, suppose 60 pieces of data constitute one data sequence. Also suppose first 30 pieces of data are symbols (#1-#30) on channel A and second 30 pieces of data are symbols (#31-#60) on channel B. Since data #1 is the first symbol on channel A, it is numbered "A1" in the figure. In like fashion, symbols on channel A are sequentially numbered up to "A30." On the other hand, since data #31 is the first symbol on channel B, it is numbered "B1" in the figure. In like fashion, symbols on channel B are sequentially numbered up to "B30."

When interleaver 2301A receives data as shown in FIG. 93(A), it forms blocks of 10 pieces of data from data A1 to data A30 as shown in the FIG. 93(B) and rearranges the data by reading them one by one vertically. In this way, interleaver 2301A outputs data in a sequence of A1, A11, A21, A2, A12, A22, . . . , A10, A20, A30 as digital signal S10A after interleaving as shown in FIG. 93(D). In the same way, interleaver 2301A forms blocks of 10 pieces of data from data B1 to data B30 as shown in FIG. 93(C) and rearranges the data by reading them one by one vertically. In this way, interleaver 2301A outputs data in a sequence of B1, B11, B21, B2, B12, B22, ..., B10, B20, B30 as shown in FIG. 93(E) as digital signal SOB after interleaving.

The difference from above described Working Example 1 is that while interleaver 2301A in Working Example 1 rearranges the data sequence on channel A and the data sequence on channel B differently, this embodiment uses the same interleaving pattern on channel A and channel B.

When signal-to-subcarrier assignment section 8301A receives data of channel A after interleaving shown in FIG. 93(D), it forms output data 8202A in such a way that each piece of data A1 to A30 is assigned to subcarriers as shown in FIG. 93(F). On the other hand, when signal-to-subcarrier assignment section 8301B receives data of channel B after interleaving shown in FIG. 93(E), it forms output data 8202B in such a way that each piece of data B1 to B30 is assigned to subcarriers as shown in FIG. 93(G). In the examples shown in FIGS. 93(F), (G), the data on channel B assigned to subcarriers is offset by 3 symbols with respect to the data on channel A assigned to subcarriers. In other words, this is equivalent to interleaving of data on channel A (modulated signal A) and data on channel B (modulated signal B) in the frequency direction in different interleaving patterns.

Figure 94:
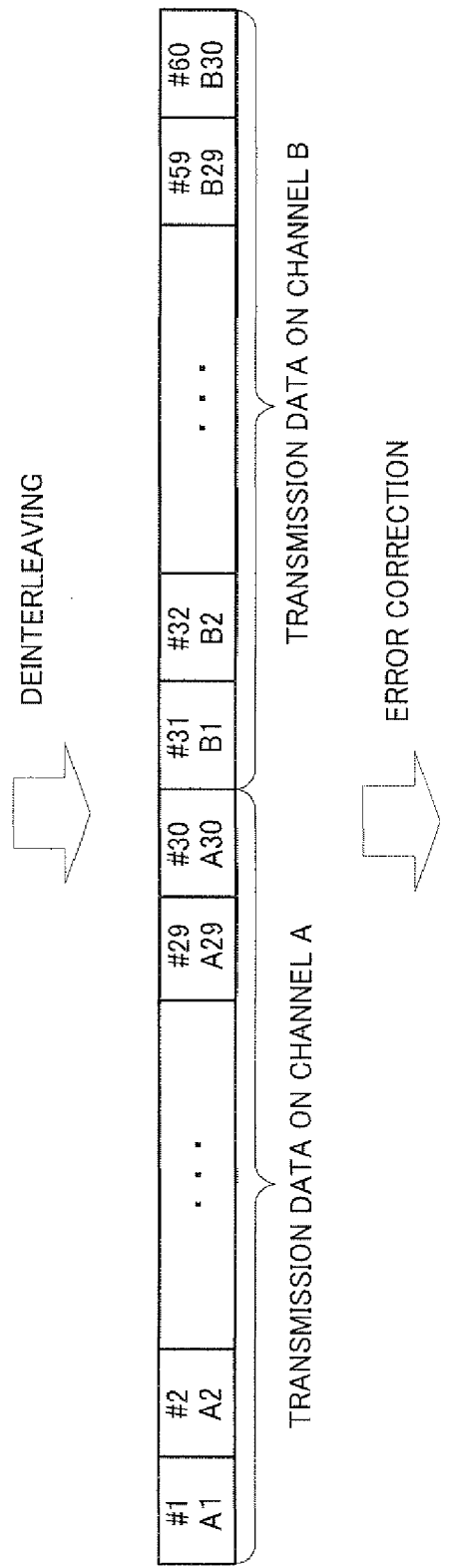
FIG. 94 illustrates reception processing of Working Example 2.

The receiving side applies deinterleaving processing as shown in FIG. 94 to the signal interleaved and transmitted and performs soft decision decoding processing. Then, as explained in Embodiment 6, errors occur consecutively when a convolutional code or the like is used.

However, when iterative decoding is performed using signal processing section 8000 in FIG. 84, different interleaving patterns are used between channels as explained Embodiment 6 and Embodiment 1, and therefore wrong signal point selections occur discretely as shown in FIG. 85-2(G) explained in Embodiment 1. In this way, when data (modulated signals A, B) on each channel is decoded by soft decision section 512, the reception quality improves effectively as shown in FIG. 85-2(H).

Figure 93:
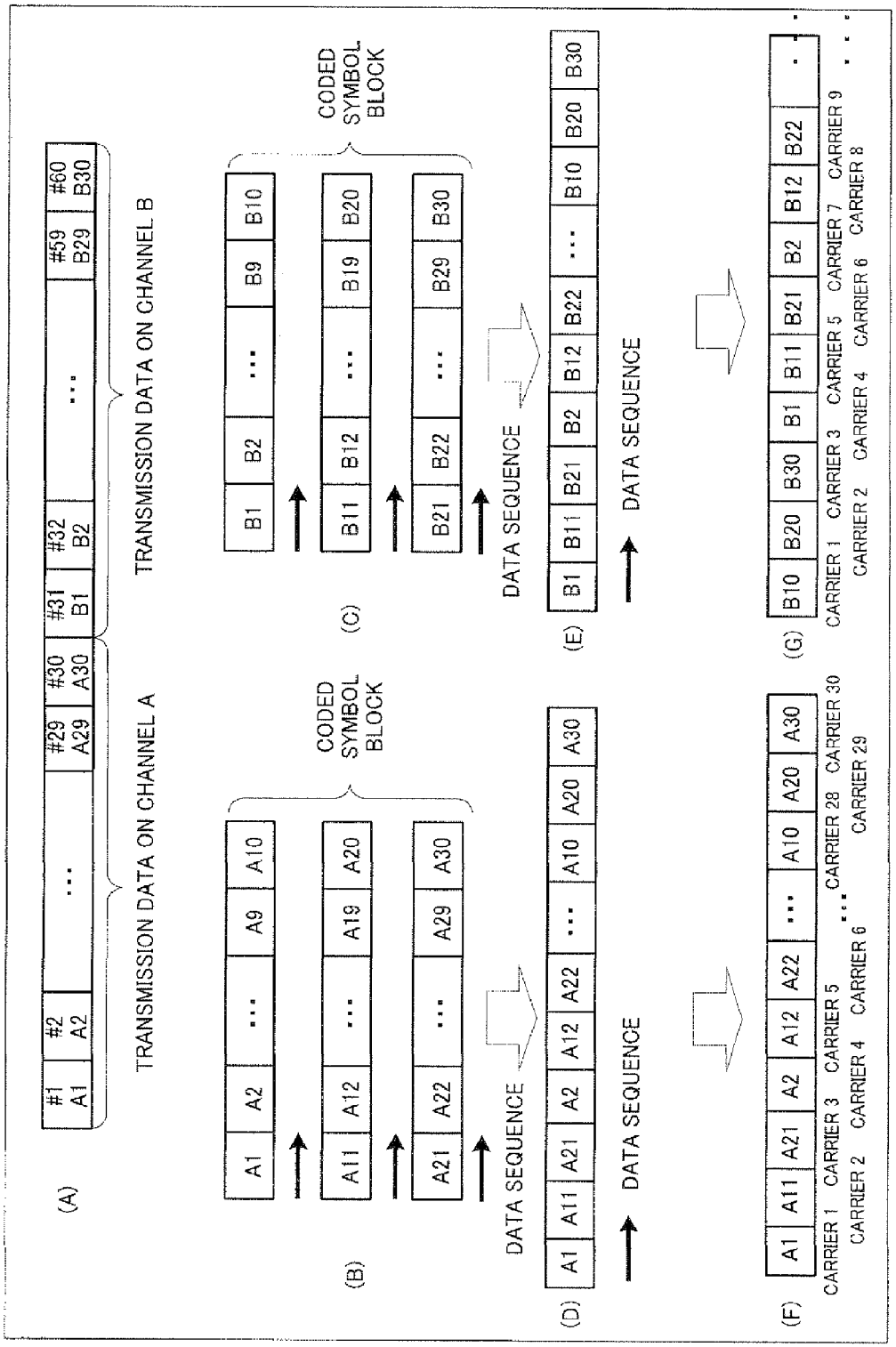
FIG. 93 illustrates interleaving processing of Working Example 2; (A) shows data sequence before interleaving, (B) shows an interleaving method on channel A, (C) shows an interleaving method on channel B, (D) shows the sequence on channel A after interleaving, (E) shows the sequence on channel B after interleaving, (F) shows an assignment to subcarriers on channel A and (G) shows an assignment to subcarriers on channel B.

This Working Example has explained the case where different interleaving patterns are used for channel A (modulated signal A) and channel B (modulated signal B) as shown in FIG. 93, but interleaving patterns are not limited to them. It is essential only that the pattern in which symbols are assigned to subcarriers be made to differ between channels (antennas).

Processing similar to the processing in this Working Example can also be performed by multi-antenna transmission apparatus 8200 in the configuration in FIG. 86. In this case, interleaver 2301A in FIG. 86 can be configured so as to include the function of subcarrier assignment sections 8301A, 8301B in FIG. 92.

Furthermore, Working Example 1 and Working Example 2 have explained the method of forming signals in interleaving patterns which differ between channels and improving reception quality when there are one coding section and one interleaver, but the interleaving pattern and the method of data arrangement are not limited to the methods in Working Example 1 and Working Example 2. Furthermore, when LDPC is applied as an error correcting code, as explained in Embodiment 14, it is also possible to realize the interleaving method whereby data on channel A is not interleaved while data on channel B is interleaved using one interleaver in the same way as in Working Example 1 and Working Example 2.

Furthermore, Working Example 1 and Working Example 2 have explained the case where the number of channels (antennas) is two, but the present invention is not limited to this, and even when the number of channels (antennas) is equal to or more than three, if different interleaving patterns are used between channels (antennas), it is possible to obtain effects similar to those described above. The same will also apply to the above described other embodiments where different interleaving patterns are used between channels (antennas).

Working Example 3

This Working Example will explain an example of the multi-antenna transmission apparatus that makes an interleaving pattern of a modulated signal transmitted from each antenna differ from one modulated signal to another and the reception apparatus that receives and demodulates the modulated signals, explained in the embodiments so far such as Embodiment 6 and Embodiment 7, where identical data is transmitted with the respective modulated signals to improve reception quality.

Figure 95:
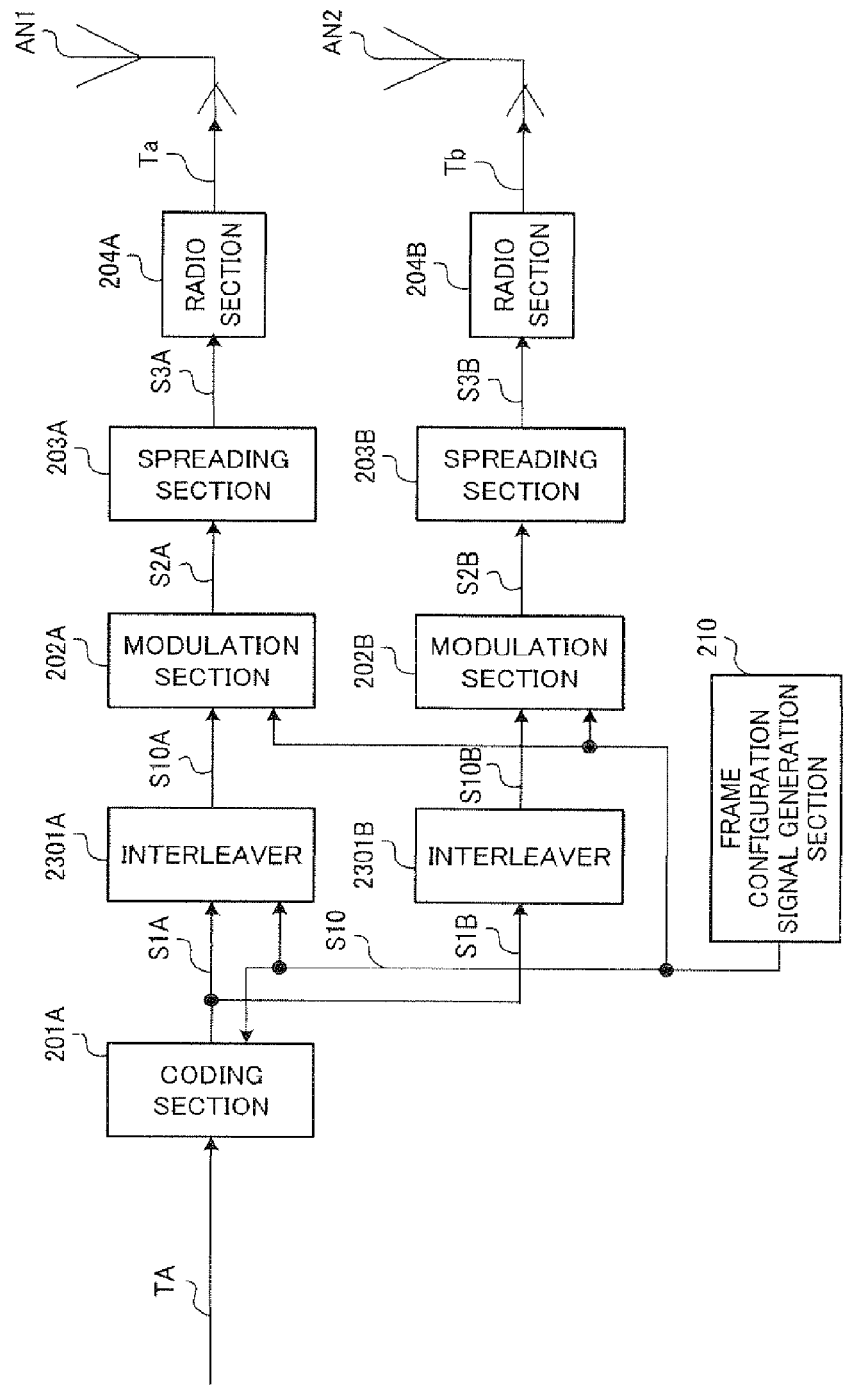
FIG. 95 is a block diagram showing the configuration of a multi-antenna transmission apparatus of Working Example 3.

FIG. 95 shows a configuration example of the multi-antenna transmission apparatus of this Working Example. In FIG. 95, parts operating in the same way as those in FIG. 23 are assigned the same reference numerals as those in FIG. 23. Multi-antenna transmission apparatus 9000 in FIG. 95 differs from multi-antenna transmission apparatus 2300 in FIG. 23 in that multi-antenna transmission apparatus 9000 forms a modulated signal of channel A (modulated signal transmitted from antenna AN1) and a modulated signal of channel B (modulated signal transmitted from antenna AN2) by applying different interleaving patterns to identical data TA.

Figure 96:
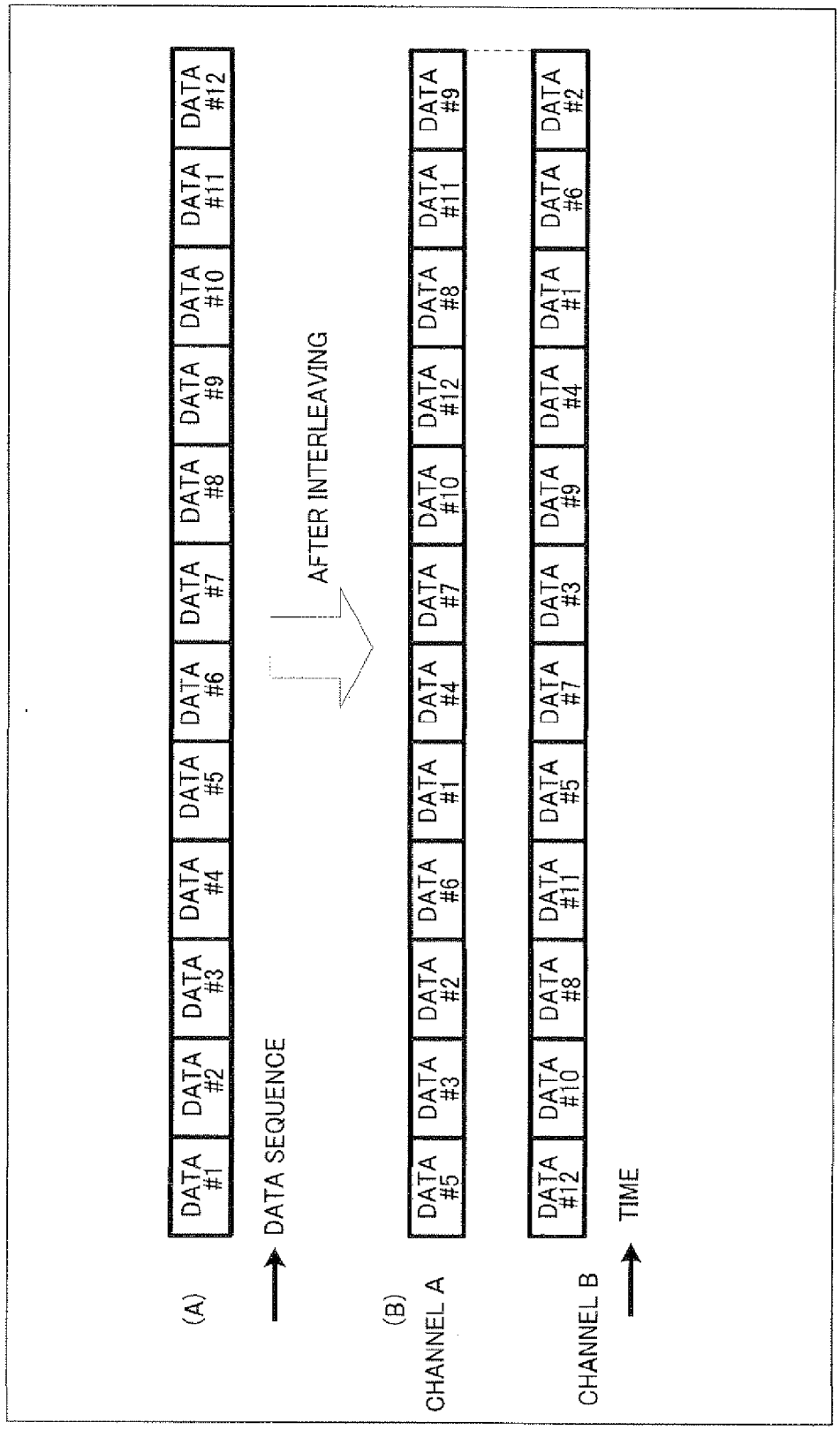
FIG. 96 illustrates interleaving processing of Working Example 3.

FIG. 96 shows the frame configuration of a modulated signal transmitted by multi-antenna transmission apparatus 9000 in this Working Example. FIG. 96(A) shows a sequence of data #1, #2, ..., #11, #12 before interleaving. FIG. 96(B) shows a sequence of data #1 to #12 after interleaving in interleaving patterns which are different between interleavers 2301A, 2301B of multi-antenna transmission apparatus 9000. Interleaver 2301A applies interleaving so as to obtain the frame configuration similar to that of channel A in FIG. 96(B). On the other hand, interleaver 2301B applies interleaving so as to obtain the frame configuration similar to that of channel B in FIG. 96(B).

Figure 97:
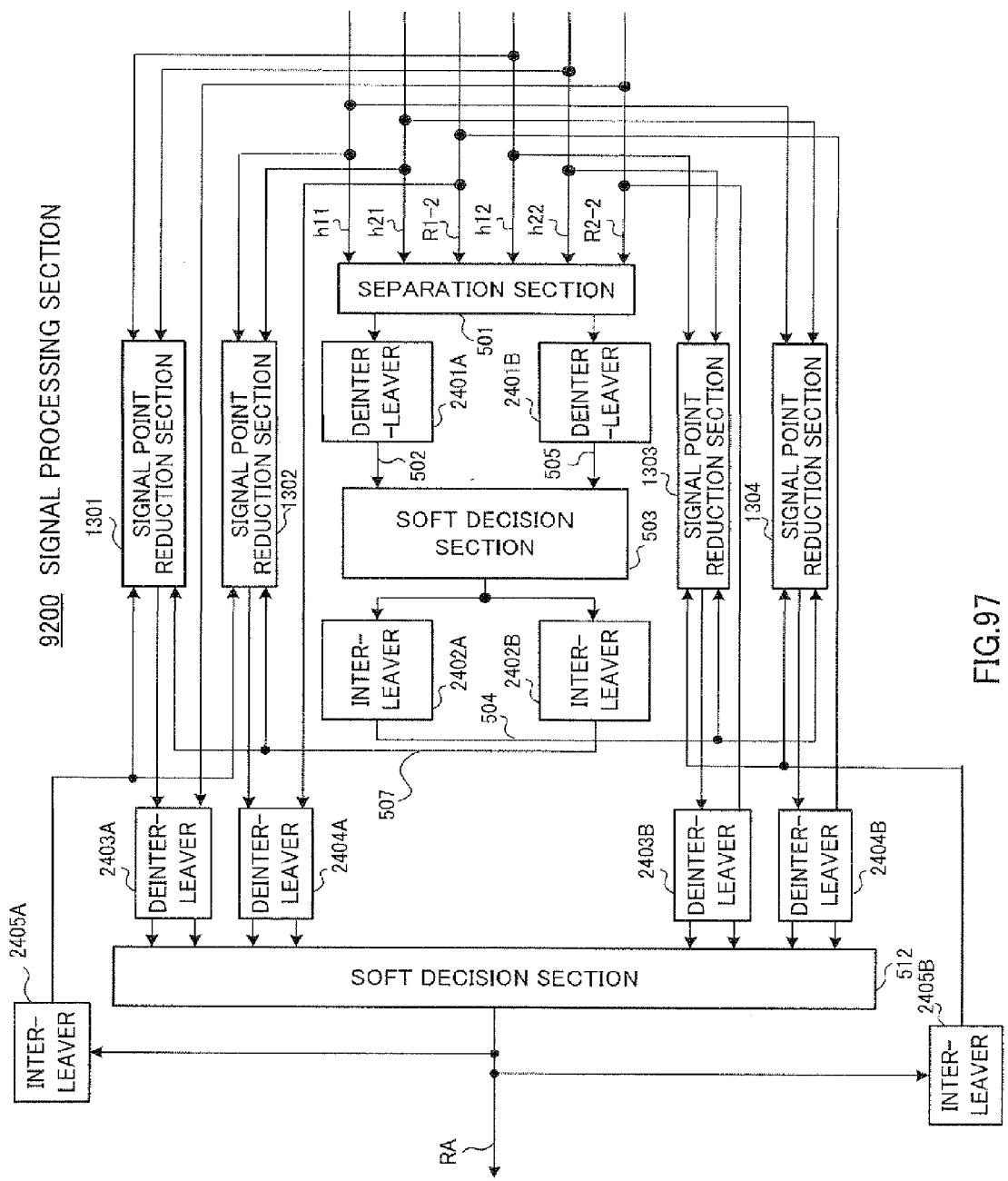
FIG. 97 is a block diagram showing the configuration of the signal processing section of the multi-antenna reception apparatus of Working Example 3.

The reception apparatus of this Working Example can be configured as shown in FIG. 4, for example. Signal processing section 404 in FIG. 4 can be configured as shown in FIG. 97. In FIG. 97, parts operating in the same way as those in FIG. 24 are assigned the same reference numerals as those in FIG. 24. The difference in the configuration between signal processing section 9200 in FIG. 97 and signal processing section 2400 in FIG. 24 is that while signal processing section 2400 in FIG. 24 is provided with two soft decision sections 503, 506 for a provisional decision and two soft decision sections 512, 518 for a main decision, signal processing section 9200 is provided with one soft decision sections 503 for a provisional decision and one soft decision section 512 for a main decision.

Deinterleavers 2401A, 2403A, 2404A in FIG. 97 are deinterleavers corresponding to interleaver 2301A in FIG. 95 and deinterleavers 2401B, 2403B, 2404B are deinterleavers corresponding to interleaver 2301B in FIG. 95.

Signals input to soft decision section 503 of signal processing section 9200 are 2 lines of estimated baseband signals 502, 505 of channel A, channel B including information on transmission digital signal TA. At this time, soft decision section 503 calculates a branch metric, path metric and carries out decoding, but since baseband signals 502, 505 are interleaved in completely different interleaving patterns, the quality of the path metric obtained from estimated baseband signal 502 is completely different from the quality of the path metric obtained from estimated baseband signal 505. Therefore, using the path metrics obtained from both baseband signals improves the accuracy of a soft decision and improves the reception quality of data. A similar effect can also be obtained by soft decision section 512.

As a result, it is possible to obtain the effect that the reception quality of data improves drastically.

The example explained in this Working Example can also be applied to the multicarrier communication exemplified by OFDM which has been explained in Embodiment 7. Here, coding can be performed in the time axis direction or in the frequency axis direction.

As the method of generating different interleaving patterns, the method explained in Embodiment 6 can be applied. Furthermore, this Working Example has explained the case where the number of transmit antennas is 2 and the number 2 of receive antennas is 2 as an example, but the present invention is not limited to this and when, for example, the number of transmit antennas is 3, identical data is transmitted from three antennas but the present invention can be implemented in the same way by using different interleaving patterns.

Working Example 4

By the way, as explained in above described Working Example 1, when applying block interleaving for every xth symbol on channel A and applying block interleaving for every yth symbol on channel B, it is preferable to increase x, y as much as possible considering a propagation correlation on the frequency axis when symbols are arranged in the frequency axis direction and a propagation correlation on the time axis when symbols are arranged in the time axis direction. This embodiment will explain a block interleaving design method which realizes this.

For example, consider carrying out interleaving in a block size of 48 as data symbols on channel A and channel B. In the block size of 48 symbols, as an example of interleaving of channel A and channel B such that the block size=the least common multiple, it is possible to apply interleaving of block size 48 for channel A using an interleaver for every 3 symbols and apply interleaving of block size 48 for channel B using an interleaver for every 16 symbols. However, since the block interleaving for every 3 symbols applied on channel A has such a small value as every 3 symbols, the influence of a propagation correlation increases, and as a result, the reception quality is more likely to degrade.

Therefore, a method is proposed whereby for example, 8 is added to block size 48, a block size of 48+8=56 is virtually created and signals on channel A, channel B are interleaved in this block size. Here, 8 is added to block size 48 to get 56 because both the condition of block size=the least common multiple and the condition of making x, y as big as possible are satisfied by assigning block interleaving for every 7 symbols and block interleaving for every 8 symbols to channel A and channel B respectively.

Hereinafter, the method proposed in this Working Example will be explained in detail.

Figure 98:
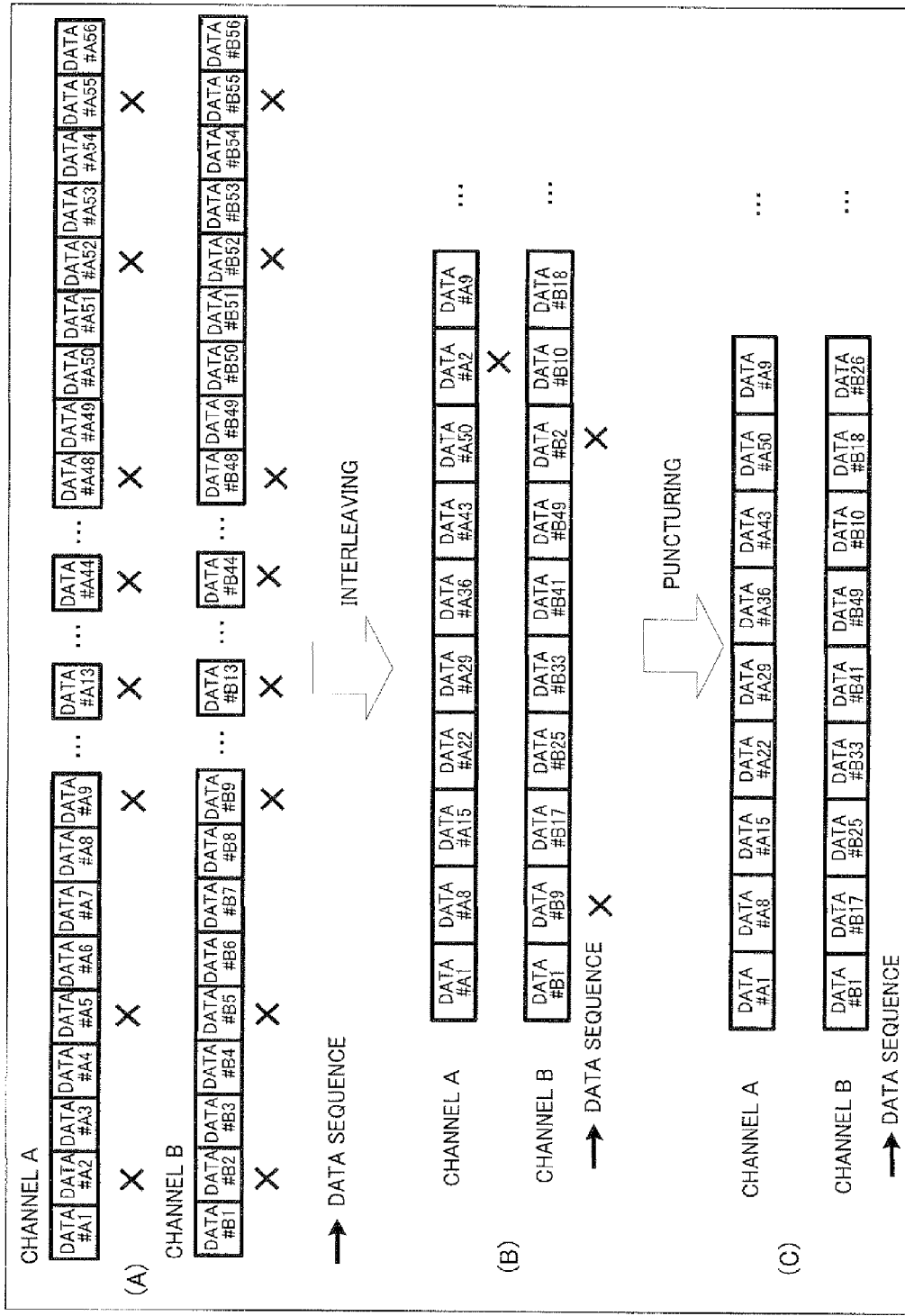
FIG. 98 illustrates interleaving processing of Working Example 4; (A) shows a data sequence on each channel before interleaving, (B) shows a data sequence on each channel after interleaving and (C) shows a data sequence on each channel after puncturing.

In FIG. 98, 56 pieces of data which composes a block are virtually assigned numbers indicating the sequence for convenience of explanation. FIG. 98(A) shows the sequences before interleaving on channel A and channel B. However, actually, there are eight symbols without data. As shown in FIG. 98(A), suppose no data exists in data #A2, #A5, #A9, #A13, #A44, #A48, #A52, #A55 on channel A. Suppose no data exists in data #B2, #B5, data #B9, #B13, #B44, #B48, #B52, #B55 on channel B.

On channel A, an interleaver for every 7 symbols applies interleaving of block size 56 regardless of the presence/absence of data. On channel B, an interleaver for every 8 symbols applies interleaving of block size 56 regardless of the presence/absence of data. This situation is shown its FIG. 98(B).

Next, data #A2, #A5, #A9, #A13, #A44, #A48, #A52, #A55 on channel A where no data exists are punctured. In the same way, data #B2, #B5, #B9, #B13, #B44, #B48, #B52, #B55 on channel B where no data exists are punctured. The situation of data sequence of on channel A and channel B after puncturing is shown in FIG. 98(C).

This FIG. 98(C) is considered as the final result of interleaving. This reduces a correlation between the interleaving patterns of channel A and channel B and can also extend the period of the patterns, and therefore the reception quality improves drastically. In this way, using the method of virtually making block size=the least common multiple of x, y and using x, y of large values can improve flexibility of the design.

Figure 99:
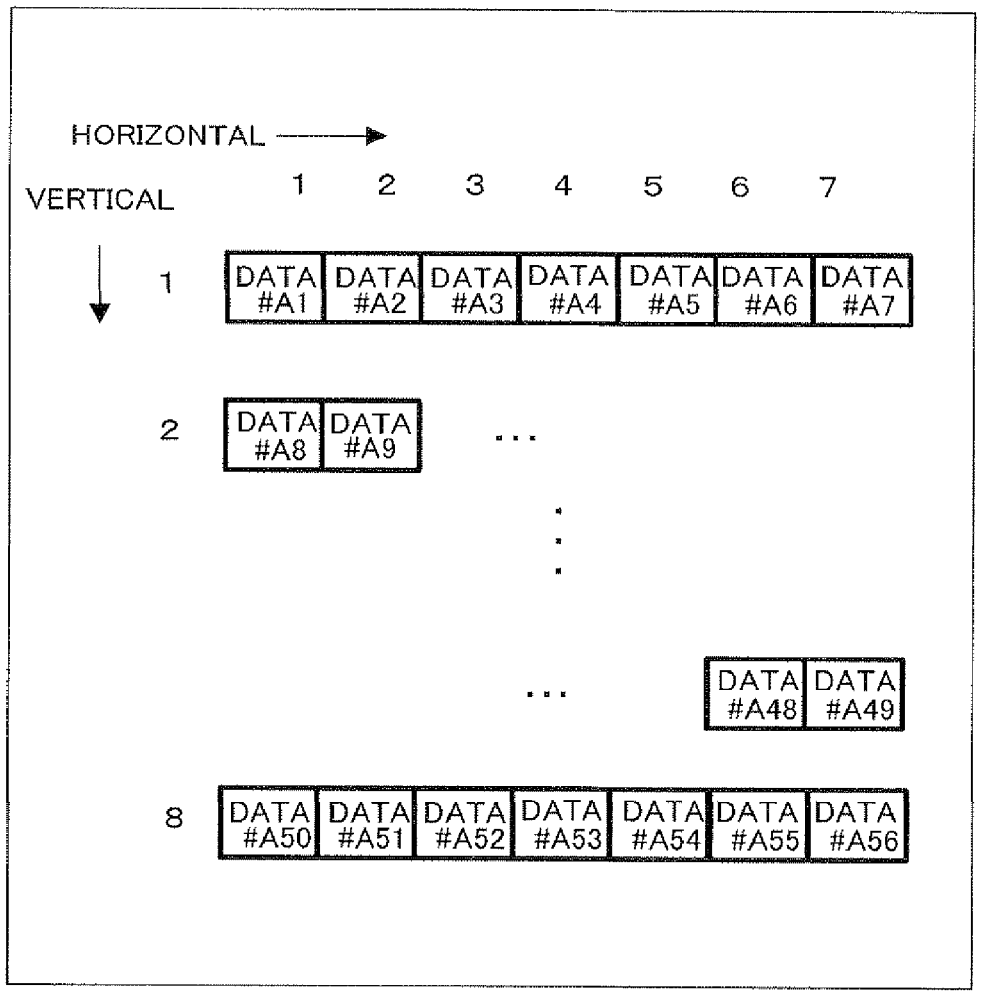
FIG. 99 illustrates interleaving processing of Working Example 4.

FIG. 99 and FIG. 100 show examples of the actual interleaving processing when implementing such a method. FIG. 99 shows how transmission data #A1 to #A56 are written into the memory of the interleaver. Interleaving is realized by writing transmission data #A1 to #A56 sequentially with priority given to the horizontal direction during a write and reading transmission data #A1 to #A56 sequentially with priority given to the vertical direction during a read. However, the sequence of this writing and reading can be set as appropriate according to the interleaving pattern applied.

FIG. 100 shows a relationship between transmission data #A1 to #A56 and memory addresses when transmission data #A1 to #A56 are written as shown in FIG. 99. In this Working Example, as shown in FIG. 100, data presence/absence information which indicates whether data actually exists or not is provided associated with addresses. This causes addresses corresponding to data presence/absence information (0) which indicates that there is no data to be skipped and can realize interleaving processing which virtually increases the block size.

Furthermore, mention will be made of the effect of the interleaving method using the puncturing explained in this Working Example. The interleaving method of this Working Example is block interleaving, yet it is the one which has the exceptional effect that a propagation correlation on the time axis or the frequency axis can be excluded like random interleaving.

Consider when, for example, the block size is 22. At this time, it is possible to use interleaving of block size 22 by an interleaver for every 2 symbols or interleaving of block size 22 by an interleaver for every 11 symbols. No matter which interleaving is used, high correlation symbols are arranged every 2 symbols, and therefore it is difficult to exclude a propagation correlation. However, using the above described interleaving method, adding 3 to virtually make a block size of 25, applying interleaving of block size 25 using an interleaver for every 5 symbols to both channels A, B and performing puncturing like the procedure of FIG. 98(B), FIG. 98(C), it is possible to thereby obtain the exceptional effect that it is possible to apply interleaving which excludes propagation correlation by performing interleaving of block size 22 using an interleaver for every 2 symbols or interleaving of block size 22 using an interleaver for every 11 symbols. In this way, the interleaving method of this Working Example can get an exceptional effect with interleaving alone. Furthermore, the method explained in this Working Example can be applied in combination with all methods described in the present specification.

Other Embodiments

The above described embodiments have mainly described the cases where a digital signal is obtained by making a soft decision, but the present invention is not limited to this and the present invention is also applicable to cases where a digital signal is obtained by acquiring a hard decision, in which case it is also possible to obtain received data with a good error rate characteristic with fewer calculations.

Furthermore, the above described embodiments have described the cases where all the decision values provisionally decided by separation section 501 and soft decision sections 503, 506, 1101 are used for signal point reduction processing, but some provisional decision values may also be used as is as the final received data. For example, data or the like which is not required to have high reception quality may be output as is without making any main decision by soft decision sections 512, 518.

Furthermore, the above described embodiments have mainly described a spectrum spreading communication scheme as an example, but the present invention is not limited to this and the present invention is likewise applicable to a single carrier scheme or OFDM scheme having no spreading section. In the ease of a single carrier scheme, it has a configuration having no spreading section or dispreading section. The present invention can be implemented in like fashion even in the case where a multicarrier scheme and a spectrum spreading communication scheme are used together (e.g., OFDM-CDMA scheme).

Furthermore, the method of transmitting modulated signals whereby an interleaving pattern is made to differ between the above described channels (antennas) can also obtain effects similar to those described above when applied to an MIMO system whereby a transmission signal is converted to multi-beams and transmitted as described in, for example, a document "Eigen Beam Space Division Multiple (E-SDM) Scheme on MIMO Channel" Institute of Electronics, Information and Communication Engineers, TECHNICAL REPORT OF IEICE RCS2002-53, May, 2002.

Figure 101:
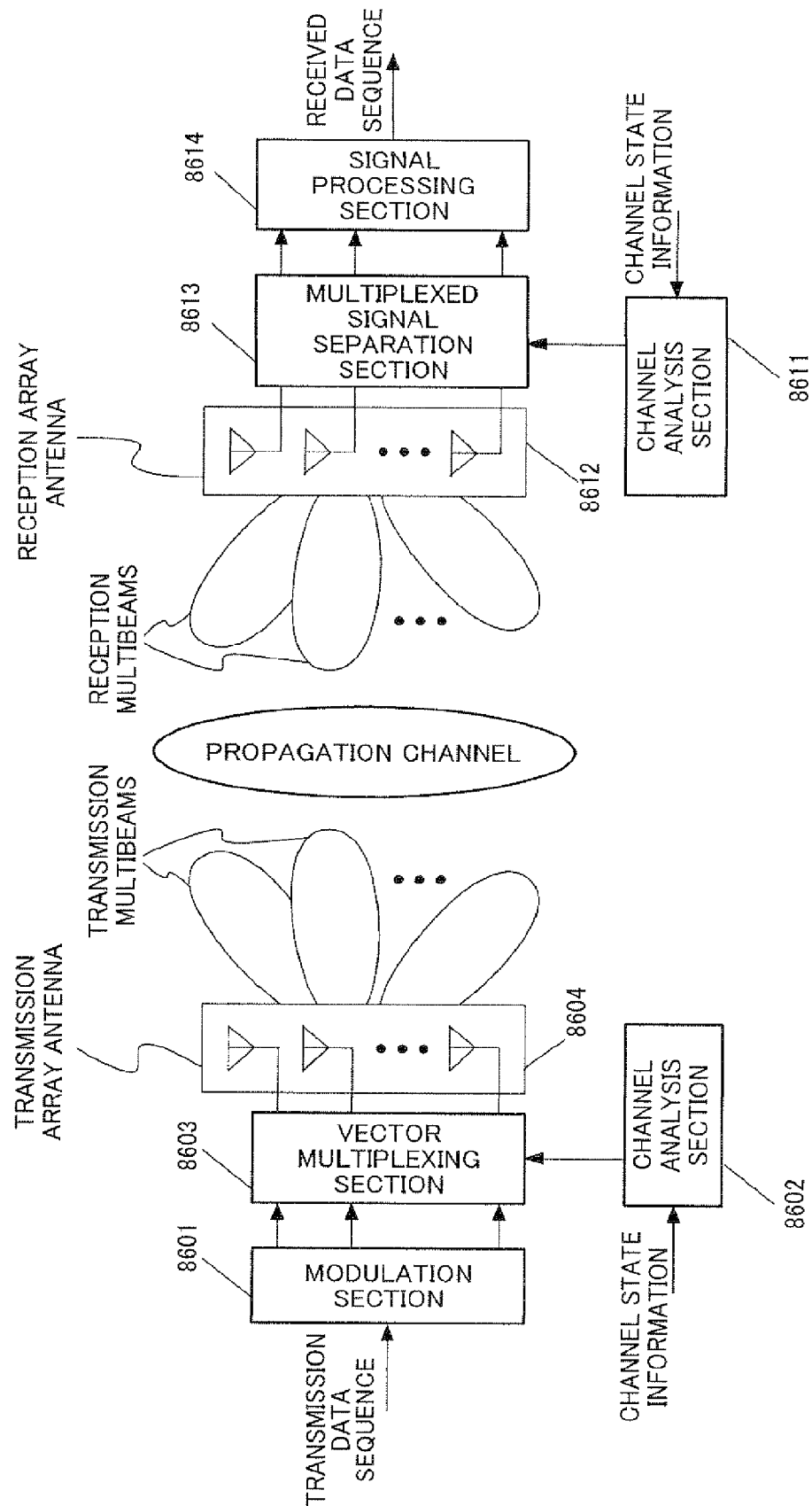
FIG. 101 is a block diagram showing the configuration of an MIMO system of another embodiment.
Figure 102:
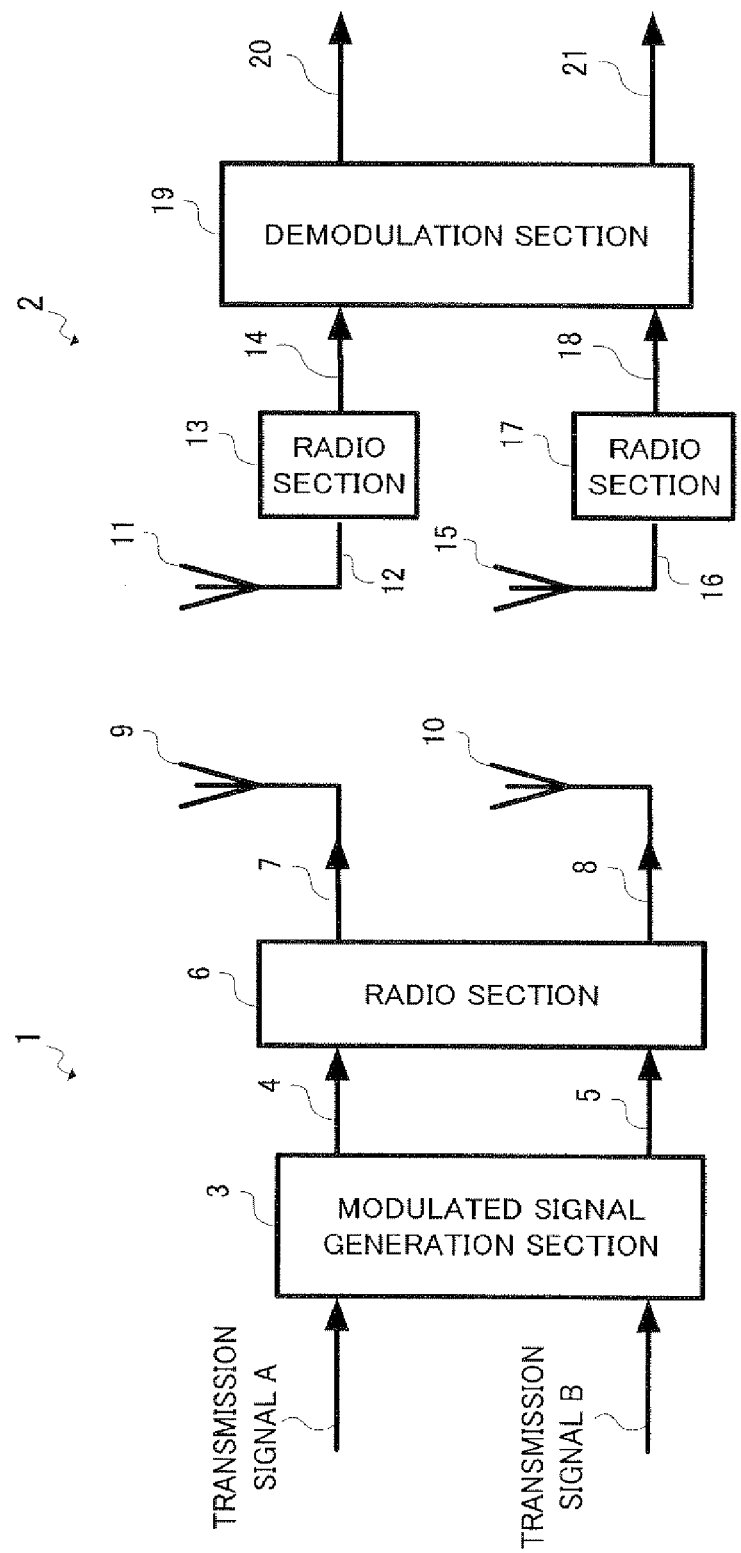
FIG. 102 shows a schematic configuration of a general multi-antenna communication system.
Figure 103:
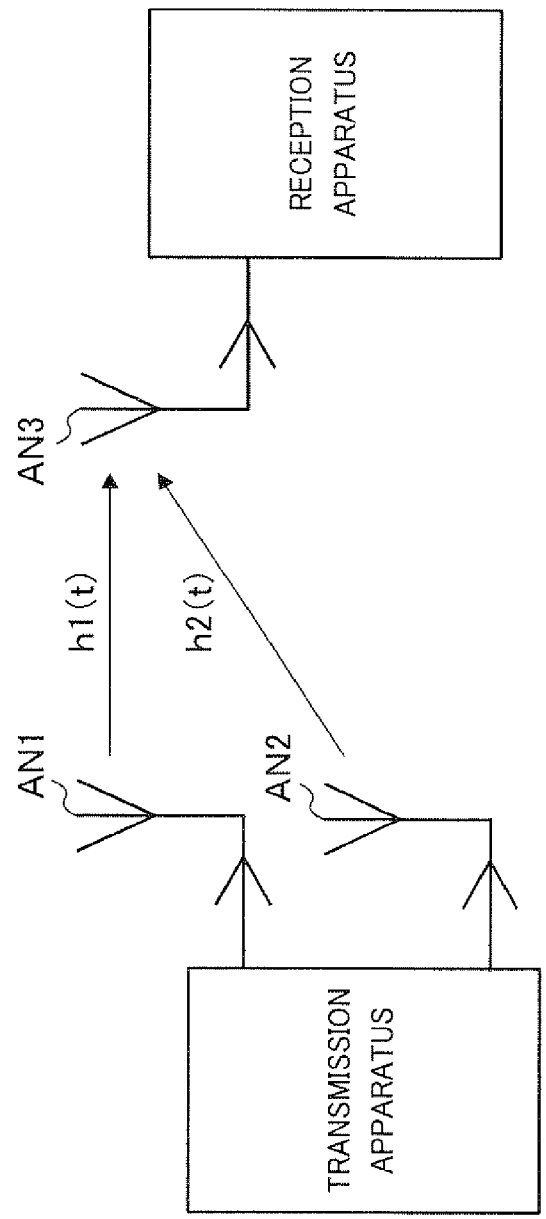
FIG. 103 is a block diagram showing the configuration of a conventional multi-antenna communication system.
Figure 104:
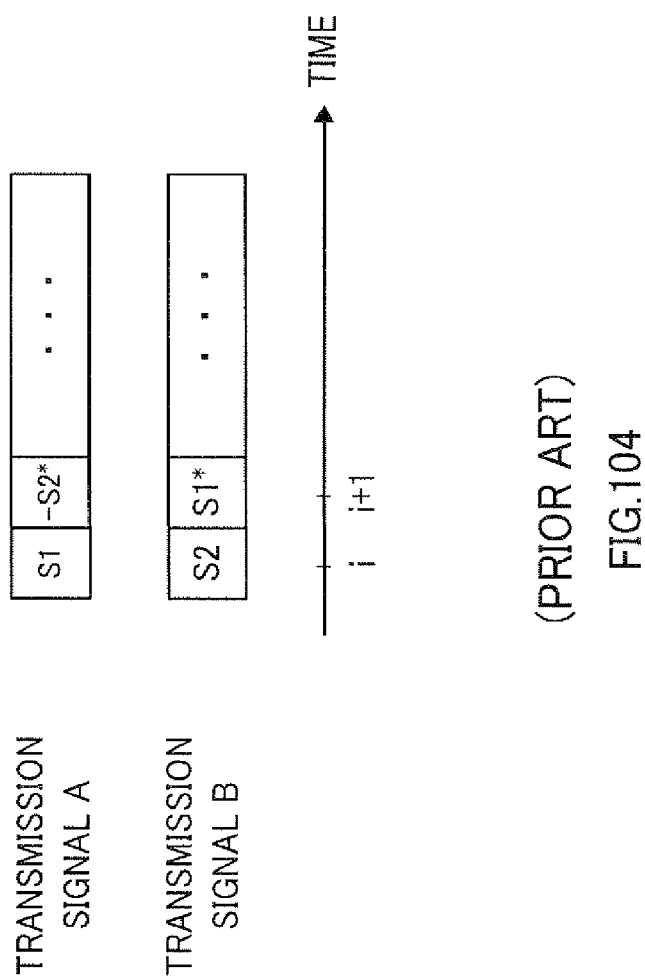
FIG. 104 illustrates space-time block codes.

FIG. 101 shows a schematic configuration of such an MIMO system. Modulation section 8601 on the transmitting side forms a plurality of transmission frames by receiving a transmission data sequence and modulating this. Here, modulation section 8601 forms a modulated signal in such a way as to make an interleaving pattern differ between channels (antennas). Channel analysis section 8602 calculates a plurality of transmission channel signature vectors to compose a multiplexed channel based on the channel condition information which is an estimation result of the propagation channel. Vector multiplexing section 8603 multiplies respective transmission frames by separate channel signature vectors, combines them and sends the combined signal to transmission array antenna 8604. In this way, multi-beamed signal is transmitted from transmission array antenna 8604.

On the receiving side, channel analysis section 8611 calculates a plurality of reception channel signature vectors to separate the multiplexed transmission signal based on the channel condition information that is an estimation result on the propagation channel. Multiplexed signal separation section 8613 receives a received signal of reception array antenna 8612, multiplies the respective received signals by separate channel signature vectors and thereby separates the signal in which a plurality of transmission frames are multiplexed into a plurality of received signal frames. Signal processing section 8614 obtains received data by demodulating and decoding the separated received signal frames. Here, signal processing section 8614 has the deinterleaving processing and signal point reduction process functions as described above. This makes it possible to obtain received data with a good error rate characteristic as shown in above described Embodiment 6 and Working Example 1 or the like.

Moreover, when the retransmission method explained in Embodiment 15 is applied to an MIMO system which performs beam forming as shown in FIG. 101, it is possible to improve signal quality in the MIMO system at the time of retransmission. That is, when carrying out a retransmission, the number of modulated signals to be transmitted is reduced compared to the previously transmitted modulated signals. For example, if beams of modulated signals A, B are formed and transmitted at the first transmission, beams are formed not from both modulated signal A, B at the time of retransmission but from only data of one of the modulated signals and retransmitted. By so doing, the number of beams decreases at the time of retransmission, and therefore it is possible to reduce interference among beams, and as a result, improve quality of the retransmission signal.

In this case, the position of the beam at the time of retransmission may be changed from that of the last transmission. For example, if there is a retransmission request for retransmission of modulated signal B when modulated signal A is transmitted with beam 1 and modulated signal B is transmitted with beam 2 last time, modulated signal B is transmitted with beam 1 at the time of retransmission. In this way, the quality of modulated signal B can be further improved, which is preferable. That is, the fact that there has been no retransmission request for modulated signal A means that there is a high possibility that beam 1 rather than beam 2 may be the beam which allows transmission of higher quality. By sending a retransmission signal with a beam which allows transmission of higher quality at the time of retransmission in this way, the quality of the retransmission signal can be further improved.

Furthermore, the above described embodiments have explained the case where the number of transmit antennas is 2 and the number of receive antennas is 2, but the present invention is not limited to this and it is likewise applicable to cases where the number of transmit antennas is 3 or more and the number of receive antennas is 3 or more.

Moreover, as the method of inserting special symbols when using an LDPC code, various methods can be applied. For example, unlike the ease where a convolutional code or a turbo code is used, when an LDPC code is used, the coding section also has the interleaving function, and therefore there is no need to insert special symbols regularly. Therefore, special symbols may be inserted partially and consecutively.

The present invention is not limited to the above described embodiments, but can be implemented modified in various ways.

The present application is based on the following documents:

Japanese Patent Application No. 2003-391860, filed on Nov. 21, 2003;

Japanese Patent Application No. 2004-3885, filed on Jan. 9, 2004;

Japanese Patent Application No. 2004-71780, filed on Mar. 12, 2004;

Japanese Patent Application No. 2004-139241, filed on May 7, 2004;

Japanese Patent Application No. 2004-146887, filed on May 17, 2004;

Japanese Patent Application No. 2004-180277, filed on Jun. 17, 2004; and

Japanese Patent Application No. 2004-318521, filed on Nov. 1, 2004.

The entire contents of the above-listed patent applications are expressly incorporated hereinto by reference.

INDUSTRIAL APPLICABILITY

The present invention is suitable for use in a multi-antenna communication system intended for high-speed data communication using an OFDM-MIMO (Multiple-input Multiple-Output) technology or the like.

The invention claimed is:

1. A transmission method using a first data sequence and a second data sequence that is different from the first data sequence, the first and second data sequences being encoded data sequences, the method comprising:
  interleaving the first data sequence into a first interleaved data sequence using a first interleaving pattern in which an output order pattern of the first interleaved data sequence is different from an input order pattern of the first data sequence;
  interleaving the second data sequence into a second interleaved data sequence using a second interleaving pattern in which an output order pattern of the second interleaved data sequence is different from the output order pattern of the first data sequence;
  wherein an amount of data of the first data sequence interleaved using the first interleaving pattern and the amount of data of the second data sequence interleaved by the second interleaving pattern are the same;
  wherein interleaving the first data sequence includes interleaving every x-amount of symbols, and interleaving the second data sequence includes interleaving every y-amount of symbols, where x and y are not equal;
  modulating the first interleaved data sequence into a first modulated symbol;
  modulating the second interleaved data sequence into a second modulated symbol; and
  transmitting the first modulated symbol from a first antenna in a frequency band and simultaneously transmitting the second modulated symbol from a second antenna in the frequency band.

2. The transmission method according to claim 1, wherein the first interleaving pattern and the second interleaving pattern are selected to be uncorrelated between the antennas.

3. The transmission method according to claim 1, wherein the first data sequence and the second data sequence are encoded in a block size; and wherein the transmitting comprises the first and second antennas being switched at least once per encoded block.

4. The transmission method according to claim 1, wherein interleaving is performed in a block size equal to a least common multiple of x and y.

5. The transmission method according to claim 4, wherein interleaving includes at least one of x and y being a prime number.

6. The transmission method according to claim 4, wherein interleaving is performed by providing an offset in at least one of a frequency domain and a time domain.

7. A transmission apparatus comprising:
  an interleaver using a first data sequence and a second data sequence that is different from the first data sequence, the first and second data sequences being encoded data sequences, the interleaver configured to interleave the first data sequence into a first interleaved data sequence using a first interleaving pattern in which an output order pattern of the first interleaved data sequence is different from an input order pattern of the first data sequence, and interleave the second data sequence into a second interleaved data sequence using a second interleaving pattern in which an output order pattern of the second interleaved data sequence is different from the output order pattern of the first data sequence, wherein an amount of data of the first data sequence interleaved using the first interleaving pattern and the amount of data of the second data sequence interleaved by the second interleaving pattern are the same, and wherein the interleaver is configured to interleave the first data sequence every x-amount of symbols, and interleave the second data sequence every y-amount of symbols, where x and y are not equal;
  a modulator configured to modulate the first interleaved data sequence into a first modulated symbol, and modulate the second interleaved data sequence into a second modulated symbol;
  a first antenna;
  a second antenna; and
  a transmitter configured to transmit the first modulated symbol from the first antenna in a frequency band and simultaneously transmitting the second modulated symbol from the second antenna in the frequency band.

8. The transmission apparatus according to claim 7, wherein the first interleaving pattern and the second interleaving pattern are selected to be uncorrelated between the antennas.

9. The transmission apparatus according to claim 7, wherein the first data sequence and the second data sequence are encoded in a block size; and the transmitter is configured to switch the first and second antennas at least once per encoded block.

10. The transmission apparatus according to claim 7, wherein the interleaver is configured to perform interleaving in a block size equal to a least a common multiple of x and y.

11. The transmission apparatus according to claim 7, wherein the interleaver is configured to perform interleaving wherein at least one of x and y is a prime number.

12. The transmission apparatus according to claim 7, wherein the interleaver is configured to perform interleaving by providing an offset in at least one of a frequency domain and a time domain.

* * * * *